US010992784B2

(12) United States Patent
Decenzo et al.

(10) Patent No.: US 10,992,784 B2
(45) Date of Patent: Apr. 27, 2021

(54) COMMUNICATION PROTOCOLS OVER INTERNET PROTOCOL (IP) NETWORKS

(71) Applicant: iControl Networks, Inc., Philadelphia, PA (US)

(72) Inventors: Chris Decenzo, Menlo Park, CA (US); Marc Baum, Redwood City, CA (US); Paul Dawes, Redwood City, CA (US); Frank Chu, Redwood City, CA (US)

(73) Assignee: Control Networks, Inc., Philadelphia, PA (US)

( * ) Notice: Subject to any disclaimer, the term of this patent is extended or adjusted under 35 U.S.C. 154(b) by 0 days.

(21) Appl. No.: 16/221,299

(22) Filed: Dec. 14, 2018

(65) Prior Publication Data

US 2019/0379766 A1 Dec. 12, 2019

Related U.S. Application Data

(63) Continuation of application No. 14/202,579, filed on Mar. 10, 2014, now Pat. No. 10,200,504, which is a (Continued)

(51) Int. Cl.
*H04L 29/06* (2006.01)
*G07C 9/00* (2020.01)
(Continued)

(52) U.S. Cl.
CPC ............... *H04L 67/42* (2013.01); *G07C 9/00* (2013.01); *H04L 65/4084* (2013.01);
(Continued)

(58) Field of Classification Search
CPC ......... H04L 67/42; H04L 67/10; H04L 67/12; H04L 65/4084; G07C 9/00; H04N 7/18
(Continued)

(56) References Cited

U.S. PATENT DOCUMENTS 686,838 A 11/1901 Appel
1,738,540 A 12/1929 Replogle et al.
(Continued)

FOREIGN PATENT DOCUMENTS

AU 2005223267 B2 12/2010
AU 2010297957 A1 5/2012
(Continued)

OTHER PUBLICATIONS

"Dragging" The Authoritative Dictionary of IEEE Standard Terms. 7th ed. 2000, p. 337.
(Continued)

*Primary Examiner* — Tauqir Hussain
(74) *Attorney, Agent, or Firm* — Bakerhostetler

(57) ABSTRACT

A system and methods comprise a touchscreen at a premises. The touchscreen includes a processor coupled to a security system at the premises. User interfaces are presented via the touchscreen. The user interfaces include a security interface that provides control of functions of the security system and access to data collected by the security system, and a network interface that provides access to network devices. A camera at the premises is coupled to the touchscreen via a plurality of interfaces. A security server at a remote location is coupled to the touchscreen. The security server comprises a client interface through which remote client devices exchange data with the touchscreen and the security system.

30 Claims, 27 Drawing Sheets

Related U.S. Application Data continuation-in-part of application No. 13/932,837, filed on Jul. 1, 2013, now Pat. No. 9,621,408, and a continuation-in-part of application No. 13/925,181, filed on Jun. 24, 2013, now Pat. No. 10,339,791, and a continuation-in-part of application No. 13/718,851, filed on Dec. 18, 2012, now Pat. No. 10,156,831, and a continuation-in-part of application No. 13/531,757, filed on Jun. 25, 2012, now abandoned, and a continuation-in-part of application No. 13/335,279, filed on Dec. 22, 2011, said application No. 13/932,837 is a continuation-in-part of application No. 13/311,365, filed on Dec. 5, 2011, now Pat. No. 9,141,276, said application No. 14/202,579 is a continuation-in-part of application No. 13/104,932, filed on May 10, 2011, and a continuation-in-part of application No. 12/750,470, filed on Mar. 30, 2010, now Pat. No. 9,191,228, said application No. 13/932,837 is a continuation-in-part of application No. 12/637,671, filed on Dec. 14, 2009, now Pat. No. 8,478,871, said application No. 14/202,579 is a continuation-in-part of application No. 12/539,537, filed on Aug. 11, 2009, now Pat. No. 10,156,959, said application No. 13/104,932 is a continuation-in-part of application No. 12/269,585, filed on Nov. 12, 2008, now Pat. No. 8,086,702, said application No. 13/531,757 is a continuation-in-part of application No. 12/269,735, filed on Nov. 12, 2008, now Pat. No. 8,996,665, said application No. 13/335,279 is a continuation of application No. 12/267,767, filed on Nov. 10, 2008, now abandoned, said application No. 13/531,757 is a continuation-in-part of application No. 12/198,023, filed on Aug. 25, 2008, now Pat. No. 8,209,400, said application No. 13/335,279 is a continuation of application No. 12/197,895, filed on Aug. 25, 2008, now Pat. No. 8,073,931, said application No. 13/531,757 is a continuation-in-part of application No. 12/197,931, filed on Aug. 25, 2008, now Pat. No. 9,172,553, said application No. 14/202,579 is a continuation-in-part of application No. 12/197,946, filed on Aug. 25, 2008, now Pat. No. 8,612,591, said application No. 13/925,181 is a continuation of application No. 12/189,757, filed on Aug. 11, 2008, now Pat. No. 8,473,619, said application No. 13/335,279 is a continuation-in-part of application No. 12/019,554, filed on Jan. 24, 2008, now Pat. No. 7,911,341, said application No. 14/202,579 is a continuation-in-part of application No. 12/019,568, filed on Jan. 24, 2008, now Pat. No. 10,142,392, and a continuation-in-part of application No. 11/761,745, filed on Jun. 12, 2007, now Pat. No. 8,635,350, said application No. 13/335,279 is a continuation-in-part of application No. 11/761,718, filed on Jun. 12, 2007, now Pat. No. 7,711,796, said application No. 13/718,851 is a continuation of application No. 11/084,232, filed on Mar. 16, 2005, now Pat. No. 8,335,842.

(60) Provisional application No. 61/802,077, filed on Mar. 15, 2013, provisional application No. 61/782,345, filed on Mar. 14, 2013, provisional application No. 61/781,713, filed on Mar. 14, 2013, provisional application No. 61/781,401, filed on Mar. 14, 2013, provisional application No. 61/779,753, filed on Mar. 13, 2013, provisional application No. 61/780,435, filed on Mar. 13, 2013, provisional application No. 61/780,538, filed on Mar. 13, 2013, provisional application No. 61/780,092, filed on Mar. 13, 2013, provisional application No. 61/778,853, filed on Mar. 13, 2013, provisional application No. 61/780,637, filed on Mar. 13, 2013, provisional application No. 61/779,028, filed on Mar. 13, 2013, provisional application No. 61/780,290, filed on Mar. 13, 2013, provisional application No. 61/777,061, filed on Mar. 12, 2013, provisional application No. 61/333,130, filed on May 10, 2010, provisional application No. 61/164,877, filed on Mar. 30, 2009, provisional application No. 61/087,967, filed on Aug. 11, 2008, provisional application No. 61/023,496, filed on Jan. 25, 2008, provisional application No. 61/023,489, filed on Jan. 25, 2008, provisional application No. 61/023,493, filed on Jan. 25, 2008, provisional application No. 61/019,162, filed on Jan. 4, 2008, provisional application No. 61/019,167, filed on Jan. 4, 2008, provisional application No. 60/987,366, filed on Nov. 12, 2007, provisional application No. 60/987,359, filed on Nov. 12, 2007, provisional application No. 60/968,005, filed on Aug. 24, 2007, provisional application No. 60/957,997, filed on Aug. 24, 2007, provisional application No. 60/955,172, filed on Aug. 10, 2007, provisional application No. 60/886,439, filed on Jan. 24, 2007, provisional application No. 60/886,435, filed on Jan. 24, 2007, provisional application No. 60/804,550, filed on Jun. 12, 2006, provisional application No. 60/652,475, filed on Feb. 11, 2005, provisional application No. 60/553,932, filed on Mar. 16, 2004, provisional application No. 60/553,934, filed on Mar. 16, 2004.

(51) Int. Cl.
*H04L 29/08* (2006.01)
*H04N 7/18* (2006.01)

(52) U.S. Cl.
CPC ............. *H04L 67/10* (2013.01); *H04L 67/12* (2013.01); *H04N 7/18* (2013.01)

(58) Field of Classification Search
USPC ........................................................ 709/203
See application file for complete search history.

(56) References Cited

U.S. PATENT DOCUMENTS

| | | |
|---|---|---|
| 3,803,576 A | 4/1974 | Dobrzanski et al. |
| 3,852,541 A | 12/1974 | Altenberger |
| 4,006,460 A | 2/1977 | Hewitt et al. |
| 4,141,006 A | 2/1979 | Braxton |
| 4,206,449 A | 6/1980 | Apsell et al. |
| 4,257,038 A | 3/1981 | Rounds et al. |
| 4,286,331 A | 8/1981 | Anderson et al. |
| 4,304,970 A | 12/1981 | Fahey et al. |
| 4,351,023 A | 9/1982 | Richer |
| 4,363,031 A | 12/1982 | Reinowitz |
| 4,459,582 A | 7/1984 | Sheahan et al. |
| 4,520,503 A | 5/1985 | Kirst et al. |
| 4,559,526 A | 12/1985 | Tani et al. |
| 4,559,527 A | 12/1985 | Kirby |
| 4,567,557 A | 1/1986 | Burns |
| 4,574,305 A | 3/1986 | Campbell et al. |
| 4,581,606 A | 4/1986 | Mallory |
| 4,591,834 A | 5/1986 | Kyle |
| D284,084 S | 6/1986 | Ferrara, Jr. |
| 4,641,127 A | 2/1987 | Hogan et al. |
| 4,652,859 A | 3/1987 | Van Wienen |
| 4,670,739 A | 6/1987 | Kelly, Jr. |
| 4,683,460 A | 7/1987 | Nakatsugawa |
| 4,694,282 A | 9/1987 | Tamura et al. |

(56) References Cited

U.S. PATENT DOCUMENTS

| | | |
|---|---|---|
| 4,716,973 A | 1/1988 | Cobern |
| 4,730,184 A | 3/1988 | Bach |
| 4,754,261 A | 6/1988 | Marino |
| 4,755,792 A | 7/1988 | Pezzolo et al. |
| 4,779,007 A | 10/1988 | Schlanger et al. |
| 4,801,924 A | 1/1989 | Burgmann et al. |
| 4,812,820 A | 3/1989 | Chatwin |
| 4,818,970 A | 4/1989 | Natale et al. |
| 4,833,339 A | 5/1989 | Luchaco et al. |
| 4,833,449 A | 5/1989 | Gaffigan |
| 4,855,713 A | 8/1989 | Brunius |
| 4,860,185 A | 8/1989 | Brewer et al. |
| 4,887,064 A | 12/1989 | Drori et al. |
| 4,897,630 A | 1/1990 | Nykerk |
| 4,918,623 A | 4/1990 | Lockitt et al. |
| 4,918,717 A | 4/1990 | Bissonnette et al. |
| 4,951,029 A | 8/1990 | Severson |
| 4,959,713 A | 9/1990 | Morotomi et al. |
| 4,962,473 A | 10/1990 | Crain |
| 4,980,666 A | 12/1990 | Hwang |
| 4,993,059 A | 2/1991 | Smith et al. |
| 4,994,787 A | 2/1991 | Kratt et al. |
| 4,996,646 A | 2/1991 | Farrington |
| 5,023,901 A | 6/1991 | Sloan et al. |
| 5,083,106 A | 1/1992 | Kostusiak et al. |
| 5,086,385 A | 2/1992 | Launey et al. |
| 5,091,780 A | 2/1992 | Pomerleau |
| 5,109,278 A | 4/1992 | Erickson et al. |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| 5,164,703 A | 11/1992 | Rickman |
| 5,164,979 A | 11/1992 | Choi |
| D337,569 S | 7/1993 | Kando |
| 5,227,776 A | 7/1993 | Starefoss |
| 5,237,305 A | 8/1993 | Ishikuro et al. |
| 5,245,694 A | 9/1993 | Zwern |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Simms et al. |
| 5,400,011 A | 3/1995 | Sutton |
| 5,400,246 A | 3/1995 | Wilson et al. |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,481,312 A | 1/1996 | Cash et al. |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A | 11/1996 | Mun |
| D377,034 S | 12/1996 | Matsushita |
| 5,586,254 A | 12/1996 | Kondo et al. |
| 5,587,705 A | 12/1996 | Morris |
| 5,598,086 A | 1/1997 | Somerville |
| 5,602,918 A | 2/1997 | Chen et al. |
| 5,604,493 A | 2/1997 | Behlke |
| 5,606,615 A | 2/1997 | Lapointe et al. |
| 5,621,662 A | 4/1997 | Humphries et al. |
| 5,623,601 A | 4/1997 | Vu |
| 5,625,338 A | 4/1997 | Pildner et al. |
| 5,625,410 A | 4/1997 | Washino et al. |
| 5,629,687 A | 5/1997 | Sutton et al. |
| 5,630,216 A | 5/1997 | McEwan |
| 5,631,630 A | 5/1997 | McSweeney |
| 5,638,046 A | 6/1997 | Malinowski |
| 5,650,773 A | 7/1997 | Chiarello |
| 5,651,070 A | 7/1997 | Blunt |
| 5,652,567 A | 7/1997 | Traxler |
| 5,654,694 A | 8/1997 | Newham |
| 5,675,321 A | 10/1997 | McBride |
| 5,680,131 A | 10/1997 | Utz |
| 5,682,133 A | 10/1997 | Johnson et al. |
| 5,686,885 A | 11/1997 | Bergman |
| 5,686,896 A | 11/1997 | Bergman |
| 5,689,235 A | 11/1997 | Sugimoto et al. |
| 5,689,708 A | 11/1997 | Regnier et al. |
| 5,691,697 A | 11/1997 | Carvalho et al. |
| 5,694,335 A | 12/1997 | Hollenberg |
| 5,694,595 A | 12/1997 | Jacobs et al. |
| 5,696,486 A | 12/1997 | Poliquin et al. |
| 5,696,898 A | 12/1997 | Baker et al. |
| D389,501 S | 1/1998 | Mascarenas et al. |
| 5,706,191 A | 1/1998 | Bassett et al. |
| 5,712,679 A | 1/1998 | Coles |
| 5,714,933 A | 2/1998 | Le Van Suu |
| 5,715,394 A | 2/1998 | Jabs |
| 5,717,378 A | 2/1998 | Malvaso et al. |
| 5,717,379 A | 2/1998 | Peters |
| 5,717,578 A | 2/1998 | Afzal |
| 5,719,551 A | 2/1998 | Flick |
| 5,726,912 A | 3/1998 | Krall et al. |
| 5,731,756 A | 3/1998 | Roddy |
| 5,736,927 A | 4/1998 | Stebbins et al. |
| 5,737,391 A | 4/1998 | Dame et al. |
| 5,748,084 A | 5/1998 | Isikoff |
| 5,748,089 A | 5/1998 | Sizemore |
| 5,757,616 A | 5/1998 | May et al. |
| 5,761,206 A | 6/1998 | Kackman |
| 5,774,051 A | 6/1998 | Kostusiak |
| 5,777,551 A | 7/1998 | Hess |
| 5,777,837 A | 7/1998 | Eckel et al. |
| 5,784,461 A | 7/1998 | Shaffer et al. |
| 5,784,463 A | 7/1998 | Chen et al. |
| 5,793,028 A | 8/1998 | Wagener et al. |
| 5,793,763 A | 8/1998 | Mayes et al. |
| 5,794,128 A | 8/1998 | Brockel et al. |
| 5,796,401 A | 8/1998 | Winer |
| 5,798,701 A | 8/1998 | Bernal et al. |
| 5,801,618 A | 9/1998 | Jenkins |
| 5,805,056 A | 9/1998 | Mueller et al. |
| 5,805,064 A | 9/1998 | Yorkey |
| 5,809,013 A | 9/1998 | Kackman |
| 5,812,054 A | 9/1998 | Cohen |
| 5,819,124 A | 10/1998 | Somner et al. |
| 5,821,937 A | 10/1998 | Tonelli |
| 5,844,599 A | 12/1998 | Hildin |
| 5,845,070 A | 12/1998 | Ikudome |
| 5,854,588 A | 12/1998 | Dockery |
| 5,859,966 A | 1/1999 | Hayman et al. |
| 5,861,804 A | 1/1999 | Fansa et al. |
| 5,867,484 A | 2/1999 | Shaunfield |
| 5,874,952 A | 2/1999 | Morgan |

(56) References Cited

U.S. PATENT DOCUMENTS

| | | |
|---|---|---|
| 5,875,395 A | 2/1999 | Holmes |
| 5,877,696 A | 3/1999 | Powell |
| 5,880,775 A | 3/1999 | Ross |
| 5,881,226 A | 3/1999 | Veneklase |
| 5,886,894 A | 3/1999 | Rakoff |
| 5,892,442 A | 4/1999 | Ozery |
| 5,898,831 A | 4/1999 | Hall et al. |
| 5,905,438 A | 5/1999 | Weiss et al. |
| 5,907,279 A | 5/1999 | Bruins et al. |
| 5,909,183 A | 6/1999 | Borgstahl et al. |
| 5,914,655 A | 6/1999 | Clifton et al. |
| 5,924,069 A | 7/1999 | Kowalkowski et al. |
| 5,926,209 A | 7/1999 | Glatt |
| 5,933,098 A | 8/1999 | Haxton |
| 5,940,387 A | 8/1999 | Humpleman |
| 5,943,394 A | 8/1999 | Ader et al. |
| 5,952,815 A | 9/1999 | Rouillard et al. |
| 5,955,946 A | 9/1999 | Beheshti et al. |
| 5,958,053 A | 9/1999 | Denker |
| 5,959,528 A | 9/1999 | Right et al. |
| 5,959,529 A | 9/1999 | Kail, IV |
| 5,963,916 A | 10/1999 | Kaplan |
| 5,967,975 A | 10/1999 | Ridgeway |
| D416,910 S | 11/1999 | Vasquez |
| 5,982,418 A | 11/1999 | Ely |
| 5,991,795 A | 11/1999 | Howard et al. |
| 6,002,430 A | 12/1999 | McCall et al. |
| 6,009,320 A | 12/1999 | Dudley |
| 6,011,321 A | 1/2000 | Stancu et al. |
| 6,011,921 A | 1/2000 | Takahashi et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,049,598 A | 4/2000 | Peters et al. |
| 6,052,052 A | 4/2000 | Delmonaco |
| 6,058,115 A | 5/2000 | Sawyer et al. |
| 6,060,994 A | 5/2000 | Chen |
| 6,067,346 A | 5/2000 | Akhteruzzaman |
| 6,067,440 A | 5/2000 | Diefes |
| 6,069,655 A | 5/2000 | Seeley et al. |
| 6,078,253 A | 6/2000 | Fowler |
| 6,078,257 A | 6/2000 | Ferraro |
| 6,078,649 A | 6/2000 | Small et al. |
| 6,085,030 A | 7/2000 | Whitehead et al. |
| 6,091,771 A | 7/2000 | Seeley et al. |
| 6,094,134 A | 7/2000 | Cohen |
| 6,097,429 A | 8/2000 | Seeley et al. |
| 6,104,785 A | 8/2000 | Chen |
| 6,107,918 A | 8/2000 | Klein et al. |
| 6,107,930 A | 8/2000 | Behlke et al. |
| 6,108,034 A | 8/2000 | Kim |
| 6,112,015 A | 8/2000 | Planas et al. |
| 6,112,237 A | 8/2000 | Donaldson et al. |
| 6,117,182 A | 9/2000 | Alpert et al. |
| 6,124,882 A | 9/2000 | Voois et al. |
| 6,128,653 A | 10/2000 | Del et al. |
| 6,134,303 A | 10/2000 | Chen |
| 6,134,591 A | 10/2000 | Nickles |
| 6,138,249 A | 10/2000 | Nolet |
| 6,139,177 A | 10/2000 | Venkatraman et al. |
| 6,140,987 A | 10/2000 | Stein et al. |
| 6,144,993 A | 11/2000 | Fukunaga et al. |
| 6,154,133 A | 11/2000 | Ross et al. |
| 6,157,943 A | 12/2000 | Meyer |
| 6,161,182 A | 12/2000 | Nadooshan |
| 6,167,186 A | 12/2000 | Kawasaki et al. |
| 6,181,341 B1 | 1/2001 | Shinagawa |
| 6,192,282 B1 | 2/2001 | Smith et al. |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,208,952 B1 | 3/2001 | Goertzel et al. |
| 6,209,011 B1 | 3/2001 | Vong et al. |
| 6,211,783 B1 | 4/2001 | Wang |
| 6,215,404 B1 | 4/2001 | Morales |
| 6,218,938 B1 | 4/2001 | Lin |
| 6,219,677 B1 | 4/2001 | Howard |
| 6,226,031 B1 | 5/2001 | Barraclough et al. |
| 6,229,429 B1 | 5/2001 | Horon |
| 6,230,271 B1 | 5/2001 | Wadlow et al. |
| 6,239,892 B1 | 5/2001 | Davidson |
| 6,243,683 B1 | 6/2001 | Peters |
| 6,246,320 B1 | 6/2001 | Monroe |
| 6,271,752 B1 | 8/2001 | Vaios |
| 6,275,227 B1 | 8/2001 | Destefano |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,292,766 B1 | 9/2001 | Mattos et al. |
| 6,292,827 B1 | 9/2001 | Raz |
| 6,295,346 B1 | 9/2001 | Markowitz et al. |
| 6,314,425 B1 | 11/2001 | Serbinis et al. |
| 6,320,506 B1 | 11/2001 | Ferraro |
| 6,323,897 B1 | 11/2001 | Kogane et al. |
| D451,529 S | 12/2001 | Vasquez |
| 6,331,122 B1 | 12/2001 | Wu |
| 6,332,193 B1 | 12/2001 | Glass et al. |
| 6,347,393 B1 | 2/2002 | Alpert et al. |
| 6,351,213 B1 | 2/2002 | Hirsch et al. |
| 6,351,595 B1 | 2/2002 | Kim |
| 6,351,829 B1 | 2/2002 | Dupont et al. |
| 6,353,853 B1 | 3/2002 | Gravlin |
| 6,353,891 B1 | 3/2002 | Borella et al. |
| 6,359,560 B1 | 3/2002 | Budge et al. |
| 6,363,417 B1 | 3/2002 | Howard et al. |
| 6,363,422 B1 | 3/2002 | Hunter et al. |
| 6,366,211 B1 | 4/2002 | Parker |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,378,109 B1 | 4/2002 | Young et al. |
| 6,385,772 B1 | 5/2002 | Courtney |
| 6,392,538 B1 | 5/2002 | Shere |
| 6,400,265 B1 | 6/2002 | Saylor et al. |
| 6,405,348 B1 | 6/2002 | Fallah-Tehrani et al. |
| 6,411,802 B1 | 6/2002 | Cardina et al. |
| D460,472 S | 7/2002 | Wang |
| 6,418,037 B1 | 7/2002 | Zhang |
| 6,421,080 B1 | 7/2002 | Lambert |
| 6,430,629 B1 | 8/2002 | Smyers |
| 6,433,683 B1 | 8/2002 | Robinson |
| 6,434,700 B1 | 8/2002 | Alonso et al. |
| 6,437,692 B1 | 8/2002 | Petite et al. |
| 6,441,723 B1 | 8/2002 | Mansfield et al. |
| 6,442,241 B1 | 8/2002 | Tsumpes |
| 6,445,291 B2 | 9/2002 | Addy et al. |
| 6,446,192 B1 | 9/2002 | Narasimhan et al. |
| 6,452,490 B1 | 9/2002 | Garland et al. |
| 6,452,923 B1 | 9/2002 | Gerszberg et al. |
| 6,453,687 B2 | 9/2002 | Sharood et al. |
| D464,328 S | 10/2002 | Vasquez et al. |
| D464,948 S | 10/2002 | Vasquez et al. |
| 6,462,507 B2 | 10/2002 | Fisher, Jr. |
| 6,462,663 B1 | 10/2002 | Wilson et al. |
| 6,467,084 B1 | 10/2002 | Howard et al. |
| 6,476,858 B1 | 11/2002 | Ramirez et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,499,131 B1 | 12/2002 | Savithri et al. |
| 6,504,479 B1 | 1/2003 | Lemons et al. |
| 6,507,589 B1 | 1/2003 | Ramasubramani et al. |
| 6,526,581 B1 | 2/2003 | Edson |
| 6,529,230 B1 | 3/2003 | Chong |
| 6,529,723 B1 | 3/2003 | Bentley |
| 6,542,075 B2 | 4/2003 | Barker et al. |

(56) References Cited

U.S. PATENT DOCUMENTS

| | | |
|---|---|---|
| 6,542,992 B1 | 4/2003 | Peirce et al. |
| 6,552,647 B1 | 4/2003 | Thiessen et al. |
| 6,553,336 B1 | 4/2003 | Johnson et al. |
| 6,559,769 B2 | 5/2003 | Anthony et al. |
| 6,563,800 B1 | 5/2003 | Salo et al. |
| 6,563,910 B2 | 5/2003 | Menard et al. |
| 6,567,122 B1 | 5/2003 | Anderson et al. |
| 6,567,502 B2 | 5/2003 | Zellner et al. |
| 6,574,234 B1 | 6/2003 | Myer et al. |
| 6,580,424 B1 | 6/2003 | Krumm |
| 6,580,950 B1 | 6/2003 | Johnson et al. |
| 6,587,046 B2 | 7/2003 | Joao |
| 6,587,455 B1 | 7/2003 | Ray et al. |
| 6,587,736 B2 | 7/2003 | Howard et al. |
| 6,587,739 B1 | 7/2003 | Abrams et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,611,206 B2 | 8/2003 | Eshelman et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,652 B2 | 11/2003 | Helgeson et al. |
| 6,643,669 B1 | 11/2003 | Novak et al. |
| 6,643,795 B1 | 11/2003 | Sicola et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,662,340 B2 | 12/2003 | Rawat et al. |
| 6,665,004 B1 | 12/2003 | Paff |
| 6,667,688 B1 | 12/2003 | Menard et al. |
| 6,674,767 B1 | 1/2004 | Kadyk et al. |
| 6,675,365 B2 | 1/2004 | Elzinga |
| 6,680,730 B1 | 1/2004 | Shields et al. |
| 6,686,838 B1 | 2/2004 | Rezvani et al. |
| 6,690,411 B2 | 2/2004 | Naidoo et al. |
| 6,690,719 B1 | 2/2004 | Raphaeli et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,720,990 B1 | 4/2004 | Walker et al. |
| 6,721,689 B2 | 4/2004 | Markle et al. |
| 6,721,740 B1 | 4/2004 | Skinner et al. |
| 6,721,747 B2 | 4/2004 | Lipkin |
| 6,721,802 B1 | 4/2004 | Wright et al. |
| 6,727,811 B1 | 4/2004 | Fendis |
| 6,728,233 B1 | 4/2004 | Park et al. |
| 6,728,688 B1 | 4/2004 | Hirsch et al. |
| 6,738,824 B1 | 5/2004 | Blair |
| 6,741,171 B2 | 5/2004 | Palka et al. |
| 6,754,717 B1 | 6/2004 | Day et al. |
| 6,756,896 B2 | 6/2004 | Ford |
| 6,756,998 B1 | 6/2004 | Bilger |
| 6,759,956 B2 | 7/2004 | Menard et al. |
| 6,762,686 B1 | 7/2004 | Tabe |
| 6,771,181 B1 | 8/2004 | Hughen, Jr. |
| 6,778,085 B2 | 8/2004 | Faulkner et al. |
| 6,779,019 B1 | 8/2004 | Mousseau et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,795,863 B1 | 9/2004 | Doty, Jr. |
| 6,798,344 B2 | 9/2004 | Faulkner et al. |
| 6,804,638 B2 | 10/2004 | Fiedler |
| 6,810,409 B1 | 10/2004 | Fry et al. |
| 6,826,173 B1 | 11/2004 | Kung et al. |
| 6,826,233 B1 | 11/2004 | Oosawa |
| 6,829,478 B1 | 12/2004 | Layton et al. |
| 6,834,208 B2 | 12/2004 | Gonzales et al. |
| 6,836,214 B2 | 12/2004 | Choi |
| 6,850,252 B1 | 2/2005 | Hoffberg |
| 6,856,236 B2 | 2/2005 | Christensen et al. |
| 6,857,026 B1 | 2/2005 | Cain |
| 6,865,690 B2 | 3/2005 | Kocin |
| 6,871,193 B1 | 3/2005 | Campbell et al. |
| 6,873,256 B2 | 3/2005 | Lemelson et al. |
| 6,885,362 B2 | 4/2005 | Suomela |
| D504,889 S | 5/2005 | Andre et al. |
| 6,891,838 B1 | 5/2005 | Petite et al. |
| 6,912,429 B1 | 6/2005 | Bilger |
| 6,914,533 B2 | 7/2005 | Petite |
| 6,918,112 B2 | 7/2005 | Bourke-Dunphy et al. |
| 6,920,502 B2 | 7/2005 | Araujo et al. |
| 6,920,615 B1 | 7/2005 | Campbell et al. |
| 6,922,701 B1 | 7/2005 | Ananian et al. |
| 6,928,148 B2 | 8/2005 | Simon et al. |
| 6,930,598 B2 | 8/2005 | Weiss |
| 6,930,599 B2 | 8/2005 | Naidoo et al. |
| 6,930,730 B2 | 8/2005 | Maxson et al. |
| 6,931,445 B2 | 8/2005 | Davis |
| 6,941,258 B2 | 9/2005 | Van et al. |
| 6,943,681 B2 | 9/2005 | Rezvani et al. |
| 6,956,477 B2 | 10/2005 | Chun |
| 6,957,186 B1 | 10/2005 | Guheen et al. |
| 6,957,275 B1 | 10/2005 | Sekiguchi |
| 6,959,341 B1 | 10/2005 | Leung |
| 6,959,393 B2 | 10/2005 | Hollis et al. |
| 6,963,908 B1 | 11/2005 | Lynch et al. |
| 6,963,981 B1 | 11/2005 | Bailey et al. |
| 6,965,294 B1 | 11/2005 | Elliott et al. |
| 6,965,313 B1 | 11/2005 | Saylor et al. |
| 6,970,183 B1 | 11/2005 | Monroe |
| 6,971,076 B2 | 11/2005 | Chen |
| 6,972,676 B1 | 12/2005 | Kimmel et al. |
| 6,975,220 B1 | 12/2005 | Foodman et al. |
| 6,977,485 B1 | 12/2005 | Wei |
| 6,983,432 B2 | 1/2006 | Hayes |
| 6,990,591 B1 | 1/2006 | Pearson |
| 6,993,658 B1 | 1/2006 | Engberg et al. |
| 6,999,562 B2 | 2/2006 | Winick |
| 6,999,992 B1 | 2/2006 | Deen et al. |
| 7,015,806 B2 | 3/2006 | Naidoo et al. |
| 7,016,970 B2 | 3/2006 | Harumoto et al. |
| 7,019,639 B2 | 3/2006 | Stilp |
| 7,020,697 B1 | 3/2006 | Goodman et al. |
| 7,020,701 B1 | 3/2006 | Gelvin et al. |
| 7,023,913 B1 | 4/2006 | Monroe |
| 7,023,914 B2 | 4/2006 | Furukawa et al. |
| 7,023,975 B2 | 4/2006 | Mansfield et al. |
| 7,024,676 B1 | 4/2006 | Klopfenstein |
| 7,028,328 B2 | 4/2006 | Kogane et al. |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,047,180 B1 | 5/2006 | Mathews et al. |
| 7,050,388 B2 | 5/2006 | Kim et al. |
| 7,053,764 B2 | 5/2006 | Stilp |
| 7,053,765 B1 | 5/2006 | Clark |
| 7,068,164 B1 | 6/2006 | Duncan et al. |
| 7,072,934 B2 | 7/2006 | Helgeson et al. |
| 7,073,140 B1 | 7/2006 | Li et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,084,756 B2 | 8/2006 | Stilp |
| 7,085,814 B1 | 8/2006 | Gandhi et al. |
| 7,085,937 B1 | 8/2006 | Rezvani et al. |
| 7,086,018 B2 | 8/2006 | Ito |
| 7,099,944 B1 | 8/2006 | Anschutz et al. |
| 7,099,994 B2 | 8/2006 | Thayer et al. |
| 7,103,152 B2 | 9/2006 | Naidoo et al. |

(56) References Cited

U.S. PATENT DOCUMENTS

| | | |
|---|---|---|
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,609 B2 | 10/2006 | Naidoo et al. |
| 7,119,674 B2 | 10/2006 | Sefton |
| 7,120,139 B1 | 10/2006 | Kung et al. |
| 7,120,232 B2 | 10/2006 | Naidoo et al. |
| 7,120,233 B2 | 10/2006 | Naidoo et al. |
| 7,126,473 B1 | 10/2006 | Powell |
| 7,130,383 B2 | 10/2006 | Naidoo et al. |
| 7,130,585 B1 | 10/2006 | Ollis et al. |
| 7,134,138 B2 | 11/2006 | Scherr |
| 7,136,711 B1 | 11/2006 | Duncan et al. |
| 7,142,503 B1 | 11/2006 | Grant et al. |
| 7,147,147 B1 | 12/2006 | Enright et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,158,026 B2 | 1/2007 | Feldkamp et al. |
| 7,158,776 B1 | 1/2007 | Estes et al. |
| 7,158,920 B2 | 1/2007 | Ishikawa |
| 7,164,883 B2 | 1/2007 | Rappaport et al. |
| 7,164,907 B2 | 1/2007 | Cochran et al. |
| 7,166,987 B2 | 1/2007 | Lee et al. |
| 7,171,466 B2 | 1/2007 | Van Der Meulen |
| 7,171,686 B1 | 1/2007 | Jansen et al. |
| 7,174,018 B1 | 2/2007 | Patil et al. |
| 7,174,564 B1 | 2/2007 | Weatherspoon et al. |
| 7,180,889 B1 | 2/2007 | Kung et al. |
| 7,181,207 B1 | 2/2007 | Chow et al. |
| 7,181,716 B1 | 2/2007 | Dahroug |
| 7,183,907 B2 | 2/2007 | Simon et al. |
| 7,184,848 B2 | 2/2007 | Krzyzanowski et al. |
| 7,187,279 B2 | 3/2007 | Chung |
| 7,187,986 B2 | 3/2007 | Johnson et al. |
| 7,194,003 B2 | 3/2007 | Danner et al. |
| 7,194,446 B1 | 3/2007 | Bromley et al. |
| 7,203,486 B2 | 4/2007 | Patel |
| 7,209,945 B2 | 4/2007 | Hicks et al. |
| 7,212,570 B2 | 5/2007 | Akiyama et al. |
| 7,213,061 B1 | 5/2007 | Hite et al. |
| 7,218,217 B2 | 5/2007 | Adonailo et al. |
| 7,222,359 B2 | 5/2007 | Freund et al. |
| 7,229,012 B1 | 6/2007 | Enright et al. |
| 7,237,267 B2 | 6/2007 | Rapes et al. |
| 7,240,327 B2 | 7/2007 | Singh et al. |
| 7,246,044 B2 | 7/2007 | Imamura et al. |
| 7,248,150 B2 | 7/2007 | Mackjust et al. |
| 7,248,161 B2 | 7/2007 | Spoltore et al. |
| 7,249,177 B1 | 7/2007 | Miller |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,262,690 B2 | 8/2007 | Heaton et al. |
| 7,277,010 B2 | 10/2007 | Joao |
| 7,292,142 B2 | 11/2007 | Simon et al. |
| 7,293,083 B1 | 11/2007 | Ranous et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,340,314 B1 | 3/2008 | Duncan et al. |
| 7,343,619 B2 | 3/2008 | Ofek et al. |
| 7,345,580 B2 | 3/2008 | Akamatsu et al. |
| 7,346,338 B1 | 3/2008 | Calhoun et al. |
| 7,349,682 B1 | 3/2008 | Bennett et al. |
| 7,349,761 B1 | 3/2008 | Cruse |
| 7,349,967 B2 | 3/2008 | Wang |
| 7,356,372 B1 | 4/2008 | Duncan et al. |
| 7,359,843 B1 | 4/2008 | Keller et al. |
| 7,362,221 B2 | 4/2008 | Katz |
| 7,367,045 B2 | 4/2008 | Ofek et al. |
| 7,370,115 B2 | 5/2008 | Bae et al. |
| 7,383,339 B1 | 6/2008 | Meenan et al. |
| 7,383,522 B2 | 6/2008 | Murgai et al. |
| 7,391,298 B1 | 6/2008 | Campbell et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,440,767 B2 | 10/2008 | Ballay et al. |
| 7,447,775 B1 | 11/2008 | Zhu et al. |
| 7,454,731 B2 | 11/2008 | Oh et al. |
| 7,457,869 B2 | 11/2008 | Kernan |
| 7,466,223 B2 | 12/2008 | Sefton |
| 7,469,139 B2 | 12/2008 | Van De Groenendaal |
| 7,469,294 B1 | 12/2008 | Luo et al. |
| 7,469,381 B2 | 12/2008 | Ording |
| 7,469,391 B2 | 12/2008 | Carrere et al. |
| D584,738 S | 1/2009 | Kim et al. |
| D585,399 S | 1/2009 | Hwang |
| 7,477,629 B2 | 1/2009 | Tsirtsis et al. |
| 7,479,949 B2 | 1/2009 | Jobs et al. |
| 7,480,713 B2 | 1/2009 | Ullman |
| 7,480,724 B2 | 1/2009 | Zimler et al. |
| 7,483,958 B1 | 1/2009 | Elabbady et al. |
| 7,493,651 B2 | 2/2009 | Vaenskae et al. |
| 7,498,695 B2 | 3/2009 | Gaudreau et al. |
| 7,502,672 B1 | 3/2009 | Kolls |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,542,721 B1 | 6/2009 | Bonner et al. |
| 7,549,134 B1 | 6/2009 | Li |
| 7,551,071 B2 | 6/2009 | Bennett et al. |
| 7,554,934 B2 | 6/2009 | Abraham et al. |
| 7,558,379 B2 | 7/2009 | Winick |
| 7,558,903 B2 | 7/2009 | Kinstler |
| 7,562,323 B1 | 7/2009 | Bai |
| 7,564,855 B1 | 7/2009 | Georgiou |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,583,191 B2 | 9/2009 | Zinser |
| 7,587,464 B2 | 9/2009 | Moorer et al. |
| 7,590,953 B2 | 9/2009 | Chang |
| 7,595,816 B1 | 9/2009 | Enright et al. |
| 7,596,622 B2 | 9/2009 | Owen et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,606,767 B1 | 10/2009 | Couper et al. |
| 7,610,555 B2 | 10/2009 | Klein et al. |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,639,157 B1 | 12/2009 | Whitley et al. |
| 7,651,530 B2 | 1/2010 | Winick |
| 7,653,911 B2 | 1/2010 | Doshi et al. |
| 7,671,729 B2 | 3/2010 | Hershkovitz et al. |
| 7,679,503 B2 | 3/2010 | Mason et al. |
| 7,681,201 B2 | 3/2010 | Dale et al. |
| 7,697,028 B1 | 4/2010 | Johnson |

(56) References Cited

U.S. PATENT DOCUMENTS

| | | |
|---|---|---|
| 7,701,970 B2 | 4/2010 | Krits et al. |
| 7,702,782 B1 | 4/2010 | Pai |
| D615,083 S | 5/2010 | Andre et al. |
| 7,711,796 B2 | 5/2010 | Gutt et al. |
| 7,720,654 B2 | 5/2010 | Hollis |
| 7,733,371 B1 | 6/2010 | Monroe |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,747,975 B2 | 6/2010 | Dinter et al. |
| 7,751,409 B1 | 7/2010 | Carolan |
| 7,755,472 B2 | 7/2010 | Grossman |
| 7,755,506 B1 | 7/2010 | Clegg et al. |
| 7,761,275 B2 | 7/2010 | Chopra et al. |
| 7,787,863 B2 | 8/2010 | Van De Groenendaal |
| 7,804,760 B2 | 9/2010 | Schmukler et al. |
| D624,896 S | 10/2010 | Park et al. |
| D626,437 S | 11/2010 | Lee et al. |
| 7,825,793 B1 | 11/2010 | Spillman et al. |
| 7,827,252 B2 | 11/2010 | Hopmann et al. |
| 7,847,675 B1 | 12/2010 | Thyen et al. |
| 7,855,635 B2 | 12/2010 | Cohn et al. |
| 7,859,404 B2 | 12/2010 | Chul et al. |
| 7,882,466 B2 | 2/2011 | Ishikawa |
| 7,882,537 B2 | 2/2011 | Okajo et al. |
| 7,884,855 B2 | 2/2011 | Ortiz |
| 7,890,612 B2 | 2/2011 | Todd et al. |
| 7,890,915 B2 | 2/2011 | Celik et al. |
| 7,899,732 B2 | 3/2011 | Van et al. |
| 7,904,074 B2 | 3/2011 | Karaoguz et al. |
| 7,904,187 B2 | 3/2011 | Hoffberg et al. |
| 7,911,341 B2 | 3/2011 | Raji et al. |
| D636,769 S | 4/2011 | Wood et al. |
| 7,921,686 B2 | 4/2011 | Bagepalli et al. |
| 7,928,840 B2 | 4/2011 | Kim et al. |
| D637,596 S | 5/2011 | Akana et al. |
| 7,949,960 B2 | 5/2011 | Roessler et al. |
| D639,805 S | 6/2011 | Song et al. |
| D640,663 S | 6/2011 | Arnholt et al. |
| 7,956,736 B2 | 6/2011 | Cohn et al. |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,032,881 B2 | 10/2011 | Holmberg et al. |
| 8,042,049 B2 | 10/2011 | Killian et al. |
| 8,046,411 B2 | 10/2011 | Hayashi et al. |
| 8,069,194 B1 | 11/2011 | Manber et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,144,836 B2 | 3/2012 | Naidoo et al. |
| 8,149,849 B2 | 4/2012 | Osborn et al. |
| 8,159,519 B2 | 4/2012 | Kurtz et al. |
| 8,159,945 B2 | 4/2012 | Muro et al. |
| 8,160,425 B2 | 4/2012 | Kisliakov |
| 8,196,064 B2 | 6/2012 | Krzyzanowski et al. |
| 8,200,827 B1 | 6/2012 | Hunyady et al. |
| 8,205,181 B2 | 6/2012 | Singla et al. |
| 8,209,400 B2 | 6/2012 | Baum et al. |
| D663,298 S | 7/2012 | Song et al. |
| D664,540 S | 7/2012 | Kim et al. |
| 8,214,494 B1 | 7/2012 | Slavin |
| 8,214,496 B2 | 7/2012 | Gutt et al. |
| 8,229,812 B2 | 7/2012 | Raleigh |
| D664,954 S | 8/2012 | Kim et al. |
| D666,198 S | 8/2012 | Van et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 | 9/2012 | Elberbaum |
| 8,269,623 B2 | 9/2012 | Addy |
| 8,271,629 B1 | 9/2012 | Winters et al. |
| 8,271,881 B2 | 9/2012 | Moorer et al. |
| 8,272,053 B2 | 9/2012 | Markham et al. |
| 8,275,830 B2 | 9/2012 | Raleigh |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| 8,336,010 B1 | 12/2012 | Chang et al. |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| 8,350,694 B1 | 1/2013 | Trundle et al. |
| D675,588 S | 2/2013 | Park |
| D675,612 S | 2/2013 | Andre et al. |
| D676,443 S | 2/2013 | Canizares et al. |
| D676,819 S | 2/2013 | Choi |
| 8,373,313 B2 | 2/2013 | Garcia et al. |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| 8,396,766 B1 | 3/2013 | Enright et al. |
| 8,400,767 B2 | 3/2013 | Yeom et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| 8,413,204 B2 | 4/2013 | White et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,456,293 B1 | 6/2013 | Trundle et al. |
| 8,473,619 B2 | 6/2013 | Baum et al. |
| D685,778 S | 7/2013 | Fahrendorff et al. |
| D685,783 S | 7/2013 | Bryan et al. |
| 8,478,450 B2 | 7/2013 | Lu et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,493,202 B1 | 7/2013 | Trundle et al. |
| 8,499,038 B1 | 7/2013 | Vucurevich |
| 8,520,068 B2 | 8/2013 | Naidoo et al. |
| 8,520,072 B1 | 8/2013 | Slavin et al. |
| 8,525,664 B2 | 9/2013 | Hadizad et al. |
| 8,543,665 B2 | 9/2013 | Ansari et al. |

(56) References Cited

U.S. PATENT DOCUMENTS

| | | |
|---|---|---|
| D692,042 S | 10/2013 | Dawes et al. |
| 8,554,478 B2 | 10/2013 | Hartman |
| 8,560,041 B2 | 10/2013 | Flaherty et al. |
| 8,570,993 B2 | 10/2013 | Austin et al. |
| 8,584,199 B1 | 11/2013 | Chen et al. |
| 8,595,377 B1 | 11/2013 | Apgar et al. |
| D695,735 S | 12/2013 | Kitchen et al. |
| 8,599,018 B2 | 12/2013 | Kellen et al. |
| 8,612,591 B2 | 12/2013 | Dawes et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,666,560 B2 | 3/2014 | Lu et al. |
| 8,675,071 B1 | 3/2014 | Slavin et al. |
| 8,700,769 B2 | 4/2014 | Alexander et al. |
| 8,704,821 B2 | 4/2014 | Kulkarni et al. |
| 8,713,132 B2 | 4/2014 | Baum et al. |
| 8,723,671 B2 | 5/2014 | Foisy et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,819,178 B2 | 8/2014 | Baum et al. |
| 8,825,871 B2 | 9/2014 | Baum et al. |
| 8,836,467 B1 | 9/2014 | Cohn et al. |
| 8,885,552 B2 | 11/2014 | Bedingfield et al. |
| 8,902,740 B2 | 12/2014 | Hicks, III |
| 8,914,526 B1 | 12/2014 | Lindquist et al. |
| 8,914,837 B2 | 12/2014 | Ahmed et al. |
| 8,935,236 B2 | 1/2015 | Morita et al. |
| 8,937,658 B2 | 1/2015 | Hicks et al. |
| 8,953,479 B2 | 2/2015 | Hall et al. |
| 8,953,749 B2 | 2/2015 | Naidoo et al. |
| 8,963,713 B2 | 2/2015 | Dawes et al. |
| 8,976,763 B2 | 3/2015 | Shrestha et al. |
| 8,988,217 B2 | 3/2015 | Piccolo, III |
| 8,988,221 B2 | 3/2015 | Raji et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,064,394 B1 | 6/2015 | Trundle |
| 9,094,407 B1 | 7/2015 | Matthieu et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,147,337 B2 | 9/2015 | Cohn et al. |
| 9,160,784 B2 | 10/2015 | Jeong et al. |
| 9,170,707 B1 | 10/2015 | Laska et al. |
| 9,172,532 B1 | 10/2015 | Fuller et al. |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,553,738 B2 | 1/2017 | Meenan et al. |
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,721,461 B2 | 8/2017 | Zeng et al. |
| 9,729,342 B2 | 8/2017 | Cohn et al. |
| 9,779,595 B2 | 10/2017 | Thibault |
| 9,843,458 B2 | 12/2017 | Cronin |
| 9,876,651 B2 | 1/2018 | Cho et al. |
| 9,882,985 B1 | 1/2018 | Esam et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 10,025,473 B2 | 7/2018 | Sarao et al. |
| 10,051,078 B2 | 8/2018 | Burd et al. |
| 10,062,245 B2 | 8/2018 | Fulker et al. |
| 10,079,839 B1 | 9/2018 | Bryan et al. |
| 10,120,354 B1 | 11/2018 | Rolston et al. |
| 10,127,801 B2 | 11/2018 | Raji et al. |
| 10,142,392 B2 | 11/2018 | Raji et al. |
| 10,142,394 B2 | 11/2018 | Chmielewski et al. |
| 10,156,831 B2 | 12/2018 | Raji et al. |
| 10,223,903 B2 | 3/2019 | Raji et al. |
| 10,225,314 B2 | 3/2019 | Raji et al. |
| 10,237,237 B2 | 3/2019 | Dawes et al. |
| 10,237,757 B2 | 3/2019 | Raleigh et al. |
| 10,264,138 B2 | 4/2019 | Raleigh et al. |
| 10,313,303 B2 | 6/2019 | Baum et al. |
| 10,339,791 B2 | 7/2019 | Baum et al. |
| 10,348,575 B2 | 7/2019 | Sundermeyer et al. |
| 10,380,873 B1 | 8/2019 | Halverson |
| 10,430,887 B1 | 10/2019 | Parker et al. |
| 2001/0016501 A1 | 8/2001 | King |
| 2001/0022836 A1 | 9/2001 | Bremer et al. |
| 2001/0025349 A1 | 9/2001 | Sharood et al. |
| 2001/0029585 A1 | 10/2001 | Simon et al. |
| 2001/0030597 A1 | 10/2001 | Inoue et al. |
| 2001/0034209 A1 | 10/2001 | Tong et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0042137 A1 | 11/2001 | Ota et al. |
| 2001/0044835 A1 | 11/2001 | Schober et al. |
| 2001/0046366 A1 | 11/2001 | Susskind |
| 2001/0047474 A1 | 11/2001 | Takagi et al. |
| 2001/0053207 A1 | 12/2001 | Jeon et al. |
| 2001/0054115 A1 | 12/2001 | Ferguson et al. |
| 2002/0000913 A1 | 1/2002 | Hamamoto et al. |
| 2002/0003575 A1 | 1/2002 | Marchese |
| 2002/0004828 A1 | 1/2002 | Davis et al. |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0019751 A1 | 2/2002 | Rothschild et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0029276 A1 | 3/2002 | Bendinelli et al. |
| 2002/0031120 A1 | 3/2002 | Rakib |
| 2002/0032853 A1 | 3/2002 | Preston et al. |
| 2002/0037004 A1 | 3/2002 | Bossemeyer et al. |
| 2002/0038380 A1 | 3/2002 | Brawn et al. |
| 2002/0046280 A1 | 4/2002 | Fujita |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 | 5/2002 | Rakib |
| 2002/0068558 A1 | 6/2002 | Janik |
| 2002/0068984 A1 | 6/2002 | Alexander et al. |
| 2002/0072868 A1 | 6/2002 | Bartone et al. |
| 2002/0075153 A1 | 6/2002 | Dahl |
| 2002/0077077 A1 | 6/2002 | Rezvani et al. |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0099854 A1 | 7/2002 | Jorgensen |
| 2002/0103898 A1 | 8/2002 | Moyer et al. |
| 2002/0103927 A1 | 8/2002 | Parent |
| 2002/0107910 A1 | 8/2002 | Zhao |

(56) References Cited

U.S. PATENT DOCUMENTS

| | | |
|---|---|---|
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0118796 A1 | 8/2002 | Menard et al. |
| 2002/0120696 A1 | 8/2002 | Mousseau et al. |
| 2002/0120698 A1 | 8/2002 | Tamargo |
| 2002/0120790 A1 | 8/2002 | Schwalb |
| 2002/0126009 A1 | 9/2002 | Oyagi et al. |
| 2002/0128728 A1 | 9/2002 | Murakami et al. |
| 2002/0131404 A1 | 9/2002 | Mehta et al. |
| 2002/0133539 A1 | 9/2002 | Monday |
| 2002/0133578 A1 | 9/2002 | Wu |
| 2002/0143805 A1 | 10/2002 | Hayes et al. |
| 2002/0143923 A1 | 10/2002 | Alexander |
| 2002/0147982 A1 | 10/2002 | Naidoo et al. |
| 2002/0150086 A1 | 10/2002 | Bailey et al. |
| 2002/0152298 A1 | 10/2002 | Kikta et al. |
| 2002/0156564 A1 | 10/2002 | Preston et al. |
| 2002/0156899 A1 | 10/2002 | Sekiguchi |
| 2002/0163534 A1 | 11/2002 | Choi et al. |
| 2002/0163997 A1 | 11/2002 | Bergman et al. |
| 2002/0164997 A1 | 11/2002 | Parry |
| 2002/0165006 A1 | 11/2002 | Haller et al. |
| 2002/0166125 A1 | 11/2002 | Fulmer |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178100 A1 | 11/2002 | Koveos |
| 2002/0178211 A1 | 11/2002 | Singhal et al. |
| 2002/0180579 A1 | 12/2002 | Nagaoka |
| 2002/0184301 A1 | 12/2002 | Parent |
| 2002/0184527 A1 | 12/2002 | Chun et al. |
| 2002/0191636 A1 | 12/2002 | Hallenbeck |
| 2003/0001883 A1 | 1/2003 | Wang |
| 2003/0005030 A1 | 1/2003 | Sutton et al. |
| 2003/0009552 A1 | 1/2003 | Benfield et al. |
| 2003/0009553 A1 | 1/2003 | Benfield et al. |
| 2003/0010243 A1 | 1/2003 | Roller |
| 2003/0023839 A1 | 1/2003 | Burkhardt et al. |
| 2003/0025599 A1 | 2/2003 | Monroe |
| 2003/0028294 A1 | 2/2003 | Yanagi |
| 2003/0028398 A1 | 2/2003 | Yamashita et al. |
| 2003/0030548 A1 | 2/2003 | Kovacs et al. |
| 2003/0031165 A1 | 2/2003 | O'Brien |
| 2003/0038730 A1 | 2/2003 | Imafuku et al. |
| 2003/0038849 A1 | 2/2003 | Craven et al. |
| 2003/0039242 A1 | 2/2003 | Moore |
| 2003/0041137 A1 | 2/2003 | Horie et al. |
| 2003/0041167 A1 | 2/2003 | French et al. |
| 2003/0050731 A1 | 3/2003 | Rosenblum |
| 2003/0051009 A1 | 3/2003 | Shah et al. |
| 2003/0051026 A1 | 3/2003 | Carter et al. |
| 2003/0052905 A1 | 3/2003 | Gordon et al. |
| 2003/0052923 A1 | 3/2003 | Porter |
| 2003/0056012 A1 | 3/2003 | Modeste et al. |
| 2003/0056014 A1 | 3/2003 | Verberkt et al. |
| 2003/0060900 A1 | 3/2003 | Lo et al. |
| 2003/0061344 A1 * | 3/2003 | Monroe .............. G08B 25/085 709/224 |
| 2003/0061615 A1 | 3/2003 | Van Der Meulen |
| 2003/0061621 A1 | 3/2003 | Petty et al. |
| 2003/0062997 A1 | 4/2003 | Naidoo et al. |
| 2003/0065407 A1 | 4/2003 | Johnson et al. |
| 2003/0065757 A1 | 4/2003 | Mentze et al. |
| 2003/0065784 A1 | 4/2003 | Herrod |
| 2003/0065791 A1 | 4/2003 | Garg |
| 2003/0067923 A1 | 4/2003 | Ju et al. |
| 2003/0071724 A1 | 4/2003 | D Amico |
| 2003/0073406 A1 | 4/2003 | Benjamin et al. |
| 2003/0081768 A1 | 5/2003 | Caminschi |
| 2003/0090473 A1 | 5/2003 | Joshi |
| 2003/0096590 A1 | 5/2003 | Satoh |
| 2003/0101243 A1 | 5/2003 | Donahue et al. |
| 2003/0101459 A1 | 5/2003 | Edson |
| 2003/0103088 A1 | 6/2003 | Dresti et al. |
| 2003/0110262 A1 | 6/2003 | Hasan et al. |
| 2003/0110302 A1 | 6/2003 | Hodges et al. |
| 2003/0112866 A1 | 6/2003 | Yu et al. |
| 2003/0113100 A1 | 6/2003 | Hecht et al. |
| 2003/0115345 A1 | 6/2003 | Chien et al. |
| 2003/0123634 A1 | 7/2003 | Chee |
| 2003/0128114 A1 | 7/2003 | Quigley |
| 2003/0128115 A1 | 7/2003 | Giacopelli et al. |
| 2003/0132018 A1 | 7/2003 | Okita et al. |
| 2003/0134590 A1 | 7/2003 | Suda et al. |
| 2003/0137426 A1 | 7/2003 | Anthony et al. |
| 2003/0137991 A1 | 7/2003 | Doshi et al. |
| 2003/0147534 A1 | 8/2003 | Ablay et al. |
| 2003/0149671 A1 | 8/2003 | Yamamoto et al. |
| 2003/0153325 A1 | 8/2003 | Veerepalli et al. |
| 2003/0155757 A1 | 8/2003 | Larsen et al. |
| 2003/0158609 A1 | 8/2003 | Chiu |
| 2003/0158635 A1 | 8/2003 | Pillar et al. |
| 2003/0159135 A1 | 8/2003 | Hiller et al. |
| 2003/0169728 A1 | 9/2003 | Choi |
| 2003/0174154 A1 | 9/2003 | Yukie et al. |
| 2003/0174648 A1 | 9/2003 | Wang et al. |
| 2003/0174717 A1 | 9/2003 | Zabarski et al. |
| 2003/0177236 A1 | 9/2003 | Goto et al. |
| 2003/0182396 A1 | 9/2003 | Reich et al. |
| 2003/0182640 A1 | 9/2003 | Alani et al. |
| 2003/0184436 A1 | 10/2003 | Seales et al. |
| 2003/0187920 A1 | 10/2003 | Redkar |
| 2003/0187938 A1 | 10/2003 | Mousseau et al. |
| 2003/0189509 A1 | 10/2003 | Hayes et al. |
| 2003/0197847 A1 | 10/2003 | Shinoda |
| 2003/0200285 A1 | 10/2003 | Hansen |
| 2003/0200325 A1 | 10/2003 | Krishnaswamy et al. |
| 2003/0201889 A1 | 10/2003 | Zulkowski |
| 2003/0208610 A1 | 11/2003 | Rochetti et al. |
| 2003/0210126 A1 | 11/2003 | Kanazawa |
| 2003/0214775 A1 | 11/2003 | Fukuta et al. |
| 2003/0216143 A1 | 11/2003 | Roese et al. |
| 2003/0217110 A1 | 11/2003 | Weiss |
| 2003/0217136 A1 | 11/2003 | Cho et al. |
| 2003/0225883 A1 | 12/2003 | Greaves et al. |
| 2003/0227382 A1 | 12/2003 | Breed |
| 2003/0230934 A1 | 12/2003 | Cordelli et al. |
| 2003/0233155 A1 | 12/2003 | Slemmer et al. |
| 2003/0233332 A1 | 12/2003 | Keeler et al. |
| 2003/0234725 A1 | 12/2003 | Lemelson et al. |
| 2003/0236841 A1 | 12/2003 | Epshteyn |
| 2004/0003051 A1 | 1/2004 | Krzyzanowski et al. |
| 2004/0003241 A1 | 1/2004 | Sengodan et al. |
| 2004/0008724 A1 | 1/2004 | Devine et al. |
| 2004/0015572 A1 | 1/2004 | Kang |
| 2004/0024851 A1 | 2/2004 | Naidoo et al. |
| 2004/0034697 A1 | 2/2004 | Fairhurst et al. |
| 2004/0034798 A1 | 2/2004 | Yamada et al. |
| 2004/0036615 A1 | 2/2004 | Candela |
| 2004/0037295 A1 | 2/2004 | Tanaka et al. |
| 2004/0041910 A1 | 3/2004 | Naidoo et al. |
| 2004/0054789 A1 | 3/2004 | Breh et al. |
| 2004/0056665 A1 | 3/2004 | Iwanaga et al. |
| 2004/0064351 A1 | 4/2004 | Mikurak |
| 2004/0068657 A1 | 4/2004 | Alexander et al. |
| 2004/0083015 A1 | 4/2004 | Patwari |
| 2004/0086088 A1 | 5/2004 | Naidoo et al. |
| 2004/0086090 A1 | 5/2004 | Naidoo et al. |
| 2004/0086093 A1 | 5/2004 | Schranz |
| 2004/0093492 A1 | 5/2004 | Daude et al. |
| 2004/0095943 A1 | 5/2004 | Korotin |
| 2004/0103308 A1 | 5/2004 | Paller |
| 2004/0107027 A1 | 6/2004 | Boudrieau |
| 2004/0107299 A1 | 6/2004 | Lee et al. |
| 2004/0113770 A1 | 6/2004 | Falk et al. |
| 2004/0113778 A1 | 6/2004 | Script et al. |
| 2004/0113937 A1 | 6/2004 | Sawdey et al. |
| 2004/0117068 A1 | 6/2004 | Lee |

(56) References Cited

U.S. PATENT DOCUMENTS

| | | |
|---|---|---|
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0125146 A1 | 7/2004 | Gerlach et al. |
| 2004/0125782 A1 | 7/2004 | Chang |
| 2004/0133689 A1 | 7/2004 | Vasisht |
| 2004/0137915 A1 | 7/2004 | Diener et al. |
| 2004/0139227 A1 | 7/2004 | Takeda |
| 2004/0143749 A1 | 7/2004 | Tajalli et al. |
| 2004/0153171 A1 | 8/2004 | Brandt et al. |
| 2004/0155757 A1 | 8/2004 | Litwin et al. |
| 2004/0160309 A1 | 8/2004 | Stilp |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0163705 A1 | 8/2004 | Uhler |
| 2004/0169288 A1 | 9/2004 | Hsieh et al. |
| 2004/0170120 A1 | 9/2004 | Reunamaki et al. |
| 2004/0170155 A1 | 9/2004 | Omar et al. |
| 2004/0172396 A1 | 9/2004 | Vanska et al. |
| 2004/0177163 A1 | 9/2004 | Casey et al. |
| 2004/0181693 A1 | 9/2004 | Milliot et al. |
| 2004/0183756 A1 | 9/2004 | Freitas et al. |
| 2004/0189460 A1 | 9/2004 | Heaton et al. |
| 2004/0189471 A1 | 9/2004 | Ciarcia et al. |
| 2004/0189871 A1 | 9/2004 | Kurosawa et al. |
| 2004/0196844 A1 | 10/2004 | Hagino |
| 2004/0198386 A1 | 10/2004 | Dupray |
| 2004/0199645 A1 | 10/2004 | Rouhi |
| 2004/0201472 A1 | 10/2004 | McGunn et al. |
| 2004/0202351 A1 | 10/2004 | Park et al. |
| 2004/0212494 A1 | 10/2004 | Stilp |
| 2004/0212497 A1 | 10/2004 | Stilp |
| 2004/0212500 A1 | 10/2004 | Stilp |
| 2004/0212503 A1 | 10/2004 | Stilp |
| 2004/0212687 A1 | 10/2004 | Patwari |
| 2004/0213150 A1 | 10/2004 | Krause et al. |
| 2004/0215694 A1 | 10/2004 | Podolsky |
| 2004/0215700 A1 | 10/2004 | Shenfield et al. |
| 2004/0215750 A1 | 10/2004 | Stilp |
| 2004/0215955 A1 | 10/2004 | Tamai et al. |
| 2004/0220830 A1 | 11/2004 | Moreton et al. |
| 2004/0223605 A1 | 11/2004 | Donnelly |
| 2004/0225516 A1 | 11/2004 | Bruskotter et al. |
| 2004/0225719 A1 | 11/2004 | Kisley et al. |
| 2004/0229569 A1 | 11/2004 | Franz |
| 2004/0243714 A1 | 12/2004 | Vvynn et al. |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249613 A1 | 12/2004 | Sprogis et al. |
| 2004/0249922 A1 | 12/2004 | Hackman et al. |
| 2004/0257433 A1 | 12/2004 | Lia et al. |
| 2004/0260407 A1 | 12/2004 | Wimsatt |
| 2004/0260427 A1 | 12/2004 | Wimsatt |
| 2004/0260527 A1 | 12/2004 | Stanculescu |
| 2004/0263314 A1 | 12/2004 | Dorai et al. |
| 2004/0266493 A1 | 12/2004 | Bahl et al. |
| 2004/0267385 A1 | 12/2004 | Lingemann |
| 2004/0267937 A1 | 12/2004 | Klemets |
| 2005/0002417 A1 | 1/2005 | Kelly et al. |
| 2005/0007967 A1 | 1/2005 | Keskar et al. |
| 2005/0010866 A1 | 1/2005 | Humpleman et al. |
| 2005/0015805 A1 | 1/2005 | Iwamura |
| 2005/0021309 A1 | 1/2005 | Alexander et al. |
| 2005/0021626 A1 | 1/2005 | Prajapat et al. |
| 2005/0022210 A1 | 1/2005 | Zintel et al. |
| 2005/0023858 A1 | 2/2005 | Bingle et al. |
| 2005/0024203 A1 | 2/2005 | Wolfe |
| 2005/0030928 A1 | 2/2005 | Virtanen et al. |
| 2005/0033513 A1 | 2/2005 | Gasbarro |
| 2005/0038325 A1 | 2/2005 | Moll |
| 2005/0038326 A1 | 2/2005 | Mathur |
| 2005/0044061 A1 | 2/2005 | Klemow |
| 2005/0048957 A1 | 3/2005 | Casey et al. |
| 2005/0049746 A1 | 3/2005 | Rosenblum |
| 2005/0052831 A1 | 3/2005 | Chen |
| 2005/0055575 A1 | 3/2005 | Evans et al. |
| 2005/0055716 A1 | 3/2005 | Louie et al. |
| 2005/0057361 A1 | 3/2005 | Giraldo et al. |
| 2005/0060163 A1 | 3/2005 | Barsness et al. |
| 2005/0060411 A1 | 3/2005 | Coulombe et al. |
| 2005/0066045 A1 | 3/2005 | Johnson et al. |
| 2005/0066912 A1 | 3/2005 | Korbitz et al. |
| 2005/0069098 A1 | 3/2005 | Kalervo et al. |
| 2005/0071483 A1 | 3/2005 | Motoyama |
| 2005/0075764 A1 | 4/2005 | Horst |
| 2005/0079855 A1 | 4/2005 | Jethi et al. |
| 2005/0081161 A1 | 4/2005 | MacInnes et al. |
| 2005/0086093 A1 | 4/2005 | Hammad et al. |
| 2005/0086126 A1 | 4/2005 | Patterson |
| 2005/0086211 A1 | 4/2005 | Mayer |
| 2005/0086366 A1 | 4/2005 | Luebke et al. |
| 2005/0088983 A1 | 4/2005 | Wesslen et al. |
| 2005/0089023 A1 | 4/2005 | Barkley et al. |
| 2005/0090915 A1 | 4/2005 | Geiwitz |
| 2005/0091435 A1 | 4/2005 | Han et al. |
| 2005/0091696 A1 | 4/2005 | Wolfe et al. |
| 2005/0096753 A1 | 5/2005 | Arling et al. |
| 2005/0097478 A1 | 5/2005 | Killian et al. |
| 2005/0101314 A1 | 5/2005 | Levi |
| 2005/0102152 A1 | 5/2005 | Hodges |
| 2005/0102497 A1 | 5/2005 | Buer |
| 2005/0105530 A1 | 5/2005 | Kono |
| 2005/0108091 A1 | 5/2005 | Sotak et al. |
| 2005/0108369 A1 | 5/2005 | Sather et al. |
| 2005/0114528 A1 | 5/2005 | Suito |
| 2005/0114900 A1 | 5/2005 | Ladd et al. |
| 2005/0119913 A1 | 6/2005 | Hornreich et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0128093 A1 | 6/2005 | Genova |
| 2005/0128314 A1 | 6/2005 | Ishino |
| 2005/0144312 A1 | 6/2005 | Kadyk et al. |
| 2005/0148356 A1 | 7/2005 | Ferguson et al. |
| 2005/0149639 A1 | 7/2005 | Vrielink et al. |
| 2005/0149746 A1 | 7/2005 | Lu et al. |
| 2005/0154494 A1 | 7/2005 | Ahmed |
| 2005/0154774 A1 | 7/2005 | Giaffreda et al. |
| 2005/0155757 A1 | 7/2005 | Paton |
| 2005/0156568 A1 | 7/2005 | Yueh |
| 2005/0156737 A1 | 7/2005 | Al-Khateeb |
| 2005/0159823 A1 | 7/2005 | Hayes et al. |
| 2005/0159911 A1 | 7/2005 | Funk et al. |
| 2005/0169288 A1 | 8/2005 | Kamiwada et al. |
| 2005/0174229 A1 | 8/2005 | Feldkamp et al. |
| 2005/0179531 A1 | 8/2005 | Tabe |
| 2005/0182681 A1 | 8/2005 | Bruskotter et al. |
| 2005/0184865 A1 | 8/2005 | Han |
| 2005/0188315 A1 | 8/2005 | Campbell et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0207429 A1 | 9/2005 | Akita et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0220123 A1 | 10/2005 | Wybenga et al. |
| 2005/0222820 A1 | 10/2005 | Chung |
| 2005/0222933 A1 | 10/2005 | Wesby |
| 2005/0229016 A1 | 10/2005 | Addy |
| 2005/0231349 A1 | 10/2005 | Bhat |
| 2005/0232242 A1* | 10/2005 | Karaoguz ........... H04L 12/2805 370/352 |
| 2005/0232284 A1 | 10/2005 | Karaoguz et al. |
| 2005/0234568 A1 | 10/2005 | Chung et al. |
| 2005/0237182 A1 | 10/2005 | Wang |
| 2005/0246119 A1 | 11/2005 | Koodali |
| 2005/0249199 A1 | 11/2005 | Albert et al. |
| 2005/0253706 A1 | 11/2005 | Spoltore et al. |
| 2005/0256608 A1 | 11/2005 | King et al. |

(56) References Cited

U.S. PATENT DOCUMENTS

| | | |
|---|---|---|
| 2005/0257013 A1 | 11/2005 | Ma |
| 2005/0257260 A1 | 11/2005 | Lenoir et al. |
| 2005/0259673 A1 | 11/2005 | Lu et al. |
| 2005/0260973 A1 | 11/2005 | Van De Groenendaal |
| 2005/0262241 A1 | 11/2005 | Gubbi et al. |
| 2005/0267605 A1 | 12/2005 | Lee et al. |
| 2005/0270151 A1* | 12/2005 | Winick ............... G08B 17/00 340/539.1 |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2005/0282557 A1 | 12/2005 | Mikko et al. |
| 2005/0283823 A1 | 12/2005 | Okajo et al. |
| 2005/0285934 A1 | 12/2005 | Carter |
| 2005/0285941 A1 | 12/2005 | Haigh et al. |
| 2006/0009863 A1 | 1/2006 | Lingemann |
| 2006/0010078 A1 | 1/2006 | Rezvani et al. |
| 2006/0015943 A1 | 1/2006 | Mahieu |
| 2006/0018328 A1 | 1/2006 | Mody et al. |
| 2006/0018479 A1 | 1/2006 | Chen |
| 2006/0022816 A1 | 2/2006 | Yukawa |
| 2006/0023847 A1 | 2/2006 | Tyroler et al. |
| 2006/0025132 A1 | 2/2006 | Karaoguz et al. |
| 2006/0026301 A1 | 2/2006 | Maeda et al. |
| 2006/0031852 A1 | 2/2006 | Chu et al. |
| 2006/0036750 A1 | 2/2006 | Ladd et al. |
| 2006/0041655 A1 | 2/2006 | Holloway et al. |
| 2006/0045074 A1 | 3/2006 | Lee |
| 2006/0050692 A1 | 3/2006 | Petrescu et al. |
| 2006/0050862 A1 | 3/2006 | Shen et al. |
| 2006/0051122 A1 | 3/2006 | Kawazu et al. |
| 2006/0052884 A1 | 3/2006 | Staples et al. |
| 2006/0053447 A1 | 3/2006 | Krzyzanowski et al. |
| 2006/0053491 A1 | 3/2006 | Khuti et al. |
| 2006/0058923 A1 | 3/2006 | Kruk et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067356 A1 | 3/2006 | Kim et al. |
| 2006/0067484 A1 | 3/2006 | Elliot et al. |
| 2006/0075235 A1 | 4/2006 | Renkis |
| 2006/0077254 A1 | 4/2006 | Shu et al. |
| 2006/0078344 A1 | 4/2006 | Kawazu et al. |
| 2006/0080465 A1 | 4/2006 | Conzola et al. |
| 2006/0088092 A1 | 4/2006 | Chen et al. |
| 2006/0092010 A1 | 5/2006 | Simon et al. |
| 2006/0092011 A1 | 5/2006 | Simon et al. |
| 2006/0093365 A1 | 5/2006 | Dybsetter et al. |
| 2006/0094400 A1* | 5/2006 | Beachem ............... H04L 63/101 455/410 |
| 2006/0101062 A1 | 5/2006 | Godman et al. |
| 2006/0103510 A1 | 5/2006 | Chen et al. |
| 2006/0103520 A1 | 5/2006 | Clark |
| 2006/0104312 A1 | 5/2006 | Friar |
| 2006/0105713 A1 | 5/2006 | Zheng et al. |
| 2006/0106933 A1 | 5/2006 | Huang et al. |
| 2006/0109113 A1 | 5/2006 | Reyes et al. |
| 2006/0109860 A1 | 5/2006 | Matsunaga et al. |
| 2006/0111095 A1 | 5/2006 | Weigand |
| 2006/0121924 A1 | 6/2006 | Rengaraju et al. |
| 2006/0123212 A1 | 6/2006 | Yagawa |
| 2006/0129837 A1 | 6/2006 | Im et al. |
| 2006/0132302 A1 | 6/2006 | Stilp |
| 2006/0136558 A1 | 6/2006 | Sheehan et al. |
| 2006/0142880 A1 | 6/2006 | Deen et al. |
| 2006/0142968 A1 | 6/2006 | Han et al. |
| 2006/0143268 A1 | 6/2006 | Chatani |
| 2006/0145842 A1 | 7/2006 | Stilp |
| 2006/0154642 A1 | 7/2006 | Scannell, Jr. |
| 2006/0155851 A1 | 7/2006 | Ma et al. |
| 2006/0159032 A1 | 7/2006 | Ukrainetz et al. |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0167919 A1 | 7/2006 | Hsieh |
| 2006/0168013 A1 | 7/2006 | Wilson et al. |
| 2006/0168178 A1 | 7/2006 | Hwang et al. |
| 2006/0176146 A1 | 8/2006 | Krishan et al. |
| 2006/0176167 A1 | 8/2006 | Dohrmann |
| 2006/0181406 A1 | 8/2006 | Petite et al. |
| 2006/0182100 A1 | 8/2006 | Li et al. |
| 2006/0183460 A1 | 8/2006 | Srinivasan et al. |
| 2006/0187900 A1 | 8/2006 | Akbar |
| 2006/0190458 A1 | 8/2006 | Mishina et al. |
| 2006/0190529 A1 | 8/2006 | Morozumi et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0208872 A1 | 9/2006 | Yu et al. |
| 2006/0208880 A1 | 9/2006 | Funk et al. |
| 2006/0209857 A1 | 9/2006 | Hicks, III |
| 2006/0215650 A1 | 9/2006 | Wollmershauser et al. |
| 2006/0218593 A1 | 9/2006 | Afshary et al. |
| 2006/0220830 A1 | 10/2006 | Bennett et al. |
| 2006/0221184 A1 | 10/2006 | Vallone et al. |
| 2006/0222153 A1 | 10/2006 | Tarkoff et al. |
| 2006/0226972 A1 | 10/2006 | Smith |
| 2006/0229746 A1 | 10/2006 | Ollis et al. |
| 2006/0230270 A1 | 10/2006 | Goffin |
| 2006/0233372 A1 | 10/2006 | Shaheen et al. |
| 2006/0235963 A1 | 10/2006 | Wetherly et al. |
| 2006/0238372 A1 | 10/2006 | Jung et al. |
| 2006/0238617 A1 | 10/2006 | Tamir |
| 2006/0242395 A1 | 10/2006 | Fausak |
| 2006/0244589 A1 | 11/2006 | Schranz |
| 2006/0245369 A1 | 11/2006 | Schimmelpfeng et al. |
| 2006/0246886 A1 | 11/2006 | Benco et al. |
| 2006/0246919 A1 | 11/2006 | Park et al. |
| 2006/0250235 A1 | 11/2006 | Astrin |
| 2006/0258342 A1 | 11/2006 | Fok et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0281435 A1 | 12/2006 | Shearer et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0008099 A1 | 1/2007 | Kimmel et al. |
| 2007/0014248 A1 | 1/2007 | Fowlow |
| 2007/0043478 A1 | 2/2007 | Ehlers et al. |
| 2007/0043954 A1 | 2/2007 | Fox |
| 2007/0047585 A1 | 3/2007 | Gillespie et al. |
| 2007/0052675 A1 | 3/2007 | Chang |
| 2007/0055770 A1 | 3/2007 | Karmakar et al. |
| 2007/0058627 A1 | 3/2007 | Smith et al. |
| 2007/0061018 A1 | 3/2007 | Callaghan et al. |
| 2007/0061020 A1 | 3/2007 | Bovee et al. |
| 2007/0061266 A1 | 3/2007 | Moore et al. |
| 2007/0061430 A1 | 3/2007 | Kim |
| 2007/0061878 A1 | 3/2007 | Hagiu et al. |
| 2007/0063836 A1 | 3/2007 | Hayden et al. |
| 2007/0063866 A1 | 3/2007 | Webb |
| 2007/0064714 A1 | 3/2007 | Bi et al. |
| 2007/0079151 A1 | 4/2007 | Connor et al. |
| 2007/0079385 A1 | 4/2007 | Williams et al. |
| 2007/0083668 A1 | 4/2007 | Kelsey et al. |
| 2007/0090944 A1 | 4/2007 | Du Breuil |
| 2007/0094716 A1 | 4/2007 | Farino et al. |
| 2007/0096981 A1 | 5/2007 | Abraham |
| 2007/0101345 A1 | 5/2007 | Takagi |
| 2007/0103433 A1 | 5/2007 | Katz |
| 2007/0105072 A1 | 5/2007 | Koljonen |
| 2007/0106124 A1 | 5/2007 | Kuriyama et al. |
| 2007/0106547 A1 | 5/2007 | Agrawal |
| 2007/0109975 A1 | 5/2007 | Reckamp et al. |
| 2007/0116020 A1 | 5/2007 | Cheever et al. |

(56) References Cited

U.S. PATENT DOCUMENTS

| | | |
|---|---|---|
| 2007/0117464 A1 | 5/2007 | Freeman |
| 2007/0118609 A1 | 5/2007 | Mullan et al. |
| 2007/0127510 A1 | 6/2007 | Bossemeyer et al. |
| 2007/0130286 A1 | 6/2007 | Hopmann et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143440 A1 | 6/2007 | Reckamp et al. |
| 2007/0146127 A1 | 6/2007 | Stilp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0155423 A1 | 7/2007 | Carmody et al. |
| 2007/0160017 A1 | 7/2007 | Meier et al. |
| 2007/0161372 A1 | 7/2007 | Rogalski et al. |
| 2007/0162228 A1 | 7/2007 | Mitchell |
| 2007/0162680 A1 | 7/2007 | Mitchell |
| 2007/0164779 A1 | 7/2007 | Weston et al. |
| 2007/0168860 A1 | 7/2007 | Takayama et al. |
| 2007/0176766 A1 | 8/2007 | Cheng |
| 2007/0182543 A1 | 8/2007 | Luo |
| 2007/0182819 A1 | 8/2007 | Monroe |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0198698 A1 | 8/2007 | Boyd et al. |
| 2007/0200658 A1 | 8/2007 | Yang |
| 2007/0208521 A1 | 9/2007 | Petite et al. |
| 2007/0214262 A1 | 9/2007 | Buchbinder et al. |
| 2007/0214264 A1 | 9/2007 | Koister |
| 2007/0216764 A1 | 9/2007 | Kwak |
| 2007/0216783 A1 | 9/2007 | Ortiz et al. |
| 2007/0218895 A1 | 9/2007 | Saito et al. |
| 2007/0223465 A1 | 9/2007 | Wang et al. |
| 2007/0223500 A1 | 9/2007 | Lee et al. |
| 2007/0226182 A1 | 9/2007 | Sobotka et al. |
| 2007/0230415 A1 | 10/2007 | Malik |
| 2007/0230744 A1 | 10/2007 | Dronge |
| 2007/0245223 A1 | 10/2007 | Siedzik et al. |
| 2007/0253361 A1 | 11/2007 | Pristas et al. |
| 2007/0255856 A1 | 11/2007 | Reckamp et al. |
| 2007/0256105 A1 | 11/2007 | Tabe |
| 2007/0257986 A1 | 11/2007 | Ivanov et al. |
| 2007/0260713 A1 | 11/2007 | Moorer et al. |
| 2007/0262857 A1 | 11/2007 | Jackson |
| 2007/0263782 A1 | 11/2007 | Stock et al. |
| 2007/0265866 A1 | 11/2007 | Fehling et al. |
| 2007/0271398 A1 | 11/2007 | Manchester et al. |
| 2007/0275703 A1 | 11/2007 | Lim et al. |
| 2007/0282665 A1 | 12/2007 | Buehler et al. |
| 2007/0283001 A1 | 12/2007 | Spiess et al. |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0288858 A1 | 12/2007 | Pereira |
| 2007/0290830 A1 | 12/2007 | Gurley |
| 2007/0291118 A1 | 12/2007 | Shu et al. |
| 2007/0296814 A1 | 12/2007 | Cooper et al. |
| 2007/0298772 A1 | 12/2007 | Owens et al. |
| 2008/0001734 A1 | 1/2008 | Stilp et al. |
| 2008/0013957 A1 | 1/2008 | Akers et al. |
| 2008/0027587 A1 | 1/2008 | Nickerson et al. |
| 2008/0042826 A1 | 2/2008 | Hevia et al. |
| 2008/0043107 A1 | 2/2008 | Coogan et al. |
| 2008/0048861 A1 | 2/2008 | Naidoo et al. |
| 2008/0048975 A1 | 2/2008 | Leibow |
| 2008/0052348 A1 | 2/2008 | Adler et al. |
| 2008/0056261 A1 | 3/2008 | Osborn et al. |
| 2008/0059533 A1 | 3/2008 | Krikorian |
| 2008/0059622 A1 | 3/2008 | Hite et al. |
| 2008/0065681 A1 | 3/2008 | Fontijn et al. |
| 2008/0065685 A1 | 3/2008 | Frank |
| 2008/0072244 A1 | 3/2008 | Eker et al. |
| 2008/0074258 A1 | 3/2008 | Bennett et al. |
| 2008/0074993 A1 | 3/2008 | Vainola |
| 2008/0082186 A1 | 4/2008 | Hood et al. |
| 2008/0084294 A1 | 4/2008 | Zhiying et al. |
| 2008/0084296 A1 | 4/2008 | Kutzik et al. |
| 2008/0086564 A1 | 4/2008 | Putman et al. |
| 2008/0091793 A1 | 4/2008 | Diroo et al. |
| 2008/0102845 A1 | 5/2008 | Zhao |
| 2008/0103608 A1 | 5/2008 | Gough et al. |
| 2008/0104215 A1 | 5/2008 | Excoffier et al. |
| 2008/0104516 A1 | 5/2008 | Lee |
| 2008/0109302 A1 | 5/2008 | Salokannel et al. |
| 2008/0109650 A1 | 5/2008 | Shim et al. |
| 2008/0112340 A1 | 5/2008 | Luebke |
| 2008/0112405 A1 | 5/2008 | Cholas et al. |
| 2008/0117029 A1 | 5/2008 | Dohrmann et al. |
| 2008/0117201 A1 | 5/2008 | Martinez et al. |
| 2008/0117922 A1 | 5/2008 | Cockrell et al. |
| 2008/0120405 A1 | 5/2008 | Son et al. |
| 2008/0122575 A1 | 5/2008 | Lavian et al. |
| 2008/0126535 A1 | 5/2008 | Zhu et al. |
| 2008/0128444 A1 | 6/2008 | Schininger et al. |
| 2008/0129484 A1 | 6/2008 | Dahl et al. |
| 2008/0129821 A1 | 6/2008 | Howarter et al. |
| 2008/0130949 A1 | 6/2008 | Ivanov et al. |
| 2008/0133725 A1 | 6/2008 | Shaouy |
| 2008/0134343 A1 | 6/2008 | Pennington et al. |
| 2008/0137572 A1 | 6/2008 | Park et al. |
| 2008/0140868 A1 | 6/2008 | Kalayjian et al. |
| 2008/0141303 A1 | 6/2008 | Walker et al. |
| 2008/0141341 A1 | 6/2008 | Vinogradov et al. |
| 2008/0144884 A1 | 6/2008 | Habibi |
| 2008/0147834 A1 | 6/2008 | Quinn et al. |
| 2008/0155080 A1 | 6/2008 | Marlow et al. |
| 2008/0155470 A1 | 6/2008 | Khedouri et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0181239 A1 | 7/2008 | Wood et al. |
| 2008/0183483 A1 | 7/2008 | Hart |
| 2008/0183842 A1 | 7/2008 | Raji et al. |
| 2008/0189609 A1 | 8/2008 | Larson et al. |
| 2008/0201468 A1 | 8/2008 | Titus |
| 2008/0204190 A1 | 8/2008 | Cohn et al. |
| 2008/0204219 A1 | 8/2008 | Cohn et al. |
| 2008/0208399 A1 | 8/2008 | Pham |
| 2008/0209505 A1 | 8/2008 | Ghai et al. |
| 2008/0209506 A1 | 8/2008 | Ghai et al. |
| 2008/0215450 A1 | 9/2008 | Gates et al. |
| 2008/0215613 A1 | 9/2008 | Grasso |
| 2008/0219239 A1 | 9/2008 | Bell et al. |
| 2008/0221715 A1 | 9/2008 | Krzyzanowski et al. |
| 2008/0227460 A1 | 9/2008 | David et al. |
| 2008/0235326 A1 | 9/2008 | Parsi et al. |
| 2008/0235600 A1 | 9/2008 | Harper et al. |
| 2008/0239075 A1 | 10/2008 | Mehrotra et al. |
| 2008/0240372 A1 | 10/2008 | Frenette |
| 2008/0240696 A1 | 10/2008 | Kucharyson |
| 2008/0253391 A1 | 10/2008 | Krits et al. |
| 2008/0259818 A1 | 10/2008 | Balassanian |
| 2008/0261540 A1 | 10/2008 | Rohani et al. |
| 2008/0266080 A1 | 10/2008 | Leung et al. |
| 2008/0266257 A1 | 10/2008 | Chiang |
| 2008/0271150 A1 | 10/2008 | Boerger et al. |
| 2008/0284580 A1 | 11/2008 | Babich et al. |
| 2008/0284587 A1 | 11/2008 | Saigh et al. |
| 2008/0284592 A1 | 11/2008 | Collins et al. |
| 2008/0288639 A1 | 11/2008 | Ruppert et al. |
| 2008/0294588 A1 | 11/2008 | Morris et al. |
| 2008/0297599 A1 | 12/2008 | Donovan et al. |
| 2008/0303903 A1 | 12/2008 | Bentley et al. |
| 2008/0313316 A1 | 12/2008 | Hite et al. |
| 2008/0316024 A1 | 12/2008 | Chantelou et al. |
| 2009/0003252 A1 | 1/2009 | Salomone et al. |
| 2009/0003820 A1 | 1/2009 | Law et al. |
| 2009/0007596 A1 | 1/2009 | Goldstein et al. |
| 2009/0013210 A1 | 1/2009 | McIntosh et al. |

(56) References Cited

U.S. PATENT DOCUMENTS

| | | |
|---|---|---|
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |
| 2009/0046664 A1 | 2/2009 | Aso |
| 2009/0049488 A1 | 2/2009 | Stransky |
| 2009/0051769 A1 | 2/2009 | Kuo et al. |
| 2009/0055760 A1 | 2/2009 | Whatcott et al. |
| 2009/0063582 A1 | 3/2009 | Anna et al. |
| 2009/0066534 A1 | 3/2009 | Sivakkolundhu |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0067441 A1 | 3/2009 | Ansari et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0072988 A1 | 3/2009 | Haywood |
| 2009/0074184 A1 | 3/2009 | Baum et al. |
| 2009/0076211 A1 | 3/2009 | Yang et al. |
| 2009/0076879 A1 | 3/2009 | Sparks et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0079547 A1 | 3/2009 | Oksanen et al. |
| 2009/0086660 A1 | 4/2009 | Sood et al. |
| 2009/0092283 A1 | 4/2009 | Whillock et al. |
| 2009/0100329 A1 | 4/2009 | Espinoza |
| 2009/0100492 A1 | 4/2009 | Hicks et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0161609 A1 | 6/2009 | Bergstrom |
| 2009/0165114 A1 | 6/2009 | Baum et al. |
| 2009/0172443 A1 | 7/2009 | Rothman et al. |
| 2009/0177298 A1 | 7/2009 | McFarland et al. |
| 2009/0177906 A1 | 7/2009 | Paniagua et al. |
| 2009/0187297 A1 | 7/2009 | Kish et al. |
| 2009/0193373 A1 | 7/2009 | Abbaspour et al. |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240353 A1 | 9/2009 | Songkakul et al. |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260430 A1 | 10/2009 | Zamfes |
| 2009/0265042 A1 | 10/2009 | Mollenkopf et al. |
| 2009/0265193 A1 | 10/2009 | Collins et al. |
| 2009/0289787 A1 | 11/2009 | Dawson et al. |
| 2009/0289788 A1 | 11/2009 | Leblond |
| 2009/0303100 A1 | 12/2009 | Zemany |
| 2009/0307255 A1 | 12/2009 | Park |
| 2009/0307307 A1 | 12/2009 | Igarashi |
| 2009/0313693 A1 | 12/2009 | Rogers |
| 2009/0322510 A1 | 12/2009 | Berger et al. |
| 2009/0324010 A1 | 12/2009 | Hou |
| 2009/0327483 A1 | 12/2009 | Thompson et al. |
| 2010/0000791 A1 | 1/2010 | Alberty |
| 2010/0001812 A1 | 1/2010 | Kausch |
| 2010/0004949 A1 | 1/2010 | O'Brien |
| 2010/0008274 A1 | 1/2010 | Kneckt et al. |
| 2010/0013917 A1 | 1/2010 | Hanna et al. |
| 2010/0023865 A1 | 1/2010 | Fulker et al. |
| 2010/0026481 A1 | 2/2010 | Oh et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0039958 A1 | 2/2010 | Ge et al. |
| 2010/0041380 A1 | 2/2010 | Hewes et al. |
| 2010/0052612 A1 | 3/2010 | Raji et al. |
| 2010/0066530 A1 | 3/2010 | Cohn et al. |
| 2010/0067371 A1 | 3/2010 | Gogic et al. |
| 2010/0074112 A1 | 3/2010 | Derr et al. |
| 2010/0077111 A1 | 3/2010 | Holmes et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0100269 A1 | 4/2010 | Ekhaguere et al. |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0141762 A1 | 6/2010 | Siann et al. |
| 2010/0145485 A1 | 6/2010 | Duchene et al. |
| 2010/0150170 A1 | 6/2010 | Lee et al. |
| 2010/0153853 A1 | 6/2010 | Dawes et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0165897 A1 | 7/2010 | Sood |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0197219 A1 | 8/2010 | Issa et al. |
| 2010/0204839 A1 | 8/2010 | Behm et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0238286 A1 | 9/2010 | Boghossian et al. |
| 2010/0241711 A1 | 9/2010 | Ansari et al. |
| 2010/0245107 A1 | 9/2010 | Fulker et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0277300 A1 | 11/2010 | Cohn et al. |
| 2010/0277302 A1 | 11/2010 | Cohn et al. |
| 2010/0277315 A1 | 11/2010 | Cohn et al. |
| 2010/0280635 A1 | 11/2010 | Cohn et al. |
| 2010/0280637 A1 | 11/2010 | Cohn et al. |
| 2010/0281135 A1 | 11/2010 | Cohn et al. |
| 2010/0281161 A1 | 11/2010 | Cohn et al. |
| 2010/0281312 A1 | 11/2010 | Cohn et al. |
| 2010/0298024 A1 | 11/2010 | Choi |
| 2010/0308990 A1 | 12/2010 | Simon et al. |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0029875 A1 | 2/2011 | Milch |
| 2011/0030056 A1 | 2/2011 | Tokunaga |
| 2011/0037593 A1 | 2/2011 | Foisy et al. |
| 2011/0040415 A1 | 2/2011 | Nickerson et al. |
| 2011/0040877 A1 | 2/2011 | Foisy |
| 2011/0046792 A1 | 2/2011 | Imes et al. |
| 2011/0051638 A1 | 3/2011 | Jeon et al. |
| 2011/0068921 A1 | 3/2011 | Shafer |
| 2011/0080267 A1 | 4/2011 | Clare et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0125333 A1 | 5/2011 | Gray |
| 2011/0125846 A1 | 5/2011 | Ham et al. |
| 2011/0128378 A1 | 6/2011 | Raji |
| 2011/0156914 A1 | 6/2011 | Sheharri et al. |
| 2011/0169637 A1 | 7/2011 | Siegler et al. |

(56) References Cited

U.S. PATENT DOCUMENTS

| | | |
|---|---|---|
| 2011/0197327 A1 | 8/2011 | McElroy et al. |
| 2011/0200052 A1 | 8/2011 | Mungo et al. |
| 2011/0208359 A1 | 8/2011 | Duchene et al. |
| 2011/0212706 A1 | 9/2011 | Uusilehto |
| 2011/0218777 A1 | 9/2011 | Chen et al. |
| 2011/0230160 A1 | 9/2011 | Felgate |
| 2011/0234392 A1 | 9/2011 | Cohn et al. |
| 2011/0257953 A1 | 10/2011 | Li et al. |
| 2011/0283006 A1 | 11/2011 | Ramamurthy |
| 2011/0286437 A1 | 11/2011 | Austin et al. |
| 2011/0289517 A1 | 11/2011 | Sather et al. |
| 2011/0302497 A1 | 12/2011 | Garrett et al. |
| 2011/0309929 A1 | 12/2011 | Myers |
| 2011/0314515 A1 | 12/2011 | Hernoud et al. |
| 2012/0001436 A1 | 1/2012 | Sami et al. |
| 2012/0014363 A1 | 1/2012 | Hassan et al. |
| 2012/0016607 A1 | 1/2012 | Cottrell et al. |
| 2012/0017268 A9 | 1/2012 | Dispensa |
| 2012/0020060 A1 | 1/2012 | Myer et al. |
| 2012/0023151 A1 | 1/2012 | Bennett et al. |
| 2012/0030130 A1 | 2/2012 | Smith et al. |
| 2012/0062026 A1 | 3/2012 | Raji et al. |
| 2012/0062370 A1 | 3/2012 | Feldstein et al. |
| 2012/0066608 A1 | 3/2012 | Sundermeyer et al. |
| 2012/0066632 A1 | 3/2012 | Sundermeyer et al. |
| 2012/0081842 A1 | 4/2012 | Ewing et al. |
| 2012/0143383 A1 | 6/2012 | Cooperrider et al. |
| 2012/0154126 A1 | 6/2012 | Cohn et al. |
| 2012/0154138 A1 | 6/2012 | Cohn et al. |
| 2012/0172027 A1 | 7/2012 | Partheesh et al. |
| 2012/0182245 A1 | 7/2012 | Hutton |
| 2012/0209951 A1 | 8/2012 | Enns et al. |
| 2012/0214502 A1 | 8/2012 | Qiang |
| 2012/0232788 A1 | 9/2012 | Diao |
| 2012/0242788 A1 | 9/2012 | Chuang et al. |
| 2012/0257061 A1 | 10/2012 | Edwards et al. |
| 2012/0260184 A1 | 10/2012 | Dawes et al. |
| 2012/0265892 A1 | 10/2012 | Ma et al. |
| 2012/0269199 A1 | 10/2012 | Chan et al. |
| 2012/0278877 A1 | 11/2012 | Baum et al. |
| 2012/0280790 A1 | 11/2012 | Gerhardt et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0314901 A1 | 12/2012 | Hanson et al. |
| 2012/0315848 A1 | 12/2012 | Smith et al. |
| 2012/0324566 A1 | 12/2012 | Baum et al. |
| 2012/0327242 A1 | 12/2012 | Barley et al. |
| 2012/0331109 A1 | 12/2012 | Baum et al. |
| 2013/0007871 A1 | 1/2013 | Meenan et al. |
| 2013/0038730 A1 | 2/2013 | Peterson et al. |
| 2013/0038800 A1 | 2/2013 | Yoo |
| 2013/0062951 A1 | 3/2013 | Raji et al. |
| 2013/0073746 A1 | 3/2013 | Singh et al. |
| 2013/0082835 A1 | 4/2013 | Shapiro et al. |
| 2013/0082836 A1 | 4/2013 | Watts |
| 2013/0085615 A1 | 4/2013 | Barker |
| 2013/0085620 A1 | 4/2013 | Lu et al. |
| 2013/0103207 A1 | 4/2013 | Ruff et al. |
| 2013/0115972 A1 | 5/2013 | Ziskind et al. |
| 2013/0120134 A1 | 5/2013 | Hicks, III |
| 2013/0125157 A1 | 5/2013 | Sharif-Ahmadi et al. |
| 2013/0136102 A1 | 5/2013 | Macwan et al. |
| 2013/0154822 A1 | 6/2013 | Kumar |
| 2013/0155229 A1 | 6/2013 | Thornton et al. |
| 2013/0163491 A1 | 6/2013 | Singh et al. |
| 2013/0174239 A1 | 7/2013 | Kim et al. |
| 2013/0183924 A1 | 7/2013 | Saigh et al. |
| 2013/0184874 A1 | 7/2013 | Frader-Thompson et al. |
| 2013/0191755 A1 | 7/2013 | Balog et al. |
| 2013/0218959 A1 | 8/2013 | Sa et al. |
| 2013/0222133 A1 | 8/2013 | Schultz et al. |
| 2013/0223279 A1 | 8/2013 | Tinnakornsrisuphap et al. |
| 2013/0245837 A1 | 9/2013 | Grohman |
| 2013/0261821 A1 | 10/2013 | Lu et al. |
| 2013/0266193 A1 | 10/2013 | Tiwari et al. |
| 2013/0311146 A1 | 11/2013 | Miller et al. |
| 2013/0314542 A1 | 11/2013 | Jackson |
| 2013/0318231 A1 | 11/2013 | Raji et al. |
| 2013/0318443 A1 | 11/2013 | Bachman et al. |
| 2013/0331109 A1 | 12/2013 | Dhillon et al. |
| 2013/0344875 A1 | 12/2013 | Chowdhury |
| 2014/0032034 A1 | 1/2014 | Raptopoulos et al. |
| 2014/0035726 A1 | 2/2014 | Schoner et al. |
| 2014/0053246 A1 | 2/2014 | Huang et al. |
| 2014/0068486 A1 | 3/2014 | Sellers et al. |
| 2014/0075464 A1 | 3/2014 | McCrea |
| 2014/0098247 A1 | 4/2014 | Rao et al. |
| 2014/0112405 A1 | 4/2014 | Jafarian et al. |
| 2014/0126425 A1 | 5/2014 | Burd et al. |
| 2014/0136242 A1 | 5/2014 | Weekes et al. |
| 2014/0136936 A1 | 5/2014 | Patel et al. |
| 2014/0140575 A1 | 5/2014 | Wolf |
| 2014/0143695 A1 | 5/2014 | Sundermeyer et al. |
| 2014/0143851 A1 | 5/2014 | Baum et al. |
| 2014/0143854 A1 | 5/2014 | Lopez et al. |
| 2014/0146171 A1 | 5/2014 | Brady et al. |
| 2014/0153695 A1 | 6/2014 | Yanagisawa et al. |
| 2014/0167928 A1 | 6/2014 | Burd |
| 2014/0172957 A1 | 6/2014 | Baum et al. |
| 2014/0176797 A1 | 6/2014 | Silva et al. |
| 2014/0180968 A1 | 6/2014 | Song et al. |
| 2014/0201291 A1 | 7/2014 | Russell |
| 2014/0218517 A1 | 8/2014 | Kim et al. |
| 2014/0232861 A1 | 8/2014 | Naidoo et al. |
| 2014/0233951 A1 | 8/2014 | Cook |
| 2014/0236325 A1 | 8/2014 | Sasaki et al. |
| 2014/0266678 A1 | 9/2014 | Shapiro et al. |
| 2014/0266736 A1 | 9/2014 | Cretu-Petra |
| 2014/0278281 A1 | 9/2014 | Vaynriber et al. |
| 2014/0282048 A1 | 9/2014 | Shapiro et al. |
| 2014/0282934 A1 | 9/2014 | Miasnik et al. |
| 2014/0289384 A1 | 9/2014 | Kao et al. |
| 2014/0289388 A1 | 9/2014 | Ghosh et al. |
| 2014/0293046 A1 | 10/2014 | Ni |
| 2014/0316616 A1 | 10/2014 | Kugelmass |
| 2014/0319232 A1 | 10/2014 | Gourlay et al. |
| 2014/0340216 A1 | 11/2014 | Puskarich |
| 2014/0355588 A1 | 12/2014 | Cho et al. |
| 2014/0359101 A1 | 12/2014 | Dawes et al. |
| 2014/0359524 A1 | 12/2014 | Sasaki et al. |
| 2014/0368331 A1 | 12/2014 | Cohn et al. |
| 2014/0369584 A1 | 12/2014 | Fan et al. |
| 2014/0372599 A1 | 12/2014 | Gutt |
| 2014/0372811 A1 | 12/2014 | Cohn et al. |
| 2015/0009325 A1 | 1/2015 | Kardashov |
| 2015/0019714 A1 | 1/2015 | Shaashua et al. |
| 2015/0054947 A1 | 2/2015 | Dawes |
| 2015/0074206 A1 | 3/2015 | Baldwin |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097949 A1 | 4/2015 | Ure et al. |
| 2015/0097961 A1 | 4/2015 | Ure et al. |
| 2015/0106721 A1 | 4/2015 | Cha et al. |
| 2015/0116108 A1 | 4/2015 | Fadell et al. |
| 2015/0142991 A1 | 5/2015 | Zaloom |
| 2015/0161875 A1 | 6/2015 | Cohn et al. |
| 2015/0205465 A1 | 7/2015 | Robison et al. |
| 2015/0222517 A1 | 8/2015 | McLaughlin et al. |
| 2015/0256355 A1 | 9/2015 | Pera et al. |
| 2015/0261427 A1 | 9/2015 | Sasaki |
| 2015/0319006 A1 | 11/2015 | Plummer et al. |
| 2015/0319046 A1 | 11/2015 | Plummer et al. |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0358359 A1 | 12/2015 | Ghai et al. |
| 2015/0365217 A1 | 12/2015 | Scholten et al. |
| 2015/0373149 A1 | 12/2015 | Lyons |
| 2016/0012715 A1 | 1/2016 | Raji et al. |
| 2016/0019763 A1 | 1/2016 | Raji et al. |

(56) References Cited

U.S. PATENT DOCUMENTS

| | | |
|---|---|---|
| 2016/0019778 A1 | 1/2016 | Raji et al. |
| 2016/0023475 A1 | 1/2016 | Bevier et al. |
| 2016/0027295 A1 | 1/2016 | Raji et al. |
| 2016/0036944 A1 | 2/2016 | Kitchen |
| 2016/0042637 A1 | 2/2016 | Cahill |
| 2016/0055573 A1 | 2/2016 | Chen et al. |
| 2016/0062624 A1 | 3/2016 | Sundermeyer et al. |
| 2016/0065413 A1 | 3/2016 | Sundermeyer et al. |
| 2016/0065414 A1 | 3/2016 | Sundermeyer et al. |
| 2016/0077935 A1 | 3/2016 | Zheng et al. |
| 2016/0100348 A1 | 4/2016 | Cohn et al. |
| 2016/0107749 A1 | 4/2016 | Mucci |
| 2016/0116914 A1 | 4/2016 | Mucci |
| 2016/0127641 A1 | 5/2016 | Gove |
| 2016/0161277 A1 | 6/2016 | Park et al. |
| 2016/0163185 A1 | 6/2016 | Ramasubbu et al. |
| 2016/0164923 A1 | 6/2016 | Dawes |
| 2016/0171853 A1 | 6/2016 | Naidoo et al. |
| 2016/0180719 A1 | 6/2016 | Wouhaybi et al. |
| 2016/0183073 A1 | 6/2016 | Saito et al. |
| 2016/0189509 A1 | 6/2016 | Malhotra et al. |
| 2016/0189524 A1 | 6/2016 | Poder et al. |
| 2016/0189527 A1 | 6/2016 | Peterson et al. |
| 2016/0189549 A1 | 6/2016 | Marcus |
| 2016/0191265 A1 | 6/2016 | Cohn et al. |
| 2016/0191621 A1 | 6/2016 | Oh et al. |
| 2016/0192461 A1 | 6/2016 | Minsky |
| 2016/0202695 A1 | 7/2016 | Deroos et al. |
| 2016/0209072 A1 | 7/2016 | Golden et al. |
| 2016/0225240 A1 | 8/2016 | Voddhi et al. |
| 2016/0226732 A1 | 8/2016 | Kim et al. |
| 2016/0231916 A1 | 8/2016 | Dawes |
| 2016/0232780 A1 | 8/2016 | Cohn et al. |
| 2016/0234075 A1 | 8/2016 | Sirpal et al. |
| 2016/0260135 A1 | 9/2016 | Zomet et al. |
| 2016/0261932 A1 | 9/2016 | Fadell et al. |
| 2016/0266579 A1 | 9/2016 | Chen et al. |
| 2016/0267751 A1 | 9/2016 | Fulker et al. |
| 2016/0269191 A1 | 9/2016 | Cronin |
| 2016/0274759 A1 | 9/2016 | Dawes |
| 2016/0364089 A1 | 12/2016 | Blackman et al. |
| 2016/0371961 A1 | 12/2016 | Narang et al. |
| 2016/0373453 A1 | 12/2016 | Ruffner et al. |
| 2016/0378109 A1 | 12/2016 | Raffa et al. |
| 2017/0004714 A1 | 1/2017 | Rhee |
| 2017/0005818 A1 | 1/2017 | Gould |
| 2017/0006107 A1 | 1/2017 | Dawes et al. |
| 2017/0019644 A1 | 1/2017 | K V et al. |
| 2017/0026440 A1 | 1/2017 | Cockrell et al. |
| 2017/0039413 A1 | 2/2017 | Nadler |
| 2017/0052513 A1 | 2/2017 | Raji |
| 2017/0054571 A1 | 2/2017 | Kitchen et al. |
| 2017/0054594 A1 | 2/2017 | Decenzo et al. |
| 2017/0063967 A1 | 3/2017 | Kitchen et al. |
| 2017/0063968 A1 | 3/2017 | Kitchen et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0078298 A1 | 3/2017 | Vlaminck et al. |
| 2017/0103646 A1 | 4/2017 | Naidoo et al. |
| 2017/0109999 A1 | 4/2017 | Cohn et al. |
| 2017/0118037 A1 | 4/2017 | Kitchen et al. |
| 2017/0127124 A9 | 5/2017 | Wilson et al. |
| 2017/0154507 A1 | 6/2017 | Dawes et al. |
| 2017/0155545 A1 | 6/2017 | Baum et al. |
| 2017/0180198 A1 | 6/2017 | Baum et al. |
| 2017/0180306 A1 | 6/2017 | Gutt |
| 2017/0185277 A1 | 6/2017 | Sundermeyer et al. |
| 2017/0185278 A1 | 6/2017 | Sundermeyer et al. |
| 2017/0192402 A1 | 7/2017 | Karp et al. |
| 2017/0227965 A1 | 8/2017 | Decenzo et al. |
| 2017/0244573 A1 | 8/2017 | Baum et al. |
| 2017/0255452 A1 | 9/2017 | Barnes et al. |
| 2017/0257257 A1 | 9/2017 | Dawes |
| 2017/0278407 A1 | 9/2017 | Lemmey et al. |
| 2017/0279629 A1 | 9/2017 | Raji |
| 2017/0289360 A1 | 10/2017 | Baum et al. |
| 2017/0301216 A1 | 10/2017 | Cohn et al. |
| 2017/0302469 A1 | 10/2017 | Cohn |
| 2017/0303257 A1 | 10/2017 | Yamada et al. |
| 2017/0310500 A1 | 10/2017 | Dawes |
| 2017/0331781 A1 | 11/2017 | Gutt |
| 2017/0337806 A1 | 11/2017 | Cohn et al. |
| 2017/0353324 A1 | 12/2017 | Baum et al. |
| 2018/0004377 A1 | 1/2018 | Kitchen et al. |
| 2018/0019890 A1 | 1/2018 | Dawes |
| 2018/0054774 A1 | 2/2018 | Cohn et al. |
| 2018/0063248 A1 | 3/2018 | Dawes et al. |
| 2018/0083831 A1 | 3/2018 | Baum et al. |
| 2018/0092046 A1 | 3/2018 | Egan et al. |
| 2018/0096568 A1 | 4/2018 | Cohn et al. |
| 2018/0191720 A1 | 7/2018 | Dawes |
| 2018/0191740 A1 | 7/2018 | Decenzo et al. |
| 2018/0191741 A1 | 7/2018 | Dawes et al. |
| 2018/0191742 A1 | 7/2018 | Dawes |
| 2018/0191807 A1 | 7/2018 | Dawes |
| 2018/0197387 A1 | 7/2018 | Dawes |
| 2018/0198688 A1 | 7/2018 | Dawes |
| 2018/0198755 A1 | 7/2018 | Domangue et al. |
| 2018/0198756 A1 | 7/2018 | Dawes |
| 2018/0198788 A1 | 7/2018 | Helen et al. |
| 2018/0198802 A1 | 7/2018 | Dawes |
| 2018/0198841 A1 | 7/2018 | Chmielewski et al. |
| 2018/0278701 A1 | 9/2018 | Diem |
| 2018/0307223 A1 | 10/2018 | Peeters et al. |
| 2019/0041547 A1 | 2/2019 | Rolf et al. |
| 2019/0058720 A1 | 2/2019 | Lindquist et al. |
| 2019/0073534 A1 | 3/2019 | Dvir et al. |
| 2019/0347924 A1 | 11/2019 | Trundle et al. |
| 2019/0386892 A1 | 12/2019 | Sundermeyer et al. |
| 2020/0094963 A1 | 3/2020 | Myslinski |
| 2020/0127891 A9 | 4/2020 | Johnson et al. |
| 2020/0257721 A1 | 8/2020 | McKinnon et al. |

FOREIGN PATENT DOCUMENTS

| | | |
|---|---|---|
| AU | 2011250886 A1 | 1/2013 |
| AU | 2013284428 A1 | 2/2015 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |
| CA | 2878117 A1 | 1/2014 |
| CA | 2559842 C | 5/2014 |
| CA | 2992429 A1 | 12/2016 |
| CA | 2976682 A1 | 2/2018 |
| CA | 2976802 A1 | 2/2018 |
| CN | 102834818 A | 12/2012 |
| CN | 102985915 A | 3/2013 |
| EP | 0295146 A2 | 12/1988 |
| EP | 0308046 A2 | 3/1989 |
| EP | 0591585 A1 | 4/1994 |
| EP | 1117214 A2 | 7/2001 |
| EP | 1119837 A1 | 8/2001 |
| EP | 0978111 | 11/2001 |
| EP | 1738540 A2 | 1/2007 |
| EP | 1881716 A1 | 1/2008 |
| EP | 2112784 A1 | 10/2009 |
| EP | 2188794 A1 | 5/2010 |
| EP | 2191351 A1 | 6/2010 |
| EP | 2327063 A1 | 6/2011 |
| EP | 2483788 A1 | 8/2012 |
| EP | 2569712 A1 | 3/2013 |
| EP | 2619686 A1 | 7/2013 |
| EP | 2868039 A2 | 5/2015 |
| EP | 3031206 A2 | 6/2016 |
| EP | 3285238 A2 | 2/2018 |
| EP | 3308222 A1 | 4/2018 |
| FR | 2584217 A1 | 1/1987 |
| FR | 2661023 A1 | 10/1991 |

(56) References Cited

FOREIGN PATENT DOCUMENTS

| | | |
|---|---|---|
| FR | 2793334 A1 | 11/2000 |
| GB | 2222288 A | 2/1990 |
| GB | 2273593 A | 6/1994 |
| GB | 2286423 A | 8/1995 |
| GB | 2291554 A | 1/1996 |
| GB | 2319373 A | 5/1998 |
| GB | 2320644 A | 6/1998 |
| GB | 2324630 A | 10/1998 |
| GB | 2325548 A | 11/1998 |
| GB | 2335523 A | 9/1999 |
| GB | 2349293 A | 10/2000 |
| GB | 2370400 A | 6/2002 |
| GB | 2442628 A | 4/2008 |
| GB | 2442633 A | 4/2008 |
| GB | 2442640 A | 4/2008 |
| GB | 2428821 B | 6/2008 |
| IN | 45/2015 | 11/2015 |
| IN | 04/2016 | 1/2016 |
| JP | 63-033088 A | 2/1988 |
| JP | 05-167712 A | 7/1993 |
| JP | 06-339183 A | 12/1993 |
| JP | 08-227491 | 9/1996 |
| JP | 10-004451 A | 1/1998 |
| JP | 2000-006343 A | 1/2000 |
| JP | 2000-023146 A | 1/2000 |
| JP | 2000-278671 A | 10/2000 |
| JP | 2001-006088 A | 1/2001 |
| JP | 2001-006343 A | 1/2001 |
| JP | 2001-069209 A | 3/2001 |
| JP | 2002-055895 | 2/2002 |
| JP | 2002-185629 | 6/2002 |
| JP | 2003-085258 A | 3/2003 |
| JP | 2003-141659 A | 5/2003 |
| JP | 2003-281647 A | 10/2003 |
| JP | 2004-192659 A | 7/2004 |
| JP | 2007-529826 A | 10/2007 |
| JP | 2010-140091 A | 6/2010 |
| KR | 10-2006-0021605 A | 3/2006 |
| KR | 10-0771941 B1 | 10/2007 |
| TW | 340934 B | 9/1998 |
| TW | I239176 B | 9/2005 |
| TW | I480839 B | 4/2015 |
| TW | I480840 B | 4/2015 |
| TW | I509579 B | 11/2015 |
| TW | I517106 B | 1/2016 |
| WO | 89/07855 A1 | 8/1989 |
| WO | 89/11187 A1 | 11/1989 |
| WO | 94/03881 A1 | 2/1994 |
| WO | 95/13944 A1 | 5/1995 |
| WO | 96/36301 A1 | 11/1996 |
| WO | 97/13230 A2 | 4/1997 |
| WO | 98/25243 A1 | 6/1998 |
| WO | 98/49663 A1 | 11/1998 |
| WO | 98/52343 A1 | 11/1998 |
| WO | 98/59256 A2 | 12/1998 |
| WO | 99/34339 A2 | 7/1999 |
| WO | 00/21053 A1 | 4/2000 |
| WO | 00/36812 A1 | 6/2000 |
| WO | 00/72598 A1 | 11/2000 |
| WO | 01/11586 A1 | 2/2001 |
| WO | 01/52478 A2 | 7/2001 |
| WO | 01/71489 A1 | 9/2001 |
| WO | 01/99078 A2 | 12/2001 |
| WO | 02/11444 A1 | 2/2002 |
| WO | 02/21300 A1 | 3/2002 |
| WO | 02/97584 A2 | 12/2002 |
| WO | 2002/100083 | 12/2002 |
| WO | 2003/026305 A1 | 3/2003 |
| WO | 03/40839 A1 | 5/2003 |
| WO | 2004/004222 A1 | 1/2004 |
| WO | 2004/098127 A1 | 11/2004 |
| WO | 2004/107710 A1 | 12/2004 |
| WO | 2005/091218 A2 | 9/2005 |
| WO | 2007/038872 A1 | 4/2007 |
| WO | 2007/124453 A2 | 11/2007 |
| WO | 2008/056320 A1 | 5/2008 |
| WO | 2009/006670 A1 | 1/2009 |
| WO | 2009/023647 A1 | 2/2009 |
| WO | 2009/029590 A1 | 3/2009 |
| WO | 2009/029597 A1 | 3/2009 |
| WO | 2009/064795 A1 | 5/2009 |
| WO | 2009/145747 A1 | 12/2009 |
| WO | 2010/019624 A1 | 2/2010 |
| WO | 2010/025468 A1 | 3/2010 |
| WO | 2010/127009 A1 | 11/2010 |
| WO | 2010/127194 A2 | 11/2010 |
| WO | 2010/127200 A1 | 11/2010 |
| WO | 2010/127203 A1 | 11/2010 |
| WO | 2011/038409 A1 | 3/2011 |
| WO | 2011/063354 A1 | 5/2011 |
| WO | 2011/143273 A1 | 11/2011 |
| WO | 2012/040653 A1 | 3/2012 |
| WO | 2014/004911 A2 | 1/2014 |
| WO | 2015/021469 A2 | 2/2015 |
| WO | 2015/134520 A1 | 9/2015 |
| WO | 20161201033 A1 | 12/2016 |
| ZA | 201302668 | 6/2014 |

OTHER PUBLICATIONS

Shang, Wei-Lai, "Study on Application Embedded Intelligent Area System", Journal of Anyang Institute of Technology, Dec. 2010, vol. 9, No. 6, pp. 56-57 and 65.
US Patent Application filed on Mar. 18, 2019, entitled "Server-Based Notification of Alarm Event Subsequent to Communication Failure With Armed Security System", U.S. Appl. No. 16/356,742.
US Patent Application filed on Apr. 23, 2019, entitled "Control System User Interface", U.S. Appl. No. 16/391,625.
US Patent Application filed on Apr. 26, 2019, entitled "Custom Content for Premises Management", U.S. Appl. No. 16/396,368.
US Patent Application filed on Jul. 2, 2019, entitled "Communication Protocols in Integrated Systems", U.S. Appl. No. 16/460,712.
Form PCT/ISA/220, "PCT Notification of Transmittal of the International Search Report and the Written Opinion of the International Searching Authority, or the Declaration," 1 pg.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US08/83254," dated Jan. 14, 2009, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion fo the International

(56) References Cited

OTHER PUBLICATIONS

Searching Authority, or the Declaration for the Application No. PCT/US08/74260," dated Nov. 13, 2008, 1 page.
Form PCT/ISA/210, "PCT International Search Report for the Application No. PCT/US11/53136," dated Jan. 5, 2012, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US09/53485," dated Oct. 22, 2009, 2 pages.
Form PCT/ISA/210, "PCT International Search Report for the Application No. PCT/US08/83254," dated Jan. 14, 2009, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US08/74246," Nov. 14, 2008, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US05/08766," dated May 23, 2006, 2 pages.
Foreign communication from a related counterpart application—International Search Report, App No. PCT/US02/14450, dated Dec. 17, 2002, 6 pgs.
Foreign communication from a related counterpart application—International Preliminary Examination Report, App No. PCT/US02/14450, dated Mar. 2, 2004, 4 pgs.
Final Office Action dated Sep. 14, 2011 for U.S. Appl. No. 12/197,931, filed Aug. 25, 2008.
Final Office Action dated Jul. 12, 2010 for U.S. Appl. No. 12/019,554, filed Jan. 24, 2008.
Final Office Action dated Feb. 16, 2011 for U.S. Appl. No. 12/019,568, filed Jan. 24, 2008.
Final Office Action dated Oct. 31, 2012 for U.S. Appl. No. 12/771,624, filed Apr. 30, 2010.
Final Office Action dated Dec. 31, 2012 for U.S. Appl. No. 12/770,365, filed Apr. 29, 2010.
Final Office Action dated Jun. 29, 2012 for U.S. Appl. No. 12/539,537, filed Aug. 11, 2009.
Final Office Action dated Feb. 26, 2013 for U.S. Appl. No. 12/771,471, filed Apr. 30, 2010.
Final Office Action dated Jul. 23, 2013 for U.S. Appl. No. 13/531,757, filed Jun. 25, 2012.
Final Office Action dated Mar. 21, 2013 for U.S. Appl. No. 12/691,992, filed Jan. 22, 2010.
Final Office Action dated Sep. 17, 2012 for U.S. Appl. No. 12/197,958, filed Aug. 25, 2008.
Final Office Action dated Oct. 17, 2012 for U.S. Appl. No. 12/637,671, filed Dec. 14, 2009.
Final Office Action dated Jan. 13, 2011 for U.S. Appl. No. 12/189,780, filed Aug. 11, 2008.
Final Office Action dated Jun. 10, 2011 for U.S. Appl. No. 11/084,232, filed Mar. 16, 2005.
Final Office Action dated Jan. 10, 2011 for U.S. Appl. No. 12/189,785, filed Aug. 11, 2008.
Final Office Action dated May 9, 2013 for U.S. Appl. No. 12/952,080, filed Nov. 22, 2010.
Final Office Action dated May 9, 2013 for U.S. Appl. No. 12/189,780, filed Aug. 11, 2008.
Final Office Action dated Jun. 5, 2012 for U.S. Appl. No. 12/771,071, filed Apr. 30, 2010.
Final Office Action dated Jun. 1, 2009 for U.S. Appl. No. 11/084,232, filed Mar. 16, 2005.
Final Office Action dated Aug. 1, 2011 for U.S. Appl. No. 12/630,092, filed Dec. 3, 2009.
Faultline, "AT&T Targets video home security as next broadband market"; Nov. 2, 2006; The Register; 2 Pages.
Examination Report under Section 18(3) re for UK Patent Application No. GB0800040.8, dated Jan. 30, 2008.
Examination Report under Section 18(3) re for UK Patent Application No. GB0724760.4, dated Jan. 30, 2008.
Examination Report under Section 18(3) re for UK Patent Application No. GB0724248.0, dated Jan. 30, 2008.
Examination Report under Section 18(3) re for UK Patent Application No. GB0724248.0, dated Jun. 4, 2008.
Yanni Zhai et al., Design of Smart Home Remote Monitoring System Based on Embedded System, 2011 IEEE 2nd International Conference on Computing, Control and Industrial Engineering, vol. 2, pp. 41-44.
X10—ActiveHome, Home Automation Made Easy [retrieved on Nov. 8, 2003], 3 pages.
WLS906 Photoelectric Smoke Alarm, Data Sheet, DSC Security Products, Ontario, Canada, Jan. 1998.
Wireless, Battery-Powered Smoke Detectors, Brochure, SafeNight Technology, Inc. Roanoke, VA, 1995.
Windows, Newton's Telecom Dictionary, 21st Edition, Mar. 2005, 937-938.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
visitalk.com-communication with vision, http://www.visitalk.com. Visitalk, Communication with Vision, http://www.visitalk.jimbo.com; website accessed Jan. 10, 2018.
Valtchev, D., and I. Frankov. "Service gateway architecture for a smart home." Communications Magazine, IEEE 40.4 (2002): 126-132.
US Patent Application filed on Aug. 9, 2018, entitled "Method and Systems for Processing Security Event Data", U.S. Appl. No. 16/059,833.
US Patent Application filed on Dec. 27, 2018, entitled "Communication Protocols in Integrated Systems", U.S. Appl. No. 16/233,913.
US Patent Application filed on Nov. 30, 2017, entitled "Controller and Interface for Home Security, Monitoring and Automation Having Customizable Audio Alerts for SMA Events", U.S. Appl. No. 15/828,030.
US Patent Application filed on Nov. 29, 2018, entitled "Premise Management Systems and Methods", U.S. Appl. No. 16/204,442.
US Patent Application filed on Nov. 28, 2017, entitled "Forming a Security Network Including Integrated Security System Components", U.S. Appl. No. 15/824,503.
US Patent Application filed on Oct. 27, 2017, entitled "Security System With Networked Touchscreen", U.S. Appl. No. 15/796,421.
US Patent Application filed on Oct. 18, 2018, entitled "Generating Risk Profile Using Data of Home Monitoring and Security System", U.S. Appl. No. 16/164,114.
US Patent Application filed on Oct. 13, 2017, entitled "Notification of Event Subsequent to Communication Failure With Security System", U.S. Appl. No. 15/783,858.
US Patent Application filed on Oct. 10, 2018, entitled "Method and System for Providing Alternate Network Access", U.S. Appl. No. 16/156,448.
US Patent Application filed on Oct. 3, 2018, entitled "Activation of a Home Automation Controller", U.S. Appl. No. 16/150,973.
US Patent Application filed on Oct. 1, 2018, entitled "User Interface in a Premises Network", U.S. Appl. No. 16/148,572.
US Patent Application filed on Oct. 1, 2018, entitled "Integrated Security System with Parallel Processing Architecture", U.S. Appl. No. 16/148,411.
US Patent Application filed on Oct. 1, 2018, entitled "Integrated Security System With Parallel Processing Architecture", U.S. Appl. No. 16/148,387.

(56) References Cited

OTHER PUBLICATIONS

US Patent Application filed on Sep. 11, 2018, entitled "Premises Management Networking", U.S. Appl. No. 16/128,089.
US Patent Application filed on Sep. 28, 2018, entitled "Forming a Security Network Including Integrated Security System Components and Network Devices", U.S. Appl. No. 16/147,044.
US Patent Application filed on Sep. 28, 2018, entitled "Control System User Interface", U.S. Appl. No. 16/146,715.
US Patent Application filed on Sep. 17, 2018, entitled "Integrated Security System With Parallel Processing Architecture", U.S. Appl. No. 16/133,135.
US Patent Application filed on Sep. 6, 2018, entitled "Takeover of Security Network", U.S. Appl. No. 16/123,695.
US Patent Application filed on Aug. 21, 2018, entitled "Premises System Management Using Status Signal", U.S. Appl. No. 16/107,568.
US Patent Application filed on Aug. 9, 2018, entitled "Method and System for Processing Security Event Data", U.S. Appl. No. 16/059,833.
US Patent Application filed on Aug. 9, 2016, entitled "Controller and Interface for Home Security, Monitoring and Automation Having Customizable Audio Alerts for Sma Events", U.S. Appl. No. 15/232,135.
US Patent Application filed on Aug. 8, 2016, entitled "Security, Monitoring and Automation Controller Access and Use of Legacy Security Control Panel Information", U.S. Appl. No. 15/231,273.
US Patent Application filed on Jul. 28, 2016, entitled "Method and System for Automatically Providing Alternate Network Access for Telecommunications", U.S. Appl. No. 15/222,416.
US Patent Application filed on Jul. 20, 2018, entitled "Cross-Client Sensor User Interface in an Integrated Security Network", U.S. Appl. No. 16/041,291.
US Patent Application filed on Jul. 12, 2018, entitled "Integrated Security System with Parallel Processing Architecture", U.S. Appl. No. 16/034,132.
US Patent Application filed on Jul. 3, 2018, entitled "WIFI-To-Serial Encapsulation in Systems", U.S. Appl. No. 16/026,703.
US Patent Application filed on Jun. 27, 2018, entitled "Activation of Gateway Device", U.S. Appl. No. 16/020,499.
US Patent Application filed on Jun. 1, 2012, entitled "Gateway Registry Methods and Systems", U.S. Appl. No. 13/486,276.
US Patent Application filed on May 23, 2018, entitled "Networked Touchscreen With Integrated Interfaces", U.S. Appl. No. 15/987,638.
US patent application filed on May 2, 2018, entitled "Automation System With Mobile Interface", U.S. Appl. No. 15/969,514.
US Patent Application filed on Mar. 10, 2014, entitled "Communication Protocols Over Internet Protocol (IP) Networks", U.S. Appl. No. 14/202,579.
US Patent Application filed on Mar. 10, 2014, entitled "Communication Protocols Over Internet Protocol (IP) Networks", U.S. Appl. No. 14/202,505.
US Patent Application filed on Mar. 10, 2014, entitled "Communication Protocols in Integrated Systems", U.S. Appl. No. 14/203,219.
US Patent Application filed on Mar. 10, 2014, entitled "Communication Protocols in Integrated Systems", U.S. Appl. No. 14/203,141.
US Patent Application filed on Mar. 10, 2014, entitled "Communication Protocols in Integrated Systems", U.S. Appl. No. 14/203,128.
US Patent Application filed on Mar. 10, 2014, entitled "Communication Protocols in Integrated Systems", U.S. Appl. No. 14/203,084.
US Patent Application filed on Mar. 10, 2014, entitled "Communication Protocols in Integrated Systems", U.S. Appl. No. 14/203,077.
US Patent Application filed on Mar. 10, 2014, entitled "Communication Protocols in Integrated Systems", U.S. Appl. No. 14/202,685.
US Patent Application filed on Mar. 10, 2014, entitled "Communication Protocols in Integrated Systems", U.S. Appl. No. 14/202,627.
US Patent Application filed on Mar. 10, 2014, entitled "Communication Protocols in Integrated Systems", U.S. Appl. No. 14/202,592.
US Patent Application filed on Mar. 10, 2014, entitled "Communication Protocols in Integrated Systems", U.S. Appl. No. 14/202,573.
US Patent Application filed on Mar. 7, 2014, entitled "Security System Integrated With Social Media Platform", U.S. Appl. No. 14/201,133.
US Patent Application filed on Mar. 7, 2014, entitled "Integrated Security and Control System With Geofencing", U.S. Appl. No. 14/201,189.
US Patent Application filed on Mar. 7, 2014, entitled "Device Integration Framework", U.S. Appl. No. 14/201,227.
US Patent Application filed on Mar. 7, 2014, entitled "Communication Protocols in Integrated Systems", U.S. Appl. No. 14/200,921.
US Patent Application filed on Mar. 7, 2014, entitled "Activation of Gateway Device", U.S. Appl. No. 14/201,162.
US Patent Application filed on Mar. 2, 2017, entitled "Generating Risk Profile Using Data of Home Monitoring and Security System", U.S. Appl. No. 15/447,982.
US Patent Application filed on Jan. 28, 2019, entitled "Automation System User Interface With Three-Dimensional Display", U.S. Appl. No. 16/258,858.
US Patent Application filed on Jan. 25, 2019, entitled Communication Protocols in Integrated Systems, U.S. Appl. No. 16/257,706.
US Patent Application filed on Jan. 22, 2019, entitled "Premises System Automation", U.S. Appl. No. 16/254,480.
US Patent Application filed on Jan. 22, 2019, entitled "Data Model for Home Automation", U.S. Appl. No. 16/254,535.
US Patent Application filed on Jan. 3, 2019, entitled "Methods and Systems for Data Communication", U.S. Appl. No. 16/239,114.
United States Patent and Trademark Office—Before the Patent Trial and Appeal Board, *Alarm.com* (U.S. Pat. No. 8,350,694B1) (inventors Stephen Scott Trundle & Alison Jane Slavin) V *iControl Networks, Inc.* (U.S. Appl. No. 13/311,365) (Inventors. Poul j. Dawes, Jim Fulker, Carolyn Wales, Reza Raji, and Gerald Gutt), Patent Interference 106,001 (HHB) (Technology Center 24000), Mar. 31, 2015.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
Supplementary Non-Final Office Action dated Oct. 28, 2010 for U.S. Appl. No. 12/630,092, filed Dec. 3, 2009.
Supplementary European Search Report for Application No. EP2191351, dated Jun. 23, 2014, 2 pages.
Supplementary Partial European Search Report for Application No. EP09807196, dated Nov. 17, 2014, 5 pages.
Supplementary European Search Report for Application No. EP11827671, dated Mar. 10, 2015, 2 pages.
Supplementary European Search Report for Application No. EP10819658, dated Mar. 10, 2015, 2 pages.
Supplemental European Search Report for Application No. EP05725743.8 dated Sep. 14, 2010, 2 pages.
Shang, Wei-lai, Study on Application of Embedded Intelligent Area System, Journal of Anyang Institute of Technology, vol. 9, No. 6, pp. 56-57 and 65.
Security for the Future, Introducing 5804BO—Advanced two-way wireless remote technology, Advertisement, ADEMCO Group, Syosset, NY, circa 1997.
Security for the Future, Introducing 5804B0—Advanced two-way wireless remote technology, Advertisement, ADEMCO Group, Syosset, NY, circa 1997.
Requirement for Restriction/Election dated Oct. 24, 2012 for U.S. Appl. No. 12/750,470, filed Mar. 30, 2010.
Requirement for Restriction/Election dated Jan. 22, 2013 for U.S. Appl. No. 13/104,936 filed May 10, 2011.
Requirement for Restriction/Election dated Jan. 22, 2013 for U.S. Appl. No. 13/104,932 filed May 10, 2011.
PCT Application filed on Nov. 17, 2016, entitled "Mobile Premises Automation Platform", PCT/US2016/062519.
PCT Application filed on Oct. 13, 2016, entitled "Coordinated Control of Connected Devices in a Premise", PCT/US2016/056842.
PCT Application filed on Aug. 17, 2016, entitled "Automation System User Interface", PCT/US2016/047262.
PCT Application filed on Aug. 16, 2016, entitled "Automation System User Interface", PCT/US2016/047172.
PCT Application filed on Jul. 7, 2016, entitled "Automation System User Interface with Three-Dimensional Display", PCT/US2016/041353.

(56) References Cited

OTHER PUBLICATIONS

PCT Application filed on Jun. 30, 2016, entitled "Integrated Cloud System with Lightweight Gateway for Premises Automation", PCT/US2016/040451.
PCT Application filed on Jun. 29, 2016, entitled "Integrated Cloud System for Premises Automation", PCT/US2016/040046.
PCT Application filed on Jun. 9, 2016, entitled "Virtual Device Systems and Methods", PCT/US2016/036674.
Notice of Allowance dated Oct. 25, 2012 for U.S. Appl. No. 11/084,232, filed Mar. 16, 2005.
Notice of Allowance mailed May 14, 2013 for U.S. Appl. No. 12/637,671, filed Dec. 14, 2009.
Non-Final Office Action dated May 23, 2013 for U.S. Appl. No. 13/104,936, filed May 10, 2011.
Non-Final Office Action dated May 23, 2013 for U.S. Appl. No. 13/104,932, filed May 10, 2011.
Non-Final Office Action dated Jan. 5, 2010 for U.S. Appl. No. 12/019,554, filed Jan. 24, 2008.
Non-Final Office Action dated Feb. 21, 2013 for U.S. Appl. No. 12/771,372, filed Apr. 30, 2010.
Non-Final Office Action dated Apr. 13, 2010 for U.S. Appl. No. 11/761,745, filed Jun. 12, 2007.
Non-Final Office Action dated May 30, 2008 for U.S. Appl. No. 11/084,232, filed Mar. 16, 2005.
Non-Final Office Action dated Dec. 30, 2009 for U.S. Appl. No. 11/084,232 filed Mar. 16, 2005.
Non-Final Office Action dated Jun. 27, 2013 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jan. 26, 2012 for U.S. Appl. No. 12/019,568, filed Jan. 24, 2008.
Non-Final Office Action dated Jul. 22, 2013 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 21, 2010 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Feb. 18, 2011 for U.S. Appl. No. 12/630,092, filed Dec. 3, 2009.
Non-Final Office Action dated Aug. 18, 2011 for U.S. Appl. No. 12/197,958, filed Aug. 25, 2008.
Non-Final Office Action dated Sep. 17, 2012 for U.S. Appl. No. 12/189,780, filed Aug. 11, 2008.
Non-Final Office Action dated Sep. 16, 2011 for U.S. Appl. No. 12/539,537, filed Aug. 11, 2009.
Non-Final Office Action dated Sep. 14, 2010 for U.S. Appl. No. 11/084,232, filed Mar. 16, 2005.
Non-Final Office Action dated Nov. 14, 2012 for U.S. Appl. No. 13/531,757, filed Jun. 25, 2012.
Non-Final Office Action dated Jul. 13, 2010 for U.S. Appl. No. 12/019,568, filed Jan. 24, 2008.
Non-Final Office Action dated Sep. 12, 2012 for U.S. Appl. No. 12/952,080, filed Nov. 22, 2010.
Non-Final Office Action dated Oct. 12, 2012 for U.S. Appl. No. 12/630,092, filed Dec. 3, 2009.
Non-Final Office Action dated Jul. 12, 2012 for U.S. Appl. No. 12/691,992, filed Jan. 22, 2010.
Non-Final Office Action dated Apr. 12, 2012 for U.S. Appl. No. 12/770,365, filed Apr. 29, 2010.
Non-Final Office Action dated Oct. 11, 2012 for U.S. Appl. No. 12/019,568, filed Jan. 24, 2008.
Non-Final Office Action dated Aug. 10, 2012 for U.S. Appl. No. 12/771,471, filed Apr. 30, 2010.
Non-Final Office Action dated Dec. 9, 2008 for U.S. Appl. No. 11/084,232, filed Mar. 16, 2005.
Non-Final Office Action dated Apr. 9, 2012 for U.S. Appl. No. 12/771,624, filed Apr. 30, 2010.
Non-Final Office Action dated Feb. 8, 2012 for U.S. Appl. No. 12/630,092, filed Dec. 3, 2009.
Non-Final Office Action dated Feb. 7, 2013 for U.S. Appl. No. 12/970,313, filed Dec. 16, 2010.
Non-Final Office Action dated Feb. 7, 2012 for U.S. Appl. No. 12/637,671, filed Dec. 14, 2009.
Non-Final Office Action dated May 5, 2010 for U.S. Appl. No. 12/189,785, filed Aug. 11, 2008.
Non-Final Office Action dated May 5, 2010 for U.S. Appl. No. 12/189,780, filed Aug. 11, 2008.
Non-Final Office Action dated Mar. 4, 2013 for U.S. Appl. No. 13/400,477, filed Feb. 20, 2012.
Non-Final Office Action dated Apr. 4, 2013 for U.S. Appl. No. 12/197,931, filed Aug. 25, 2008.
Network Working Group, Request for Comments H.Schulzrinne Apr. 1998.
Lagotek Wireless Home Automation System, May 2006 [retrieved on Aug. 22, 2012].
J. David Eisenberg, SVG Essentials: Producing Scalable Vector Graphics with XML. O'Reilly & Associates, Inc., Sebastopol, CA 2002.
International Search Report for Application No. PCT/US2014/050548, dated Mar 18, 2015, 4 pages.
International Search Report for Application No. PCT/US13148324, dated Jan. 14, 2014, 2 pages.
Indian Patent App. No. 3687/DELNP/2012, corresponds to WO2011/038409 filed on Sep. 28, 2010.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
GTI Genex Technologies, Inc. OmniEye.(Trademark). Product Brochure, Sep. 14, 1999 (5 pages).
GrayElectronics, http://www.grayelectronics.com; webpage accessed on Jan. 10, 2018.
GrayElectronics, "Digitizing TV cameras on TCP/IP Computer Networks," http://www.grayelectronics.com/default.htm, printed on Oct. 12, 1999 (2 pages).
Gong, Li, A Software architecture for open service gateways, Internet Computing, IEEE 5.1, Jan.-Feb. 2001, 64-70.
Genex Technologies, Genex OmniEye, www.av-iq.com/avcat/images/documents/pdfs/omnieye%20nightwatchbrochure.pdf; webpage accessed Jan. 10, 2018.
Genex OmniEye http://www.cienextech.com/prod01.htm, 1999 5 pages.
Form PCT/ISA/237, "PCT Written Opinion ofthe International Searching Authority of the Application No. PCT/US08/83254," dated Jan. 14, 2009, 7 pages.
Form PCT/ISA/237, "PCT Written Opinion of the International Searching Authority for the Application No. PCT/US11/53136," dated Jan. 5, 2012.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US08/74260," dated Nov. 13, 2008, 6 pages.

(56) References Cited

OTHER PUBLICATIONS

Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion ofthe International Searching Authority for the Application No. PCT/US0S/08766," dated May 23, 2006, 5 pages.
Form PCT/ISA/237, "PCT Written Opinion ofthe International Searching Authority for the Application No. PCT/US05/08766," dated May 23, 2006, 5 pages.
Form PCT/ISA/220, PCT Notification of Transmittal of the International Search Report and the Written Opinion of the International Searching Authority, or the Declaration for the Application No. PCT/US05/08766, dated May 23, 2006, 1 page.
Indian Patent App. No. 10698/DELNP/2012, corresponds to WO2011/143273 filed Nov. 17, 2011.
South African Patent App. No. 2013/02668, corresponds to WO2012/040653.
US Patent Application filed on Jul. 26, 2019, entitled "Device Integration Framework", U.S. Appl. No. 16/522,949.
visitalk.com-communication with vision, http://www.visitalk.com (date unknown).
Examination Report under Section 18(3) re for UK Patent Application No. GB0620362.4, dated Aug. 13, 2007.
EP examination report issued in EP08797646.0, dated May 17, 2017, 11 pages.
EP application filed on Aug. 16, 2017, entitled, "Automation System User Interface", 17186497.8.
Elwahab et al.; Device, System and . . . Customer Premises Gateways; Sep. 27, 2001; WO 01/71489.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
CorAccess Systems, Companion 6 User Guide, Jun. 17, 2002.
Control Panel Standard—Features for False Alarm Reduction, The Security Industry Association, SIA 2009, pp. 1-48.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Alarm.com—Interactive Security Systems, Product Advantages [retrieved on Nov. 4, 2003], 3 pages.
Alarm.com—Interactive Security Systems, Overview [retrieved on Nov. 4, 2003], 2 pages.
Alarm.com—Interactive Security Systems, Frequently Asked Questions [retrieved on Nov. 4, 2003], 3 pages.
Alarm.com—Interactive Security Systems, Elders [retrieved on Nov. 4, 2003], 1 page.
6270 Touch Screen Keypad Notes, Honeywell, Sep. 2006.
"Modular programming", The Authoritative Dictionary of IEEE Standard Terms. 7th ed. 2000.
"Application" The Authoritative Dictionary of IEEE Standard Terms. 7th ed. 2000.
US Patent Application filed on Aug. 23, 2019, entitled "Premises System Management Using Status Signal" U.S. Appl. No. 16/549,837.
"File", The Authoritative Dictionary of IEEE Standard Terms. 7th ed. 2000, pp. 453.
"Icon", Newton's Telecom Dictionary, 21st ed., Mar. 2005.

Gateway Registry Methods and Systems, U.S. Appl. No. 13/486,276, filed Jun. 1, 2012.
US Patent Application filed on Jan. 23, 2020, entitled "Forming a Security Network Including Integrated Security System Components and Network Dev", U.S. Appl. No. 16/750,976.
US Patent Application filed on Feb. 6, 2020, entitled "Activation of Gateway Device", U.S. Appl. No. 16/784,159.
US Patent Application filed on Mar. 2, 2020, entitled "Communication Protocols in Integrated Systems", U.S. Appl. No. 16/807,100.
US Patent Application filed on Mar. 2, 2020, entitled "Coordinated Control of Connected Devices in a Premise", U.S. Appl. No. 16/807,028.
US Patent Application filed on Mar. 11, 2020, entitled "Management of a Security System At a Premises", U.S. Appl. No. 16/816,134.
US Patent Application filed on Mar. 20, 2020, entitled "Security, Monitoring and Automation Controller Access and Use of Legacy Security Control Panel Information", U.S. Appl. No. 16/825,099.
US Patent Application filed on Apr. 17, 2020, entitled "Method and System for Providing Alternate Network Access", U.S. Appl. No. 16/852,072.
US Patent Application filed on Apr. 17, 2020, entitled "Networked Touchscreen With Integrated Interfaces", U.S. Appl. No. 16/852,058.
US Patent Application filed on May 11, 2020, entitled "Control System User Interface", U.S. Appl. No. 16/871,151.
US Patent Application filed on May 12, 2020, entitled "IP Device Discovery Systems and Methods", U.S. Appl. No. 15/930,029.
US Patent Application filed on May 19, 2020, entitled "User Interface in a Premises Network", U.S. Appl. No. 16/878,099.
US Patent Application filed on May 26, 2020, entitled "Premises Management Configuration and Control", U.S. Appl. No. 16/882,876.
US Patent Application filed on Jun. 10, 2020, entitled "Method and System for Communicating With and Controlling an Alarm System From a Remote Server", U.S. Appl. No. 16/898,146.
US Patent Application filed on Sep. 27, 2019, entitled "Control System User Interface", U.S. Appl. No. 16/585,481.
US Patent Application filed on Oct. 18, 2019, entitled "WIFI-To-Serial Encapsulation in Systems", U.S. Appl. No. 16/656,874.
US Patent Application filed on Nov. 19, 2019, entitled "Integrated Cloud System With Lightweight Gateway for Premises Automation", U.S. Appl. No. 16/688,717.
US Patent Application filed on Nov. 26, 2019, entitled "Communication Protocols Over Internet Protocol (IP) Networks", U.S. Appl. No. 16/696,657.
US Patent Application filed on Dec. 27, 2019, entitled "Premises Management Systems", U.S. Appl. No. 16/728,608.
US Patent Application filed on Jun. 24, 2020, entitled "Method and System for Processing Security Event Data", U.S. Appl. No. 16/910,967.
US Patent Application filed on Aug. 26, 2020, entitled "Automation System User Interface With Three-Dimensional Display", U.S. Appl. No. 17/003,550.
US Patent Application filed on Sep. 10, 2020, entitled "Security System With Networked Touchscreen", U.S. Appl. No. 17/017,519.
US Patent Application filed on Sep. 11, 2020, entitled "Management of Applications for a Device Located At a Premises", U.S. Appl. No. 17/018,901.
US Patent Application filed on Oct. 8, 2020, entitled "Communication Protocols in Integrated Systems", U.S. Appl. No. 17/065,841.
US Patent Application filed on Oct. 12, 2020, entitled "Integrated Security System With Parallel Processing Architecture", U.S. Appl. No. 17/068,584.
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.

* cited by examiner

Camera with Premise Gateway Deployement Scenario

RTSP Tunnel State Transition Diagram

Media Channel Sample Call Flow

MJPEG Media Channel State Transition Diagram

COMMUNICATION PROTOCOLS OVER INTERNET PROTOCOL (IP) NETWORKS

RELATED APPLICATIONS

This application is a continuation of U.S. patent application Ser. No. 14/202,579, filed Mar. 10, 2014, which claims the benefit of U.S. Provisional Application No. 61/802,077, filed Mar. 15, 2013,
and claims the benefit of U.S. Provisional Application No. 61/782,345, filed Mar. 14, 2013,
and claims the benefit of U.S. Provisional Application No. 61/781,713, filed Mar. 14, 2013,
and claims the benefit of U.S. Provisional Patent Application No. 61/781,401, filed Mar. 14, 2013,
and claims the benefit of U.S. Provisional Patent Application No. 61/779,028, filed Mar. 13, 2013,
and claims the benefit of U.S. Provisional Patent Application No. 61/780,637, filed Mar. 13, 2013,
and claims the benefit of U.S. Provisional Patent Application No. 61/780,538, filed Mar. 13, 2013,
and claims the benefit of U.S. Provisional Patent Application No. 61/780,435, filed Mar. 13, 2013,
and claims the benefit of U.S. Provisional Patent Application No. 61/780,290, filed Mar. 13, 2013,
and claims the benefit of U.S. Provisional Patent Application No. 61/780,092, filed Mar. 13, 2013,
and claims the benefit of U.S. Provisional Patent Application No. 61/779,753, filed Mar. 13, 2013,
and claims the benefit of U.S. Provisional Patent Application No. 61/778,853, filed Mar. 13, 2013,
and claims the benefit of U.S. Provisional Patent Application No. 61/777,061, filed Mar. 12, 2013,
and is a continuation-in-part of U.S. patent application Ser. No. 13/932,837, filed Jul. 1, 2013, issued as U.S. Pat. No. 9,621,408 on Apr. 11, 2017,
and is a continuation-in-part of U.S. patent application Ser. No. 13/925,181, filed Jun. 24, 2013,
and is a continuation-in-part of U.S. patent application Ser. No. 13/718,851, filed Dec. 18, 2012,
and is a continuation-in-part of U.S. patent application Ser. No. 13/531,757, filed Jun. 25, 2012,
and is a continuation-in-part of U.S. patent application Ser. No. 13/335,279, filed Dec. 22, 2011,
and is a continuation-in-part of U.S. patent application Ser. No. 13/104,932, filed May 10, 2011,
and is a continuation-in-part of U.S. patent application Ser. No. 12/750,470, filed Mar. 30, 2010, issued as U.S. Pat. No. 9,191,228 on Nov. 17, 2015,
and is a continuation-in-part of U.S. patent application Ser. No. 12/539,537, filed Aug. 11, 2009, and is a continuation-in-part of U.S. patent application Ser. No. 12/197,946, filed Aug. 25, 2008, issued as U.S. Pat. No. 8,612,591 on Dec. 17, 2013,
and is a continuation-in-part of U.S. patent application Ser. No. 12/019,568, filed Jan. 24, 2008, issued as U.S. Pat. No. 110,142,392 on Nov. 27, 2018,
and is a continuation-in-part of U.S. patent application Ser. No. 11/761,745, filed Jun. 12, 2007, issued as U.S. Pat. No. 8,635,350 on Jan. 21, 2014, which are hereby incorporated by reference in their entirety.

U.S. patent application Ser. No. 13/932,837 is a continuation-in-part of U.S. patent application Ser. No. 13/311,365, filed on Dec. 5, 2011, issued as U.S. Pat. No. 9,141,276 on Sep. 22, 2015,
and is a continuation of U.S. patent application Ser. No. 12/637,671, filed on Dec. 14, 2009, issued as U.S. Pat. No. 8,478,871 on Jul. 2, 2013, which are hereby incorporated by reference in their entirety.

U.S. patent application Ser. No. 13/925,181 is a continuation of U.S. patent application Ser. No. 12/189,757, filed on Aug. 11, 2008, issued as U.S. Pat. No. 8,473,619 on Jun. 25, 2014, which are hereby incorporated by reference in their entirety.

U.S. patent application Ser. No. 13/718,851 is a continuation of U.S. patent application Ser. No. 11/084,232, filed on Mar. 16, 2005, issued as U.S. Pat. No. 8,335,842 on Dec. 18, 2012, which are hereby incorporated by reference in their entirety.

U.S. patent application Ser. No. 13/531,757 is a continuation-in-part of U.S. patent application Ser. No. 12/269,735, filed on Nov. 12, 2008, issued as U.S. Pat. No. 8,996,665 on Mar. 31, 2015,
and is a continuation-in-part of U.S. patent application Ser. No. 12/197,931, filed on Aug. 25, 2008, issued as U.S. Pat. No. 9,172,553 on Oct. 27, 2015,
and is a continuation-in-part of U.S. patent application Ser. No. 12/198,023, filed on Aug. 25, 2008, issued as U.S. Pat. No. 8,209,400 on Jun. 26, 2012, which are hereby incorporated by reference in their entirety.

U.S. patent application Ser. No. 13/335,279 is a continuation of U.S. patent application Ser. No. 12/267,767, filed on Nov. 12, 2008, issued as U.S. Pat. No. 8,086,703 on Dec. 27, 2011,
and is a continuation of U.S. patent application Ser. No. 12/197,895, filed on Aug. 25, 2008, issued as U.S. Pat. No. 8,073,931 on Dec. 6, 2011,
and is a continuation-in-part of U.S. patent application Ser. No. 12/019,554, filed on Jan. 24, 2008, issued as U.S. Pat. No. 7,911,341 on Mar. 22, 2011,
and is a continuation-in-part of U.S. patent application Ser. No. 11/761,718, filed on Jun. 12, 2007, issued as U.S. Pat. No. 7,711,796 on May 10, 2014, which are incorporated by reference in their entirety.

U.S. patent application Ser. No. 13/104,932 claims the benefit U.S. Provisional Patent Application No. 61/333,130, filed on May 10, 2010,
and is a continuation-in-part of U.S. patent application Ser. No. 12/269,585, filed on Nov. 12, 2008, issued as U.S. Pat. No. 8,086,702 on Dec. 27, 2011, which are incorporated by reference in its entirety.

U.S. patent application Ser. No. 12/750,470 claims the benefit U.S. Provisional Patent Application No. 61/164,877, filed on Mar. 30, 2009, which is incorporated by reference in its entirety.

U.S. patent application Ser. No. 12/539,537 claims the benefit U.S. Provisional Patent Application No. 61/087,967, filed on Aug. 11, 2008, which is hereby incorporated by reference in its entirety.

U.S. patent application Ser. No. 12/197,946 claims the benefit U.S. Provisional Patent Application No. 61/023,496, filed on Jan. 25, 2008,
and claims the benefit of U.S. Provisional Patent Application No. 61/023,493, filed on Jan. 25, 2008,
and claims the benefit of U.S. Provisional Patent Application No. 61/023,489, filed on Jan. 25, 2008,
and claims the benefit of U.S. Provisional Patent Application No. 61/019,162, filed on Jan. 4, 2008,
and claims the benefit of U.S. Provisional Patent Application No. 61/019,167, filed on Jan. 4, 2008,
and claims the benefit of U.S. Provisional Patent Application No. 60/987,359, filed on Nov. 12, 2007,
and claims the benefit of U.S. Provisional Patent Application No. 60/987,366, filed on Nov. 12, 2007, and claims the benefit of U.S. Provisional Patent Application No. 60/968,005, filed on Aug. 24, 2007, and claims the benefit of U.S. Provisional Patent Application No. 60/957,997, filed on Aug. 24, 2007, which are hereby incorporated by reference in their entirety.

U.S. patent application Ser. No. 12/019,568 claims the benefit U.S. Provisional Patent Application No. 60/886,439, filed on Jan. 24, 2007, which is hereby incorporated by reference in its entirety.

U.S. patent application Ser. No. 11/761,745 claims the benefit U.S. Provisional Patent Application No. 60/804,550, filed on Jun. 12, 2006, which is hereby incorporated by reference in its entirety.

U.S. patent application Ser. No. 12/189,757 claims the benefit U.S. Provisional Patent Application No. 60/955,172, filed on Aug. 10, 2007, which is hereby incorporated by reference in its entirety.

U.S. patent application Ser. No. 11/084,232 claims the benefit U.S. Provisional Patent Application No. 60/652,475, filed on Feb. 11, 2005, and claims the benefit U.S. Provisional Patent Application No. 60/553,932, filed on Mar. 16, 2004, and claims the benefit U.S. Provisional Patent Application No. 60/553,934, filed on Mar. 16, 2004, which are hereby incorporated by reference in their entirety.

U.S. patent application Ser. No. 12/019,554 claims the benefit U.S. Provisional Patent Application No. 60/886,435, filed on Jan. 24, 2007, which is hereby incorporated by reference in its entirety.

BACKGROUND

The field of home and small business security is dominated by technology suppliers who build comprehensive 'closed' security systems, where the individual components (sensors, security panels, keypads) operate solely within the confines of a single vendor solution. For example, a wireless motion sensor from vendor A cannot be used with a security panel from vendor B. Each vendor typically has developed sophisticated proprietary wireless technologies to enable the installation and management of wireless sensors, with little or no ability for the wireless devices to operate separate from the vendor's homogeneous system. Furthermore, these traditional systems are extremely limited in their ability to interface either to a local or wide area standards-based network (such as an IP network); most installed systems support only a low-bandwidth, intermittent connection utilizing phone lines or cellular (RF) backup systems. Wireless security technology from providers such as GE Security, Honeywell, and DSC/Tyco are well known in the art, and are examples of this proprietary approach to security systems for home and business.

Furthermore, with the proliferation of the internet, ethernet and WiFi local area networks (LANs) and advanced wide area networks (WANs) that offer high bandwidth, low latency connections (broadband), as well as more advanced wireless WAN data networks (e.g. GPRS or CDMA 1×RTT) there increasingly exists the networking capability to extend these traditional security systems to offer enhanced functionality. In addition, the proliferation of broadband access has driven a corresponding increase in home and small business networking technologies and devices. It is desirable to extend traditional security systems to encompass enhanced functionality such as the ability to control and manage security systems from the world wide web, cellular telephones, or advanced function internet-based devices.

Other desired functionality includes an open systems approach to interface home security systems to home and small business networks.

Due to the proprietary approach described above, the traditional vendors are the only ones capable of taking advantage of these new network functions. To date, even though the vast majority of home and business customers have broadband network access in their premises, most security systems do not offer the advanced capabilities associated with high speed, low-latency LANs and WANs. This is primarily because the proprietary vendors have not been able to deliver such technology efficiently or effectively. Solution providers attempting to address this need are becoming known in the art, including three categories of vendors: traditional proprietary hardware providers such as Honeywell and GE Security; third party hard-wired module providers such as Alarm.com, NextAlarm, and uControl; and new proprietary systems providers such as InGrid.

A disadvantage of the prior art technologies of the traditional proprietary hardware providers arises due to the continued proprietary approach of these vendors. As they develop technology in this area it once again operates only with the hardware from that specific vendor, ignoring the need for a heterogeneous, cross-vendor solution. Yet another disadvantage of the prior art technologies of the traditional proprietary hardware providers arises due to the lack of experience and capability of these companies in creating open internet and web based solutions, and consumer friendly interfaces.

A disadvantage of the prior art technologies of the third party hard-wired module providers arises due to the installation and operational complexities and functional limitations associated with hardwiring a new component into existing security systems. Moreover, a disadvantage of the prior art technologies of the new proprietary systems providers arises due to the need to discard all prior technologies, and implement an entirely new form of security system to access the new functionalities associated with broadband and wireless data networks. There remains, therefore, a need for systems, devices, and methods that easily interface to and control the existing proprietary security technologies utilizing a variety of wireless technologies.

DETAILED DESCRIPTION

Figure 1:
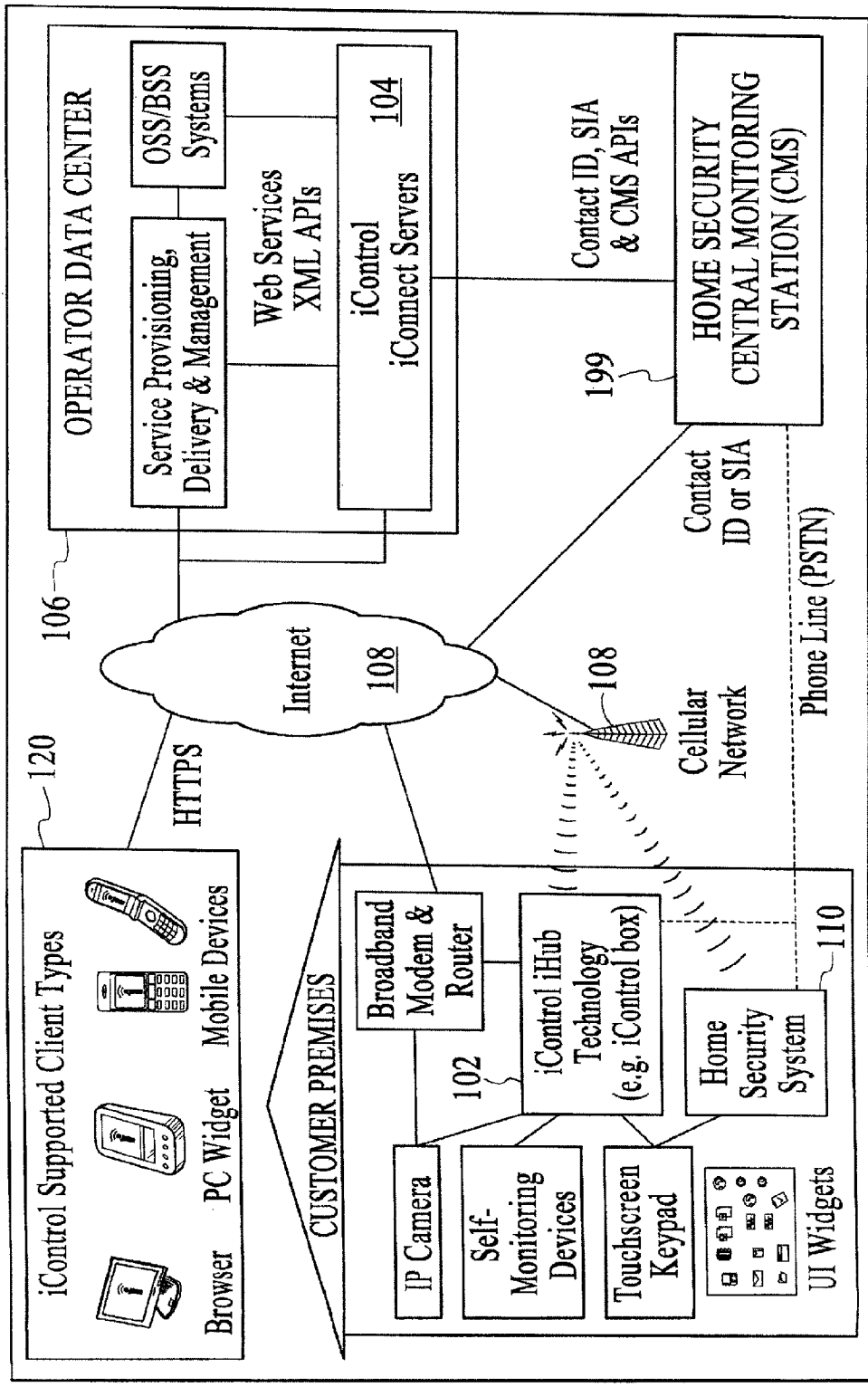
FIG. 1 is a block diagram of the integrated security system, under an embodiment.

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

As described herein, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The integrated security system can be a component of a single system, multiple systems, and/or geographically separate systems. The integrated security system can also be a subcomponent or subsystem of a single system, multiple systems, and/or geographically separate systems. The integrated security system can be coupled to one or more other components (not shown) of a host system or a system coupled to the host system.

One or more components of the integrated security system and/or a corresponding system or application to which the integrated security system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the integrated security system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the integrated security system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the integrated security system and corresponding systems and methods include: microcontrollers with memory (such as electronically erasable programmable read only memory (EEPROM)), embedded microprocessors, firmware, software, etc. Furthermore, aspects of the integrated security system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard)(MIL/TCP/IP protocols and ports are employed over secured SSL sessions; USB 2.0 via ports on the gateway; 802.11b/g/n IP communications; GSM/GPRS RF WAN communications; CDMA 1xRTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

FIG. 1 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, internet, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OS SB SS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 2:
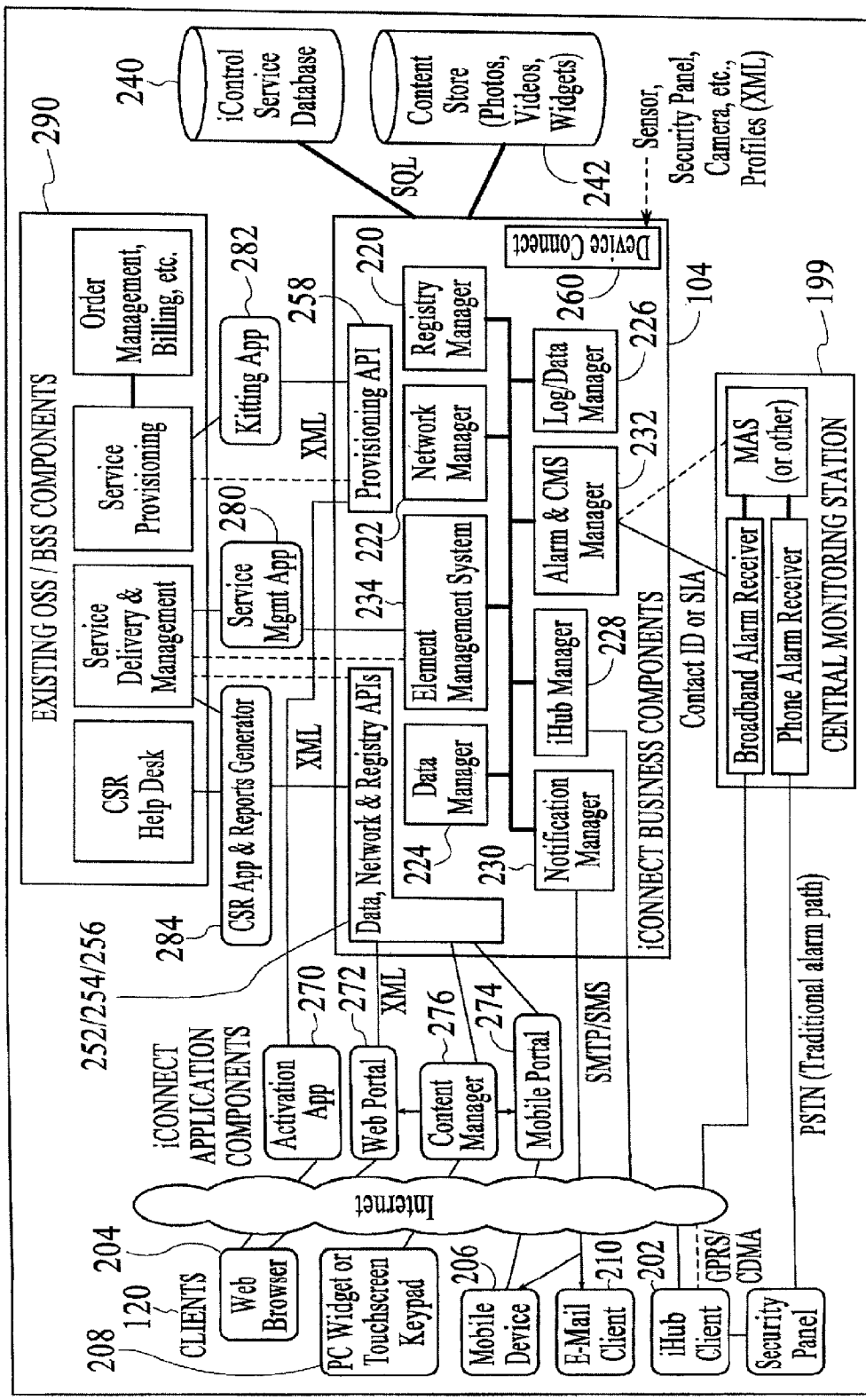
FIG. 2 is a block diagram of components of the integrated security system, under an embodiment.

The integrated security system service is delivered by hosted servers running software components that communicate with a variety of client types while interacting with other systems. FIG. 2 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following:

Clients based on gateway client applications 202 (e.g., a processor-based device running the gateway technology that manages home security and automation devices).

A web browser 204 accessing a Web Portal application, performing end-user configuration and customization of the integrated security system service as well as monitoring of in-home device status, viewing photos and video, etc. Device and user management can also be performed by this portal application.

A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.

PC or browser-based "widget" containers 208 that present integrated security system service content, as well as other third-party content, in simple, targeted ways (e.g. a widget that resides on a PC desktop and shows live video from a single in-home camera). "Widget" as used herein means applications or programs in the system.

Touchscreen home security keypads 208 and advanced in-home devices that present a variety of content widgets via an intuitive touchscreen user interface.

Notification recipients 210 (e.g., cell phones that receive SMS-based notifications when certain events occur (or don't occur), email clients that receive an email message with similar information, etc.).

Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:
  A Registry Manager 220 defines and manages users and networks. This component is responsible for the creation, modification and termination of users and networks. It is also where a user's access to networks is defined.
  A Network Manager 222 defines and manages security and self-monitoring devices that are deployed on a network (site). This component handles the creation, modification, deletion and configuration of the devices, as well as the creation of automations, schedules and notification rules associated with those devices.
  A Data Manager 224 manages access to current and logged state data for an existing network and its devices. This component specifically does not provide any access to network management capabilities, such as adding new devices to a network, which are handled exclusively by the Network Manager 222.
  To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:
  An iHub Manager 228 directly manages all communications with gateway clients, including receiving information about device state changes, changing the configuration of devices, and pushing new versions of the gateway client to the hardware it is running on.
  A Notification Manager 230 is responsible for sending all notifications to clients via SMS (mobile phone messages), email (via a relay server like an SMTP email server), etc.
  An Alarm and CMS Manager 232 sends critical server-generated alarm events to the home security Central Monitoring Station (CMS) and manages all other communications of integrated security system service data to and from the CMS.
  The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:
  A Registry Manager API 252 provides access to the Registry Manager Business Component's functionality, allowing management of networks and users.
  A Network Manager API 254 provides access to the Network Manager Business Component's functionality, allowing management of devices on a network.
  A Data Manager API 256 provides access to the Data Manager Business Component's functionality, such as setting and retrieving (current and historical) data about device states.
  A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.

An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.

An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.

A Kitting Application 282 is used by employees performing service provisioning tasks. This application allows home security and self-monitoring devices to be associated with gateways during the warehouse kitting process.

A CSR Application and Report Generator 284 is used by personnel supporting the integrated security system service, such as CSRs resolving end-user issues and employees enquiring about overall service usage. The push of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 3:
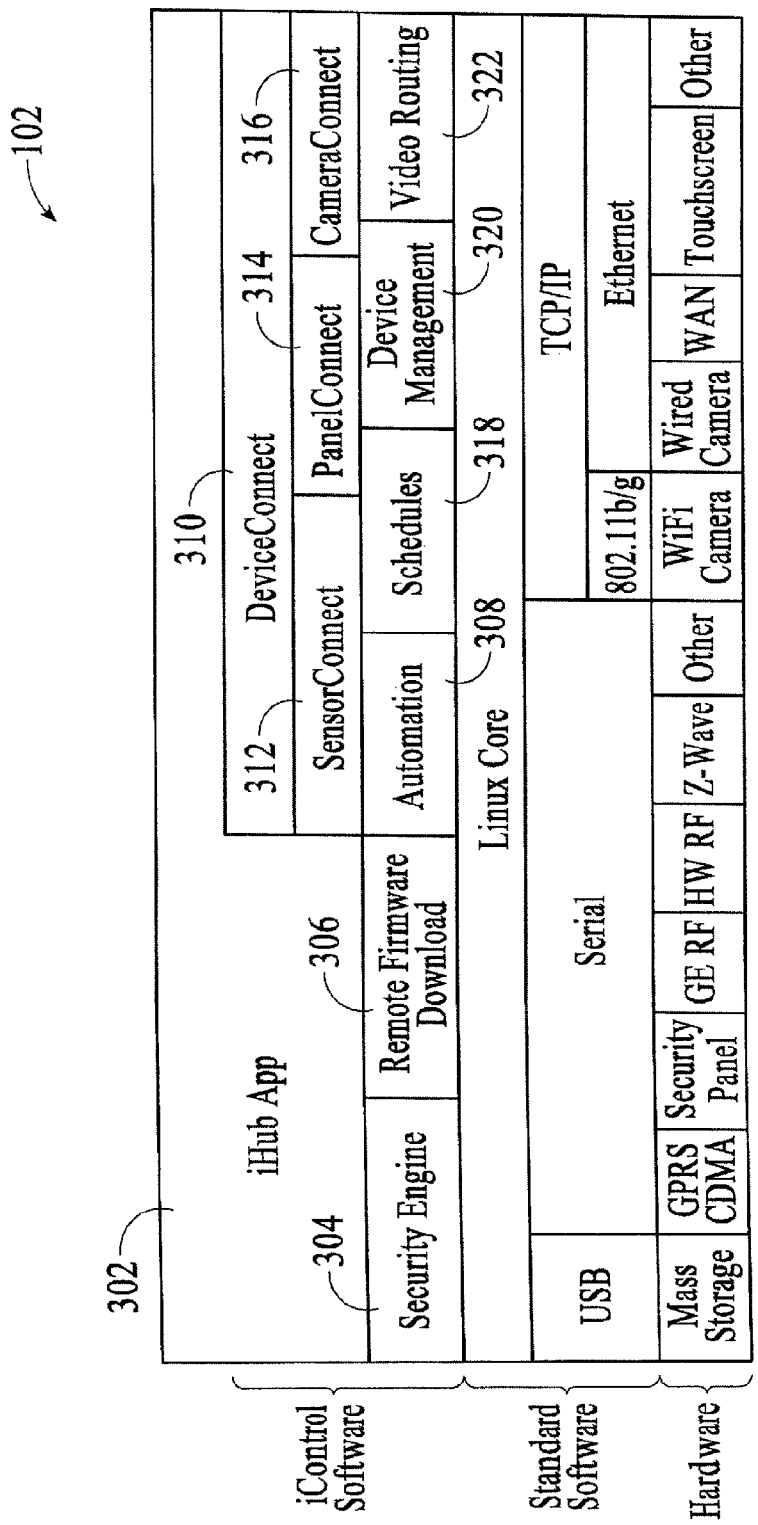
FIG. 3 is a block diagram of the gateway software or applications, under an embodiment.

FIG. 3 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The gateway provides for 128-bit SSL encapsulation of the user picture and video data sent over the interne for complete user security and privacy.

802.11b/g/n with WPA-2 security to ensure that wireless camera communications always takes place using the strongest available protection.

A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 4:
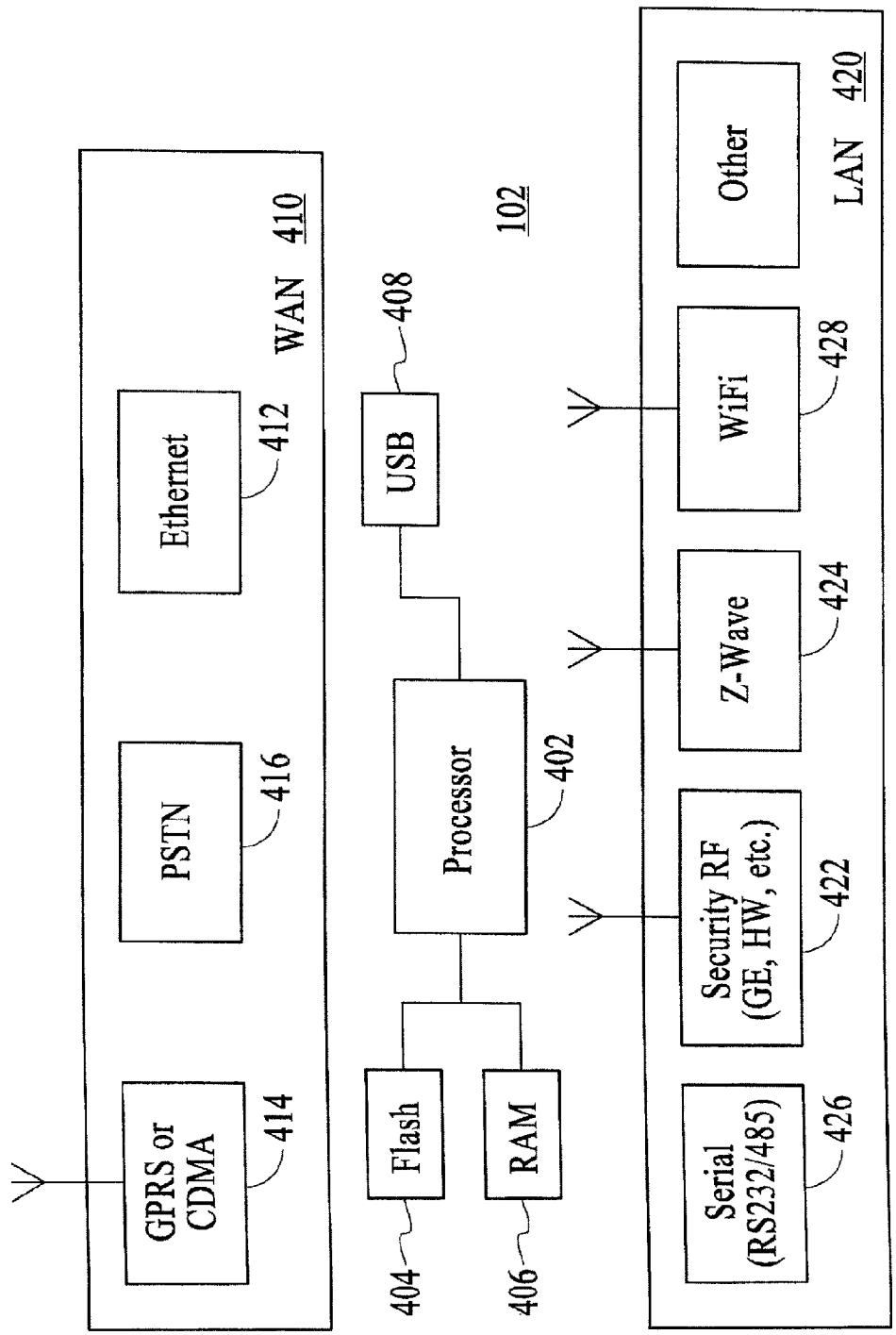
FIG. 4 is a block diagram of the gateway components, under an embodiment.

FIG. 4 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gateway 102, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as back-up for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras. The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

Figure 5:
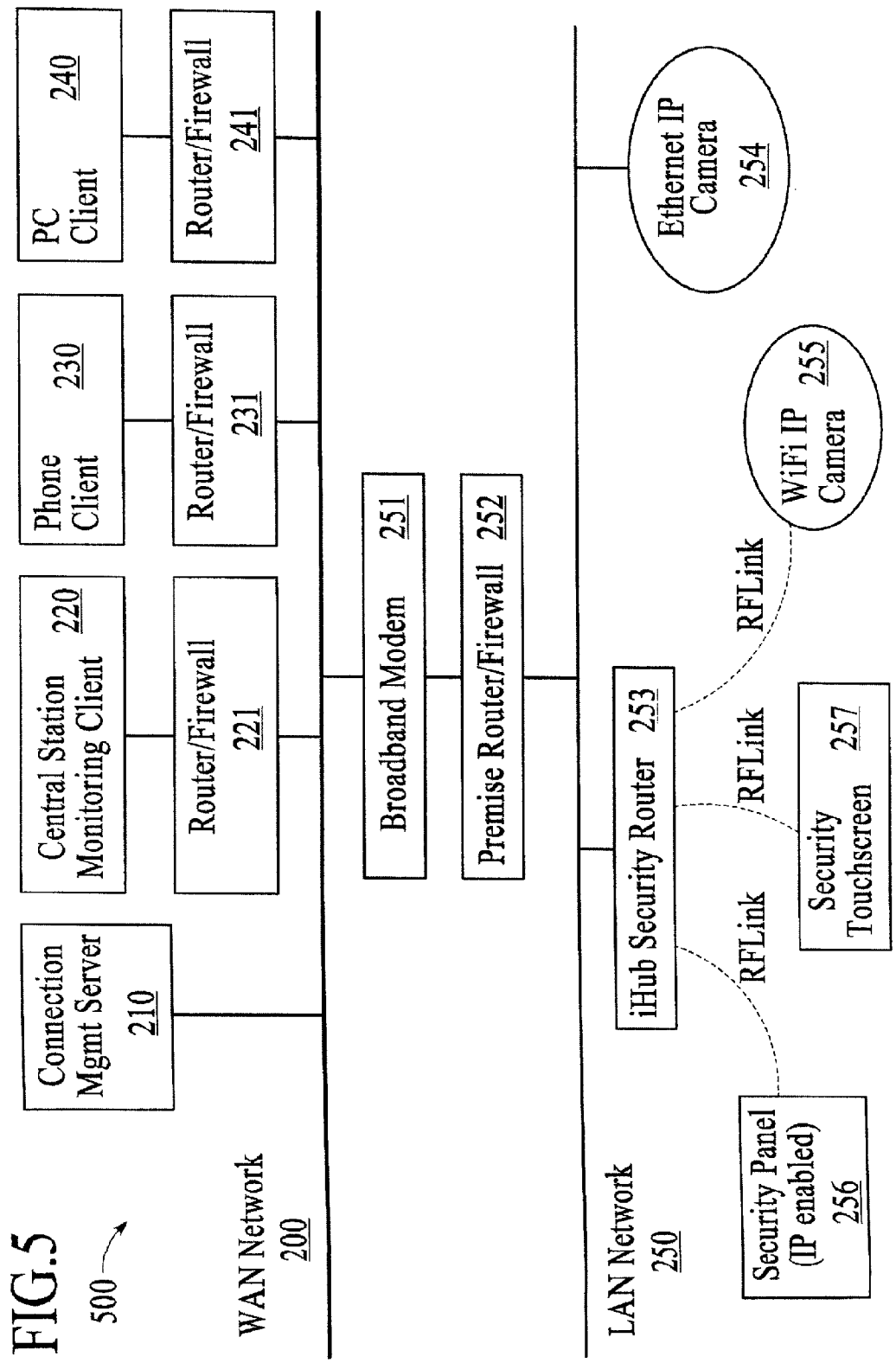
FIG. 5 is a block diagram of IP device integration with a premise network, under an embodiment.

FIG. 5 is a block diagram 500 of network or premise device integration with a premise network 250, under an embodiment. In an embodiment, network devices 255-257 are coupled to the gateway 102 using a secure network coupling or connection such as SSL over an encrypted 802.11 link (utilizing for example WPA-2 security for the wireless encryption). The network coupling or connection between the gateway 102 and the network devices 255-257 is a private coupling or connection in that it is segregated from any other network couplings or connections. The gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

Figure 6:
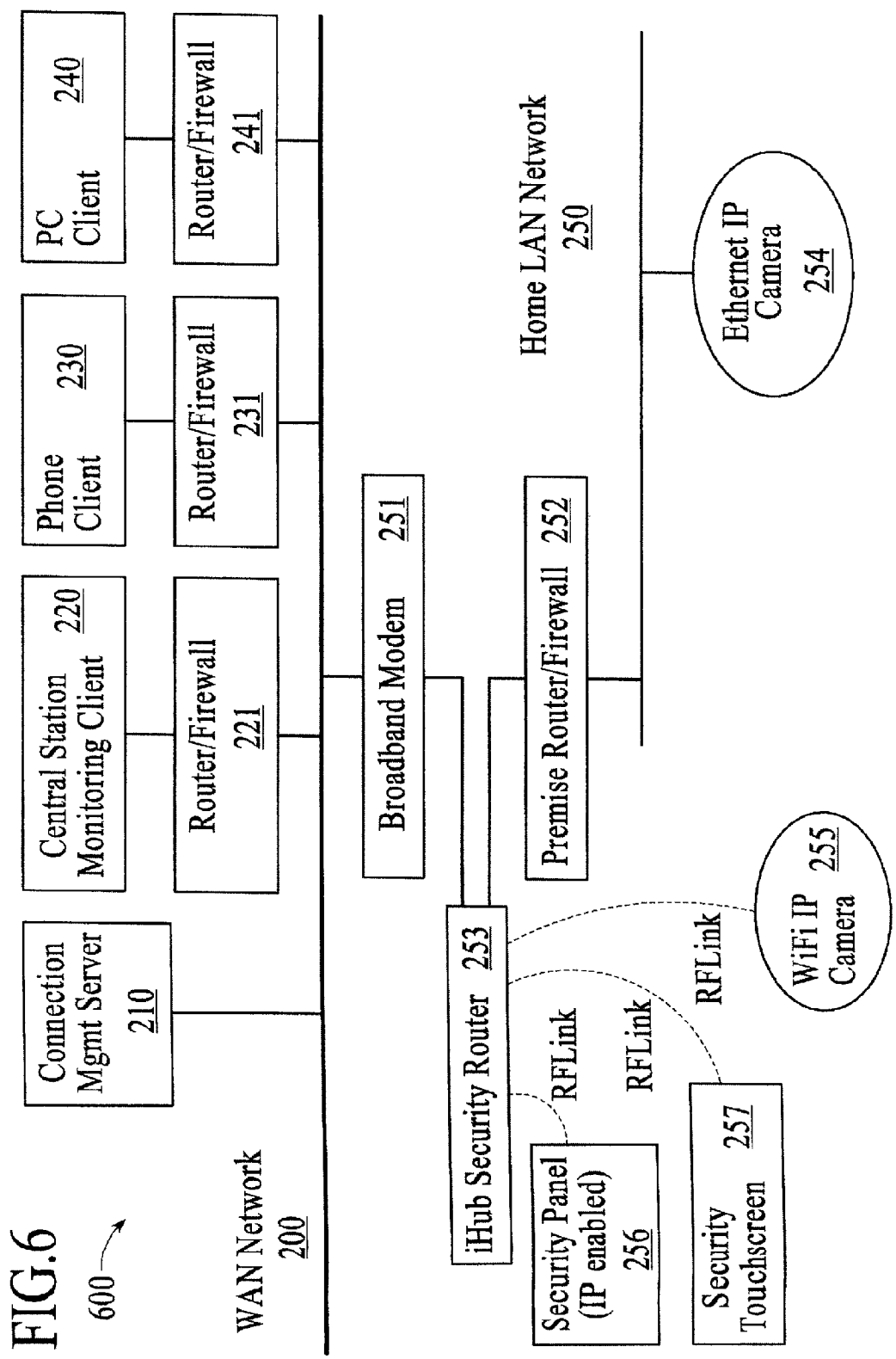
FIG. 6 is a block diagram of IP device integration with a premise network, under an alternative embodiment.

FIG. 6 is a block diagram 600 of network or premise device integration with a premise network 250, under an alternative embodiment. The network or premise devices 255-257 are coupled to the gateway 102. The network coupling or connection between the gateway 102 and the network devices 255-257 is a private coupling or connection in that it is segregated from any other network couplings or connections. The gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 5 and 6 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes a touchscreen (also referred to as the iControl touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection.

The system of an embodiment includes a touchscreen with a configurable software user interface and/or a gateway device (e.g., iHub) that couples or connects to a premise security panel through a wired or wireless connection, and a remote server that provides access to content and information from the premises devices to a user when they are remote from the home. The touchscreen supports broadband and/or WAN wireless connectivity. In this embodiment, the touchscreen incorporates an IP broadband connection (e.g., Wifi radio, Ethernet port, etc.), and/or a cellular radio (e.g., GPRS/GSM, CDMA, WiMax, etc.). The touchscreen described herein can be used as one or more of a security system interface panel and a network user interface (UI) that provides an interface to interact with a network (e.g., LAN, WAN, internet, etc.).

The touchscreen of an embodiment provides an integrated touchscreen and security panel as an all-in-one device. Once integrated using the touchscreen, the touchscreen and a security panel of a premise security system become physically co-located in one device, and the functionality of both may even be co-resident on the same CPU and memory (though this is not required).

The touchscreen of an embodiment also provides an integrated IP video and touchscreen UI. As such, the touchscreen supports one or more standard video CODECs/players (e.g., H.264, Flash Video, MOV, MPEG4, M-JPEG, etc.). The touchscreen UI then provides a mechanism (such as a camera or video widget) to play video. In an embodiment the video is streamed live from an IP video camera. In other embodiments the video comprises video clips or photos sent from an IP camera or from a remote location.

The touchscreen of an embodiment provides a configurable user interface system that includes a configuration supporting use as a security touchscreen. In this embodiment, the touchscreen utilizes a modular user interface that allows components to be modified easily by a service provider, an installer, or even the end user. Examples of such a modular approach include using Flash widgets, HTML-based widgets, or other downloadable code modules such that the user interface of the touchscreen can be updated and modified while the application is running. In an embodiment the touchscreen user interface modules can be downloaded over the internet. For example, a new security configuration widget can be downloaded from a standard web server, and the touchscreen then loads such configuration app into memory, and inserts it in place of the old security configuration widget. The touchscreen of an embodiment is configured to provide a self-install user interface.

Embodiments of the networked security touchscreen system described herein include a touchscreen device with a user interface that includes a security toolbar providing one or more functions including arm, disarm, panic, medic, and alert. The touchscreen therefore includes at least one screen having a separate region of the screen dedicated to a security toolbar. The security toolbar of an embodiment is present in the dedicated region at all times that the screen is active.

The touchscreen of an embodiment includes a home screen having a separate region of the screen allocated to managing home-based functions. The home-based functions of an embodiment include managing, viewing, and/or controlling IP video cameras. In this embodiment, regions of the home screen are allocated in the form of widget icons; these widget icons (e.g. for cameras, thermostats, lighting, etc) provide functionality for managing home systems. So, for example, a displayed camera icon, when selected, launches a Camera Widget, and the Camera widget in turn provides access to video from one or more cameras, as well as providing the user with relevant camera controls (take a picture, focus the camera, etc.)

The touchscreen of an embodiment includes a home screen having a separate region of the screen allocated to managing, viewing, and/or controlling internet-based content or applications. For example, the Widget Manager UI presents a region of the home screen (up to and including the entire home screen) where internet widgets icons such as weather, sports, etc. may be accessed). Each of these icons may be selected to launch their respective content services.

The touchscreen of an embodiment is integrated into a premise network using the gateway, as described above. The gateway as described herein functions to enable a separate wireless network, or sub-network, that is coupled, connected, or integrated with another network (e.g., WAN, LAN of the host premises, etc.). The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in PanelConnect technology (e.g SetAlarmLevel (int level, int partition, char*accessCode)). Power control drivers are also provided.

Figure 7:
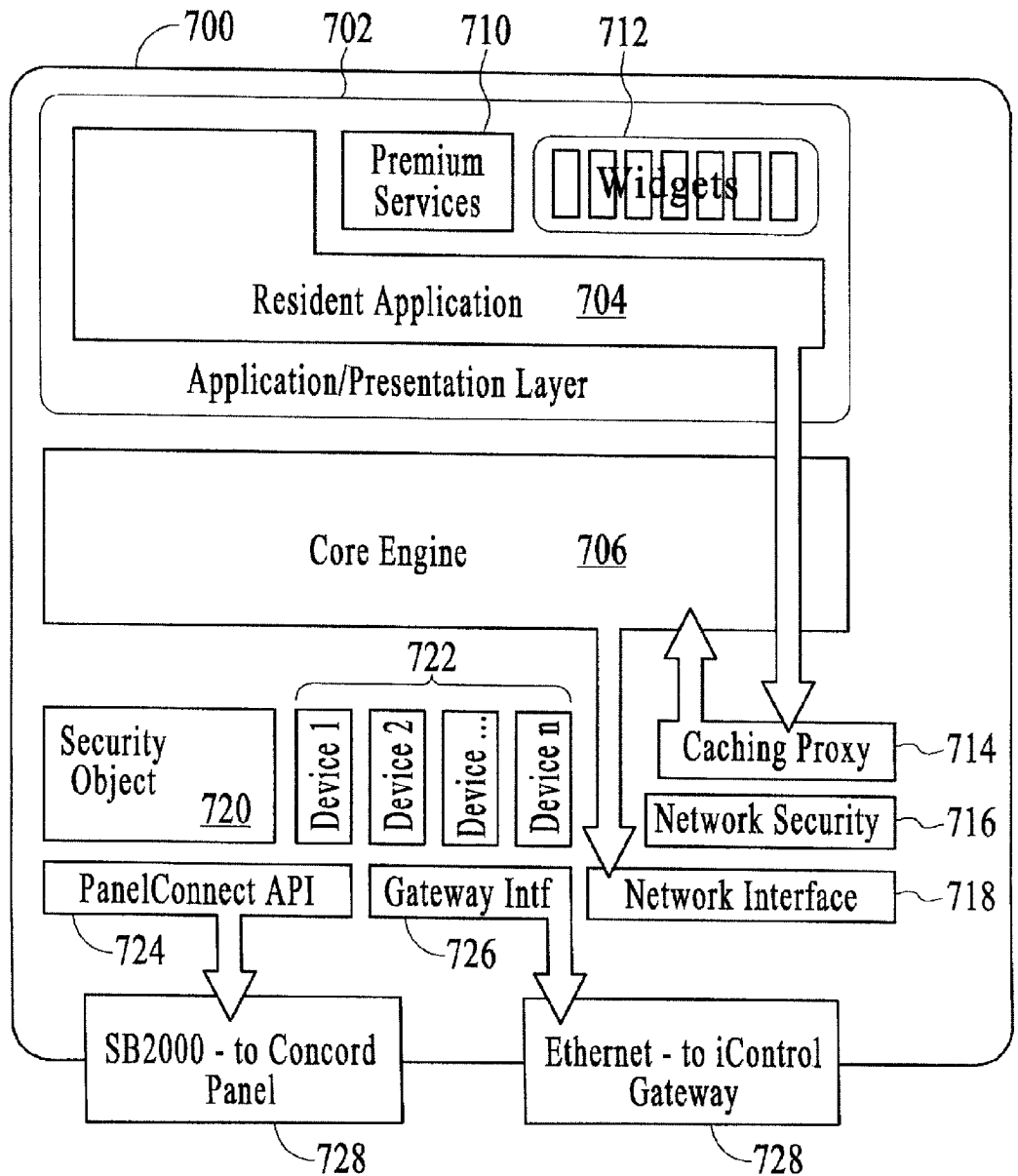
FIG. 7 is a block diagram of a touchscreen, under an embodiment.

FIG. 7 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application; installer home security application; core engine; and System bootloader/Software Updater. The core Application engine and system bootloader can also be used to support other advanced content and applications. This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 7, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

Figure 8:
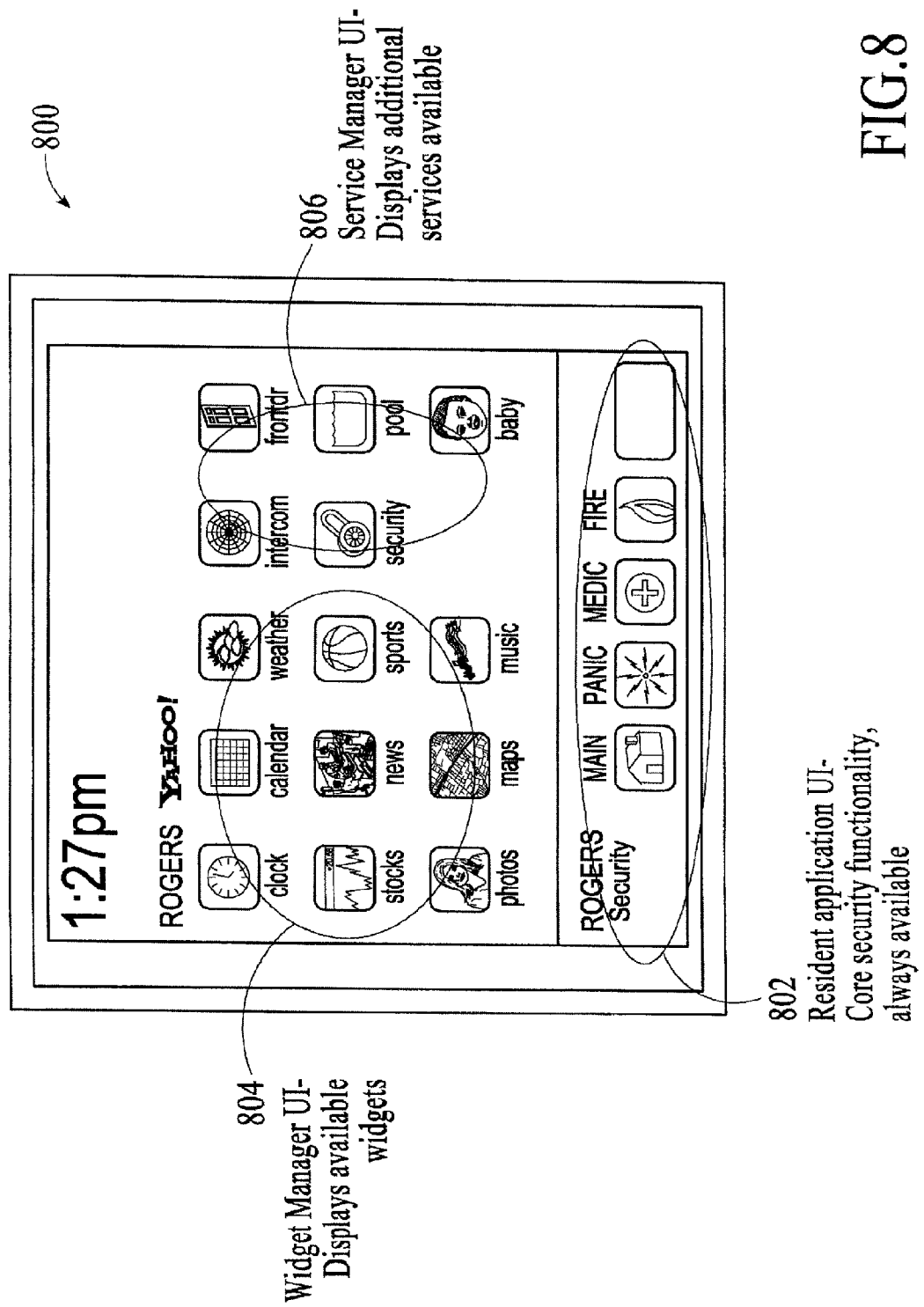
FIG. 8 is an example screenshot of a networked security touchscreen, under an embodiment.

The application engine of the touchscreen provides the presentation and interactivity capabilities for all applications (widgets) that run on the touchscreen, including both core security function widgets and third party content widgets. FIG. 8 is an example screenshot 800 of a networked security touchscreen, under an embodiment. This example screenshot 800 includes three interfaces or user interface (UI) components 802-806, but is not so limited. A first UI 802 of the touchscreen includes icons by which a user controls or accesses functions and/or components of the security system (e.g., "Main", "Panic", "Medic", "Fire", state of the premise alarm system (e.g., disarmed, armed, etc.), etc.); the first UI 802, which is also referred to herein as a security interface, is always presented on the touchscreen. A second UI 804 of the touchscreen includes icons by which a user selects or interacts with services and other network content (e.g., clock, calendar, weather, stocks, news, sports, photos, maps, music, etc.) that is accessible via the touchscreen. The second UI 804 is also referred to herein as a network interface or content interface. A third UI 806 of the touchscreen includes icons by which a user selects or interacts with additional services or componets (e.g., intercom control, security, cameras coupled to the system in particular regions (e.g., front door, baby, etc.) available via the touchscreen.

A component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets in the system, and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl Camera-Connect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests, although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein.

The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The touchscreen of an embodiment operates wirelessly with a premise security system. The touchscreen of an embodiment incorporates an RF transceiver component that either communicates directly with the sensors and/or security panel over the panel's proprietary RF frequency, or the touchscreen communicates wirelessly to the gateway over 802.11, Ethernet, or other IP-based communications channel, as described in detail herein. In the latter case the gateway implements the PanelConnect interface and communicates directly to the security panel and/or sensors over wireless or wired networks as described in detail above.

The touchscreen of an embodiment is configured to operate with multiple security systems through the use of an abstracted security system interface. In this embodiment, the PanelConnect API can be configured to support a plurality of proprietary security system interfaces, either simultaneously or individually as described herein. In one embodiment of this approach, the touchscreen incorporates multiple physical interfaces to security panels (e.g. GE Security RS-485, Honeywell RF, etc.) in addition to the PanelConnect API implemented to support multiple security interfaces. The change needed to support this in PanelConnect is a configuration parameter specifying the panel type connection that is being utilized.

So for example, the setARMState( ) function is called with an additional parameter (e.g., Armstate=setARMState (type="ARM STAY|ARM AWAY|DISARM", Parameters="ExitDelay=30|Lights=OFF", panelType="GE Concord4 RS485")). The 'panelType' parameter is used by the setARMState function (and in practice by all of the PanelConnect functions) to select an algorithm appropriate to the specific panel out of a plurality of alogorithms.

The touchscreen of an embodiment is self-installable. Consequently, the touchscreen provides a 'wizard' approach similar to that used in traditional computer installations (e.g. Install Shield). The wizard can be resident on the touchscreen, accessible through a web interface, or both. In one embodiment of a touchscreen self-installation process, the service provider can associate devices (sensors, touchscreens, security panels, lighting controls, etc.) remotely using a web-based administrator interface.

The touchscreen of an embodiment includes a battery backup system for a security touchscreen. The touchscreen incorporates a standard Li-ion or other battery and charging circuitry to allow continued operation in the event of a power outage. In an embodiment the battery is physically located and connected within the touchscreen enclosure. In another embodiment the battery is located as a part of the power transformer, or in between the power transformer and the touchscreen.

The example configurations of the integrated security system described above with reference to FIGS. 5 and 6 include a gateway that is a separate device, and the touchscreen couples to the gateway. However, in an alternative embodiment, the gateway device and its functionality can be incorporated into the touchscreen so that the device management module, which is now a component of or included in the touchscreen, is in charge of the discovery, installation and configuration of the IP devices coupled or connected to the system, as described above. The integrated security system with the integrated touchscreen/gateway uses the same "sandbox" network to discover and manage all IP devices coupled or connected as components of the system.

The touchscreen of this alternative embodiment integrates the components of the gateway with the components of the touchscreen as described herein. More specifically, the touchscreen of this alternative embodiment includes software or applications described above with reference to FIG. 3. In this alternative embodiment, the touchscreen includes the gateway application layer 302 as the main program that orchestrates the operations performed by the gateway. A Security Engine 304 of the touchscreen provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the touchscreen and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The touchscreen provides for 128-bit SSL encapsulation of the user picture and video data sent over the internet for complete user security and privacy.

802.11b/g/n with WPA-2 security to ensure that wireless camera communications always takes place using the strongest available protection.

A touchscreen-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying touchscreen-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 of the touchscreen allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Touchscreen firmware can be remotely download either for one touchscreen at a time, a group of touchscreen, or in batches.

The Automations engine 308 of the touchscreen manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 of the touchscreen touchscreen includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 of the touchscreen is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application of the touchscreen. The Schedules Engine 318 then interfaces with SensorConnect 312 to ensure that scheduled events occur at precisely the desired time.

The Device Management module 320 of the touchscreen is in charge of all discovery, installation and configuration of both wired and wireless IP devices (e.g., cameras, etc.) coupled or connected to the system. Networked IP devices, such as those used in the integrated security system, require user configuration of many IP and security parameters, and the device management module of an embodiment handles the details of this configuration. The device management module also manages the video routing module described below.

The video routing engine 322 of the touchscreen is responsible for delivering seamless video streams to the user with zero-configuration. Through a multi-step, staged approach the video routing engine uses a combination of UPnP port-forwarding, relay server routing and STUN/TURN peer-to-peer routing. The video routing engine is described in detail in the Related Applications.

Figure 9:
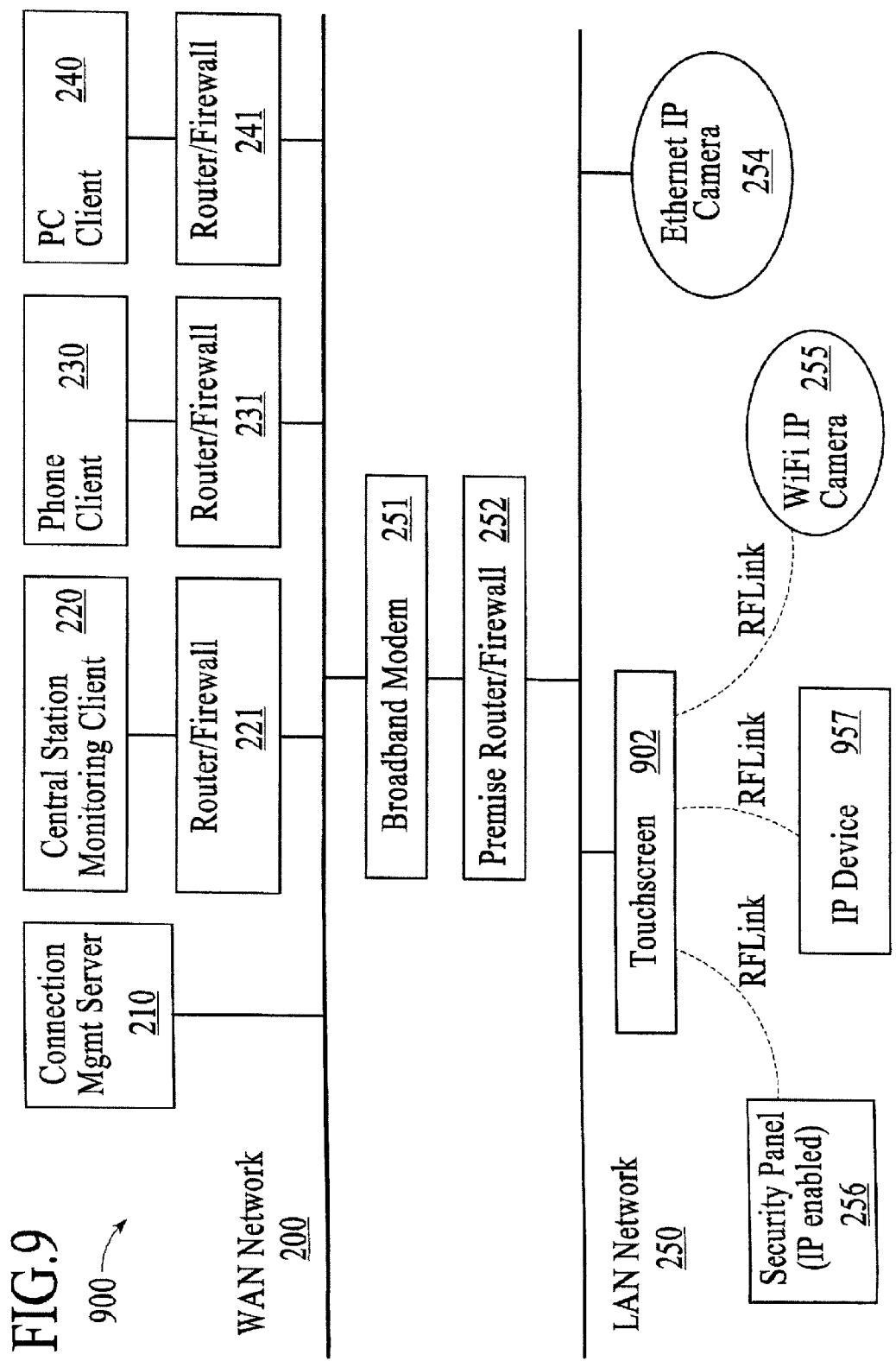
FIG. 9 is a block diagram of network or premise device integration with a premise network, under an embodiment.

FIG. 9 is a block diagram 900 of network or premise device integration with a premise network 250, under an embodiment. In an embodiment, network devices 255, 256, 957 are coupled to the touchscreen 902 using a secure network connection such as SSL over an encrypted 802.11 link (utilizing for example WPA-2 security for the wireless encryption), and the touchscreen 902 coupled to the premise router/firewall 252 via a coupling with a premise LAN 250. The premise router/firewall 252 is coupled to a broadband modem 251, and the broadband modem 251 is coupled to a WAN 200 or other network outside the premise. The touchscreen 902 thus enables or forms a separate wireless network, or sub-network, that includes some number of devices and is coupled or connected to the LAN 250 of the host premises. The touchscreen sub-network can include, but is not limited to, any number of other devices like WiFi IP cameras, security panels (e.g., IP-enabled), and IP devices, to name a few. The touchscreen 902 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 902.

Figure 10:
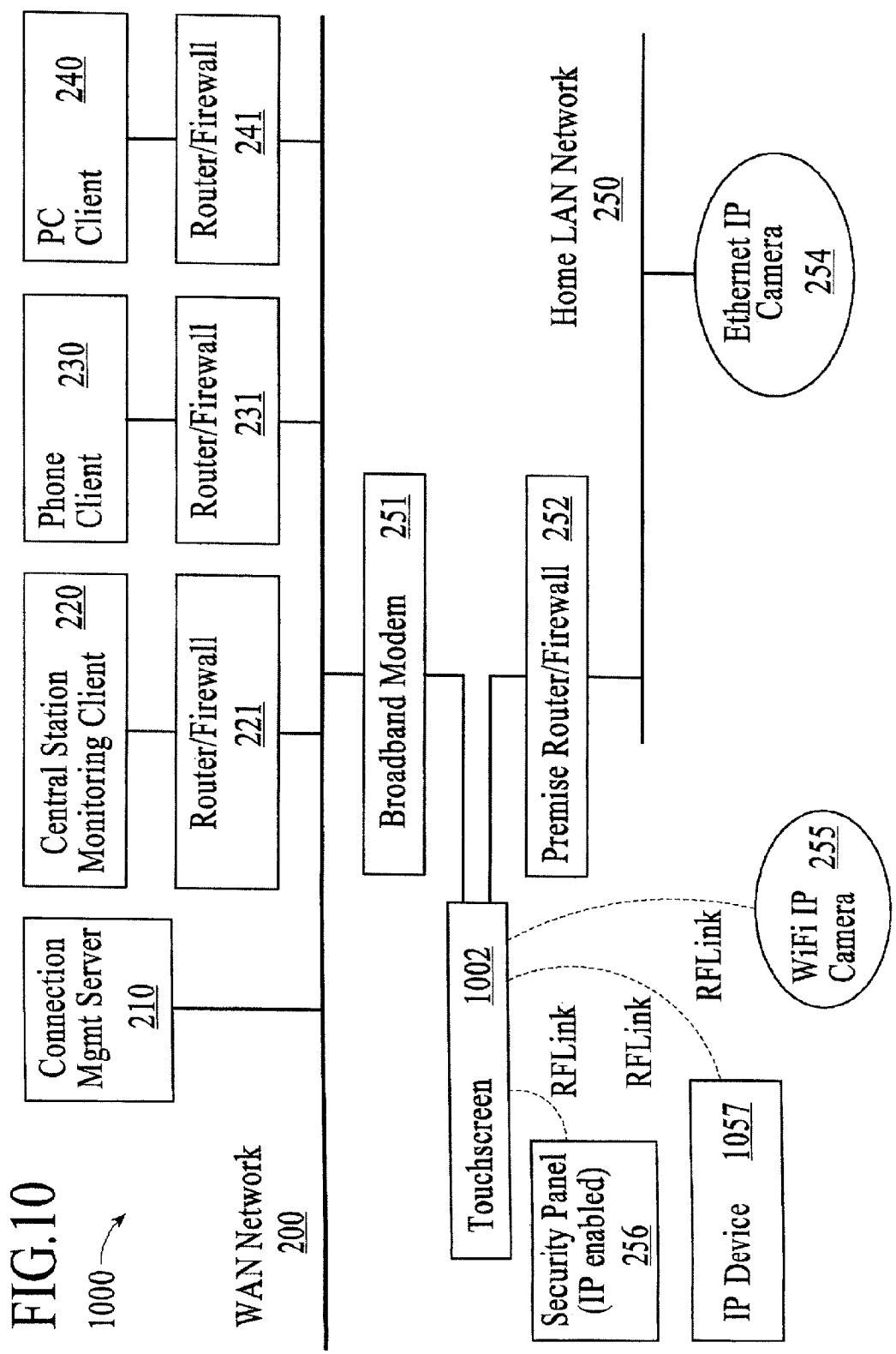
FIG. 10 is a block diagram of network or premise device integration with a premise network, under an alternative embodiment.

FIG. 10 is a block diagram 1000 of network or premise device integration with a premise network 250, under an alternative embodiment. The network or premise devices 255, 256, 1057 are coupled to the touchscreen 1002, and the touchscreen 1002 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the touchscreen 1002 can be configured or function as the premise router routing specified data between the outside network (e.g., WAN 200) and the premise router/firewall 252 of the LAN 250. As described above, the touchscreen 1002 in this configuration enables or forms a separate wireless network, or sub-network, that includes the network or premise devices 255, 156, 1057 and is coupled or connected between the LAN 250 of the host premises and the WAN 200. The touchscreen sub-network can include, but is not limited to, any number of network or premise devices 255, 256, 1057 like WiFi IP cameras, security panels (e.g., IP-enabled), and security touchscreens, to name a few. The touchscreen 1002 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 1002.

The gateway of an embodiment, whether a stand-along component or integrated with a touchscreen, enables couplings or connections and thus the flow or integration of information between various components of the host premises and various types and/or combinations of IP devices, where the components of the host premises include a network (e.g., LAN) and/or a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The gateway of an embodiment, as described herein, enables couplings or connections and thus the flow of information between various components of the host premises and various types and/or combinations of IP devices, where the components of the host premises include a network, a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

Figure 11:
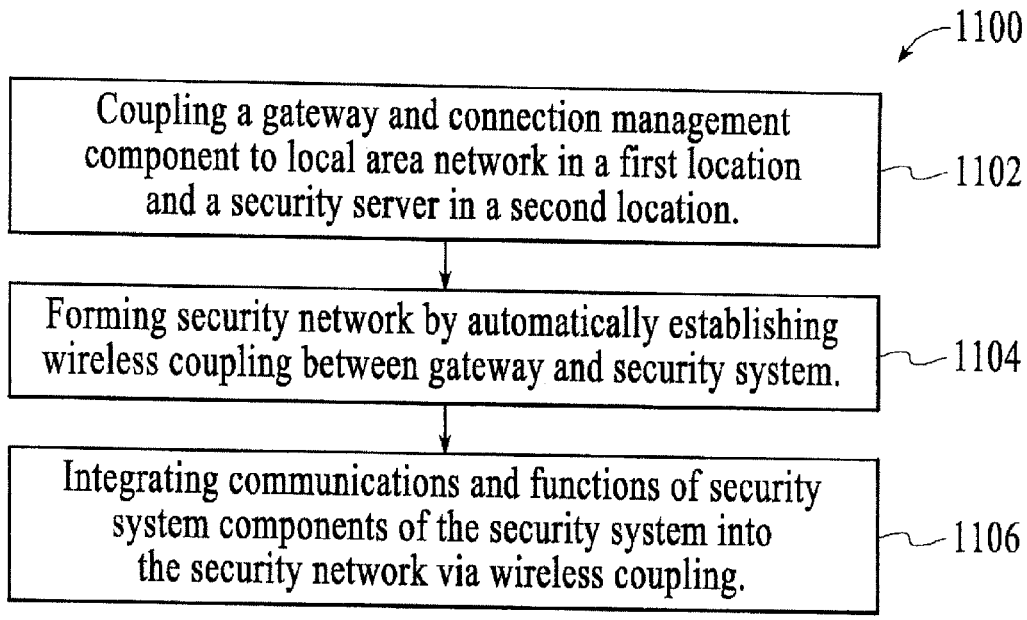
FIG. 11 is a flow diagram for a method of forming a security network including integrated security system components, under an embodiment.

FIG. 11 is a flow diagram for a method 1100 of forming a security network including integrated security system components, under an embodiment. Generally, the method comprises coupling 1102 a gateway comprising a connection management component to a local area network in a first location and a security server in a second location. The method comprises forming 1104 a security network by automatically establishing a wireless coupling between the gateway and a security system using the connection management component. The security system of an embodiment comprises security system components located at the first location. The method comprises integrating 1106 communications and functions of the security system components into the security network via the wireless coupling.

Figure 12:
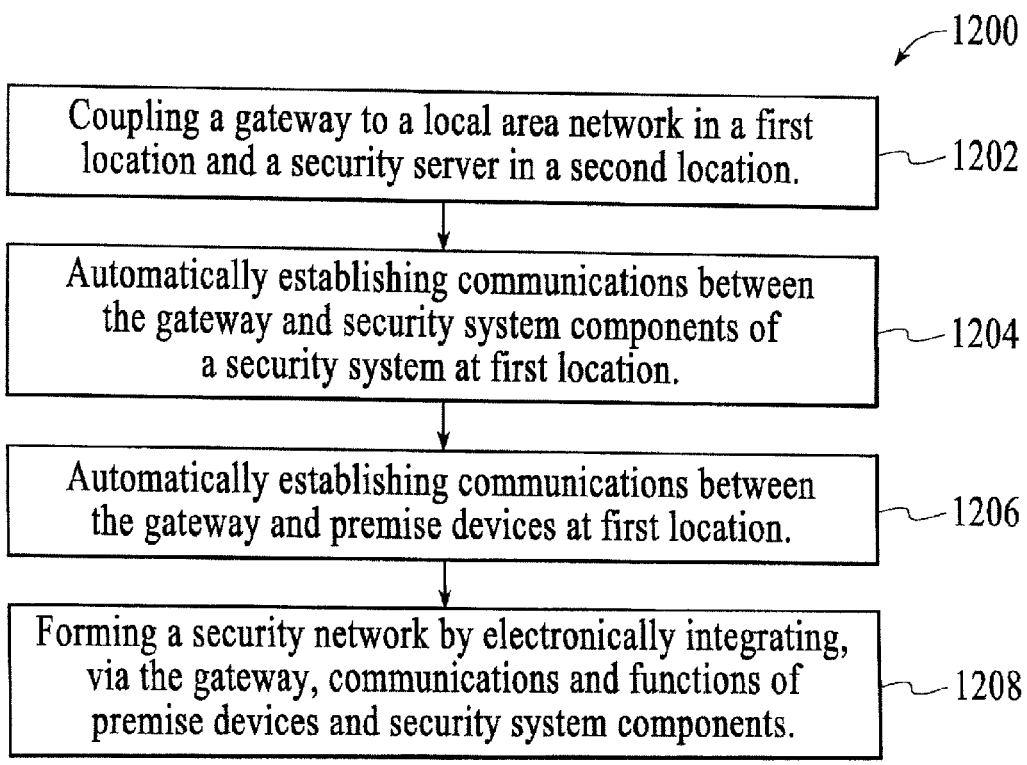
FIG. 12 is a flow diagram for a method of forming a security network including integrated security system components and network devices, under an embodiment.

FIG. 12 is a flow diagram for a method 1200 of forming a security network including integrated security system components and network devices, under an embodiment. Generally, the method comprises coupling 1202 a gateway to a local area network located in a first location and a security server in a second location. The method comprises automatically establishing 1204 communications between the gateway and security system components at the first location, the security system including the security system components. The method comprises automatically establishing 1206 communications between the gateway and premise devices at the first location. The method comprises forming 1208 a security network by electronically integrating, via the gateway, communications and functions of the premise devices and the security system components.

Figure 13:
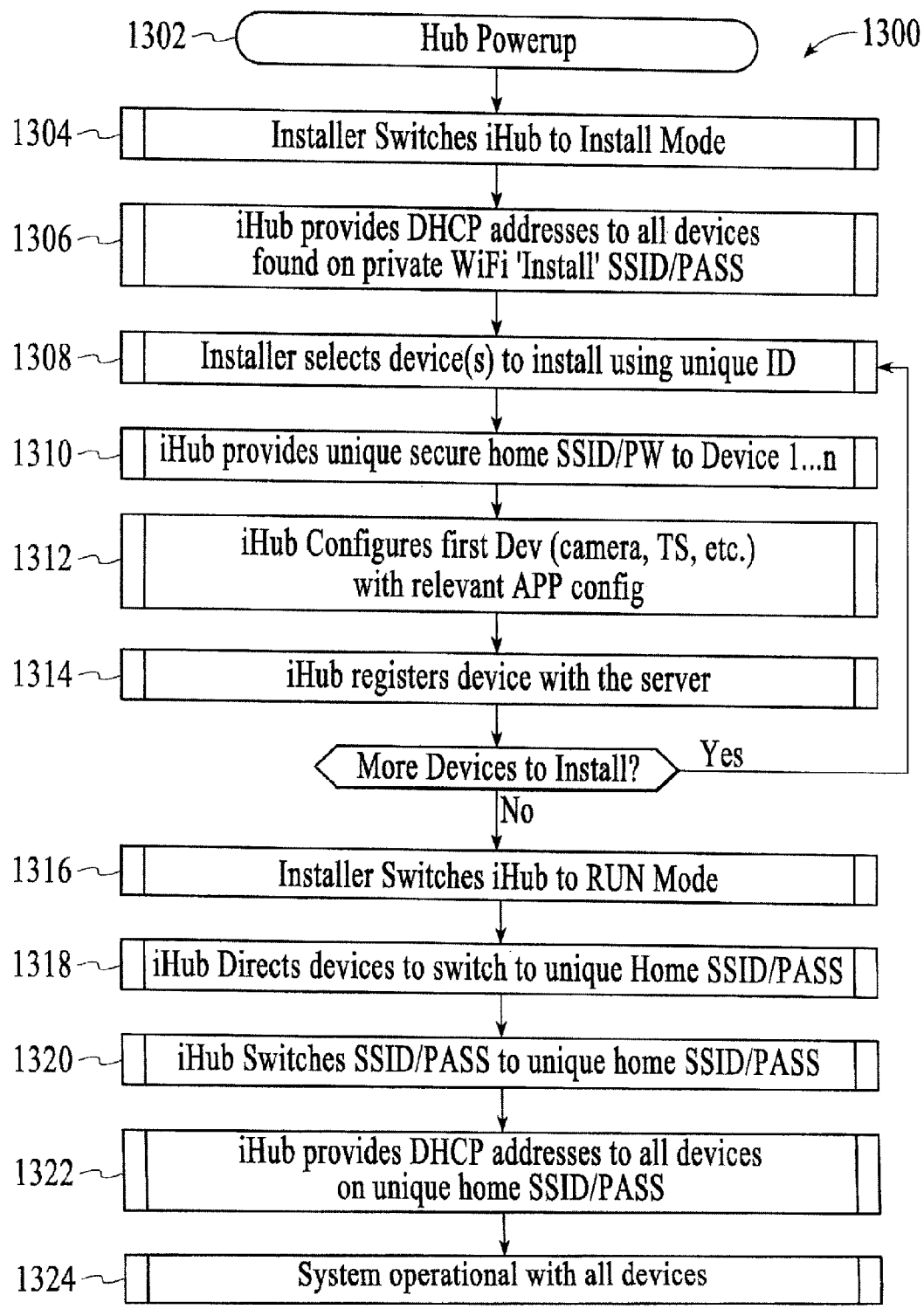
FIG. 13 is a flow diagram for installation of an IP device into a private network environment, under an embodiment.

In an example embodiment, FIG. 13 is a flow diagram 1300 for integration or installation of an IP device into a private network environment, under an embodiment. The IP device includes any IP-capable device that, for example, includes the touchscreen of an embodiment. The variables of an embodiment set at time of installation include, but are not limited to, one or more of a private SSID/Password, a gateway identifier, a security panel identifier, a user account TS, and a Central Monitoring Station account identification.

An embodiment of the IP device discovery and management begins with a user or installer activating 1302 the gateway and initiating 1304 the install mode of the system. This places the gateway in an install mode. Once in install mode, the gateway shifts to a default (Install) Wifi configuration. This setting will match the default setting for other integrated security system-enabled devices that have been pre-configured to work with the integrated security system. The gateway will then begin to provide 1306 DHCP addresses for these IP devices. Once the devices have acquired a new DHCP address from the gateway, those devices are available for configuration into a new secured Wifi network setting.

The user or installer of the system selects 1308 all devices that have been identified as available for inclusion into the integrated security system. The user may select these devices by their unique IDs via a web page, Touchscreen, or other client interface. The gateway provides 1310 data as appropriate to the devices. Once selected, the devices are configured 1312 with appropriate secured Wifi settings, including S SID and WPA/WPA-2 keys that are used once the gateway switches back to the secured sandbox configuration from the "Install" settings. Other settings are also configured as appropriate for that type of device. Once all devices have been configured, the user is notified and the user can exit install mode. At this point all devices will have been registered 1314 with the integrated security system servers.

The installer switches 1316 the gateway to an operational mode, and the gateway instructs or directs 1318 all newly configured devices to switch to the "secured" Wifi sandbox settings. The gateway then switches 1320 to the "secured" Wifi settings. Once the devices identify that the gateway is active on the "secured" network, they request new DHCP addresses from the gateway which, in response, provides 1322 the new addresses. The devices with the new addresses are then operational 1324 on the secured network.

In order to ensure the highest level of security on the secured network, the gateway can create or generate a dynamic network security configuration based on the unique ID and private key in the gateway, coupled with a randomizing factor that can be based on online time or other inputs. This guarantees the uniqueness of the gateway secured network configuration.

To enable the highest level of performance, the gateway analyzes the RF spectrum of the 802.11x network and determines which frequency band/channel it should select to run.

An alternative embodiment of the camera/IP device management process leverages the local ethernet connection of the sandbox network on the gateway. This alternative process is similar to the Wifi discovery embodiment described above, except the user connects the targeted device to the ethernet port of the sandbox network to begin the process. This alternative embodiment accommodates devices that have not been pre-configured with the default "Install" configuration for the integrated security system.

This alternative embodiment of the IP device discovery and management begins with the user/installer placing the system into install mode. The user is instructed to attach an IP device to be installed to the sandbox Ethernet port of the gateway. The IP device requests a DHCP address from the gateway which, in response to the request, provides the address. The user is presented the device and is asked if he/she wants to install the device. If yes, the system configures the device with the secured Wifi settings and other device-specific settings (e.g., camera settings for video length, image quality etc.). The user is next instructed to disconnect the device from the ethernet port. The device is now available for use on the secured sandbox network.

Figure 14:
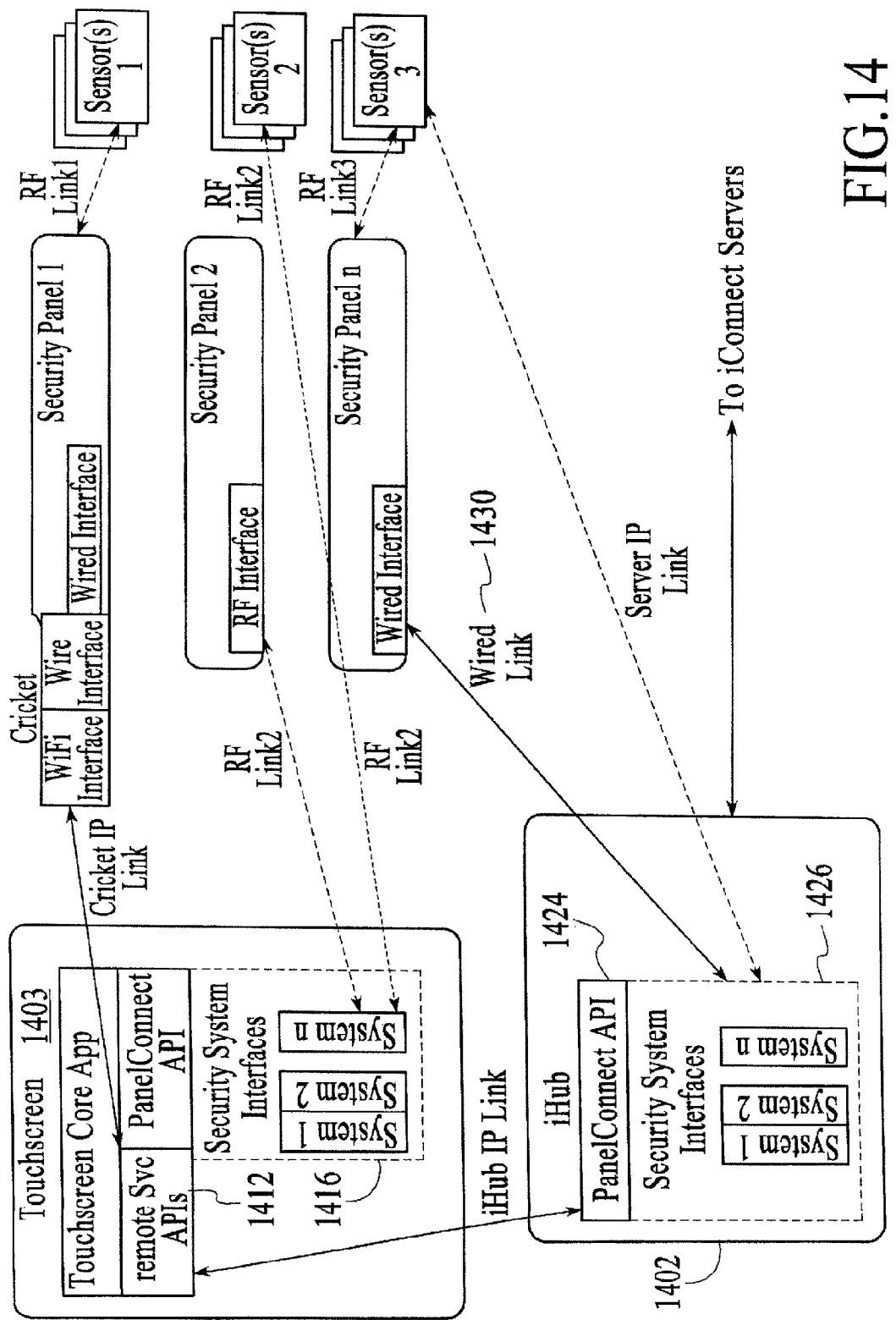
FIG. 14 is a block diagram showing communications among IP devices of the private network environment, under an embodiment.

FIG. 14 is a block diagram showing communications among integrated IP devices of the private network environment, under an embodiment. The IP devices of this example include a security touchscreen 1403, gateway 1402 (e.g., "iHub"), and security panel (e.g., "Security Panel 1", "Security Panel 2", "Security Panel n"), but the embodiment is not so limited. In alternative embodiments any number and/or combination of these three primary component types may be combined with other components including IP devices and/or security system components. For example, a single device that comprises an integrated gateway, touchscreen, and security panel is merely another embodiment of the integrated security system described herein. The description that follows includes an example configuration that includes a touchscreen hosting particular applications. However, the embodiment is not limited to the touchscreen hosting these applications, and the touchscreen should be thought of as representing any IP device.

Referring to FIG. 14, the touchscreen 1403 incorporates an application 1410 that is implemented as computer code resident on the touchscreen operating system, or as a web-based application running in a browser, or as another type of scripted application (e.g., Flash, Java, Visual Basic, etc.). The touchscreen core application 1410 represents this application, providing user interface and logic for the end user to manage their security system or to gain access to networked information or content (Widgets). The touchscreen core application 1410 in turn accesses a library or libraries of functions to control the local hardware (e.g. screen display, sound, LEDs, memory, etc.) as well as specialized librarie(s) to couple or connect to the security system.

In an embodiment of this security system connection, the touchscreen 1403 communicates to the gateway 1402, and has no direct communication with the security panel. In this embodiment, the touchscreen core application 1410 accesses the remote service APIs 1412 which provide security system functionality (e.g. ARM/DISARM panel, sensor state, get/set panel configuration parameters, initiate or get alarm events, etc.). In an embodiment, the remote service APIs 1412 implement one or more of the following functions, but the embodiment is not so limited: Armstate=setARMState (type="ARM STAY|ARM AWAY|DISARM", Parameters="ExitDelay=30|(Lights=OFF"); sensorState=getSensors(type="ALL|SensorName SensorNameList"); result=setSensorState(SensorName, parameters="Option1, Options2, . . . Option n"); interruptHandler=SensorEvent( ); and, interruptHandler=alarmEvent( ).

Functions of the remote service APIs 1412 of an embodiment use a remote PanelConnect API 1424 which which resides in memory on the gateway 1402. The touchscreen 1403 communicates with the gateway 1402 through a suitable network interface such as an Ethernet or 802.11 RF connection, for example. The remote PanelConnect API 1424 provides the underlying Security System Interfaces 1426 used to communicate with and control one or more types of security panel via wired link 1430 and/or RF link 3. The PanelConnect API 1224 provides responses and input to the remote services APIs 1426, and in turn translates function calls and data to and from the specific protocols and functions supported by a specific implementation of a Security Panel (e.g. a GE Security Simon XT or Honeywell Vista 20P). In an embodiment, the PanelConnect API 1224 uses a 345 MHz RF transceiver or receiver hardware/firmware module to communicate wirelessly to the security panel and directly to a set of 345 MHz RF-enabled sensors and devices, but the embodiment is not so limited.

The gateway of an alternative embodiment communicates over a wired physical coupling or connection to the security panel using the panel's specific wired hardware (bus) interface and the panel's bus-level protocol.

In an alternative embodiment, the Touchscreen 1403 implements the same PanelConnect API 1414 locally on the Touchscreen 1403, communicating directly with the Security Panel 2 and/or Sensors 2 over the proprietary RF link or over a wired link for that system. In this embodiment the Touchscreen 1403, instead of the gateway 1402, incorporates the 345 MHz RF transceiver to communicate directly with Security Panel 2 or Sensors 2 over the RF link 2. In the case of a wired link the Touchscreen 1403 incorporates the real-time hardware (e.g. a PIC chip and RS232-variant serial link) to physically connect to and satisfy the specific bus-level timing requirements of the SecurityPanel2.

In yet another alternative embodiment, either the gateway 1402 or the Touchscreen 1403 implements the remote service APIs. This embodiment includes a Cricket device ("Cricket") which comprises but is not limited to the following components: a processor (suitable for handling 802.11 protocols and processing, as well as the bus timing requirements of SecurityPanel1); an 802.11 (WiFi) client IP interface chip; and, a serial bus interface chip that implements variants of RS232 or RS485, depending on the specific Security Panel.

The Cricket also implements the full PanelConnect APIs such that it can perform the same functions as the case where the gateway implements the PanelConnect APIs. In this embodiment, the touchscreen core application 1410 calls functions in the remote service APIs 1412 (such as setArmState( ). These functions in turn couple or connect to the remote Cricket through a standard IP connection ("Cricket IP Link") (e.g., Ethernet, Homeplug, the gateway's proprietary Wifi network, etc.). The Cricket in turn implements the PanelConnect API, which responds to the request from the touchscreen core application, and performs the appropriate function using the proprietary panel interface. This interface uses either the wireless or wired proprietary protocol for the specific security panel and/or sensors.

Figure 15:
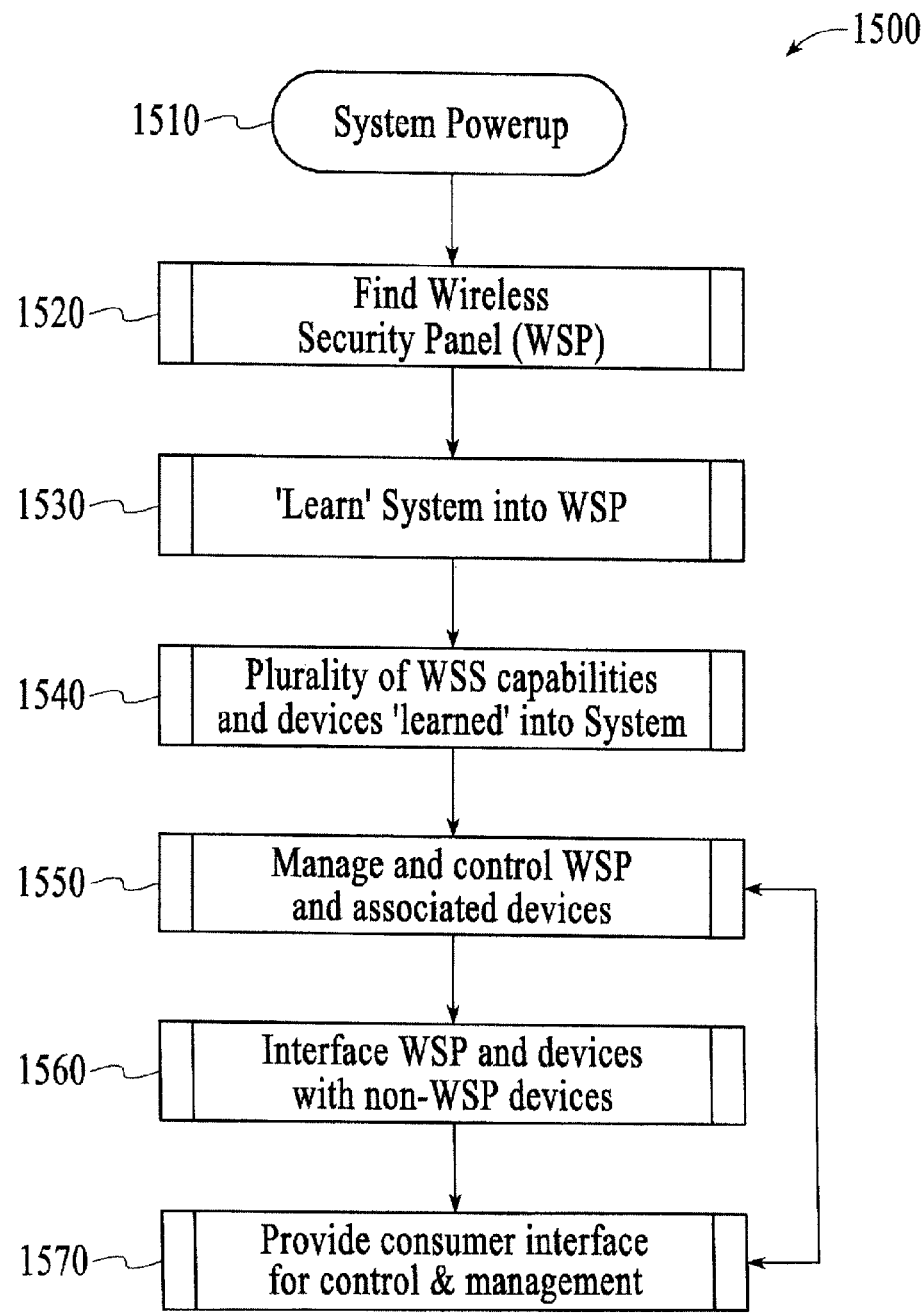
FIG. 15 is a flow diagram of a method of integrating an external control and management application system with an existing security system, under an embodiment.

FIG. 15 is a flow diagram of a method of integrating an external control and management application system with an existing security system, under an embodiment. Operations begin when the system is powered on 1510, involving at a minimum the power-on of the gateway device, and optionally the power-on of the connection between the gateway device and the remote servers. The gateway device initiates 1520 a software and RF sequence to locate the extant security system. The gateway and installer initiate and complete 1530 a sequence to 'learn' the gateway into the security system as a valid and authorized control device. The gateway initiates 1540 another software and RF sequence of instructions to discover and learn the existence and capabilities of existing RF devices within the extant security system, and store this information in the system. These operations under the system of an embodiment are described in further detail below.

Unlike conventional systems that extend an existing security system, the system of an embodiment operates utilizing the proprietary wireless protocols of the security system manufacturer. In one illustrative embodiment, the gateway is an embedded computer with an IP LAN and WAN connection and a plurality of RF transceivers and software protocol modules capable of communicating with a plurality of security systems each with a potentially different RF and software protocol interface. After the gateway has completed the discovery and learning 1540 of sensors and has been integrated 1550 as a virtual control device in the extant security system, the system becomes operational. Thus, the security system and associated sensors are presented 1550 as accessible devices to a potential plurality of user interface subsystems.

The system of an embodiment integrates 1560 the functionality of the extant security system with other non-security devices including but not limited to IP cameras, touchscreens, lighting controls, door locking mechanisms, which may be controlled via RF, wired, or powerline-based networking mechanisms supported by the gateway or servers.

The system of an embodiment provides a user interface subsystem 1570 enabling a user to monitor, manage, and control the system and associated sensors and security systems. In an embodiment of the system, a user interface subsystem is an HTML/WL/Javascript/Java/AJAX/Flash presentation of a monitoring and control application, enabling users to view the state of all sensors and controllers in the extant security system from a web browser or equivalent operating on a computer, PDA, mobile phone, or other consumer device.

In another illustrative embodiment of the system described herein, a user interface subsystem is an HTML/XML/Javascript/Java/AJAX presentation of a monitoring and control application, enabling users to combine the monitoring and control of the extant security system and sensors with the monitoring and control of non-security devices including but not limited to IP cameras, touchscreens, lighting controls, door locking mechanisms.

In another illustrative embodiment of the system described herein, a user interface subsystem is a mobile phone application enabling users to monitor and control the extant security system as well as other non-security devices.

In another illustrative embodiment of the system described herein, a user interface subsystem is an application running on a keypad or touchscreen device enabling users to monitor and control the extant security system as well as other non-security devices.

In another illustrative embodiment of the system described herein, a user interface subsystem is an application operating on a TV or set-top box connected to a TV enabling users to monitor and control the extant security system as well as other non-security devices.

Figure 16:
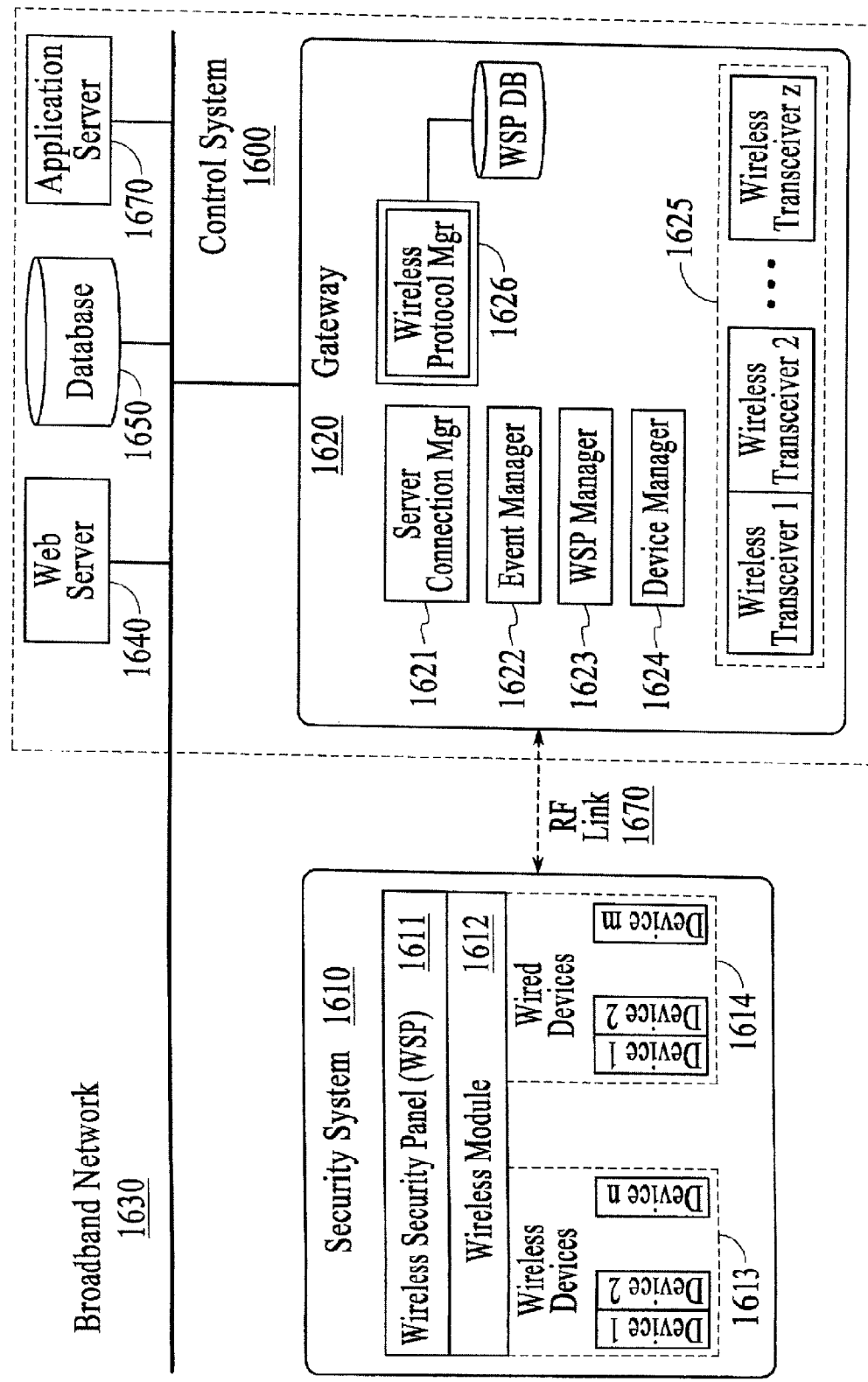
FIG. 16 is a block diagram of an integrated security system wirelessly interfacing to proprietary security systems, under an embodiment.

FIG. 16 is a block diagram of an integrated security system 1600 wirelessly interfacing to proprietary security systems, under an embodiment. A security system 1610 is coupled or connected to a Gateway 1620, and from Gateway 1620 coupled or connected to a plurality of information and content sources across a network 1630 including one or more web servers 1640, system databases 1650, and applications servers 1660. While in one embodiment network 1630 is the Internet, including the World Wide Web, those of skill in the art will appreciate that network 1630 may be any type of network, such as an intranet, an extranet, a virtual private network (VPN), a mobile network, or a non-TCP/IP based network.

Moreover, other elements of the system of an embodiment may be conventional, well-known elements that need not be explained in detail herein. For example, security system 1610 could be any type home or business security system, such devices including but not limited to a standalone RF home security system or a non-RF-capable wired home security system with an add-on RF interface module. In the integrated security system 1600 of this example, security system 1610 includes an RF-capable wireless security panel (WSP) 1611 that acts as the master controller for security system 1610. Well-known examples of such a WSP include the GE Security Concord, Networx, and Simon panels, the Honeywell Vista and Lynx panels, and similar panesl from DSC and Napco, to name a few. A wireless module 1614 includes the RF hardware and protocol software necessary to enable communication with and control of a plurality of wireless devices 1613. WSP 1611 may also manage wired devices 1614 physically connected to WSP 1611 with an RS232 or RS485 or Ethernet connection or similar such wired interface.

In an implementation consistent with the systems and methods described herein, Gateway 1620 provides the interface between security system 1610 and LAN and/or WAN for purposes of remote control, monitoring, and management. Gateway 1620 communicates with an external web server 1640, database 1650, and application server 1660 over network 1630 (which may comprise WAN, LAN, or a combination thereof). In this example system, application logic, remote user interface functionality, as well as user state and account are managed by the combination of these remote servers. Gateway 1620 includes server connection manager 1621, a software interface module responsible for all server communication over network 1630. Event manager 1622 implements the main event loop for Gateway 1620, processing events received from device manager 1624 (communicating with non-security system devices including but not limited to IP cameras, wireless thermostats, or remote door locks). Event manager 1622 further processes events and control messages from and to security system 1610 by utilizing WSP manager 1623.

WSP manager 1623 and device manager 1624 both rely upon wireless protocol manager 1626 which receives and stores the proprietary or standards-based protocols required to support security system 1610 as well as any other devices interfacing with gateway 1620. WSP manager 1623 further utilizes the comprehensive protocols and interface algorithms for a plurality of security systems 1610 stored in the WSP DB client database associated with wireless protocol manager 1626. These various components implement the software logic and protocols necessary to communicate with and manager devices and security systems 1610. Wireless Transceiver hardware modules 1625 are then used to implement the physical RF communications link to such devices and security systems 1610. An illustrative wireless transceiver 1625 is the GE Security Dialog circuit board, implementing a 319.5 MHz two-way RF transceiver module. In this example, RF Link 1670 represents the 319.5 MHz RF communication link, enabling gateway 1620 to monitor and control WSP 1611 and associated wireless and wired devices 1613 and 1614, respectively.

In one embodiment, server connection manager 1621 requests and receives a set of wireless protocols for a specific security system 1610 (an illustrative example being that of the GE Security Concord panel and sensors) and stores them in the WSP DB portion of the wireless protocol manager 1626. WSP manager 1623 then utilizes such protocols from wireless protocol manager 1626 to initiate the sequence of processes detailed in FIG. 15 and FIG. 16 for learning gateway 1620 into security system 1610 as an authorized control device. Once learned in, as described with reference to FIG. 16 (and above), event manager 1622 processes all events and messages detected by the combination of WSP manager 1623 and the GE Security wireless transceiver module 1625.

In another embodiment, gateway 1620 incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614. For example a wireless sensor from one manufacturer may be utilized to control a device using a different protocol from a different manufacturer.

In another embodiment, gateway 1620 incorporates a wired interface to security system 1610, and incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614.

Of course, while an illustrative embodiment of an architecture of the system of an embodiment is described in detail herein with respect to FIG. 16, one of skill in the art will understand that modifications to this architecture may be made without departing from the scope of the description presented herein. For example, the functionality described herein may be allocated differently between client and server, or amongst different server or processor-based components. Likewise, the entire functionality of the gateway 1620 described herein could be integrated completely within an existing security system 1610. In such an embodiment, the architecture could be directly integrated with a security system 1610 in a manner consistent with the currently described embodiments.

Figure 17:
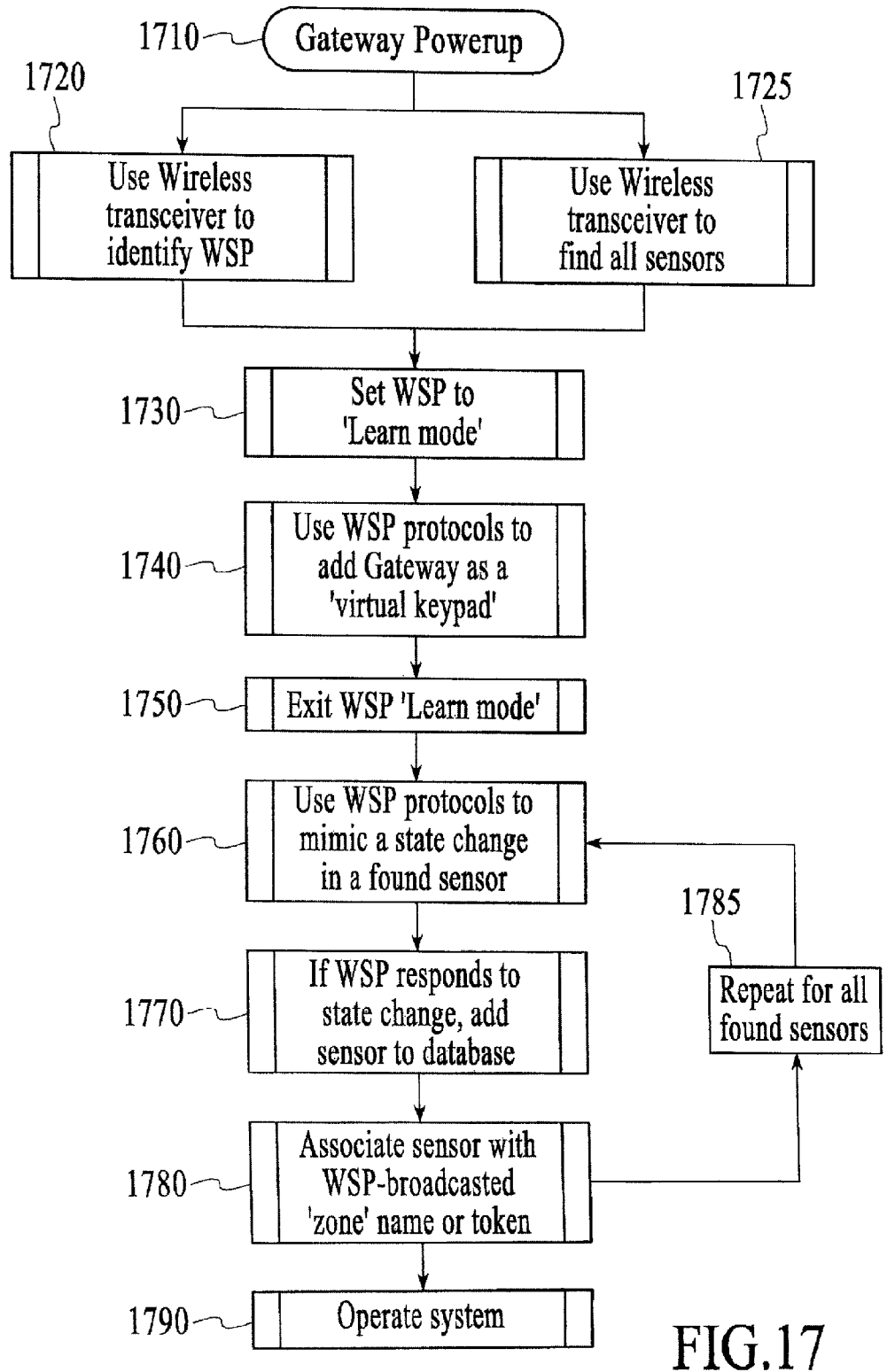
FIG. 17 is a flow diagram for wirelessly 'learning' the gateway into an existing security system and discovering extant sensors, under an embodiment.

FIG. 17 is a flow diagram for wirelessly 'learning' the Gateway into an existing security system and discovering extant sensors, under an embodiment. The learning interfaces gateway 1620 with security system 1610. Gateway 1620 powers up 1710 and initiates software sequences 1720 and 1725 to identify accessible WSPs 1611 and wireless devices 1613, respectively (e.g., one or more WSPs and/or devices within range of gateway 1620). Once identified, WSP 1611 is manually or automatically set into 'learn mode' 1730, and gateway 1620 utilizes available protocols to add 1740 itself as an authorized control device in security system 1610. Upon successful completion of this task, WSP 1611 is manually or automatically removed from 'learn mode' 1750.

Gateway 1620 utilizes the appropriate protocols to mimic 1760 the first identified device 1614. In this operation gateway 1620 identifies itself using the unique or pseudo-unique identifier of the first found device 1614, and sends an appropriate change of state message over RF Link 1670. In the event that WSP 1611 responds to this change of state message, the device 1614 is then added 1770 to the system in database 1650. Gateway 1620 associates 1780 any other information (such as zone name or token-based identifier) with this device 1614 in database 1650, enabling gateway 1620, user interface modules, or any application to retrieve this associated information.

In the event that WSP 1611 does not respond to the change of state message, the device 1614 is not added 1770 to the system in database 1650, and this device 1614 is identified as not being a part of security system 1610 with a flag, and is either ignored or added as an independent device, at the discretion of the system provisioning rules. Operations hereunder repeat 1785 operations 1760, 1770, 1780 for all devices 1614 if applicable. Once all devices 1614 have been tested in this way, the system begins operation 1790.

In another embodiment, gateway 1620 utilizes a wired connection to WSP 1611, but also incorporates a wireless transceiver 1625 to communicate directly with devices 1614. In this embodiment, operations under 1720 above are removed, and operations under 1740 above are modified so the system of this embodiment utilizes wireline protocols to add itself as an authorized control device in security system 1610.

A description of an example embodiment follows in which the Gateway (FIG. 16, element 1620) is the iHub available from iControl Networks, Palo Alto, Calif., and described in detail herein. In this example the gateway is "automatically" installed with a security system.

The automatic security system installation begins with the assignment of an authorization key to components of the security system (e.g., gateway, kit including the gateway, etc.). The assignment of an authorization key is done in lieu of creating a user account. An installer later places the gateway in a user's premises along with the premises security system. The installer uses a computer to navigate to a web portal (e.g., integrated security system web interface), logs in to the portal, and enters the authorization key of the installed gateway into the web portal for authentication. Once authenticated, the gateway automatically discovers devices at the premises (e.g., sensors, cameras, light controls, etc.) and adds the discovered devices to the system or "network". The installer assigns names to the devices, and tests operation of the devices back to the server (e.g., did the door open, did the camera take a picture, etc.). The security device information is optionally pushed or otherwise propagated to a security panel and/or to the server network database. The installer finishes the installation, and instructs the end user on how to create an account, username, and password. At this time the user enters the authorization key which validates the account creation (uses a valid authorization key to associate the network with the user's account).

New devices may subsequently be added to the security network in a variety of ways (e.g., user first enters a unique ID for each device/sensor and names it in the server, after which the gateway can automatically discover and configure the device).

A description of another example embodiment follows in which the security system (FIG. 16, element 1610) is a Dialog system and the WSP (FIG. 16, element 1611) is a SimonXT available from General Electric Security, and the Gateway (FIG. 16, element 1620) is the iHub available from iControl Networks, Palo Alto, Calif., and described in detail herein. Descriptions of the install process for the SimonXT and iHub are also provided below.

GE Security's Dialog network is one of the most widely deployed and tested wireless security systems in the world. The physical RF network is based on a 319.5 MHz unlicensed spectrum, with a bandwidth supporting up to 19 Kbps communications. Typical use of this bandwidth—even in conjunction with the integrated security system—is far less than that. Devices on this network can support either one-way communication (either a transmitter or a receiver) or two-way communication (a transceiver). Certain GE Simon, Simon XT, and Concord security control panels incorporate a two-way transceiver as a standard component. The gateway also incorporates the same two-way transceiver card. The physical link layer of the network is managed by the transceiver module hardware and firmware, while the coded payload bitstreams are made available to the application layer for processing.

Sensors in the Dialog network typically use a 60-bit protocol for communicating with the security panel transceiver, while security system keypads and the gateway use the encrypted 80-bit protocol. The Dialog network is configured for reliability, as well as low-power usage. Many devices are supervised, i.e. they are regularly monitored by the system 'master' (typically a GE security panel), while still maintaining excellent power usage characteristics. A typical door window sensor has a battery life in excess of 5-7 years.

The gateway has two modes of operation in the Dialog network: a first mode of operation is when the gateway is configured or operates as a 'slave' to the GE security panel; a second mode of operation is when the gateway is configured or operates as a 'master' to the system in the event a security panel is not present. In both configurations, the gateway has the ability to 'listen' to network traffic, enabling the gateway to continually keep track of the status of all devices in the system. Similarly, in both situations the gateway can address and control devices that support setting adjustments (such as the GE wireless thermostat).

In the configuration in which the gateway acts as a 'slave' to the security panel, the gateway is 'learned into' the system as a GE wireless keypad. In this mode of operation, the gateway emulates a security system keypad when managing the security panel, and can query the security panel for status and 'listen' to security panel events (such as alarm events).

The gateway incorporates an RF Transceiver manufactured by GE Security, but is not so limited. This transceiver implements the Dialog protocols and handles all network message transmissions, receptions, and timing. As such, the physical, link, and protocol layers of the communications between the gateway and any GE device in the Dialog network are totally compliant with GE Security specifications.

At the application level, the gateway emulates the behavior of a GE wireless keypad utilizing the GE Security 80-bit encrypted protocol, and only supported protocols and network traffic are generated by the gateway. Extensions to the Dialog RF protocol of an embodiment enable full control and configuration of the panel, and iControl can both automate installation and sensor enrollment as well as direct configuration downloads for the panel under these protocol extensions.

As described above, the gateway participates in the GE Security network at the customer premises. Because the gateway has intelligence and a two-way transceiver, it can 'hear' all of the traffic on that network. The gateway makes use of the periodic sensor updates, state changes, and supervisory signals of the network to maintain a current state of the premises. This data is relayed to the integrated security system server (e.g., FIG. 2, element 260) and stored in the event repository for use by other server components. This usage of the GE Security RF network is completely non-invasive; there is no new data traffic created to support this activity.

The gateway can directly (or indirectly through the Simon XT panel) control two-way devices on the network. For example, the gateway can direct a GE Security Thermostat to change its setting to 'Cool' from 'Off', as well as request an update on the current temperature of the room. The gateway performs these functions using the existing GE Dialog protocols, with little to no impact on the network; a gateway device control or data request takes only a few dozen bytes of data in a network that can support 19 Kbps.

By enrolling with the Simon XT as a wireless keypad, as described herein, the gateway includes data or information of all alarm events, as well as state changes relevant to the security panel. This information is transferred to the gateway as encrypted packets in the same way that the information is transferred to all other wireless keypads on the network.

Because of its status as an authorized keypad, the gateway can also initiate the same panel commands that a keypad can initiate. For example, the gateway can arm or disarm the panel using the standard Dialog protocol for this activity. Other than the monitoring of standard alarm events like other network keypads, the only incremental data traffic on the network as a result of the gateway is the infrequent remote arm/disarm events that the gateway initiates, or infrequent queries on the state of the panel.

The gateway is enrolled into the Simon XT panel as a 'slave' device which, in an embodiment, is a wireless keypad. This enables the gateway for all necessary functionality for operating the Simon XT system remotely, as well as combining the actions and information of non-security devices such as lighting or door locks with GE Security devices. The only resource taken up by the gateway in this scenario is one wireless zone (sensor ID).

The gateway of an embodiment supports three forms of sensor and panel enrollment/installation into the integrated security system, but is not limited to this number of enrollment/installation options. The enrollment/installation options of an embodiment include installer installation, kitting, and panel, each of which is described below.

Under the installer option, the installer enters the sensor IDs at time of installation into the integrated security system web portal or iScreen. This technique is supported in all configurations and installations.

Kits can be pre-provisioned using integrated security system provisioning applications when using the kitting option. At kitting time, multiple sensors are automatically associated with an account, and at install time there is no additional work required.

In the case where a panel is installed with sensors already enrolled (i.e. using the GE Simon XT enrollment process), the gateway has the capability to automatically extract the sensor information from the system and incorporate it into the user account on the integrated security system server.

The gateway and integrated security system of an embodiment uses an auto-learn process for sensor and panel enrollment in an embodiment. The deployment approach of an embodiment can use additional interfaces that GE Security is adding to the Simon XT panel. With these interfaces, the gateway has the capability to remotely enroll sensors in the panel automatically. The interfaces include, but are not limited to, the following: EnrollDevice(ID, type, name, zone, group); SetDeviceParameters(ID, type, Name, zone, group), GetDeviceParameters(zone); and RemoveDevice (zone).

The integrated security system incorporates these new interfaces into the system, providing the following install process. The install process can include integrated security system logistics to handle kitting and pre-provisioning. Pre-kitting and logistics can include a pre-provisioning kitting tool provided by integrated security system that enables a security system vendor or provider ("provider") to offer pre-packaged initial 'kits'. This is not required but is recommended for simplifying the install process. This example assumes a 'Basic' kit is preassembled and includes one (1) Simon XT, three (3) Door/window sensors, one (1) motion sensor, one (1) gateway, one (1) keyfob, two (2) cameras, and ethernet cables. The kit also includes a sticker page with all Zones (1-24) and Names (full name list).

The provider uses the integrated security system kitting tool to assemble 'Basic' kit packages. The contents of different types of starter kits may be defined by the provider. At the distribution warehouse, a worker uses a bar code scanner to scan each sensor and the gateway as it is packed into the box. An ID label is created that is attached to the box. The scanning process automatically associates all the devices with one kit, and the new ID label is the unique identifier of the kit. These boxes are then sent to the provider for distribution to installer warehouses. Individual sensors, cameras, etc. are also sent to the provider installer warehouse. Each is labeled with its own barcode/ID.

An installation and enrollment procedure of a security system including a gateway is described below as one example of the installation process.

1. Order and Physical Install Process
   a. Once an order is generated in the iControl system, an account is created and an install ticket is created and sent electronically to the provider for assignment to an installer.
   b. The assigned installer picks up his/her ticket(s) and fills his/her truck with Basic and/or Advanced starter kits. He/she also keeps a stock of individual sensors, cameras, iHubs, Simon XTs, etc. Optionally, the installer can also stock homeplug adapters for problematic installations.
   c. The installer arrives at the address on the ticket, and pulls out the Basic kit. The installer determines sensor locations from a tour of the premises and discussion with the homeowner. At this point assume the homeowner requests additional equipment including an extra camera, two (2) additional door/window sensors, one (1) glass break detector, and one (1) smoke detector.
   d. Installer mounts SimonXT in the kitchen or other location in the home as directed by the homeowner, and routes the phone line to Simon XT if available. GPRS and Phone numbers pre-programmed in SimonXT to point to the provider Central Monitoring Station (CMS).

e. Installer places gateway in the home in the vicinity of a router and cable modem. Installer installs an ethernet line from gateway to router and plugs gateway into an electrical outlet.

2. Associate and Enroll gateway into SimonXT
   a. Installer uses either his/her own laptop plugged into router, or homeowners computer to go to the integrated security system web interface and log in with installer ID/pass.
   b. Installer enters ticket number into admin interface, and clicks 'New Install' button. Screen prompts installer for kit ID (on box's barcode label).
   c. Installer clicks 'Add SimonXT'. Instructions prompt installer to put Simon XT into install mode, and add gateway as a wireless keypad. It is noted that this step is for security only and can be automated in an embodiment.
   d. Installer enters the installer code into the Simon XT. Installer Learns 'gateway' into the panel as a wireless keypad as a group 1 device.
   e. Installer goes back to Web portal, and clicks the 'Finished Adding SimonXT' button.

3. Enroll Sensors into SimonXT Via iControl
   a. All devices in the Basic kit are already associated with the user's account.
   b. For additional devices, Installer clicks 'Add Device' and adds the additional camera to the user's account (by typing in the camera ID/Serial #).
   c. Installer clicks 'Add Device' and adds other sensors (two (2) door/window sensors, one (1) glass break sensor, and one (1) smoke sensor) to the account (e.g., by typing in IDs).
   d. As part of Add Device, Installer assigns zone, name, and group to the sensor. Installer puts appropriate Zone and Name sticker on the sensor temporarily.
   e. All sensor information for the account is pushed or otherwise propagated to the iConnect server, and is available to propagate to CMS automation software through the CMS application programming interface (API).
   f. Web interface displays 'Installing Sensors in System . . . ' and automatically adds all of the sensors to the Simon XT panel through the GE RF link.
   g. Web interface displays 'Done Installing'→all sensors show green.

4. Place and Tests Sensors in Home
   a. Installer physically mounts each sensor in its desired location, and removes the stickers.
   b. Installer physically mounts WiFi cameras in their location and plugs into AC power. Optional fishing of low voltage wire through wall to remove dangling wires. Camera transformer is still plugged into outlet but wire is now inside the wall.
   c. Installer goes to Web interface and is prompted for automatic camera install. Each camera is provisioned as a private, encrypted Wifi device on the gateway secured sandbox network, and firewall NAT traversal is initiated. Upon completion the customer is prompted to test the security system.
   d. Installer selects the 'Test System' button on the web portal—the SimonXT is put into Test mode by the gateway over GE RF.
   e. Installer manually tests the operation of each sensor, receiving an audible confirmation from SimonXT.
   f. gateway sends test data directly to CMS over broadband link, as well as storing the test data in the user's account for subsequent report generation.
   g. Installer exits test mode from the Web portal.

5. Installer instructs customer on use of the Simon XT, and shows customer how to log into the iControl web and mobile portals. Customer creates a username/password at this time.

6. Installer instructs customer how to change Simon XT user code from the Web interface. Customer changes user code which is pushed to SimonXT automatically over GE RF.

An installation and enrollment procedure of a security system including a gateway is described below as an alternative example of the installation process. This installation process is for use for enrolling sensors into the SimonXT and integrated security system and is compatible with all existing GE Simon panels.

The integrated security system supports all pre-kitting functionality described in the installation process above. However, for the purpose of the following example, no kitting is used.

1. Order and Physical Install Process
   a. Once an order is generated in the iControl system, an account is created and an install ticket is created and sent electronically to the security system provider for assignment to an installer.
   b. The assigned installer picks up his/her ticket(s) and fills his/her truck with individual sensors, cameras, iHubs, Simon XTs, etc. Optionally, the installer can also stock homeplug adapters for problematic installations.
   c. The installer arrives at the address on the ticket, and analyzes the house and talks with the homeowner to determine sensor locations. At this point assume the homeowner requests three (3) cameras, five (5) door/window sensors, one (1) glass break detector, one (1) smoke detector, and one (1) keyfob.
   d. Installer mounts SimonXT in the kitchen or other location in the home. The installer routes a phone line to Simon XT if available. GPRS and Phone numbers are pre-programmed in SimonXT to point to the provider CMS.
   e. Installer places gateway in home in the vicinity of a router and cable modem, and installs an ethernet line from gateway to the router, and plugs gateway into an electrical outlet.

2. Associate and Enroll gateway into SimonXT
   a. Installer uses either his/her own laptop plugged into router, or homeowners computer to go to the integrated security system web interface and log in with an installer ID/pass.
   b. Installer enters ticket number into admin interface, and clicks 'New Install' button. Screen prompts installer to add devices.
   c. Installer types in ID of gateway, and it is associated with the user's account.
   d. Installer clicks 'Add Device' and adds the cameras to the user's account (by typing in the camera ID/Serial #).
   e. Installer clicks 'Add SimonXT'. Instructions prompt installer to put Simon XT into install mode, and add gateway as a wireless keypad.
   f. Installer goes to Simon XT and enters the installer code into the Simon XT. Learns 'gateway' into the panel as a wireless keypad as group 1 type sensor.
   g. Installer returns to Web portal, and clicks the 'Finished Adding SimonXT' button.
   h. Gateway now is alerted to all subsequent installs over the security system RF.

3. Enroll Sensors into SimonXT via iControl
   a. Installer clicks 'Add Simon XT Sensors'—Displays instructions for adding sensors to Simon XT.
   b. Installer goes to Simon XT and uses Simon XT install process to add each sensor, assigning zone, name, group. These assignments are recorded for later use.
   c. The gateway automatically detects each sensor addition and adds the new sensor to the integrated security system.
   d. Installer exits install mode on the Simon XT, and returns to the Web portal.
   e. Installer clicks 'Done Adding Devices'.
   f. Installer enters zone/sensor naming from recorded notes into integrated security system to associate sensors to friendly names.
   g. All sensor information for the account is pushed to the iConnect server, and is available to propagate to CMS automation software through the CMS API.
4. Place and Tests Sensors in Home
   a. Installer physically mounts each sensor in its desired location.
   b. Installer physically mounts Wifi cameras in their location and plugs into AC power. Optional fishing of low voltage wire through wall to remove dangling wires. Camera transformer is still plugged into outlet but wire is now inside the wall.
   c. Installer puts SimonXT into Test mode from the keypad.
   d. Installer manually tests the operation of each sensor, receiving an audible confirmation from SimonXT.
   e. Installer exits test mode from the Simon XT keypad.
   f. Installer returns to web interface and is prompted to automatically set up cameras.

After waiting for completion cameras are now provisioned and operational.

5. Installer instructs customer on use of the Simon XT, and shows customer how to log into the integrated security system web and mobile portals. Customer creates a username/password at this time.
6. Customer and Installer observe that all sensors/cameras are green.
7. Installer instructs customer how to change Simon XT user code from the keypad. Customer changes user code and stores in SimonXT.
8. The first time the customer uses the web portal to Arm/Disarm system the web interface prompts the customer for the user code, which is then stored securely on the server. In the event the user code is changed on the panel the web interface once again prompts the customer.

The panel of an embodiment can be programmed remotely. The CMS pushes new programming to SimonXT over a telephone or GPRS link. Optionally, iControl and GE provide a broadband link or coupling to the gateway and then a link from the gateway to the Simon XT over GE RF.

In addition to the configurations described above, the gateway of an embodiment supports takeover configurations in which it is introduced or added into a legacy security system. A description of example takeover configurations follow in which the security system (FIG. 2, element 210) is a Dialog system and the WSP (FIG. 2, element 211) is a GE Concord panel (e.g., equipped with POTS, GE RF, and Superbus 2000 RS485 interface (in the case of a Lynx takeover the Simon XT is used) available from General Electric Security. The gateway (FIG. 2, element 220) in the takeover configurations is an iHub (e.g., equipped with built-in 802.11b/g router, Ethernet Hub, GSM/GPRS card, RS485 interface, and iControl Honeywell-compatible RF card) available from iControl Networks, Palo Alto, Calif. While components of particular manufacturers are used in this example, the embodiments are not limited to these components or to components from these vendors.

The security system can optionally include RF wireless sensors (e.g., GE wireless sensors utilizing the GE Dialog RF technology), IP cameras, a GE-iControl Touchscreen (the touchscreen is assumed to be an optional component in the configurations described herein, and is thus treated separately from the iHub; in systems in which the touchscreen is a component of the base security package, the integrated iScreen (available from iControl Networks, Palo Alto, Calif.) can be used to combine iHub technology with the touchscreen in a single unit), and Z-Wave devices to name a few.

The takeover configurations described below assume takeover by a "new" system of an embodiment of a security system provided by another third party vendor, referred to herein as an "original" or "legacy" system. Generally, the takeover begins with removal of the control panel and keypad of the legacy system. A GE Concord panel is installed to replace the control panel of the legacy system along with an iHub with GPRS Modem. The legacy system sensors are then connected or wired to the Concord panel, and a GE keypad or touchscreen is installed to replace the control panel of the legacy system. The iHub includes the iControl RF card, which is compatible with the legacy system. The iHub finds and manages the wireless sensors of the legacy system, and learns the sensors into the Concord by emulating the corresponding GE sensors. The iHub effectively acts as a relay for legacy wireless sensors.

Once takeover is complete, the new security system provides a homogeneous system that removes the compromises inherent in taking over or replacing a legacy system. For example, the new system provides a modern touchscreen that may include additional functionality, new services, and supports integration of sensors from various manufacturers. Furthermore, lower support costs can be realized because call centers, installers, etc. are only required to support one architecture. Additionally, there is minimal install cost because only the panel is required to be replaced as a result of the configuration flexibility offered by the iHub.

The system takeover configurations described below include but are not limited to a dedicated wireless configuration, a dedicated wireless configuration that includes a touchscreen, and a fished Ethernet configuration. Each of these configurations is described in detail below.

Figure 18:
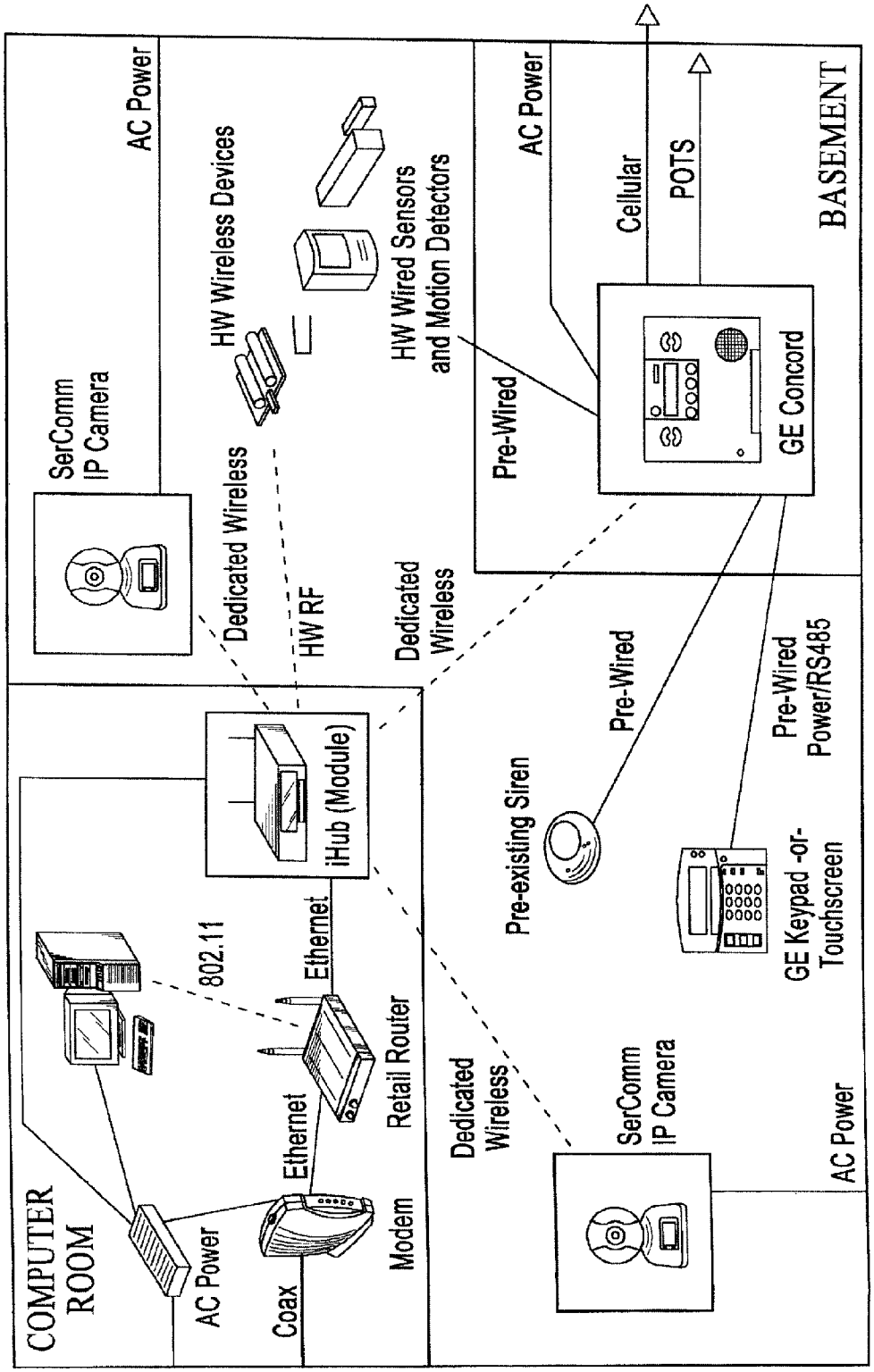
FIG. 18 is a block diagram of a security system in which the legacy panel is replaced with a wireless security panel wirelessly coupled to a gateway, under an embodiment.

FIG. 18 is a block diagram of a security system in which the legacy panel is replaced with a GE Concord panel wirelessly coupled to an iHub, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

Figure 19:
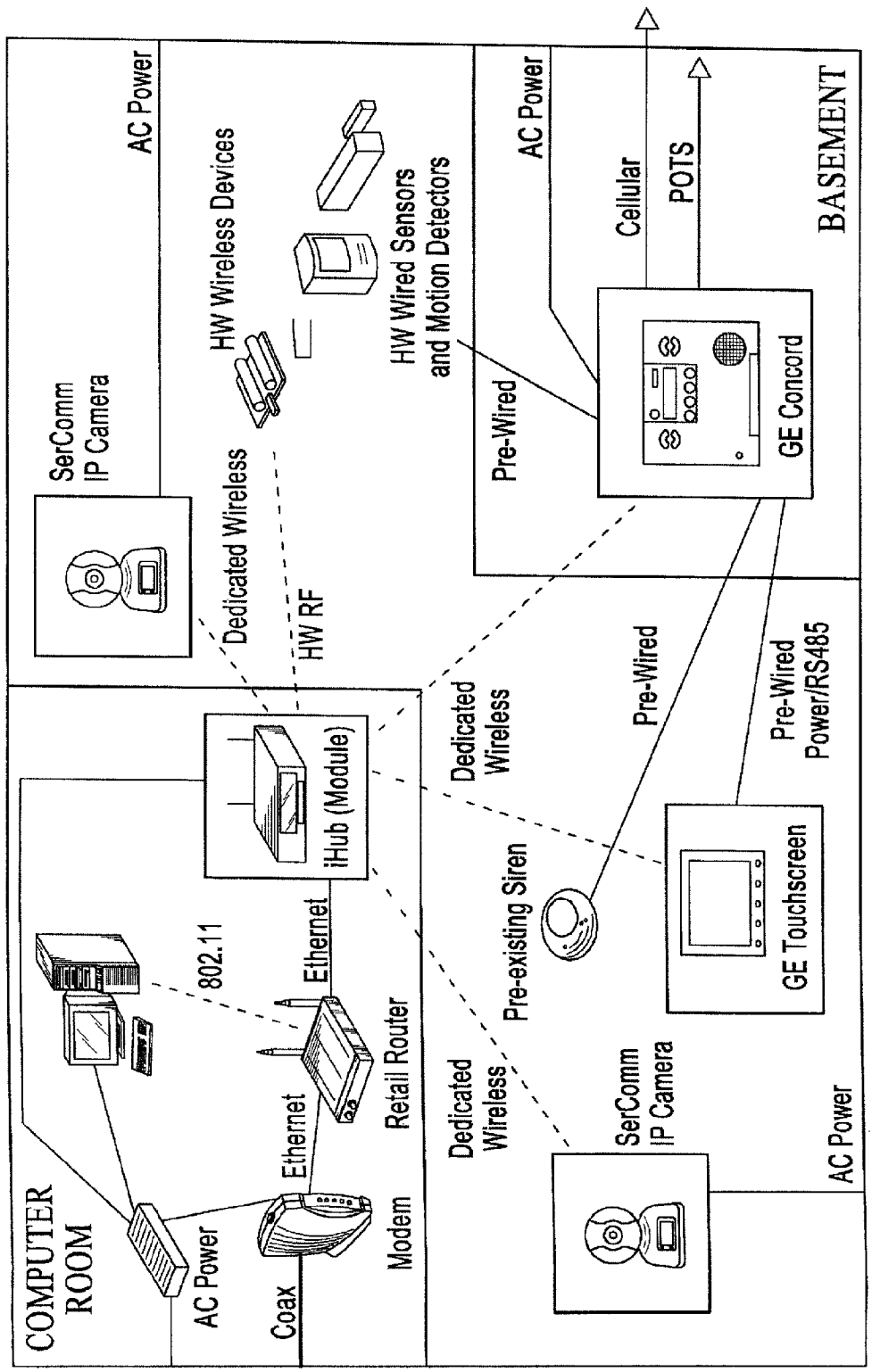
FIG. 19 is a block diagram of a security system in which the legacy panel is replaced with a wireless security panel wirelessly coupled to a gateway, and a touchscreen, under an alternative embodiment.

FIG. 19 is a block diagram of a security system in which the legacy panel is replaced with a GE Concord panel wirelessly coupled to an iHub, and a GE-iControl Touchscreen, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The GE-iControl Touchscreen can be used with either of an 802.11 connection or Ethernet connection with the iHub. Because the takeover involves a GE Concord panel (or Simon XT), the touchscreen is always an option. No extra wiring is required for the touchscreen as it can use the 4-wire set from the replaced keypad of the legacy system. This provides power, battery backup (through Concord), and data link (RS485 Superbus 2000) between Concord and touchscreen. The touchscreen receives its broadband connectivity through the dedicated 802.11 link to the iHub.

Figure 20:
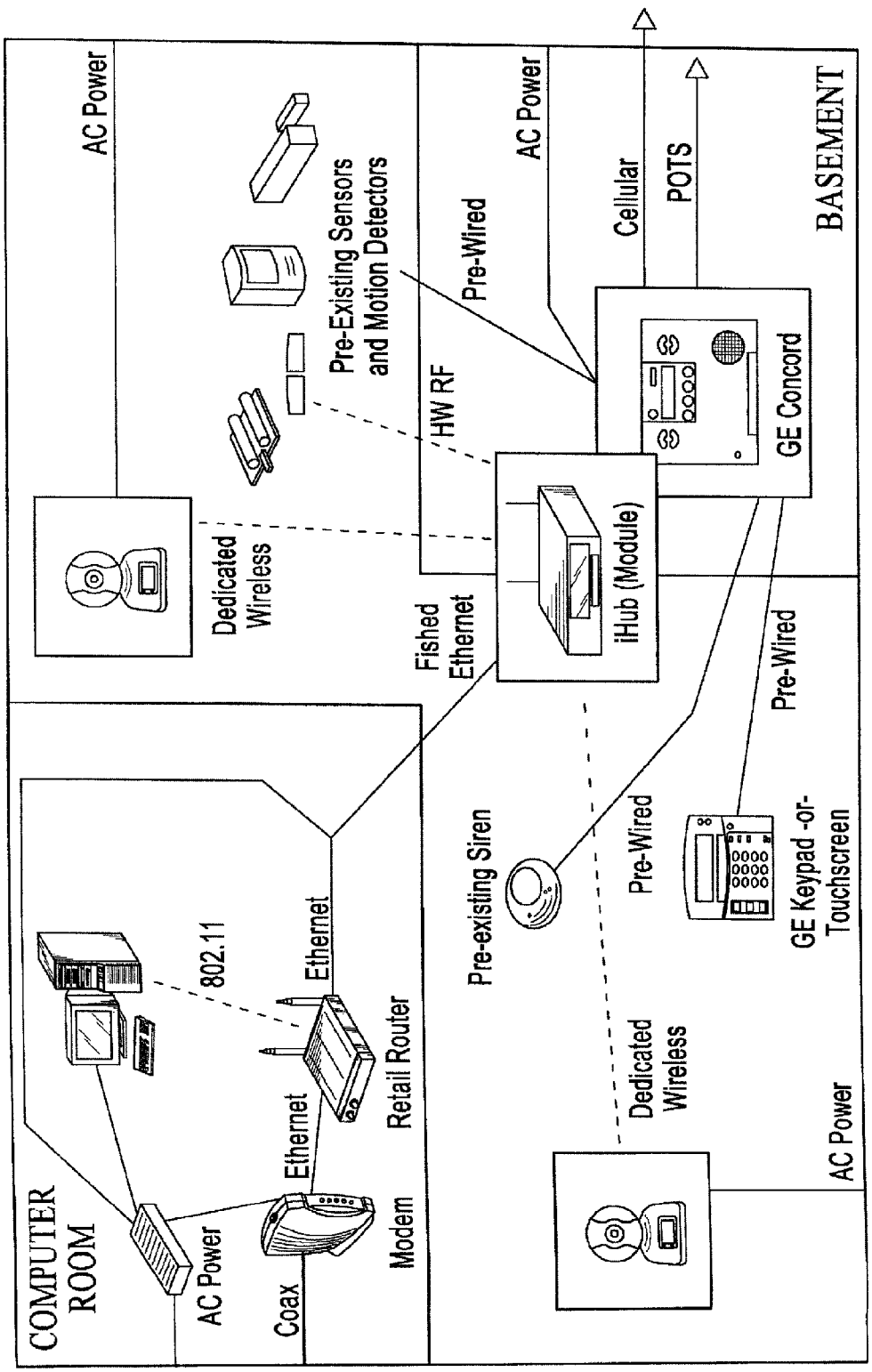
FIG. 20 is a block diagram of a security system in which the legacy panel is replaced with a wireless security panel connected to a gateway via an Ethernet coupling, under another alternative embodiment.

FIG. 20 is a block diagram of a security system in which the legacy panel is replaced with a GE Concord panel connected to an iHub via an Ethernet coupling, under an embodiment. All existing wired and RF sensors remain in place. The iHub is located near the Concord panel, and wired to the panel using a 4-wire SUperbus 2000 (RS485) interface, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The takeover installation process is similar to the installation process described above, except the control panel of the legacy system is replaced; therefore, only the differences with the installation described above are provided here. The takeover approach of an embodiment uses the existing RS485 control interfaces that GE Security and iControl support with the iHub, touchscreen, and Concord panel. With these interfaces, the iHub is capable of automatically enrolling sensors in the panel. The exception is the leverage of an iControl RF card compatible with legacy systems to 'takeover' existing RF sensors. A description of the takeover installation process follows.

During the installation process, the iHub uses an RF Takeover Card to automatically extract all sensor IDs, zones, and names from the legacy panel. The installer removes connections at the legacy panel from hardwired wired sensors and labels each with the zone. The installer pulls the legacy panel and replaces it with the GE Concord panel. The installer also pulls the existing legacy keypad and replaces it with either a GE keypad or a GE-iControl touchscreen. The installer connects legacy hardwired sensors to appropriate wired zone (from labels) on the Concord. The installer connects the iHub to the local network and connects the iHub RS485 interface to the Concord panel. The iHub automatically 'enrolls' legacy RF sensors into the Concord panel as GE sensors (maps IDs), and pushes or otherwise propagates other information gathered from HW panel (zone, name, group). The installer performs a test of all sensors back to CMS. In operation, the iHub relays legacy sensor data to the Concord panel, emulating equivalent GE sensor behavior and protocols.

The areas of the installation process particular to the legacy takeover include how the iHub extracts sensor info from the legacy panel and how the iHub automatically enrolls legacy RF sensors and populates Concord with wired zone information. Each of these areas is described below.

In having the iHub extract sensor information from the legacy panel, the installer 'enrolls' iHub into the legacy panel as a wireless keypad (use install code and house ID—available from panel). The iHub legacy RF Takeover Card is a compatible legacy RF transceiver. The installer uses the web portal to place iHub into 'Takeover Mode', and the web portal the automatically instructs the iHub to begin extraction. The iHub queries the panel over the RF link (to get all zone information for all sensors, wired and RF). The iHub then stores the legacy sensor information received during the queries on the iConnect server.

The iHub also automatically enrolls legacy RF sensors and populates Concord with wired zone information. In so doing, the installer selects 'Enroll legacy Sensors into Concord' (next step in 'Takeover' process on web portal). The iHub automatically queries the iConnect server, and downloads legacy sensor information previously extracted. The downloaded information includes an ID mapping from legacy ID to 'spoofed' GE ID. This mapping is stored on the server as part of the sensor information (e.g., the iConnect server knows that the sensor is a legacy sensor acting in GE mode). The iHub instructs Concord to go into install mode, and sends appropriate Superbus 2000 commands for sensor learning to the panel. For each sensor, the 'spoofed' GE ID is loaded, and zone, name, and group are set based on information extracted from legacy panel. Upon completion, the iHub notifies the server, and the web portal is updated to reflect next phase of Takeover (e.g., 'Test Sensors').

Sensors are tested in the same manner as described above. When a HW sensor is triggered, the signal is captured by the iHub legacy RF Takeover Card, translated to the equivalent GE RF sensor signal, and pushed to the panel as a sensor event on the SuperBus 2000 wires.

In support of remote programming of the panel, CMS pushes new programming to Concord over a phone line, or to the iConnect CMS/Alarm Server API, which in turn pushes the programming to the iHub. The iHub uses the Concord Superbus 2000 RS485 link to push the programming to the Concord panel.

Figure 21:
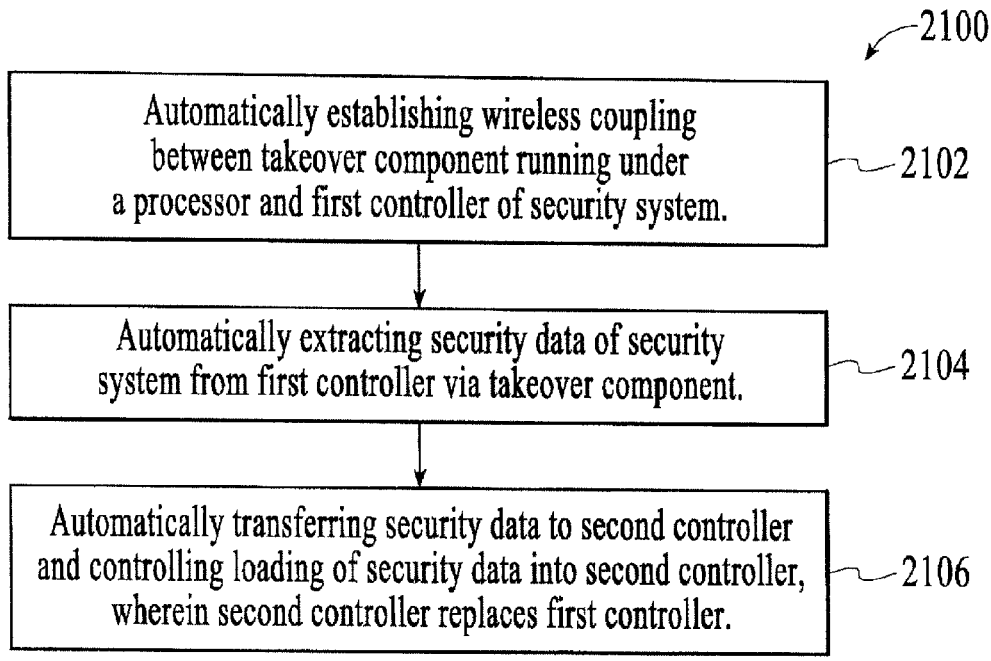
FIG. 21 is a flow diagram for automatic takeover of a security system, under an embodiment.

FIG. 21 is a flow diagram for automatic takeover 2100 of a security system, under an embodiment. Automatic takeover includes establishing 2102 a wireless coupling between a takeover component running under a processor and a first controller of a security system installed at a first location. The security system includes some number of security system components coupled to the first controller. The automatic takeover includes automatically extracting 2104 security data of the security system from the first controller via the takeover component. The automatic takeover includes automatically transferring 2106 the security data to a second controller and controlling loading of the security data into the second controller. The second controller is coupled to the security system components and replaces the first controller.

Figure 22:
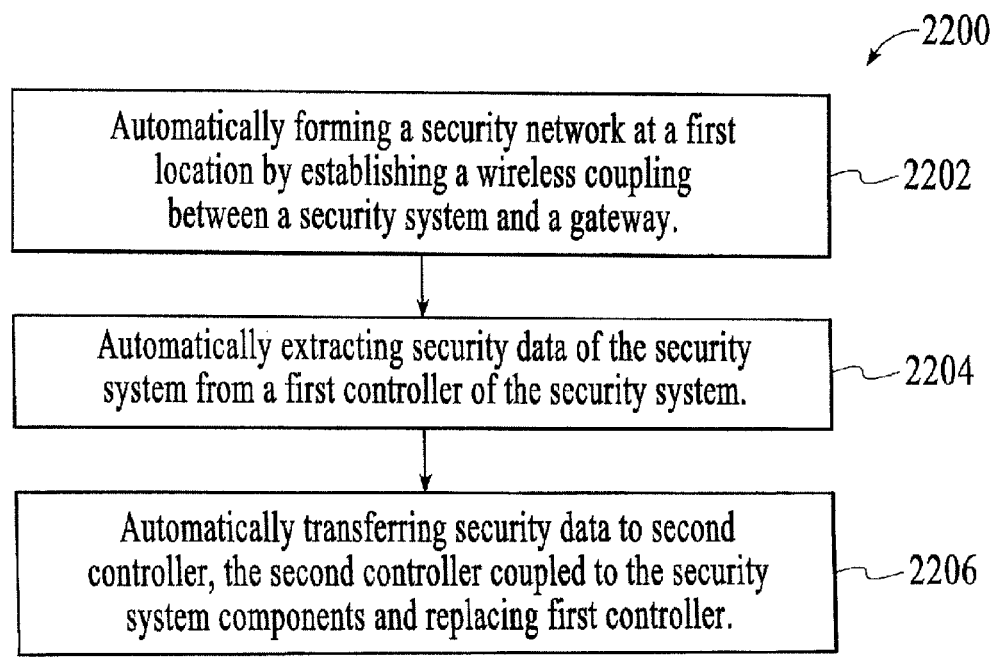
FIG. 22 is a flow diagram for automatic takeover of a security system, under an alternative embodiment.

FIG. 22 is a flow diagram for automatic takeover 2200 of a security system, under an alternative embodiment. Automatic takeover includes automatically forming 2202 a security network at a first location by establishing a wireless coupling between a security system and a gateway. The gateway of an embodiment includes a takeover component. The security system of an embodiment includes security system components. The automatic takeover includes automatically extracting 2204 security data of the security system from a first controller of the security system. The automatic takeover includes automatically transferring 2206 the security data to a second controller. The second controller of an embodiment is coupled to the security system components and replaces the first controller.

Components of the gateway of the integrated security system described herein control discovery, installation and configuration of both wired and wireless IP devices (e.g., cameras, etc.) coupled or connected to the system, as described herein with reference to FIGS. 1-4, as well as management of video routing using a video routing module or engine. The video routing engine initiates communication paths for the transfer of video from a streaming source device to a requesting client device, and delivers seamless video streams to the user via the communication paths using one or more of UPnP port-forwarding, relay server routing and STUN/TURN peer-to-peer routing, each of which is described below.

By way of reference, conventional video cameras have the ability to stream digital video in a variety of formats and over a variety of networks. Internet protocol (IP) video cameras, which include video cameras using an IP transport network (e.g., Ethernet, WiFi (IEEE 802.11 standards), etc.) are prevalent and increasingly being utilized in home monitoring and security system applications. With the proliferation of the internet, Ethernet and WiFi local area networks (LANs) and advanced wide area networks (WANs) that offer high bandwidth, low latency connections (broadband), as well as more advanced wireless WAN data networks (e.g. GPRS or CDMA 1×RTT), there increasingly exists the networking capability to extend traditional security systems to offer IP-based video. However, a fundamental reason for such IP video in a security system is to enable a user or security provider to monitor live or otherwise streamed video from outside the host premises (and the associated LAN).

The conventional solution to this problem has involved a technique known as 'port fowarding', whereby a 'port' on the LAN's router/firewall is assigned to the specific LAN IP address for an IP camera, or a proxy to that camera. Once a port has been 'forwarded' in this manner, a computer external to the LAN can address the LAN's router directly, and request access to that port. This access request is then forwarded by the router directly to the IP address specified, the IP camera or proxy. In this way an external device can directly access an IP camera within the LAN and view or control the streamed video.

The issues with this conventional approach include the following: port forwarding is highly technical and most users do not know how/why to do it; automatic port forwarding is difficult and problematic using emerging standards like UPnP; the camera IP address is often reset in response to a power outage/router reboot event; there are many different routers with different ways/capabilities for port forwarding. In short, although port forwarding can work, it is frequently less than adequate to support a broadly deployed security solution utilizing IP cameras.

Another approach to accessing streaming video externally to a LAN utilizes peer-to-peer networking technology. So-called peer-to-peer networks, which includes networks in which a device or client is connected directly to another device or client, typically over a Wide Area Network (WAN) and without a persistent server connection, are increasingly common. In addition to being used for the sharing of files between computers (e.g., Napster and KaZaa), peer-to-peer networks have also been more recently utilized to facilitate direct audio and media streaming in applications such as Skype. In these cases, the peer-to-peer communications have been utilized to enable telephony-style voice communications and video conferencing between two computers, each enabled with an IP-based microphone, speaker, and video camera. A fundamental reason for adopting such peer-to-peer technology is the ability to transparently 'punch through' LAN firewalls to enable external access to the streaming voice and video content, and to do so in a way that scales to tens of millions of users without creating an untenable server load.

A limitation of the conventional peer-to-peer video transport lies in the personal computer (PC)-centric nature of the solution. Each of the conventional solutions uses a highly capable PC connected to the video camera, with the PC providing the advanced software functionality required to initiate and manage the peer-to-peer connection with the remote client. A typical security or remote home monitoring system requires multiple cameras, each with its own unique IP address, and only a limited amount of processing capability in each camera such that the conventional PC-centric approach cannot easily solve the need. Instead of a typical PC-centric architecture with three components (a "3-way IP Video System") that include a computer device with video camera, a mediating server, and a PC client with video display capability, the conventional security system adds a plurality of fourth components that are standalone IP video cameras (requiring a "4-way IP Video System"), another less-than-ideal solution.

In accordance with the embodiments described herein, IP camera management systems and methods are provided that enable a consumer or security provider to easily and automatically configure and manage IP cameras located at a customer premise. Using this system IP camera management may be extended to remote control and monitoring from outside the firewall and router of the customer premise.

With reference to FIGS. 5 and 6, the system includes a gateway 253 having a video routing component so that the gateway 253 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Alternatively, with reference to FIGS. 9 and 10, the system includes a touchscreen 902 or 1002 having a video routing component so that the touchscreen 902 or 1002 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Figure 23:
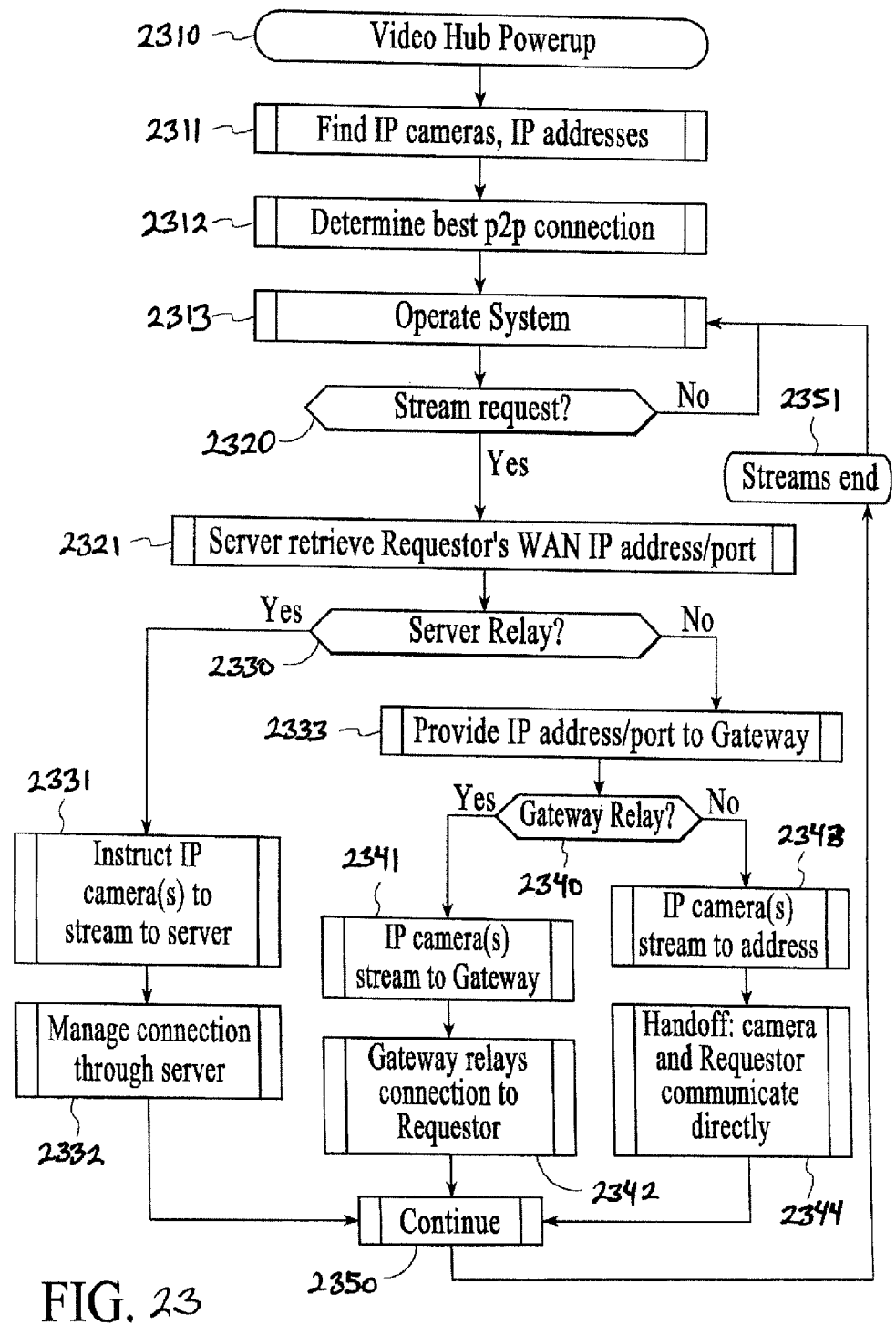
FIG. 23 is a general flow diagram for IP video control, under an embodiment.

FIG. 23 is a general flow diagram for IP video control, under an embodiment. The IP video control interfaces, manages, and provides WAN-based remote access to a plurality of IP cameras in conjunction with a home security or remote home monitoring system. The IP video control allows for monitoring and controlling of IP video cameras from a location remote to the customer premise, outside the customer premise firewall, and protected by another firewall. Operations begin when the system is powered on 2310, involving at a minimum the power-on of the gateway, as well as the power-on of at least one IP camera coupled or connected to the premise LAN. The gateway searches 2311 for available IP cameras and associated IP addresses. The gateway selects 2312 from one or more possible approaches to create connections between the IP camera and a device external to the firewall. Once an appropriate connection path is selected, the gateway begins operation 2313, and awaits 2320 a request for a stream from one of the plurality of IP video cameras available on the LAN. When a stream request is present the server retrieves 2321 the requestor's WAN IP address/port.

When a server relay is present 2330, the IP camera is instructed 2331 to stream to the server, and the connection is managed 2332 through the server. In response to the stream terminating 2351, operations return to gateway operation 2313, and waits to receive another request 2320 for a stream from one of the plurality of IP video cameras available on the LAN.

When a server relay is not present 2330, the requestor's WAN IP address/port is provided 2333 to the gateway or gateway relay. When a gateway relay is present 2340, the IP camera is instructed 2341 to stream to the gateway, and the gateway relays 2342 the connection to the requestor. In response to the stream terminating 2351, operations return to gateway operation 2313, and waits to receive another request 2320 for a stream from one of the plurality of IP video cameras available on the LAN. When a gateway relay is not present 2340, the IP camera is instructed 2343 to stream to an address, and a handoff 2344 is made resulting in direct communication between the camera and the requestor. In response to the stream terminating 2351, operations return to gateway operation 2313, and waits to receive another request 2320 from one of the plurality of IP video cameras available on the LAN.

The integrated security system of an embodiment supports numerous video stream formats or types of video streams. Supported video streams include, but are not limited to, Motion Picture Experts Group (MPEG)-4 (MPEG-4)/Real-Time Streaming Protocol (RTSP), MPEG-4 over Hypertext Transfer Protocol (HTTP), and Motion Joint Photographic Experts Group (JPEG) (MJPEG).

The integrated security system of an embodiment supports the MPEG-4/RTSP video streaming method (supported by video servers and clients) which uses RTSP for the control channel and Real-time Transport Protocol (RTP) for the data channel. Here the RTSP channel is over Transmission Control Protocol (TCP) while the data channel uses User Datagram Protocol (UDP). This method is widely supported by both streaming sources (e.g., cameras) and stream clients (e.g., remote client devices, Apple Quicktime, VideoLAN, IPTV mobile phones, etc).

Encryption can be added to the two channels under MPEG-4/RTSP. For example, the RTSP control channel can be encrypted using SSL/TLS. The data channel can also be encrypted.

If the camera or video stream source inside the home does not support encryption for either RTSP or RTP channels, the gateway located on the LAN can facilitate the encrypted RTSP method by maintaining separate TCP sessions with the video stream source device and with the encrypted RTSP client outside the LAN, and relay all communication between the two sessions. In this situation, any communication between the gateway and the video stream source that is not encrypted could be encrypted by the gateway before being relayed to the RTSP client outside the LAN. In many cases the gateway is an access point for the encrypted and private Wifi network on which the video stream source device is located. This means that communication between the gateway and the video stream source device is encrypted at the network level, and communication between the gateway and the RTSP client is encrypted at the transport level. In this fashion the gateway can compensate for a device that does not support encrypted RTSP.

The integrated security system of an embodiment also supports reverse RTSP. Reverse RTSP includes taking a TCP-based protocol like RTSP, and reversing the roles of client and server (references to "server" include the iControl server, also referred to as the iConnect server) when it comes to TCP session establishment. For example, in standard RTSP the RTSP client is the one that establishes the TCP connection with the stream source server (the server listens on a port for incoming connections). In Reverse RTSP, the RTSP client listens on a port for incoming connections from the stream source server. Once the TCP connection is established, the RTSP client begins sending commands to the server over the TCP connection just as it would in standard RTSP.

When using Reverse RTSP, the video stream source is generally on a LAN, protected by a firewall. Having a device on the LAN initiate the connection to the RTSP client outside the firewall enables easy network traversal.

If the camera or video stream source inside the LAN does not support Reverse RTSP, then the gateway facilitates the Reverse RTSP method by initiating separate TCP sessions with the video stream source device and with the Reverse RTSP client outside the LAN, and then relays all communication between the two sessions. In this fashion the gateway compensates for a stream source device that does not support Reverse RTSP.

As described in the encryption description above, the gateway can further compensate for missing functionalities on the device such as encryption. If the device does not support encryption for either RTSP or RTP channels, the gateway can communicate with the device using these unencrypted streams, and then encrypt the streams before relaying them out of the LAN to the RTSP Reverse client.

Servers of the integrated security system can compensate for RTSP clients that do not support Reverse RTSP. In this situation, the server accepts TCP connections from both the RTSP client and the Reverse RTSP video stream source (which could be a gateway acting on behalf of a stream source device that does not support Reverse RTSP). The server then relays the control and video streams from the Reverse RTSP video stream source to the RTSP client. The server can further compensate for the encryption capabilities of the RTSP client; if the RTSP client does not support encryption then the server can provide an unencrypted stream to the RTSP client even though an encrypted stream was received from the Reverse RTSP streaming video source.

The integrated security system of an embodiment also supports Simple Traversal of User Datagram Protocol (UDP) through Network Address Translators (NAT) (STUN)/Traversal Using Relay NAT (TURN) peer-to-peer routing. STUN and Turn are techniques for using a server to help establish a peer-to-peer UDP data stream (it does not apply to TCP streams). The bandwidth consumed by the data channel of a video stream is usually many thousands of times larger than that used by the control channel. Consequently, when a peer-to-peer connection for both the RTSP and RTP channels is not possible, there is still a great incentive to use STUN/TURN techniques in order to achieve a peer-to-peer connection for the RTP data channel.

Here, a method referred to herein as RTSP with STUN/TURN is used by the integrated security system. The RTSP with STUN/TURN is a method in which the video streaming device is instructed over the control channel to stream its UDP data channel to a different network address than that of the other end of the control TCP connection (usually the UDP data is simply streamed to the IP address of the RTSP client). The result is that the RTSP or Reverse RTSP TCP channel can be relayed using the gateway and/or the server, while the RTP UDP data channel can flow directly from the video stream source device to the video stream client.

If a video stream source device does not support RTSP with STUN/TURN, the gateway can compensate for the device by relaying the RTSP control channel via the server to the RTSP client, and receiving the RTP data channel and then forwarding it directly to the RTSP with STUN/TURN enabled client. Encryption can also be added here by the gateway.

The integrated security system of an embodiment supports MPEG-4 over HTTP. MPEG-4 over HTTP is similar to MPEG-4 over RTSP except that both the RTSP control channel and the RTP data channel are passed over an HTTP TCP session. Here a single TCP session can be used, splitting it into multiple channels using common HTTP techniques like chunked transfer encoding.

The MPEG-4 over HTTP is generally supported by many video stream clients and server devices, and encryption can easily be added to it using SSL/TLS. Because it uses TCP for both channels, STUN/TURN techniques may not apply in the event that a direct peer-to-peer TCP session between client and server cannot be established.

As described above, encryption can be provided using SSL/TLS taking the form of HTTPS. And as with MPEG-4 over RTSP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

As with Reverse RTSP, the integrated security system of an embodiment supports Reverse HTTP. Reverse HTTP includes taking a TCP-based protocol like HTTP, and reversing the roles of client and server when it comes to TCP session establishment. For example, in conventional HTTP the HTTP client is the one that establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables easy network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers of an embodiment can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment supports MJPEG as described above. MJPEG is a streaming technique in which a series of JPG images are sent as the result of an HTTP request. Because MJPEG streams are transmitted over HTTP, HTTPS can be employed for encryption and most MJPEG clients support the resulting encrypted stream. And as with MPEG-4 over HTTP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

The integrated system of an embodiment supports Reverse HTTP. Reverse HTTP includes taking a TCP-based protocol like HTTP, and reversal of the roles of client and server when it comes to TCP session establishment can be employed for MJPEG streams. For example, in standard HTTP the HTTP client is the one who establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment considers numerous parameters in determining or selecting one of the streaming formats described above for use in transferring video streams. The parameters considered in selecting a streaming format include, but are not limited to, security requirements, client capabilities, device capabilities, and network/system capabilities.

The security requirements for a video stream are considered in determining an applicable streaming format in an embodiment. Security requirements fall into two categories, authentication and privacy, each of which is described below.

Authentication as a security requirement means that stream clients must present credentials in order to obtain a stream. Furthermore, this presentation of credentials should be done in a way that is secure from network snooping and replays. An example of secure authentication is Basic Authentication over HTTPS. Here a username and password are presented over an encrypted HTTPS channel so snooping and replays are prevented. Basic Authentication alone, however, is generally not sufficient for secure authentication.

Because not all streaming clients support SSL/TLS, authentication methods that do not require it are desirable. Such methods include Digest Authentication and one-time requests. A one-time request is a request that can only be made by a client one time, and the server prevents a reuse of the same request. One-time requests are used to control access to a stream source device by stream clients that do not support SSL/TLS. An example here is providing video access to a mobile phone. Typical mobile phone MPEG-4 viewers do not support encryption. In this case, one of the MPEG-4 over RTSP methods described above can be employed to get the video stream relayed to an server. The server can then provide the mobile phone with a one-time request Universal Resource Locator (URL) for the relayed video stream source (via a Wireless Application Protocol (WAP) page). Once the stream ends, the mobile phone would need to obtain another one-time request URL from the server (via WAP, for example) in order to view the stream again.

Privacy as a security requirement means that the contents of the video stream must be encrypted. This is a requirement that may be impossible to satisfy on clients that do not support video stream encryption, for example many mobile phones. If a client supports encryption for some video stream format(s), then the "best" of those formats should be selected. Here "best" is determined by the stream type priority algorithm.

The client capabilities are considered in determining an applicable streaming format in an embodiment. In considering client capabilities, the selection depends upon the supported video stream formats that include encryption, and the supported video stream formats that do not support encryption.

The device capabilities are considered in determining an applicable streaming format in an embodiment. In considering device capabilities, the selection depends upon the supported video stream formats that include encryption, the supported video stream formats that do not support encryption, and whether the device is on an encrypted private Wifi network managed by the gateway (in which case encryption at the network level is not required).

The network/system capabilities are considered in determining an applicable streaming format in an embodiment. In considering network/system capabilities, the selection depends upon characteristics of the network or system across which the stream must travel. The characteristics considered include, for example, the following: whether there is a gateway and/or server on the network to facilitate some of the fancier video streaming types or security requirements; whether the client is on the same LAN as the gateway, meaning that network firewall traversal is not needed.

Streaming methods with the highest priority are peer-to-peer because they scale best with server resources. Universal Plug and Play (UPnP) can be used by the gateway to open ports on the video stream device's LAN router and direct traffic through those ports to the video stream device. This allows a video stream client to talk directly with the video stream device or talk directly with the gateway which can in turn facilitate communication with the video stream device.

Another factor in determining the best video stream format to use is the success of STUN and TURN methods for establishing direct peer-to-peer UDP communication between the stream source device and the stream client. Again, the gateway and the server can help with the setup of this communication.

Client bandwidth availability and processing power are other factors in determining the best streaming methods. For example, due to its bandwidth overhead an encrypted MJPEG stream should not be considered for most mobile phone data networks.

Device bandwidth availability can also be considered in choosing the best video stream format. For example, consideration can be given to whether the upstream bandwidth capabilities of the typical residential DSL support two or more simultaneous MJPEG streams.

Components of the integrated security system of an embodiment, while considering various parameters in selecting a video streaming format to transfer video streams from streaming source devices and requesting client devices, prioritize streaming formats according to these parameters. The parameters considered in selecting a streaming format include, as described above, security requirements, client capabilities, device capabilities, and network/system capabilities. Components of the integrated security system of an embodiment select a video streaming format according to the following priority, but alternative embodiments can use other priorities.

The selected format is UPnP or peer-to-peer MPEG-4 over RTSP with encryption when both requesting client device and streaming source device support this format.

The selected format is UPnP or peer-to-peer MPEG-4 over RTSP with authentication when the requesting client device does not support encryption or UPnP or peer-to-peer MPEG-4 over RTSP with encryption.

The selected format is UPnP (peer-to-peer) MPEG-4 over HTTPS when both requesting client device and streaming source device support this format.

The selected format is UPnP (peer-to-peer) MPEG-4 over HTTP when the requesting client device does not support encryption or UPnP (peer-to-peer) MPEG-4 over HTTPS.

The selected format is UPnP (peer-to-peer) MPEG-4 over RTSP facilitated by gateway or touchscreen (including or incorporating gateway components) (to provide encryption), when the requesting client device supports encrypted RTSP and the streaming source device supports MPEG-4 over RTSP.

The selected format is UPnP (peer-to-peer) MPEG-4 over HTTPS facilitated by gateway or touchscreen (including or incorporating gateway components) (to provide encryption) when the requesting client device supports MPEG-4 over HTTPS and the streaming source device supports MPEG-4 over HTTP.

The selected format is UPnP (peer-to-peer) MJPEG over HTTPS when the networks and devices can handle the bandwidth and both requesting client device and streaming source device support MJPEG over HTTPS.

The selected format is Reverse RTSP with STUN/TURN facilitated by the server when the streaming source device initiates SSL/TLS TCP to server, the streaming source device supports Reverse RTSP over SSL/TLS with STUN/TURN, and the requesting client device supports RTSP with STUN/TURN.

The selected format is Reverse RTSP with STUN/TURN facilitated by server and gateway or touchscreen (including or incorporating gateway components) when the gateway initiates SSL/TLS TCP to the server and to the streaming source device, the streaming source device supports RTSP, and the requesting client device supports RTSP with STUN/TURN.

The selected format is Reverse MPEG over RTSP/HTTP facilitated by the server when the streaming source device initiates SSL/TLS TCP to server, the streaming source device supports Reverse RTSP or HTTP over SSL/TLS, and the requesting client device supports MPEG over RTSP/HTTP.

The selected format is Reverse MPEG over RTSP/HTTP facilitated by server and gateway or touchscreen (including or incorporating gateway components) when the gateway initiates SSL/TLS TCP to server and to streaming source device, the streaming source device supports MPEG over RTSP or HTTP, and the requesting client device supports MPEG over RTSP/HTTP.

The selected format is UPnP (peer-to-peer) MJPEG over HTTP when the networks and devices can handle the bandwidth and when the requesting client device does not support encryption and does not support MPEG-4.

The selected format is Reverse MJPEG over HTTPS facilitated by the server when the streaming source device initiates SSL/TLS TCP to server, the streaming source device supports Reverse MJPEG over SSL/TLS, and the requesting client device supports MJPEG.

The selected format is Reverse MJPEG over HTTPS facilitated by server and gateway or touchscreen (including or incorporating gateway components) when the gateway initiates SSL/TLS TCP to the server and to the streaming source device, the streaming source device supports MJPEG, and the requesting client device supports MJPEG.

Figure 24:
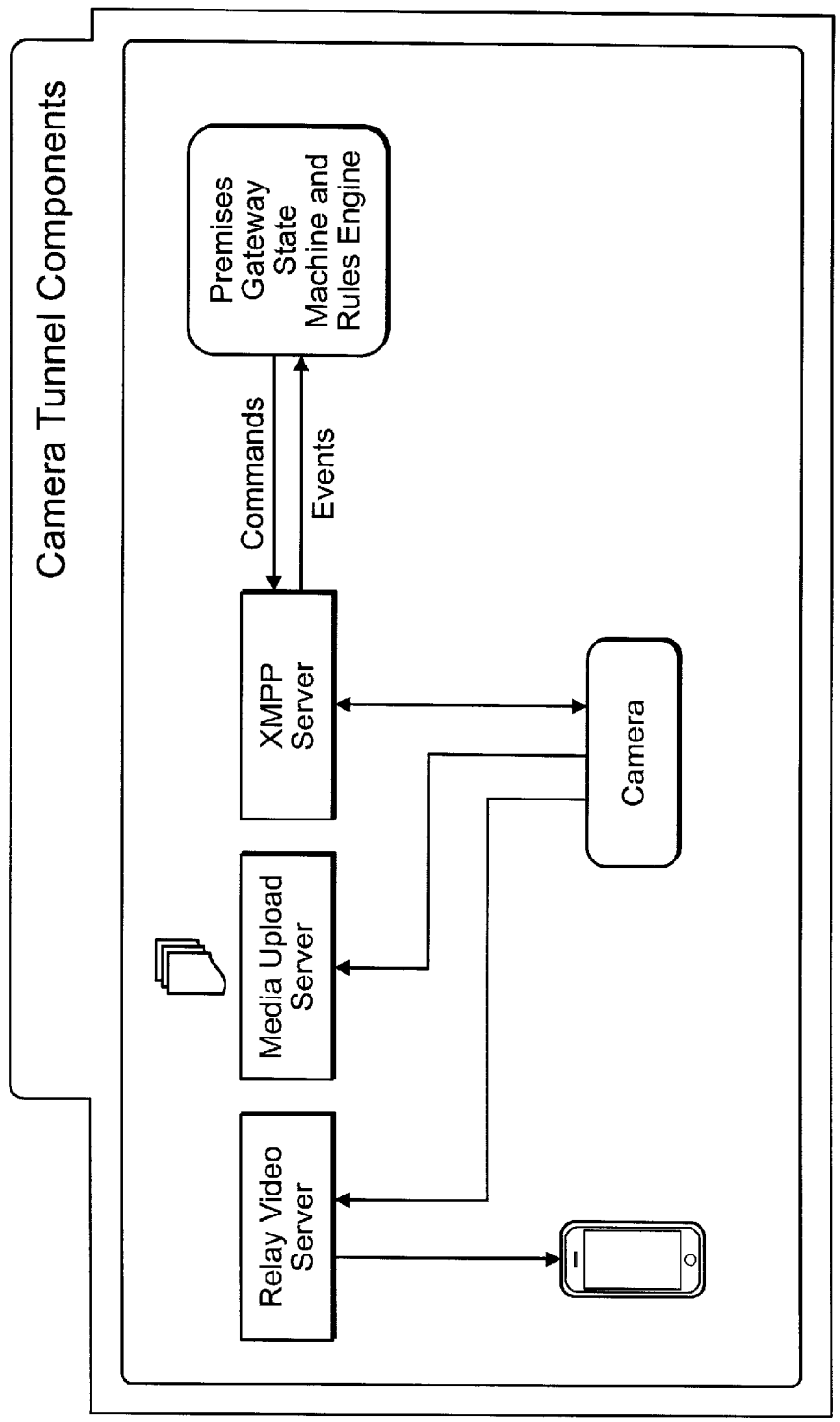
FIG. 24 is a block diagram showing camera tunneling, under an embodiment.

FIG. 24 is a block diagram showing camera tunneling, under an embodiment.

Additional detailed description of camera tunnel implementation details follow.

An embodiment uses XMPP for communication with a remote video camera as a lightweight (bandwidth) method for maintaining real-time communication with the remote camera. More specifically, the remote camera is located on another NAT (e.g., NAT traversal).

An embodiment comprises a method for including a remotely located camera in a home automation system. For example, using XMPP via cloud XMPP server to couple or connect camera to home automation system. This can be used with in-car cameras, cell phone cameras, and re-locatable cameras (e.g., dropped in the office, the hotel room, the neighbor's house, etc.).

Components of an embodiment are distributed so that any one can be offline while system continues to function (e.g., panel can be down while camera still up, motion detection from camera, video clip upload etc. continue to work.

Embodiments extend the PSIA in one or more of the following areas: wifi roaming configuration; video relay commands; wifi connectivity test; media tunnel for live video streaming in the context of a security system; motion notification mechanism and configuration (motion heartbeat) (e.g., helps with scalable server); XMPP for lightweight communication (helps with scalable server, reduced bandwidth, for maintaining persistent connection with a gateway); ping request sent over XMPP as health check mechanism; shared secret authentication bootstrapping process; asynchronous error status delivery by the camera for commands invoked by the gateway if the camera is responsible for delivering errors to the gateway in an asynchronous fashion (e.g., gateway requests a firmware update or a video clip upload).

Embodiments extend the home automation system to devices located on separate networks, and make them useable as general-purpose communication devices. These cameras can be placed in the office, vacation home, neighbor house, software can be put onto a cell phone, into a car, navigation system, etc.

Embodiments use a global device registry for enabling a device/camera to locate the server and home to which it is assigned.

Embodiments include methods for bootstrapping and re-bootstrapping of authentication credentials. The methods include activation key entry by installer into the cloud web interface. Activation key generation is based upon mac address and a shared secret between manufacturer and the service provider. Embodiments of the system allow activation of a camera with valid activation key that is not already provisioned in the global registry server.

Embodiments include a web-based interface for use in activating, configuring, remote firmware update, and re-configuring of a camera.

Embodiments process or locate local wifi access points and provide these as options during camera configuring and re-configuring. Embodiments generate and provide recommendations around choosing a best wifi access point based upon characteristics of the network (e.g., signal strength, error rates, interference, etc.). Embodiments include methods for testing and diagnosing issues with wifi and network access.

Embodiments include cameras able to perform this wifi test using only one physical network interface, an approach that enables the camera to dynamically change this physical interface from wired to wifi. Embodiments are able to change the network settings (wifi etc) remotely using the same process.

Cameras of an embodiment can be configured with multiple network preferences with priority order so that the camera can move between different locations and the camera can automatically find the best network to join (e.g., can have multiple ssid+bssid+password sets configured and prioritized).

Regarding firmware download, embodiments include a mechanism to monitor the status of the firmware update, provide feedback to the end user and improve overall quality of the system.

Embodiments use RTSP over SSL to a cloud media relay server to allow live video NAT traversal to a remote client (e.g., PC, cell phone, etc.) in a secure manner where the camera provides media session authentication credentials to the server. The camera initiates the SSL connection to the cloud and then acts as a RTSP server over this connection.

Embodiments include methods for using NAT traversal for connecting to the cloud for remote management and live video access allows the integrated security components to avoid port forwarding on the local router(s) and as a result maintain a more secure local network and a more secure camera since no ports are required to be open.

Embodiments enable camera sensors (e.g., motion, audio, heat, etc.) to serve as triggers to other actions in the automation system. The capture of video clips or snapshots from the camera is one such action, but the embodiments are not so limited.

A camera of an embodiment can be used by multiple systems.

A detailed description of flows follows relating to the camera tunnel of an embodiment.

A detailed description of camera startup and installation follows as it pertains to the camera tunnel of an embodiment.

Activation Key
  a. camera to follow same algorithm as ihub where activation key is generated from serial based upon a one-way hash on serial and a per-vendor shared secret.
  b. Used com.icontrol.util.ops.activation.ActivationKeyUtil class to validate serialNo <→activationKey.
Registry Request
[partner]/registry/[device type]/[serial]
  a. new column in existing registry table for id type; nullable but the application treats null as "gateway".
  b. rest endpoints allow adding with the new optional argument.
  c. current serial and siteId uniqueness enforcement by application depends upon device type (for any device type, there should be uniqueness on serial; for gateway device type, there should be uniqueness on siteId; for other device types, there need not be uniqueness on siteId).
  d. if no activation yet (e.g., no entry) then send dummy response (random but repeatable reply; may include predictable "dummy" so that steps below can infer.
  e. add/update registry server endpoints for adding/updating entries.
If Camera has No Password
Camera retrieves "Pending Key" via POST to/<CredentialGatewayURL>/GatewayService/<siteID>/PendingDeviceKey.
  a. pending key request (to get password) with serial and activation key.
  b. server checks for dummy reply; if dummy then responds with retry backoff response.
  c. server invokes pass-through API on gateway to get new pending key.
  d. if device is found, then gateway performs validation of serial+activation key, returns error if mismatch.
  e. if activation key checks out, then gateway checks pending key status.
  f. if device currently has a pending key status, then a new pending password is generated.
  g. gateway maintains this authorization information in a new set of variables on the camera device.
  h. device-authorization/session-key comprises the current connected password.
  i. device-authorization/pending-expiry comprises a UTC timestamp representing the time the current pending password period ends; any value less than the current time or blank means the device is not in a pending password state.
  j. device-authorization/pending-session-key comprises the last password returned to the camera in a pending request; this is optional (device may choose to maintain this value in memory).
  k. session-key and pending-session-key variables tagged with "encryption" in the device def which causes rest and admin to hide their value from client.
ConnectInfo Request
  a. returns xmpp host and port to connect to (comes from config as it does for gateway connect info).
  b. returns connectInfo with additional <xmpp> parameter.
Start Portal Add Camera Wizard
  a. user enters camera serial, activation key.
  b. addDevice rest endpoint on gateway called
  c. gateway verifies activation key is correct.
  d. gateway calls addDevice method on gapp server to add LWG_SerComm_iCamera_1000 with given serial to site.
  e. Server detects the camera type and populates registry.
  f. gateway puts device into pending password state (e.g., updates device-auth/pending-expiry point).
  g. rest endpoints on gateway device for managing device pending password state.
  h. start pending password state: POST future UTC value to device-auth/pending-expiry; device-auth/pending-expiry set to 30 minutes from time device was added.
  i. stop pending password state: POST-1 to device-auth/pending-expiry.
  j. check pending password state: GET device-auth/pending-expiry.
  k. message returned with "Location" header pointing to relative URI.
  l. user told to power on camera (or reboot if already powered on).
  m. once camera connects, gateway updates device-auth/pending-expiry to −1 and device-auth/session-key with password and device/connection-status to connected
  n. portal polls for device/connection-status to change to connected; if does not connect after X seconds, bring up error page (camera has not connected—continue waiting or start over).
  o. user asked if wifi should be configured for this camera.
  p. entry fields for wifi ssid and password.
  q. portal can pre-populate ssid and password fields with picklist of any from other cameras on the site.
  r. get XML, of available SSIDs.
  s. non-wifi option is allowed.
  t. portal submits options to configure camera (use null values to specify non-wifi); upon success, message is returned with "Location" header pointing to relative URI.

u. checks configuration progress and extracting "status" and "subState" fields.
v. puts device state into "configuring"; upon error, puts device state into "configuration failure".
w. performs firmware upgrade if needed, placing device state into "upgrading"; upon error, puts device state into "upgrade failure".
x. upon configuration success, puts device state of "ok" and applies appropriate configuration for camera (e.g., resolutions, users, etc.).
y. if non-blank wifi parameters, automatically perform "wifi test" method to test wifi without disconnecting Ethernet.
z. portal wizard polls device status until changes to "ok" or "upgrade failure/" configuration ailure" in "status" field, along with applicable, if any, with error code reason, in "subState" field; upon error, show details to user, provide options (start over, configure again, reboot, factory reset, etc)
aa. notify user they can move camera to desired location.

Camera Reboots
a. gets siteId and server URL from registry.
b. makes pending paid key request to server specifying correct siteId, serial and activation key; gets back pending password.
c. makes connectInfo request to get xmpp server.
d. connects over xmpp with pending password.

If Camera Reboots Again
a. get siteId and server URL from registry.
b. already has password (may or may not be pending) so no need to perform pending paid key request.
c. make connectInfo request to get xmpp server.
d. connect over xmpp with password.

Xmpp Connect with Password
a. xmpp user is of the form [serial]@[server]/[siteId]
b. session server performs authentication by making pass-through API request to gateway for given SiteId.
c. Session xmpp server authenticates new session using DeviceKey received in GET request against received xmpp client credential.
d. If authencation fails or GET receives non-response, server returns to camera XMPP connect retry backoff with long backoff.
e. gateway device performs password management.
f. compares password with current key and pending key (if not expired); if matches pending, then update device-auth/session-key to be pending value, and clear out the device-auth/pending-expiry.
g. gateway device updates the device/connection-status point to reflect that camera is connected.
h. gateway device tracks the xmpp session server this camera is connected to via new point device/proxy-host and updates this info if changed.
i. if deviceConnected returns message, then session server posts connected event containing xmpp user to queue monitored by all session servers.
j. session servers monitor these events and disconnect/cleanup sessions they have for same user.
k. may use new API endpoint on session server for broadcast messages.

Xmpp Connect with Bad Password
a. Upon receiving a new connection request, session server performs authentication by making passthrough API request to gateway for given SiteId.
b. Session xmpp server authenticates new session using DeviceKey received in above GET request against received xmpp client credential.
c. If authencation fails or GET receives non-response from virtual gateway.
d. Session server rejects incoming connection (is there a backoff/retry XMPP response that can be sent here).
e. Session server logs event.
f. Gateway logs event.

Xmpp Disconnect
a. session server posts disconnected event to gateway (with session server name).
b. gateway updates the device/connected variable/point to reflect that camera is disconnected.
c. gateway updates the device/connection-status variable/point to reflect that camera is disconnected.
d. gateway clears the device/proxy-host point that contains the session host to this camera is connected.

LWGW Shutdown
a. During LWGW shutdown, gateway can broadcast messages to all XMPP servers to ensure all active XMPP sessions are gracefully shutdown.
b. gateways use REST client to call URI, which will broadcast to all XMPP servers.

To Configure Camera During Installation
a. applies all appropriate configuration for camera (e.g., resolutions, users, etc).
b. returns message for configuration applied, wifi test passed, all settings taken, returns other response code with error code description upon any failure.

To Reconfigure Wifi SSID and Key
a. returns message for wifi credentials set.
b. returns other response code with error code description upon any failure.

API Pass-Through Handling for Gateway Fail-Over Case
a. When performing passthrough for LWGW, the API endpoint handles the LWGW failover case (e.g., when gateway is not currently running on any session server).
b. passthrough functions in the following way: current session server IP is maintained on the gateway object; server looks up gateway object to get session IP and then sends passthrough request to that session server; if that request returns gateway not found message, server error message, or a network level error (e.g., cannot route to host, etc.), if the gateway is a LWGW then server should lookup theprimary/secondary LW Gateway group for this site; server should then send resume message to primary, followed by rest request; if that fails, then server send resume message to secondary followed by rest request
c. alternatively, passthrough functions in the following way: rather than lookup session server IP on gateway object, passthrough requests should be posted to a passthrough queue that is monitored by all session servers; the session server with the Gateway on it should consume the message (and pass it to the appropriate gateway); the server should monitor for expiry of these messages, and if the gateway is a LWGW then server should lookup the primary/secondary LW Gateway group for this site; server should then send resume message to primary, followed by rest request; if that fails, then server send resume message to secondary followed by rest request.

A detailed description follows for additional flows relating to the camera tunnel of an embodiment.

Motion Detection
a. camera sends openhome motion event to session server via xmpp.
b. session server posts motion event to gateway via passthrough API.

c. gateway updates the camera motion variable/point to reflect the event gateway updates the camera motion variable/point to reflect the event Capture Snapshot
- a. gateway posts openhome snapshot command to session server with camera connected.
- b. gateway sends command including xmpp user id to xmpp command Queue monitored by all session servers.
- c. session server with given xmpp user id consumes command and sends command to camera (command contains upload URL on gw webapp).
- d. gateway starts internal timer to check if a response is received from camera (e.g., 5 sec wait window).
- e. if broadcast RabbitMQ not ready, then gateway will use device/proxy-host value to know which session server to post command to.
- f. session server sends command to camera (comprises upload URL on gw webapp)
- g. Example XML body:
  <MediaUpload>
  <id>1321896772660</id>
  <snapShotImageType>JPEG</snap ShotImageType>
  <gateway_url>[gatewaysyncUrl]/gw/GatewayService/
  SPutJpg/s/[siteId]/[deviceIndex]/[varValue]/[varIndex]/[who]/[ts]/[HMM]/[passCheck]/</
  <failure_url>[gatewaysyncUrl]/gw/GatewayService/
  SPutJpgError/s/[siteId]/[deviceIndex]/[varValue]/
  [varIndex]/[who]/[ts]/[HMM]/[passCheck]/</
  </MediaUpload>
- h. session server receives response to sendRequestEvent from camera and posts response to gateway.
- i. camera uploads to upload URL on gw webapp.
- j. passCheck can be verified on server (based upon gateway secret); alternatively, the OpenHome spec calls for Digest Auth here.
- k. endpoint responds with message digest password if the URI is expected, otherwise returns non-response.
- l. gw webapp stores snapshot, logs history event.
- m. event is posted to gateway for deltas.

Capture Clip
- a. gateway posts openhome video clip capture command to session server with camera connected.
- b. gateway sends command including xmpp user id to xmpp command Queue monitored by all session servers.
- c. session server with given xmpp user id consumes command and sends command to camera (command comprises upload URL on gw webapp).
- d. gateway starts internal timer to check if a response is received from camera (e.g., 5 sec wait window).
- e. session server sends command to camera (comprises upload URL on gw webapp).
- f. Example URI from session server to camera: /openhome/streaming/channels/1/video/upload
- g. Example XML body:
  <MediaUpload>
  <id>1321898092270</id>
  <videoClipFormatType>MP4</videoClipFormatType>
  <gateway_url>[gatewaysyncUrl]/gw/GatewayService/
  SPutMpeg/s/[siteId]/[deviceIndex]/[varValue]/
  [varIndex]/[who]/[ts]/[HMM]/[passCheck]/</
  <failure_url>[gatewaysyncUrl]/gw/GatewayService/
  SPutMpegFailed/s/[siteId]/[deviceIndex]/
  [varValue]/[varindex]/[who]/[ts]/[HMM]/[passCheck]/</
  </MediaUpload>
- h. session server receives response to sendRequestEvent from camera and posts response to gateway.
- i. camera uploads to upload URL on gw webapp.
- j. passCheck can be verified on server (based upon gateway secret).
- k. alternatively, spec calls for Digest Auth here.
- l. endpoint responds with message digest password if the URI is expected, otherwise returns non-response.
- m. gw webapp stores video clip, logs history event.
- n. event is posted to gateway for deltas.

Live Video (Relay)
- a. Upon user login to portal, portal creates a media relay tunnel by calling relayAPImanager create.
- b. RelayAPImanager creates relays and sends ip-config-relay variable (which instructs gateway to create media tunnel) to gateway.
- c. Upon receiving media tunnel create ip-config-relay command, gateway posts openhome media channel create command to session server with camera connected.
- d. session server sends create media tunnel command to camera (comprises camera relay URL on relay server).
- e. Example URI from session server to camera: /openhome/streaming/mediatunnel/create
- f. Example XML body:
  <CreateMediaTunnel>
  <sessionID>1</sessionID>
  <gatewayURL>TBD</gatewayURL>
  <failureURL>TBD</failureURL>
  </CreateMediaTunnel>
- g. GatewayURL is created from relay server, port, and sessionId info included within ip-config-relay variable.
- h. camera creates a TLS tunnel to relay server via POST to <gatewayURL>.
- i. When user initiates live video, portal determines user is remote and retrieves URL of Relay server from relayAPImanager.
- j. Upon receiving a user pole connection on the relay server (along with valid rtsp request), relay sends streaming command to camera: example: rtsp:://openhome/streaming/channels/1/rtsp
- k. Upon user portal logout, portals calls relayAPImanager to terminate media tunnel.
- l. RelayAPImanager send ip-config-relay varlable to terminate media tunnel.
- m. Gateway sends destroy media tunnel command to camera via XMPP.

Camera Firmware Update
- a. Gateway checks camera firmware version; if below minimum version, gateway sends command to camera (via session server) to upgrade firmware (command: /openhome/system/up datefirmware).
- b. Gateway checks firmware update status by polling: /openhome/system/up datefirmware/status.
- c. Gateway informs portal of upgrade status.
- d. Camera auto-reboots after firmware update and reconnects to Session server.

Camera First-Contact Configuration
- a. After a camera is added successfully and is connected to the session server for the first time, gateway performs first contact configuration as follows.
- b. Check firmware version.
- c. Configure settings by: download config file using /openhome/system/configurationData/configFile; or configure each category individually (configure video input channel settings—/openhome/system/ video/inputs/channels; onfigure audio input channel settings (if any)—/openhome/system/audio/inputs/channels; configure video streaming channel settings—/openhome/streaming/channels; configure motion detection settings—example: PUT/openhome/custom/motiondetection/pir/0; configure event trigger settings—example: PUT/openhome/custom/event).

d. Reboot camera (/openhome/system/factoryreset) if camera responds with reboot required.

More particularly, details follow of a camera interface specification (OPENHOME CAMERA INTERFACE SPECIFICATION) in an example embodiment of the integrated security system described herein.

iControl OpenHome Camera Interface Specification

1 INTRODUCTION

Figure 25:
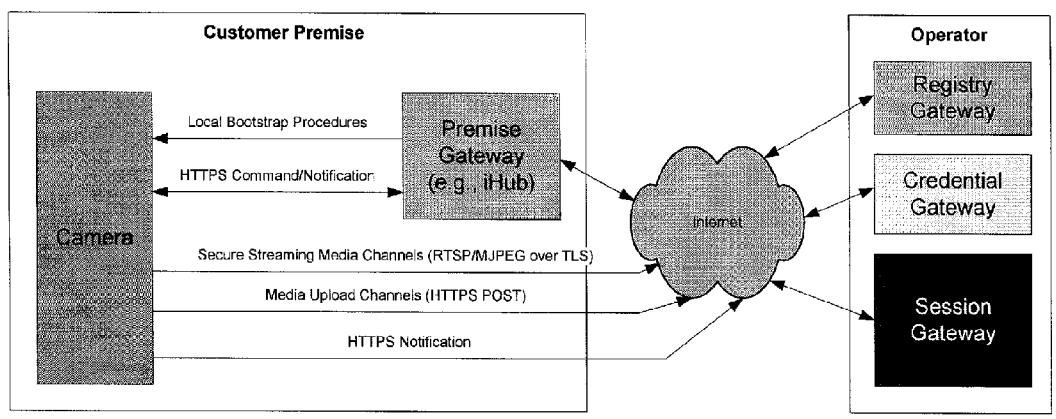
FIG. 25 is a flow diagram illustrating a deployment scenario where the Camera is deployed in conjunction with a Premise Gateway at the customer premise, under an embodiment.

This document describes the communication protocol used between an OpenHome Camera and an iControl Gateway. The OpenHome Camera (henceforth referred to as Camera) is an IP camera that supports the iControl OpenHome Camera Interface Specification and its associated requirements. The iControl Gateway consists of logical subcomponents such as Premise Gateway, Session Gateway, Registry Gateway, and Credential Gateway, etc. that collectively interface with OpenHome Cameras to provide end-users services. FIG. 25 illustrates an exemplary architecture where an OpenHome Camera and an iControl Premise Gateway are deployed at the customer premise, where both communicates with the iControl Session Gateway over the Internet. This document only specifies the OpenHome communication protocol and does not address Camera hardware and software feature requirements. Please refer to the iControl OpenHome Camera Requirements Matrix document for a list of software features required in an OpenHome compliant camera. Please refer to the OpenHome Camera XML Schema Definition for more detail.

2 COMMUNICATION INTERFACE OVERVIEW

FIG. 25 illustrates a deployment scenario where the Camera is deployed in conjunction with a Premise Gateway at the customer premise.

The Camera and the iControl Gateway communicates via interfaces described in the subsequent sections. The Local Bootstrap Procedures interface is used by the Premise Gateway to discover and configure the Camera for subsequent accesses. The HTTPS Command/Notification interface is a bi-directional interface used by the Gateway to send Commands to the Camera or for the Camera to send Notifications to the Gateway. The Secure Streaming Media Channels interface is used to tunnel live RTSP or MJPEG streams from Camera to Gateway. The Media Upload Channels interface is used to upload video and image from Camera to Gateway. The HTTPS Notification interface is just a subset of the Command/Notification interface and is used by the Camera to post Notifications to the Gateway. An OpenHome camera when deployed in the Premise Gateway deployment scenario must support all four interface types described above.

3 CAMERA AND GATEWAY PREREQUISITES 3.1 Camera Pre-Configured Parameters

Camera should support all mandatory features described in the iControl OpenHome Camera Requirements Matrix document. Furthermore, depending on the deployment mode supported, this document assumes the following parameters are pre-configured for each Camera:

Camera Prerequisites for On-Premise Gateway Deployment Mode

1. Serial Number—each camera is pre-configured with a unique alpha/numeric number. Serial number is determined by the camera manufacturer and is recommended to be at least 12 digits in length.
2. iControl root Certificate Authority (CA) certificates—each camera is pre-configured with a list of root CA certificates provided by iControl
3. Camera supports TLS v1.0 outbound connection per RFC 2246 (TLS Protocol Version 1.0)
    a. Camera supports TLS host name verification—certificate received over TLS must match hostname Camera is sending. Wildcard certificate must be supported.
    b. Camera supports TLS with AES 128 or AES 256 encryption.
4. Adminstrator account username and password—each camera is pre-configured with a pre-defined administrator username/password (e.g., Administrator/password).
5. UPnP USN—each camera is pre-configured with a pre-defined Universal Plug and Play (UPnP) Unique Service Number (USN) specified by iControl to be used as part of Simple Service Discovery Protocol (SSDP) discovery procedures.
6. HTTP server mode is enabled to listen on port 80

3.2 Camera Optimal WiFi AP/Repeater Selection

For deployment scenarios where WiFi repeaters are utilized or multiple WiFI APs shared the same SSID, a Camera shall periodically compare received signal strengths of all candidate AP/repeaters, and under the right conditions, re-establish connection to the WiFi AP/repeater with the best signal quality. General guidelines for this feature include:

Camera shall peridocally compare RSSI signal strengths from all possible BSSIDs serving the same SSID in use by the Camera. Time interval between checks is governed by check interval.

If Camera detects alternate AP(s)/repeater(s) with received RSSI that is higher than existing connection by the switch threshold, the Camera shall disconnect from the current BSSID and re-establish connection with the AP/repeater with the higher signal strength. Re-establishment may be postponed until end of media streaming or upload session.

Swtiching hysterisys—Once switched from one BSSI to another, Camera shall not switch sooner than min switch time.

Check interval, switch threshold, and min switch time are all configurable parameters that can be managed via/OpenHome/System/Network/interfaces/[UID]/wireless resource.

3.3 Gateway Prerequisites

The iControl Gateway (including Premise Gateway, Session Gateway, Credential Gateway, Registry Gateway, etc.) should support all mandary resources/services required by the Camera in order to process Commands or Notifications. For example, if a Gateway sends a Command to a Camera that includes mandatory URL for upload, notification, etc., the Gateway must support the specified services when accessed via the URL. At the same time, if a Gateway did not configure a Camera with an upload resource URL, the Camera cannot assume the upload service is available at the Gateway. For example, if no event trigger notifications are enabled at the Camera, the Camera cannot assume the upload Gateway resource will be available.

4 COMMUNICATION INTERFACE DETAIL SPECIFICATIONS

Each of the interface types above is described in more detail in the following subsections. While HTTP 1.1 is preferred, interfaces will also work with HTTP 1.0.

4.1 Interface Type 1—HTTPS Command/Notification Channel

The HTTP/HTTPS Command/Notification channel is a bi-directional, asynchronous communication interface that allows for Premise Gateway to send commands to the Camera or for Camera to send Notification Events to the Premise Gateway. Multiple messages can be sent over each connection due to the use of HTTP 1.1 persistent connection (RFC 2616). However, HTTP/HTTPS (even with the use of HTTP 1.1 persistent option) may terminate a connection after an extended idle period. It is the responsibility of the initiating entity (either Camera or Premise Gateway) to re-establish a new connection when a new message is to be delivered. Detailed definitions of Command and Notifications messages along with their parameters are described in Section 5. This section describes the HTTPS transport used to send/receive these messages.

Commands are always sent from Gateway to Camera via inbound HTTP/HTTPS connections to the Camera.

Notifications can be delivered from Camera to Gateway via either 1) Camera outbound HTTPS connection or 2) Camera inbound polling via the "/OpenHome/System/Poll/notifications" retrieval Command.

A typical Command/response process is described below:
Pre-Requisites:
  Camera was updated with a valid server SSL certificate per Section 5.7.1.
Gateway Originated Command Channel Setup Process:
  1. Gateway requests a TCP connection to Camera, if one is already open.
  2. Negotiate TLS encryption between Camera and Gateway using Camera's server SSL certificates configured per Section 5.7.1.
  3. Gateway sends HTTPS requests to Camera using HTTPS method and URI specific to each Command.
  4. Camera authenticates request using digest authentication.
  5. Camera processes received Command via the following sub-steps.
    a. Camera executes task(s) specified in the received Command(s). For Commands that require asynchronous execution, Camera should execute tasks after step b.
    b. Camera sends a response message to Gateway using HTTP response procedures
  6. The TCP/TLS connection is kept open for a pre-set duration due to the use of HTTP 1.1 persistent connection option.
  7. If connection is idle for a pre-set duration, Close TCP connection.

Camera Originated Outbound Notification Channel Setup Process:
  1. Camera requests a TCP connection to Gateway, if one is already open.
  2. Negotiate TLS encryption between Camera and Gateway using Gateway's server SSL certificates. Camera must utilize TLS host name verification while establishing connection.
  3. Camera sends HTTPS requests to Gateway using HTTPS method and URI specific to each Notification.
  4. Gateway authenticates request using digest authentication.
  5. Gateway processes received Notification via the following sub-steps.
    a. Gateway executes task(s) specified in the received Notification(s).
    b. Gateway sends a response message to Gateway using HTTP response procedures
  6. The TCP/TLS connection is kept open for a pre-set duration due to the use of HTTP 1.1 persistent connection option.
  7. If connection is idle for a pre-set duration, Close TCP connection.

Camera Notification via Inbound Polling Process:
  In lieu of using Outbound Notification Channel, Notifications can be delivered to Gateway via Inbound Polling. The following is a typical delivery process:
  1. Gateway requests a TCP connection to Camera, if one is already open.
  2. Negotiate TLS encryption between Camera and Gateway using Camera's server SSL certificates configured per Section 5.7.1.
  3. Gateway sends/OpenHome/System/Poll/notifications request to Camera.
  4. Camera waits for new Notification(s) to arrive.
  5. If a Notification does not arrive before <linger> time expiration, Camera responds with 200 OK with XML body that does NOT contain any Notification.
  6. If one or more Notification arrive before <linger> time expiration, Camera responds with 200 OK including XML body containing one more more Notifications.
  7. Upon receiving 200 OK, Gateway repeats loop starting with Step 3.

4.1.1 Gateway Originated Commands

To issue a Gateway originated command, Gateway initiates HTTP/HTTPS connection to Camera via method and URI <CommandURI> specified by the Command (see Section 5 Command/Notification Data Types). HTTP 1.1 persistent connection mode should be utilized in order to optimize connection usage. Only accounts with administration rights can issue Commands to the Camera, with the only exception being that User accounts can access video streaming and picture snapshot.

TABLE 1

HTTPS Command/Notification Channel Setup Message Format

| | |
|---|---|
| Purpose | Sends Command to Camera |
| Message Format | HTTPS <CommandURI> HTTP/1.1 |
| Authentication | Digest authentication using a valid Camera user or admin credential (see /OpenHome/Security/AAA/accounts for Camera user/admin accounts) |
| Mandatory Request Headers | Authorization |

TABLE 1-continued

| \multicolumn{2}{|c|}{HTTPS Command/Notification Channel Setup Message Format} |
| --- | --- |
| Mandatory Response Headers | Content-Type, Connection, Content-Length |
| Request Body | Varies depending on command, see Section 5. |
| Camera response | Varies depending on command, see Section 5. |
| Response body Variables | Varies depending on command, see Section 5. |
| CommandURI | Method and URI Varies depending on command, see Section 5. |
| accountCredential | Base64 encoding of (<adminUser>:<password>), where <adminUser> and <password> are defined in /OpenHome/Security/AAA/accounts. |

4.1.2 Camera Originated Notifications

Notifications can be delivered from Camera to Gateway via either 1) Camera outbound HTTPS connection or 2) Camera inbound polling via the "/OpenHome/System/Poll/notifications" retrieval Command. Depending on the configuration of the notification URL parameter, the Camera delivers Notifications using one of the two methods above. For example, the following Notification URL specifies using the Camera outbound HTTPS Notification method:
https://gateway.icontrol.com/<eventAlertURL>
Whereas the following Notification URL specifies using Camera inbound polling for Notification delivery:
poll://<eventAlertURL>
Each of the two Notification delivery types is described in more detail below.

4.1.2.1 Camera Originated Outbound Notifications

To initiate a Camera originated outbound Notification, Camera starts HTTP/HTTPS connection to Gateway via method and URI <NotificationURI> specified by the Notification (see Section 5). HTTP 1.1 persistent connections should be utilized in order to optimize connection usage. The following request format is used:

TABLE 2

| \multicolumn{2}{|c|}{Camera Originated Outbound Notification Message Format} |
| --- | --- |
| Purpose | Sends Notification to Gateway |
| Message Formats | HTTPS <NotificationURI> HTTP/1.1 or HTTP <NotificationURI> HTTP/1.1 Note: only one Command utilizes the non-secure HTTP mode (see Section 5.) |
| Authentication | Digest authentication using <SerialNumber> and <SharedSecret> |
| Mandatory Request Headers | Host, Authorization Pragma: no-cache, Cache-Control: no-cache, Date |
| Mandatory Response Headers | Content-Type, Connection, Content-Length |
| Request Body | Varies depending on command, see Section 5. |
| Camera response Variables | Varies depending on command, see Section 5. |
| NotificationURI | Method and URI Varies depending on command, see Section 5. |
| basicCredential | Base64 encoding of (<SerialNumber>:<SharedSecret>), where <SerialNumber> and <SharedSecret> are defined in Section 5. |

If Camera is unable to establish a Camera Originated Outbound Notification connection to Gateway, Camera is responsible for re-initiating the connection up to <retries> times. Upon initial failure, the Camera should wait for a random delay between <minWait> and <stepsizeWait>. Each subsequent retry attempt should backup increasingly (preferably exponentially) using industry standard practices such as "truncated binary exponential backoff", or using a multiple of <stepsizeWait>), up to maximum delay of <maxWait>. If Camera is still unable to establish connection after <abcde>, Camera should log this error and disable further attempts to send the current notification. <retires>, <stepsizeWait>, etc. are defined in/OpenHome/System/ConfigurationData/Timers' HttpNotificationTimers elements.

4.1.2.2 Notifications via Inbound Polling

If specified in the Notification URL (e.g., poll://<url>), Camera will queue Notifications for retrieval by the Gateway instead of sending Notifications via outbound HTTP/HTTPS connections. The "/OpenHome/System/Poll/notifications" Command is used to establish a connection from Gateway to Camera for polling Notifications. In this mode, Gateway will establish a semi-persistent HTTP/HTTPS connection to the Camera and wait (or linger) for Notification events. Upon receiving the/OpenHome/System/Poll/notifications Command from the Gateway, if the Camera has Notification events available, it will respond with 200 OK containing Notifications right away. However, if no Notification is pending, the Camera will wait for a Notification or until the <linger> duration has expired before responding with 200 OK. Upon receiving a 200 OK response, the Gateway will issue another/OpenHome/System/Poll/notifications Command to poll for new Notifications. Due to the use of HTTP 1.1 persistent connection, more than one request-response sequences may be sent over a single underlying TCP connection. If the Connection header of the HTTP request contains "Keep-Alive", the Camera must not close the connection after sending a 200 OK response to the Gateway.

4.2 Interface Type 2—Secure Streaming Media Channels

All multi-media acquisition channels defined in section 5.8.3 are utilized for secured upload or live streaming of media contents from the Camera to the Gateway. Currently there are five forms of media acquisition:

1. RTSP Streaming Media Channel—used to transport RTSP video
2. MJPEG Streaming Media Channel—used to transport MJPEG video
3. HTTP Live Streaming Media Channel—used to transport HLS video
4. FLV Streaming Media Channel—used to transport FLV video
5. Image Media Channel—used to obtain a single image from the camera Each of these five types is described in more detail in subsequent sections. Note that when media tunneling is used for live media streaming, the Camera shall only authenticate the user via basic Auth, not digest. Any authorized gateway with the proper credentials can initiate a request. If a tunnel is used, TLS is required to be used for transport. If tunnels are not used (i.e., local video/local client access), then Wi-Fi network security is used.

In addition to the five tunneled media channel modes, a Camera must also support direct, non-tunneled media channels defined in section 5.8.3. This mode may be used for direct client to camera access over a LAN without the use of an intervening Gateway.

4.2.1 RTSP Media Channel

The RTSP Media Channel is used to tunnel RTSP video over a TLS connection between the Camera and the Gateway. Upon receiving a Gateway originated Command (which is sent over the Command-Notification Channel), the Camera establishes a RTSP Media Channel connection to the Gateway via the following procedures:

1. Camera receives /Streaming/MediaTunnel/Create command from Gateway with the following parameters: <relayGatewayAddress>, <sessionID>, <failureURL>.
2. Camera initiates a TLS connection to the Relay Gateway at <gatewayURL>. This step may require a DNS lookup for IP address based on the hostname.
3. Camera and Gateway complete TLS negotiation per RFC 2246 (TLS Protocol Version 1.0). Camera must utilize TLS host name verification while establishing connection.
4. Camera sends a HTTP POST request to Gateway in accordance with Table 3 and Table 4.
5. Camera waits for RTSP messages from Gateway. If no RTSP message is received after <MaxMediaTunnelReadyWait> timeout, Camera tears down existing TLS connection and restart a new connection per Step 1. An example of <MaxMediaTunnelReadyWait> is 120 seconds.
6. Upon arrival of RTSP message(s) to Camera (usually after an end-user starts a live video session), normal RTSP request-response negation is initiated per RFC 2326 (Real Time Streaming Protocol)
7. RTP/RTCP media streams from Camera to Gateway are sent over the existing TLS connection, using RTSP interleaved transport mode per RFC 2326.
8. Camera receives RTSP TEARDOWN from Gateway, replies with 200 OK, and then starts to disconnect TLS session with Gateway

4.2.1.1 State Transition Diagram

Figure 26:
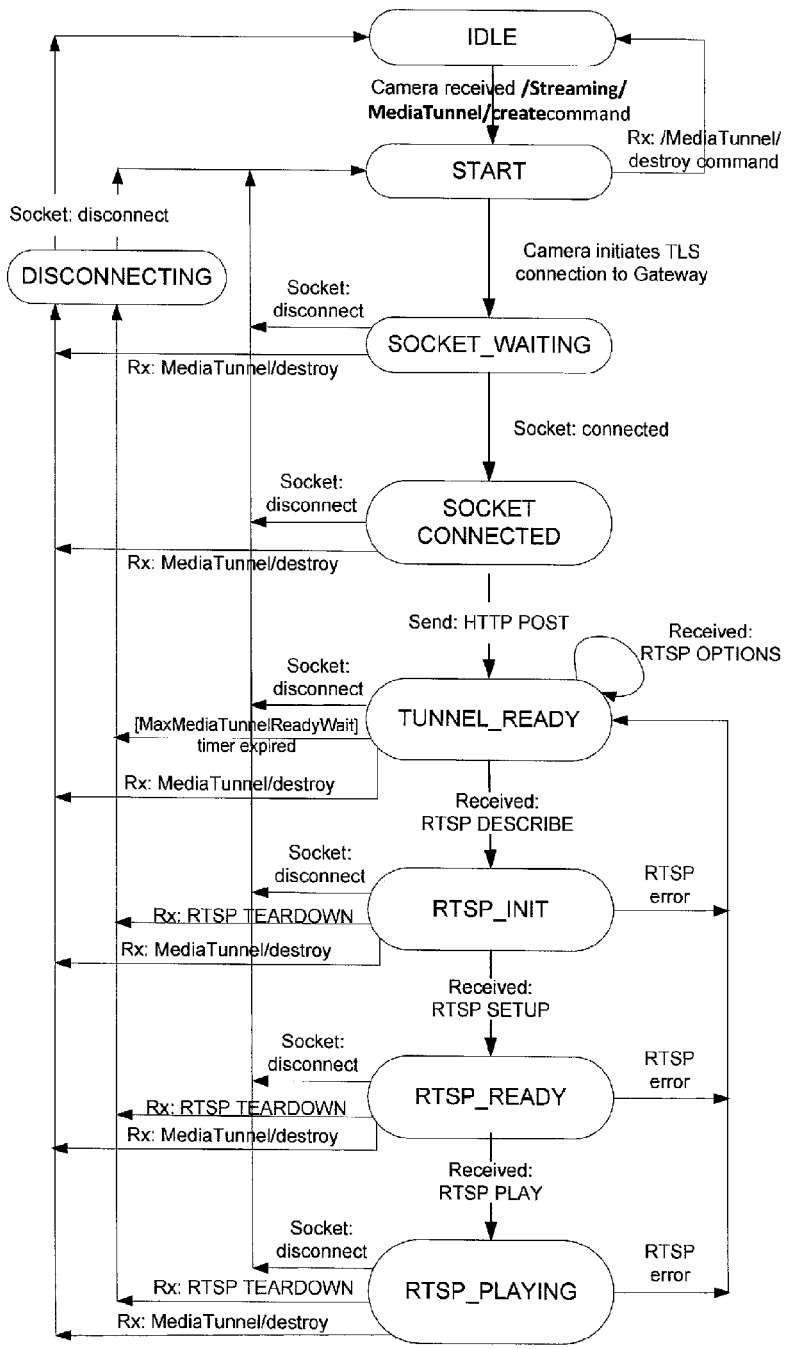
FIG. 26 is a flow diagram of the state transition for a sequence, under an embodiment.

The state transition diagram for the above sequence is illustrated in FIG. 26:

The various states in FIG. 26 are described in more detail below:

IDLE state represents idle state where no media tunnel needs to be built.

START state represents start initiating Media Channel state where the Camera initiates TLS connection with Gateway. Upon entering this state, Camera should increment its number of retries counter and check if it has reached maximum <retries> without successful connection. If maximum <retries> is reached, Camera should return to IDLE state. Before retrying connection, Camera should wait for a delay (e.g., delay equals number of retries*<stepsizeWait>) before starting TLS connection.

SOCKET_WAITING state represents waiting for network layer to complete establishing a TLS connection between the Camera and the Gateway.

SOCKET_CONNECTED state represents where TLS negotiation was successfully completed between the Camera and the Gateway.

TUNNEL_READY state represents where the media tunnel is established and the Camera is waiting for a RTSP request from the Gateway. If Camera stays in TUNNEL_READY state for greater than <maxMediaTunnelReadyWait> time, Camera should transition to START state.

RTSP_INIT state represents state where the Camera received at least one RTSP DESCRIBE request from the Gateway.

RTSP_READY state represents state where the Camera is waiting for RTSP PLAY or additional RTSP SETUP requests.

RTSP_PLAYING state represents state where the Camera is streaming media to the Gateway. Camera should resets its number of retry counter to zero.

DISCONNECTING state represents state where the Camera is tearing down TLS connection with the Gateway.

4.2.1.2 Sample Call Flows

Figure 27:
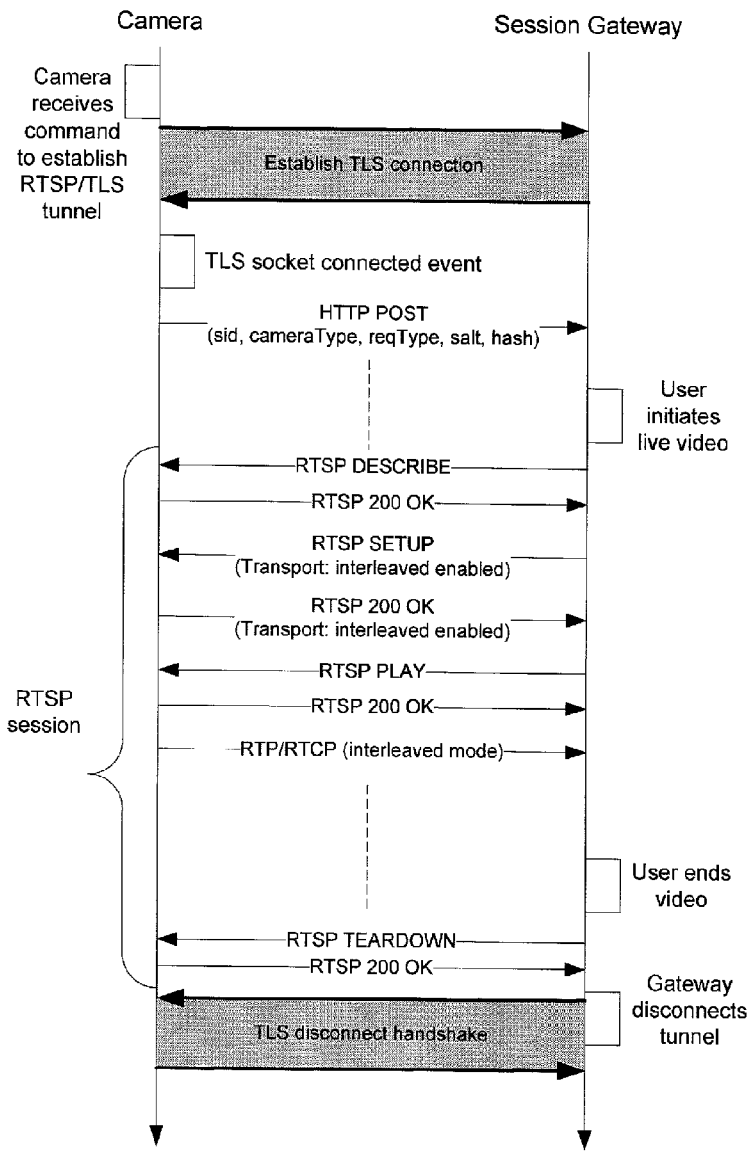
FIG. 27 is a flow diagram illustrating sample call flows, under an embodiment.

See FIG. 27.

4.2.1.3 HTTPS POST Format for Tunnel Creation

Format of HTTPS POST URI from Camera to Gateway is described in more detail below. This request is sent from Camera to Gateway while transitioning from the SOCKET_CONNECTED state to the TUNNEL_READY state.

TABLE 3

Media Channel HTTP POST Format

| | |
|---|---|
| Purpose | Establish Media tunnel within a TLS connection |
| Message Format | POST /<GatewayAddress>/<MediaTunnelURI> HTTP/1.1 |
| Authentication | None in HTTP header (authentication required in RTSP header) |
| Mandatory Request Headers | None |
| POST Body | One or more tunneled RTSP response messages |

TABLE 3-continued

Media Channel HTTP POST Format

| | |
|---|---|
| Response from Gateway | One or more tunneled RTSP request messages and RTP/RTCP media packets |
| Error responses | Standard HTTP response codes (e.g., 404) |
| Example POST URI | POST /1607349153877243391/icamera/sslrelay/1308677301445/889229dcd864691f fcd4bff342153ad7/ HTTP/1.0 |

TABLE 4

Media Channel HTTP POST Variables Description

| Variable Name | Format | Description/Notes |
|---|---|---|
| GatewayAddress | hostname:port | Gateway hostname and port or could be IP address and port. See /OpenHome/Streaming/MediaTunnel/create |
| MediaTunnelURI | URI | URI used in the Create Tunnel POST. Derived from /OpenHome/Streaming/MediaTunnel/create Command parameter. |

4.2.1.4 RTSP/RTP/RTCP Usage Clarifications

Camera should support RTSP per RFC 2326 (Real-Time Streaming Protocol) and RTP/RTCP per RFC 3550 (A Transport Protocol for Real-Time Applications). Furthermore, the following usage clarifications are to be followed:

1. Camera should support RTSP interleaved transport mode per RFC 2326
2. Camera should support at the minimum, Basic Authorization per RFC 2326
3. Camera should not require the Gateway to transmit RTCP packets, since RTCP is optional per RFC 3550 1.

4.2.2 MJPEG Media Channel

The MJPEG Media Channel is used to tunnel MJPEG streams over a TLS connection between the Camera and the Gateway. The MJPEG Media Channel is very similar to the RTSP Media Channel, with the exception that MJPEG streams are transported over the tunnel and RTSP protocol is not used to negotiate a session. Upon receiving the /Streaming/MediaTunnel/create Command (which was sent over the Command-Notification Channel), the Camera establishes a MJPEG Media Channel connection to the Gateway via the following sequence:

1. Camera receives /Streaming/MediaTunnel/create command from Gateway with the following parameters: <relayGatewayAddress>, <sessionID>, <failureURL>.
2. Camera initiates a TLS connection to the Relay Gateway at <gatewayURL> after DNS lookup.
3. Camera and Gateway complete TLS negotiation per RFC 2246 (TLS Protocol Version 1.0). Camera must utilize TLS host name verification while establishing connection.
4. Camera sends a HTTP POST request to Gateway in accordance with Table 3 and Table 4 described herein.
5. Camera waits for a HTTP GET request from Gateway. If no HTTP GET request is received after <MaxMediaTunnelReadyWait> timeout, Camera tears down existing TLS connection and restart a new connection per Step 1. An example of <MaxMediaTunnelReadyWait> is 120 seconds.
6. Camera sends a stream of MJPEG data to Gateway over the previously established TLS tunnel as part of its 200 OK response. A MJPEG stream consists of one or more JPEG frames separated by a delineating boundary string defined by the Camera.

4.2.2.1 State Transition Diagram

Figure 28:
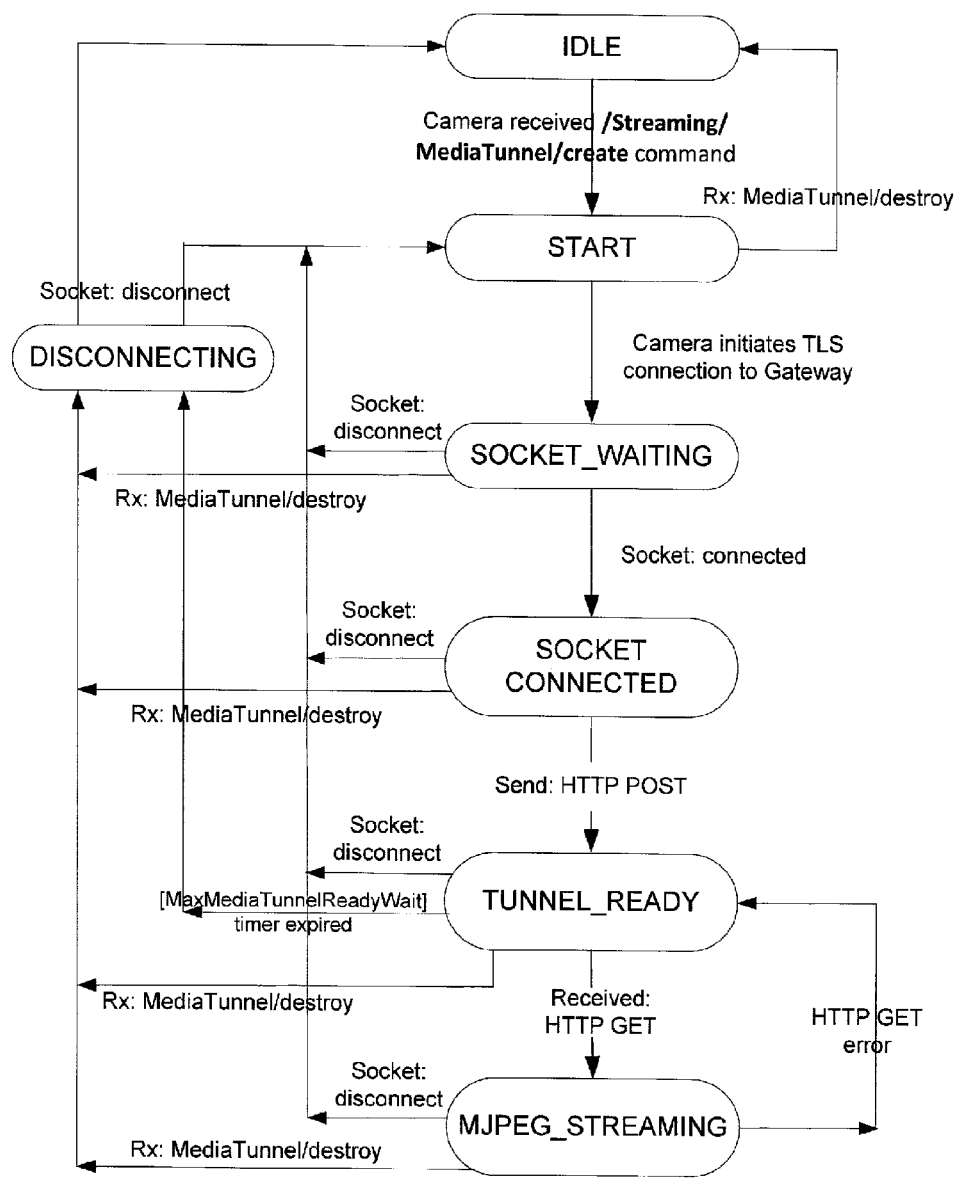
FIG. 28 is a flow diagram of the state transition for a sequence, under an embodiment.

The state transition diagram for the above sequence is illustrated in FIG. 28.

The various states are described in more detail below:

IDLE state represents idle state where no media tunnel needs to be built.

START state represents start initiating Media Channel state where the Camera initiates TLS connection with Gateway. Upon entering this state, Camera should increment its number of retries counter and check if it has reached maximum <retries> without successful connection. If maximum <retries> is reached, Camera should return to IDLE state. Before retrying connection, Camera should wait for a delay (e.g., delay equals number of retries*<stepsizeWait>) before starting TLS connection.

SOCKET_WAITING state represents waiting for network layer to complete establishing a TLS connection between the Camera and the Gateway.

SOCKET_CONNECTED state represents state where TLS connectivity is established between the Camera and the Gateway.

TUNNEL_READY state represents state where the media tunnel is established and the Camera is waiting for a HTTP GET request from the Gateway. If Camera stays in TUNNEL_READY state for greater than <maxMediaTunnelReadyWait> time, Camera should transition to START state.

STREAMING state represents state where the Camera has received a valid HTTP GET request and is streaming media to the Gateway. Camera should resets its number of retry counter to zero.

DISCONNECTING state represents state where the Camera is tearing down TLS connection with the Gateway.

4.2.2.2 MJPEG HTTP POST Tunnel Creation Format

Format of HTTPS POST URI from Camera to Gateway is the same the HTTPS POST request format in Section 4.2.1.3.

4.2.2.3 HTTP GET Start MJPEG Streaming Format

Format of HTTP GET URI from Gateway to Camera is described below:

TABLE 5

MJPEG HTTP GET Format

| | |
|---|---|
| Purpose | Request by Gateway to start MJPEG streaming. This request is sent when the Gateway wants the Camera to start MJPEG streaming. |
| Message Format | HTTP GET /<MJPEG_Path> HTTP/1.0<br>Authorization: Basic <BasicCredential> |
| Authentication | HTTP authorization: Basic |
| Mandatory Request Headers | Authorization |
| Response from Gateway | HTTP/1.0 200 OK<br>Content-Type: multipart/x-mixed-replace;boundary=<randomString><br>follow by one or more JPEG frames delineated by:<br>--<randomString><br>Content-type: image/jpeg\r\n<br>Content-Length: <jpeg image length in bytes>\r\n<br>\r\n<br><binary JPEG data> |
| Error responses | Standard HTTP response codes (e.g., 404) |
| Example GET | GET /OpenHome/Streaming/channels/2/mjpeg HTTP/1.0<br>Authorization: Basic aWN4OGdla0Y6bG5IMXdQQ2g= |

TABLE 6

MJPEG HTTP GET Variables

| Variable Name | Format | Description/Notes |
|---|---|---|
| MJPEG_Path | URI path | Path to signaling start MJPEG streaming. This value is read from the Camera. |
| BasicCredential | Alpha numeric string | Base64 encoding of <username:password> for accessing the camera |
| randomString | String | Delineator string generated by the Camera used to mark boundaries between JPEG frames within a MJPEG stream |

4.2.3 HTTP Live Streaming Media Channel

The HTTP Live Streaming (HLS) Media Channel is used to tunnel HLS streams over a TLS connection between the Camera and the Gateway. The HLS Media Channel is very similar to the RTSP Media Channel, with the exception that HLS streams are transported over the tunnel and HLS request/response protocols are used to transfer media segments. Upon receiving the /Streaming/MediaTunnel/create Command (which was sent over the Command-Notification Channel), the Camera establishes a HLS Media Channel connection to the Gateway via the following sequence:

1. Camera receives /Streaming/MediaTunnel/create command from Gateway with the following parameters: <relayGatewayAddress>, <sessionID>, <failureURL>.
2. Camera initiates a TLS connection to the Relay Gateway at <gatewayURL> after DNS lookup.
3. Camera and Gateway complete TLS negotiation per RFC 2246 (TLS Protocol Version 1.0). Camera must utilize TLS host name verification while establishing connection.
4. Camera sends a HTTP POST request to Gateway in accordance with Table 3 and Table 4 described herein.
5. Camera waits for a HTTP GET request from Gateway for retrieving the initial HLS Playlist file. If no HTTP GET request is received after <MaxMediaTunnelReadyWait> timeout, Camera tears down existing TLS connection and restarts a new connection per Step 1. An example of <MaxMediaTunnelReadyWait> is 120 seconds.
6. Camera sends a HLS Playlist File to Gateway over the previously established TLS tunnel as part of its 200 OK response.
7. Camera waits for one or more HTTP GET request(s) from Gateway for retrieving HLS media segments or updated HLS Playlist.
8. Camera responds to HTTP GET with HLS media segment or Playlist.

4.2.4 FLV Streaming Media Channel

The FLV Media Channel is used to tunnel FLV streams over a TLS connection between the Camera and the Gateway. The FLV Media Channel is very similar to the RTSP Media Channel, with the exception that FLV streams are transported over the tunnel and the FLV format is used to transfer media segments. Upon receiving the /Streaming/MediaTunnel/create Command (which was sent over the Command-Notification Channel), the Camera establishes a FLV Media Channel connection to the Gateway via the following sequence:

1. Camera receives /Streaming/MediaTunnel/create command from Gateway with the following parameters: <relayGatewayAddress>, <sessionID>, <failureURL>.
2. Camera initiates a TLS connection to the Relay Gateway at <gatewayURL> after DNS lookup.
3. Camera and Gateway complete TLS negotiation per RFC 2246 (TLS Protocol Version 1.0). Camera must utilize TLS host name verification while establishing connection.
4. Camera sends a HTTP POST request to Gateway in accordance with Table 3 and Table 4 described herein.
5. Camera waits for a HTTP GET request from Gateway. If no HTTP GET request is received after <MaxMediaTunnelReadyWait> timeout, Camera tears down existing TLS connection and restarts a new connection per Step 1. An example of <MaxMediaTunnelReadyWait> is 120 seconds.
6. Camera sends a FLV media segment to Gateway over the previously established TLS tunnel as part of its 200 OK response.
7. Camera waits for one or more HTTP GET request(s) from Gateway for retrieving FLV media segments.

8. Camera responds to HTTP GET with FLV media segment(s).

4.2.5 Image Media Channel

The Image Media Channel is used to tunnel a single snapshot image over a TLS connection between the Camera and the Gateway. Upon receiving the /Streaming/MediaTunnel/create Command (which was sent over the Command-Notification Channel), the Camera establishes a Image Media Channel connection to the Gateway via the following sequence:

1. Camera receives /Streaming/MediaTunnel/create command from Gateway with the following parameters: <relayGatewayAddress>, <sessionID>, <failureURL>.
2. Camera initiates a TLS connection to the Relay Gateway at <gatewayURL> after DNS lookup.
3. Camera and Gateway complete TLS negotiation per RFC 2246 (TLS Protocol Version 1.0). Camera must utilize TLS host name verification while establishing connection.
4. Camera sends a HTTP POST request to Gateway in accordance with sections 4.2.1.2 and 4.2.1.3.
5. Camera waits for a HTTP GET request from Gateway. If no HTTP GET request is received after <MaxMediaTunnelReadyWait> timeout, Camera tears down existing TLS connection and restart a new connection per Step 1. An example of <MaxMediaTunnelReadyWait> is 120 seconds.
6. Camera sends a binary image data to Gateway over the previously established TLS tunnel as part of its 200 OK response.

4.3 Interface Type 3—Media Upload Channels

The Media Upload Channel is used to transport video clips, still frame images, or event notifications from the Camera to the Session Gateway. The Camera utilizes standard HTTPS POST procedures to transfer media content. All media upload channels must utilize secure TLS and digest authentication to encrypt and secure its content. Furthermore, Camera must utilize TLS host name verification while establishing secure connections. Media Upload Channels can be triggered by either a Premise Gateway originated Command (e.g., CaptureVideoClip) or a Camera Originated event (e.g., motion detected, capture video and upload). Three types of Media Upload Channels are defined—1) Video Clip Upload, 2) Image Upload, and 3) event notification. The following subsections describe their specific formats.

4.3.1 Video Clip Upload

Format of Video Clip HTTPS POST from Camera to Gateway is described below:

TABLE 7

| Video Clip Upload Request URI format | |
|---|---|
| Purpose | Upload video clip from Camera to Gateway |
| Server Address | <UploadGatewayAddress> |
| Message Format | HTTPS POST /<postVideoClipURI> HTTP/1.1<br>Authorization: Basic <basicCredential> |
| Authentication | HTTP Digest Authentication (with <SerialNumber> and <SharedSecret>) |
| Mandatory Standard Request Headers | Host, Content-Length, Content-Type, Date, Authorization |
| Mandatory iControl Request Header | X-Capture-Time: <capturedTimestamp> |
| POST Body | Video clip data |
| Response from Gateway | Standard HTTP response codes (e.g., 200 OK) |
| Error responses | Standard HTTP response codes (e.g., 404) |

TABLE 8

| Video Clip Upload variables | | |
|---|---|---|
| Variable Name | Format | Description/Notes |
| UploadGatewayAddress | hostname and port | Hostname and port of Gateway handling media upload. |
| postVideoClipURI | URI | Unique URI supplied by Gateway in the media upload command |
| capturedTimestamp | UTC | timestamp Timestamp at the Camera when media's 1$^{st}$ frame was captured |

4.3.2 Image Upload

Format of Image HTTPS POST is described below:

TABLE 9

| Image Upload Request URI format | |
|---|---|
| Purpose | Upload still image from Camera to Gateway |
| Server Address | <UploadGatewayAddress> |
| Message Format | HTTPS POST /<postImageURI> HTTP/1.1<br>Authorization: Basic <basicCredential> |

TABLE 9-continued

Image Upload Request URI format

| | |
|---|---|
| Authentication | HTTP Digest (with <SerialNumber> and <SharedSecret>) |
| Mandatory Standard Request Headers | Host, Content-Length, Content-Type (image/jpeg), Date, Authorization |
| Mandatory Custom Request Header | X-Capture-Time: <capturedTimestamp> |
| POST Body | Image data |
| Response from Gateway | Standard HTTP response codes (e.g., 200 OK) |
| Error responses | Standard HTTP response codes (e.g., 404) |

TABLE 10

Image Upload variables

| Variable Name | Format | Description/Notes |
|---|---|---|
| UploadGatewayAddress | hostname and port | Hostname and port of Gateway handling media upload. This address is a variable on Camera configurable by Gateway. |
| postImageURI | URI | Unique URI supplied by Gateway in the media upload command |
| capturedTimestamp | UTC timestamp | Timestamp at the Camera when image was captured |

4.3.3 Event Notification Upload

Format of Event Notification HTTPS POST is described below:

TABLE 11

Event Notification Request URI format

| | |
|---|---|
| Purpose | Upload event notifications from Camera to Gateway |
| Server Address | <UploadGatewayAddress> |
| Message Format | HTTPS POST /<eventNotifyURI> HTTP/1.1<br>Authorization: Basic <basicCredential> |
| Authentication | HTTP Digest Authentication (with <SerialNumber> and <SharedSecret>) |
| Mandatory Standard Request Headers | Host, Content-Length, Content-Type (application/xml), Date, Authorization |
| Mandatory Custom Request Header | X-Capture-Time: <capturedTimestamp> |
| POST Body | XML Body |
| Response from Gateway | Standard HTTP response codes (e.g., 200 OK) |
| Error responses | Standard HTTP response codes (e.g., 404) |

TABLE 12

Event Notification variables

| Variable Name | Format | Description/Notes |
|---|---|---|
| UploadGatewayAddress | hostname and port | Hostname and port of Gateway handling event notification. |
| eventNotifyURI | URI | Supplied by Gateway |
| capturedTimestamp | UTC timestamp | Timestamp at the Camera when event occured |

4.3.4 Media Upload Under Error Conditions

If error is encountered during a Video or Image Upload procedure, the Camera is responsible for re-initiating the upload procedure up to <retries> times. Upon initial failure, the Camera should wait for a random delay between <minWait> and <stepsizeWait>. Each subsequent retry attempt should backup increasingly (preferably exponentially) using industry standard practices such as "truncated binary exponential backoff", or using a multiple of <stepsizeWait>), up to maximum delay of <maxWait>. If Camera is still unable to upload media after <maxMediaUploadRetries>, Camera should send a MediaUploadFailure Notification event to the Gateway via the HTTPS Command/Notification Channel.

Example Simple Backoff Timer Calculations

First connection retry wait time=random(0-<stepsizeWait>)

Subsequent retry wait time=max(<maxWait>, #reRetryCount*<stepsizeWait>)

4.4 Interface Type 4—Local Bootstrap Procedures

Local Bootstrap Procedures consist of 1) Camera discovery and 2) Camera configuration. Each step is described in more detail below:

Step 1—Camera Discovery

Camera discovery is achieved using UPnP's SSDP (Simple Service Discovery Protocol) process, where the Premise Gateway searches for one or more Cameras using the Camera's pre-configured USN (Unique Service Name). Per Section 3, Camera must be pre-configured with a USN specified by iControl. Please refer to the UPnP specification (www.upnp.org) for a definition of the UPnP discovery procedure.

After discovery, the iControl premises equipment configures the camera, including configuration of FQDNs for services (e.g., Live Media, Media Upload).

Step 2—Camera Configuration

If a Camera is discoverable via Step 1, and end-user/installer confirms intention to activate a specific Camera, the Premise Gateway will issue the following Commands via the HTTP/HTTPS Command Channel (see Section 4.1) to configure the Camera:

1. GET /<ipAddress>/index/—and walk index tree to discover API resource availability and URI
2. GET /<ipAddress>/System/deviceInfo—to determine device model, version, etc.
3. If firmware upgrade is required:
    a. POST /<ipAddress>/System/updateFirmware
    b. Wait for upgrade to finish (including wait for reboot). This may be accomplished by polling the command /OpenHome/System/upgradeFirmware/status.
    c. GET /<ipAddress>/System/deviceInfo—retrieve deviceInfo again
4. PUT /<ipAddress>/System/ConfigurationData/configFile—upload a complete configuration file to Camera based on <deviceInfo> data.
5. If reboot required, /PUT/<ipAddress>:<port>/System/reboot
6. (Optional) POST /<ipAddress>:<port>/Security/updateSSLCertificate/server—this additional Command may be issued if server certificate is to be used.

<ipAddress> is the Camera IP address discovered in Step 1. All Commands above require administrative account priviledges, therefore, the pre-configured administration account should be used to issue the above Commands

5 COMMAND/NOTIFICATION DATA TYPES

The following tables list Commands and Notifications request and responses that can be transmitted over the HTTPS Command/Notification Channel. All Commands and Notifications requests must be responded to as soon as possible or send a HTTP 202 response in the event of delays, and the receiving device should not block the channel from receiving additional requests.

5.1 Data Type Overview

Many data types defined in this chapter may be similar or have the same characteristics as defined by the Physical Security Interoperability Alliance (PSIA, http://www.psialliance.org). In particular, the PSIA Service Model (Physical Security Interoperability Alliance Service Model version 1.0, revision 1.2) and the PSIA IPMD (Pysical Security Interoperability Alliance IP Media Device API Specification version 1.1, revision 1) documents define common terminologies and data structures used in this Section. However, new service commands and modifications were necessary to PSIA's model in order to support iControl's interface.

| Command Category | Requirement | |
|---|---|---|
| System | Requirement | |
| /OpenHome/api | Required | Required |
| /OpenHome/System/reboot | Required | |
| /OpenHome/System/updateFirmware | Required | |
| /OpenHome/System/updateFirmware/status | Required | |
| /OpenHome/System/ConfigurationData/configFile | Required | |
| /OpenHome/System/ConfigurationData/Timers | Required | |
| /OpenHome/System/factoryReset | Required | |
| /OpenHome/System/deviceInfo | Required | |
| /OpenHome/System/time | Required | |
| /OpenHome/System/time/timeZone | Required | |
| /OpenHome/System/time/ntpServers | Required | |
| /OpenHome/System/time/ntpServers/[UID] | Required | |
| /OpenHome/System/logging | Required | |
| /OpenHome/System/logging/logData | Required | |
| Notification: Logging Event | Required | |
| /OpenHome/System/HTTP/Server | Required | |
| /OpenHome/System/history | Required | |
| /OpenHome/System/history/configuration | Required | |
| /OpenHome/System/Poll/notifications | Required | |
| /OpenHome/System/Ping | Required | |

-continued

| Command Category | Requirement | |
|---|---|---|
| System/Network | Requirement | |
| /OpenHome/System/Network/interfaces | Required ☐ | |
| /OpenHome/System/Network/interfaces/[UID] | Required ☐ | Required |
| /OpenHome/System/Network/interfaces/[UID]/ipAddress | Required ☐ | |
| /OpenHome/System/Network/interfaces/[UID]/wireless | Required | |
| /OpenHome/System/Network/interfaces/[UID]/wireless/status | Required | |
| /OpenHome/System/Network/interfaces//[UID]/ieee802.1x | Required ☐ | |
| /OpenHome/System/Network/interfaces/[UID]/discovery | Required ☐ | |
| System/Audio | Requirement | |
| /OpenHome/System/Audio/channels | Required ☐ | Optional |
| /OpenHome/System/Audio/channels/[UID] | Required ☐ | |
| System/Video Input Settings | Requirement | |
| /OpenHome/System/Video/inputs | Required ☐ | Required |
| /OpenHome/System/Video/inputs/channels | Required ☐ | |
| /OpenHome/System/Video/inputs/channels/[UID] | Required | |
| Security | Requirement | |
| /OpenHome/Security/updateSSLCertificate/client | Required | Required |
| /OpenHome/Security/updateSSLCertificate/server | Required | |
| /OpenHome/Security/updateSSLCertificate/server/signedCert | Required | |
| Request for updateSSLCertificate | | |
| /OpenHome/Security/AAA/accounts | Required | |
| /OpenHome/Security/AAA/accounts/[UID] | Required | |
| /OpenHome/Security/Authorization/ | Optional | |
| Streaming | Requirement | |
| /OpenHome/Streaming/channels | Required ☐ | Required |
| /OpenHome/Streaming/channels/[UID] | Required ☐ | |
| /OpenHome/Streaming/channels/[UID]/capabilities | Required ☐ | |
| /OpenHome/Streaming/status | Required ☐ | |
| /OpenHome/Streaming/channels/[UID]/status | Required ☐ | |
| /OpenHome/Streaming/channels/[UID]/video/upload | Required ☐ | |
| /OpenHome/Streaming/channels/[UID]/requestKeyFrame | Required | |
| /OpenHome/Streaming/channels/[UID]/mjpeg | Required | |
| /OpenHome/Streaming/channels/[UID]/rtsp | Required | |
| /OpenHome/Streaming/channels/[UID]/flv | Required | |
| /OpenHome/Streaming/channels/[UID]/picture | Required ☐ | |
| /OpenHome/Streaming/channels/[UID]/picture/upload | Required ☐ | |
| /OpenHome/Streaming/channels/[UID]/hls/playlist | Optional | |
| /OpenHome/Streaming/channels/[UID]/hls/<MediaSegment> | Optional | |
| Notification: MediaUploadEvent | Required | |
| MediaTunnel | Requirement | |
| /OpenHome/Streaming/MediaTunnel | Required | Required |
| /OpenHome/Streaming/MediaTunnel/[UID]/status | Required | |
| /OpenHome/Streaming/MediaTunnel/create | Required | |
| /OpenHome/Streaming/MediaTunnel/[UID]/destroy | Required | |
| Notification: CreateMediaTunnelFailure | Required | |
| PTZ | Requirement | |
| /OpenHome/PTZ/channels | Required ☐ | Optional |
| /OpenHome/PTZ/channels/[UID] | Required ☐ | |
| /OpenHome/PTZ/channels/[UID]/homePosition | Required ☐ | |
| /OpenHome/PTZ/channels/[UID]/relative | Required ☐ | |
| /OpenHome/PTZ/channels/[UID]/absolute | Required ☐ | |
| /OpenHome/PTZ/channels/[UID]/status | Required ☐ | |
| Detection | Requirement | |
| /OpenHome/EventMotionDetection/PIR | Optional | |
| /OpenHome/Event/MotionDetection/PIR/[UID]/ | (Required) | Optional |
| /OpenHome/Event/MotionDetection/video | Optional | |
| /OpenHome/Event/MotionDetection/video/[UID] | (Required) | |
| /OpenHome/Event/MotionDetection/video/[UID]/capabilities | (Required) | |

| Command Category | Requirement | |
|---|---|---|
| /OpenHome/Event/SoundDetection | Optional | |
| /OpenHome/Event/SoundDetection/[UID] | (Required) | |
| /OpenHome/Event/TemperatureDetection | Optional | |
| /OpenHome/Event/TemperatureDetection/[UID] | (Required) | |
| /OpenHome/Event/TemperatureDetection/[UID]/Current | (Required) | |

| Events | Requirement | |
|---|---|---|
| /OpenHome/Event | Required | Optional |
| /OpenHome/Event/triggers | Required | (Required if |
| /OpenHome/Event/triggers/[UID] | Required | Detection |
| /OpenHome/Event/triggers/[UID]/notifications | Required | Services |
| /OpenHome/Event/triggers/[UID]/notifications/[NOTIFYID] | Required | implemented) |
| /OpenHome/Event/notification | Required | |
| /OpenHome/Event/notification/methods | Optional | |
| /OpenHome/Event/notification/host | Required | |
| /OpenHome/Event/notification/host/[UID] | Required | |
| Notification: EventAlert | Required | |

5.1.1 [UID] URI Path Elements

All instances of [UID] in the URI path refer to unique identifiers that reference a particular configuration or channel. The [UID] may be generated by the device, or created by the external caller.

5.1.2 Manufacturer-Specific Profile Extensions

The OpenHome Camera Interface XSD can be extended with manufacturer-specific profiles.

5.2 Service Discovery of Camera Resources

Service discovery of OpenHome Data Type resources and their URLs can be achieved by retrieving (GET) from the following URI:

/OpenHome/api

In response the Camera should return the following XML data structure containing all URI resources supported by the device:

```
<!-- API -->
<xs:element name="api">
  <xs:complexType>
    <xs:sequence>
      <xs:element name="command" type="StringCap" minOccurs="1" maxOccurs="unbounded" />
    </xs:sequence>
    <xs:attribute name="version" type="xs:string" use="required" />
  </xs:complexType>
</xs:element>
```

If a command contains a channel number (i.e. [UID]) then the actual channel number is not required. Instead the command should use the tag element [UID].

The Camera may support its own custom commands through the namespace /OpenHome/Custom. If a Camera does implement custom services then these service URLs should be reflected in the /OpenHome/api XML response.

5.3 /OpenHome/System Data Type Details

A list of Commands/Notifications and corresponding URIs are is described in the following subsections. The Type field in the table describes whether the URI is a Command or Notification, where a Command is a Gateway originated request and a Notification is a Camera originated request.

5.3.1 ResponseStatus XML Block

The ResponseStatus XML, block is used throughout this Section. It is defined as:

ResponseStatus XML Block

```
<!-- ID -->
<xs:simpleType name="Id">
  <xs:restriction base="xs:string">
    <!-- TODO -->
  </xs:restriction>
</xs:simpleType>
<!-- StatusCode -->
<xs:simpleType name="StatusCode">
  <xs:restriction base="xs:int">
    <xs:minInclusive value="0">
    <xs:maxInclusive value="7">
  </xs:restriction>
  <!-- 0=1-OK, 2-Device Busy, 3-Device Error, 4-Invalid Operation, 5-Invalid XML Format, 6-Invalid XML Content; 7-Reboot Required-->
</xs:simpleType>
<!-- ResponseStatus -->
<xs:element name="ResponseStatus" type="ResponseStatus"/>
<xs:complexType name="ResponseStatus">
  <xs:sequence>
    <xs:element name="requestURL" type="xs:anyURI" />
    <xs:element name="statusCode" type="StatusCode" />
    <xs:element name="statusString" type="xs:string" />
    <xs:element name="id" type="Id" minOccurs="0" maxOccurs="1" />
    <xs:element name="Extensions" type="ResponseStatusExt" minOccurs="0" maxOccurs="1"/>
```

-continued

```
    </xs:sequence>
    <xs:attribute name="versionAttrib" type="xs:string" use="required"/>
</xs:complexType>
```

<requestURI> can be used by the Camera to indicate which resource resulted in the error in order to provide additional debugging information.

For Commands that return with an error response, Camera should include <statusString> indicating reason for the failure. This response is particularly important when only a sub-portion of a configuration block encounters error; in such situations, Camera should respond with <statusString> indicating the elements and reason for the error.

Camera should respond with "4-Invalid Operation" and set <statusString> to indicate the error, if any portion of the Command is not supported. For example, for a configuration Command, if a Camera supports most of the configuration but not all, Camera should return "4-Invalid Operation" with <statusString> indicating which portion of the configuration parameters the Camera deems as not supported.

5.3.2 Camera Configuration Changes

Camera configurations can be read or modified via HTTP/HTTPS access to URIs described in this Section. Unless explicitly specified, all configuration changes (if successful) should take effect immediately within the device before sending <ResponseStatus>. A configuration change must be fully atomic. This means that only one configuration command may be active at a time, and all updates within that command must fully succeed. If a new connection is fully established, past the authorization phase, while a configuration command is being processed the older connection must aborted, an error code returned to that connection, and the connection terminated. If any part of a configuration command cannot succeed then the entire update must be aborted and no update should occur. If an element within a configuration is not supported by the device then that element may be safely ignored, and thus will not cause an abort of the command.

The following list of URIs can postpone effective status until after a device reboot:
/OpenHome/System/updateFirmware
/OpenHome/System/ConfigurationData/configFile
/OpenHome/Security/updateSSLCertificate/client
/OpenHome/Security/updateSSLCertificate/server For reach URI request above, the Camera should respond with "Reboot Required" in the <ResponseStatus>"statusCode" element.

During the configuration process, Camera may send HTTP 503 with a Retry-After response to requests from clients. Upon completion, the camera should send HTTP 200 OK.

5.3.3 /OpenHome/System/reboot

| URI | /OpenHome/System/reboot | Type | Command |
|---|---|---|---|
| Function | Reboot device | | |
| Methods | Query String(s) | Inbound Data | Return Result |
| POST | | | <ResponseStatus> |
| Notes | The <ResponseStatus> XML data is returned beforethe device proceeds to reboot. | | |

5.3.4 /OpenHome/System/updateFirmware

| URI | /OpenHome/System/updateFirmware | Type | Command |
|---|---|---|---|
| Function | Update device firmware | | |
| Methods | Query String(s) | Inbound Data | Return Result |
| POST | | <FirmwareDownload> | <ResponseStatus> |
| Notes | Camera shall respond HTTP 200 OK once the firmware has been verified as downloadable. If the camera is unable to proceed (e.g., if it is busy), then it will respond accordingly with an error. The upgrade process, including download, may be monitored via the /updateFirmware/status command.<br>Camera shall download the firmware image in the specified URI regardless of the version number.<br>Checksum is the MD5 checksum of the firmware image. Camera should verify MD5 checksum after download before proceeding with firmware upgrade. If successful, device should auto-reboot after upgrade. | | |

FirmwareDownload XML Block

```
<!-- FirmwareDownload -->
<xs:element name="FirmwareDownload" >
    <xs:complexType>
        <xs:sequence>
            <xs:element name="url" type="StringCap" minOccurs="1" maxOccurs="1" />
            <xs:element name="fwVersion" type="StringCap" minOccurs="1" maxOccurs="1" />
            <xs:element name="md5checksum" type="StringCap" minOccurs="1" maxOccurs="1" />
            <xs:element name="Extensions" type="FirmwareDownloadExt" minOccurs="0" maxOccurs="1" />
        </xs:sequence>
        <xs:attribute name="version" type="xs:string" use="required" />
        <xs:attributeGroup ref="Capabilities" />
    </xs:complexType>
</xs:element>
```

5.3.5 /OpenHome/System/updateFirmware/status

| | | | |
|---|---|---|---|
| URI | /OpenHome/System/updateFirmware/status | Type | Command |
| Function | Update device firmware | | |
| Methods | Query String(s) | Inbound Data | Return Result |
| GET | | | <UpdateFirmwareStatus> |
| Notes | This URI allows the server to monitor the status of the firmware update and take additional steps, as necessary, in the event of an incomplete firmware update. Each call to /updateFirmware/status must return the status of the upgrade process at the moment in time the command is received. The command must be sent in a polling fashion if constant updates on the upgrade process are desired. | | |

UpdateFirmwareStatus XML Block

```
<!-- UpdateFirmwareStatus -->
<xs:element name="UpdateFirmwareStatus" >
    <xs:complexType>
        <xs:sequence>
            <xs:element name="updateSuccess" type="BooleanCap" minOccurs="1" maxOccurs="1" />
            <xs:element name="updateTime" type="DateTimeCap" minOccurs="1" maxOccurs="1" />
            <xs:element name="errorReason" type="StringCap" minOccurs="0" maxOccurs="1" />
            <xs:element name="url" type="StringCap" minOccurs="0" maxOccurs="1" />
            <xs:element name="fwVersion" type="StringCap" minOccurs="0" maxOccurs="1" />
            <xs:element name="downloadPercentage" type="PercentageCap" minOccurs="1" maxOccurs="1" />
            <xs:element name="checksumCheckSuccess" type="BooleanCap" minOccurs="0" maxOccurs="1" />
            <xs:element name="Extensions" type="UpdateFirmwareStatusExt" minOccurs="0" maxOccurs="1" />
        </xs:sequence>
        <xs:attribute name="version" type="xs:string" use="required" />
        <xs:attributeGroup ref="Capabilities" />
    </xs:complexType>
</xs:element>
```

5.3.6 /OpenHome/System/ConfigurationData/configFile

| | | | |
|---|---|---|---|
| URI | /OpenHome/System/ConfigurationData/configFile | Type | Command |
| Function | The function is used to get or set a configuration file for the device. This function is used to configure the device with all parameters at once rather than one resource at a time. | | |
| Methods | Query String(s) | Inbound Data | Return Result |
| GET | | | <ConfigFile> |
| PUT | | <ConfigFile> | <ResponseStatus> |
| Notes | For PUT operation, device should update its configuration file with the updated info and, if necessary, respond with "Reboot Required" in <ResponseStatus>. New configuration will take effect immediately or upon reboot. Config XML contains one or more configurable XML elements defined in this specification. | | |

ConfigFile XML Block

```
<xs:element name="ConfigFile" >
    <xs:complexType>
        <xs:sequence>
            <xs:element ref="ConfigTimers" minOccurs="0" maxOccurs="1" />
            <xs:element ref="DeviceInfo" minOccurs="0" maxOccurs="1" />
            <xs:element ref="Time" minOccurs="0" maxOccurs="1" />
            <xs:element ref="NTPServerList" minOccurs="0" maxOccurs="1" />
            <xs:element ref="LoggingConfig" minOccurs="0" maxOccurs="1" />
            <xs:element ref="HostServer" minOccurs="0" maxOccurs="1" />
            <xs:element ref="HistoryConfiguration" minOccurs="0" maxOccurs="1" />
            <xs:element ref="NetworkInterfaceList" minOccurs="0" maxOccurs="1" />
            <xs:element ref="AudioChannelList" minOccurs="0" maxOccurs="1" />
            <xs:element ref="VideoInput" minOccurs="0" maxOccurs="1" />
            <xs:element ref="UserList" minOccurs="0" maxOccurs="1" />
            <xs:element ref="StreamingChannelList" minOccurs="0" maxOccurs="1" />
            <xs:element ref="MotionDetectionList" minOccurs="0" maxOccurs="1" />
            <xs:element ref="SoundDetectionList" minOccurs="0" maxOccurs="1" />
            <xs:element ref="EventNotification" minOccurs="0" maxOccurs="1" />
        </xs:sequence>
```

```
    <xs:attribute name="version" type="xs:string" use="required" />
    <xs:attributeGroup ref="Capabilities" />
  </xs:complexType>
</xs:element>
```

5.3.7 /OpenHome/System/ConfigurationData/Timers

| | | | |
|---|---|---|---|
| URI | /OpenHome/System/ConfigurationData/Timers | Type | Command |
| Function | The function is used to get or set the timer specific configuration data for the device. | | |
| Methods | Query String(s) | Inbound Data | Return Result |
| GET | | | <ConfigTimers> |
| PUT | | <ConfigTimers> | <ResponseStatus> |
| Notes | See MediaTunnel and MediaUpload sections for <maxWait> timer descriptions.<br><minWait> is the minimum time to wait in milliseconds before the next retry<br><maxWait> is the maximum time to wait in milliseconds before the next retry<br><stepsizeWait> is the stepsize used in exponential backoff.<br><retries> is the maximum number of retries. If <retries> equals −1, the number of retries is infinite.<br>If error is encountered during an upload or connection procedure, the Camera is responsible for re-initiating the procedure up to <retries> times. Upon initial failure, the Camera should wait for a random delay between <minWait> and <stepsizeWait>. Each subsequent retry attempt should backup increasingly (preferably exponentially) using industry standard practices such as "truncated binary exponential backoff", or using a multiple of <stepsizeWait>), up to maximum delay of <maxWait>. | | |

ConfigTimers XML Block

```
<!-- ConfigTimers -->
<xs:complexType name="MediaTunnelReadyTimers">
  <xs:sequence>
    <!-- All wait times are in milliseconds -->
    <xs:element name="maxMediaTunnelReadyWait" type="IntegerCap" minOccurs="0" maxOccurs="1" />
    <xs:element name="minWait" type="IntegerCap" minOccurs="0" maxOccurs="1" />
    <xs:element name="maxWait" type="IntegerCap" minOccurs="0" maxOccurs="1" />
    <xs:element name="stepsizeWait" type="IntegerCap" minOccurs="0" maxOccurs="1" />
    <xs:element name="retries" type="IntegerCap" minOccurs="0" maxOccurs="1" />
  </xs:sequence>
</xs:complexType>
<xs:complexType name="MediaUploadTimers">
  <xs:sequence>
    <!-- All wait times are in milliseconds -->
    <xs:element name="minWait" type="IntegerCap" minOccurs="0" maxOccurs="1" />
    <xs:element name="maxWait" type="IntegerCap" minOccurs="0" maxOccurs="1" />
    <xs:element name="stepsizeWait" type="IntegerCap" minOccurs="0" maxOccurs="1" />
    <xs:element name="retries" type="IntegerCap" minOccurs="0" maxOccurs="1" />
    <xs:element name="UploadTimeout" type="IntegerCap" minOccurs="0" maxOccurs="1" />
  </xs:sequence>
</xs:complexType>
<xs:complexType name="XmppTimers">
  <xs:sequence>
    <!-- All wait times are in milliseconds -->
    <xs:element name="minWait" type="IntegerCap" minOccurs="0" maxOccurs="1" />
    <xs:element name="maxWait" type="IntegerCap" minOccurs="0" maxOccurs="1" />
    <xs:element name="stepsizeWait" type="IntegerCap" minOccurs="0" maxOccurs="1" />
    <xs:element name="retries" type="IntegerCap" minOccurs="0" maxOccurs="1" />
  </xs:sequence>
</xs:complexType>
<xs:element name="ConfigTimers" >
  <xs:complexType>
    <xs:sequence>
      <xs:element name="MediaTunnelReadyTimers" type="MediaTunnelReadyTimers" minOccurs="0" maxOccurs="1" />
      <xs:element name="MediaUploadTimers" type="MediaUploadTimers" minOccurs="0" maxOccurs="1" />
      <xs:element name="XmppTimers" type="XmppTimers" minOccurs="0" maxOccurs="1" />
      <xs:element name="Extensions" type="ConfigTimersExt" minOccurs="0" maxOccurs="1" />
    </xs:sequence>
```

```
    <xs:attribute name="version" type="xs:string" use="required" />
  </xs:complexType>
</xs:element>
```

5.3.8 /OpenHome/System/factoryReset

| | | | |
|---|---|---|---|
| URI | /OpenHome/System/factoryReset | Type | Command |
| Function | This function is used to reset the configuration for the device to the factory default | | |
| Methods | Query String(s) | Inbound Data | Return Result |
| POST | mode | | <ResponseStatus> |
| Notes | Two factory reset modes are supported as query parameters in the POST command: "full" resets all device parameters and settings to their factory values. "basic" resets all device parameters and settings except the values in /OpenHome/System/Network, /OpenHome/System/Host/server and /OpenHome/Security. The default mode is "full". The device may be rebooted after it is reset. | | |

5.3.9 /OpenHome/System/deviceInfo

| | | | |
|---|---|---|---|
| URI | /OpenHome/System/deviceInfo | Type | Command |
| Function | This function is used to get or set device information. | | |
| Methods | Query String(s) | Inbound Data | Return Result |
| GET | | | <DeviceInfo> |
| PUT | | <DeviceInfo> | <ResponseStatus> |
| Notes | Some fields of the <DeviceInfo> block are read-only and may not be set. If these fields are present in the inbound XML block, they must be silently ignored. For the <DeviceInfo> uploaded to the device during a PUT operation, all fields are considered optional and any fields that are not present in the inbound XML are not changed on the device. This allows setting of the fields individually without having to load the entire XML block to the device. <deviceDescription> is a description of the device as defined in RFC1213. <deviceLocation> is the location of the device as defined in RFC1213 <systemContact> is the contact information for the device as defined in RFC1213 <systemObjectID> is the System Object Identifier defined in RFC1213. Note: manufacturers are not required to register and may use a manufacturer-selected domain. <apiVersion> is the version of the OpenHome Camera Interface Specification supported <firmwareVersion> must be a string base meeting the following formatting: x.y.z.[infinite]-[optional] Where x.y.z. [infinite] is the parsed version numbers read from left-to-right. (x) will be newer than (y) which is newer than (z). The [infinite] may include as many sub-versions as the manufacturer requires. | | |

DeviceInfo XML Block

```
<!-- DeviceInfo -->
<xs:complexType name="battery">
  <xs:sequence>
    <xs:element name="level" type="PercentageCap" minOccurs="1" maxOccurs="1" />
    <xs:element name="timeRemain" type="IntegerCap" minOccurs="0" maxOccurs="1" />
  </xs:sequence>
</xs:complexType>
<xs:element name="DeviceInfo" >
  <xs:complexType>
    <xs:sequence>
      <xs:element name="deviceName" type="StringCap" minOccurs="1" maxOccurs="1" />
      <xs:element name="deviceID" type="UUIDCap" minOccurs="1" maxOccurs="1" />
      <xs:element name="deviceDescription" type="StringCap" minOccurs="0" maxOccurs="1" />
      <xs:element name="deviceLocation" type="StringCap" minOccurs="0" maxOccurs="1" />
      <xs:element name="systemContact" type="StringCap" minOccurs="0" maxOccurs="1" />
      <xs:element name="manufacturer" type="StringCap" minOccurs="1" maxOccurs="1" />
      <xs:element name="model" type="StringCap" minOccurs="1" maxOccurs="1" />
      <xs:element name="serialNumber" type="StringCap" minOccurs="1" maxOccurs="1" />
      <xs:element name="macAddress" type="MACCap" minOccurs="1" maxOccurs="1" />
      <xs:element name="firmwareVersion" type="StringCap" minOccurs="1" maxOccurs="1" />
```

```
        <xs:element name="firmwareReleasedDate" type="StringCap" minOccurs="0" maxOccurs="1" />
        <xs:element name="logicVersion" type="StringCap" minOccurs="0" maxOccurs="1" />
        <xs:element name="logicReleasedDate" type="StringCap" minOccurs="0" maxOccurs="1" />
        <xs:element name="bootVersion" type="StringCap" minOccurs="0" maxOccurs="1" />
        <xs:element name="bootReleasedDate" type="StringCap" minOccurs="0" maxOccurs="1" />
        <xs:element name="rescueVersion" type="StringCap" minOccurs="0" maxOccurs="1" />
        <xs:element name="rescueReleasedDate" type="StringCap" minOccurs="0" maxOccurs="1" />
        <xs:element name="hardwareVersion" type="IntegerCap" minOccurs="1" maxOccurs="1" />
        <xs:element name="systemObjectID" type="StringCap" minOccurs="0" maxOccurs="1" />
        <xs:element name="apiVersion" type="StringCap" minOccurs="1" maxOccurs="1" />
        <xs:element name="battery" type="battery" minOccurs="0" maxOccurs="1" />
        <xs:element name="Extensions" type="DeviceInfoExt" minOccurs="0" maxOccurs="1" />
    </xs:sequence>
    <xs:attribute name="version" type="xs:string" use="required" />
  </xs:complexType>
</xs:element>
```

5.3.10 /OpenHome/System/time

| | | | |
|---|---|---|---|
| URI | /OpenHome/System/time | Type | Command |
| Function | Access the device time information. | | |
| Methods | Query String(s) | Inbound Data | Return Result |
| GET | | | <Time> |
| Notes | The returned <Time> represents ths local and/or utc time at the moment of request. Time zones are defined by POSIX 1003.1 section 8.3 time zone notations. The <timeMode> element should always return NTP mode of operation. | | |

Time XML Block

```
<!-- Time -->
<xs:complexType name="timeMode">
  <xs:simpleContent>
    <xs:restriction base="StringCap">
      <xs:enumeration value="NTP" />
    </xs:restriction>
  </xs:simpleContent>
</xs:complexType>
<xs:element name="Time" >
  <xs:complexType>
    <xs:sequence>
      <xs:element name="timeMode" type="timeMode" minOccurs="1" maxOccurs="1" />
      <xs:element name="localTime" type="DateTimeCap" minOccurs="1" maxOccurs="1" />
      <xs:element name="utcTime" type="DateTimeCap" minOccurs="0" maxOccurs="1" />
      <xs:element name="timeZone" type="StringCap" minOccurs="1" maxOccurs="1" />
      <xs:any namespace="##any" processContents="lax" minOccurs="0" maxOccurs="unbounded"/>
    </xs:sequence>
    <xs:attribute name="version" type="xs:string" use="required" />
  </xs:complexType>
</xs:element>
```

5.3.11 /OpenHome/System/time/timeZone

| | | | |
|---|---|---|---|
| URI | /OpenHome/System/time/timeZone | Type | Command |
| Function | Access the device time zone. | | |
| Methods | Query String(s) | Inbound Data | Return Result |
| GET | | | Time zone string |
| PUT | | Time zone string | <ResponseStatus> |
| Notes | Time zones are defined by POSIX 1003.1 section 8.3 time zone notations. Note that the value following the +/− is the amount of time that must be added to the local time to result in UTC. | | |

-continued

Examples:
EST+5EDT01:00:00,M3.2.0/02:00:00,M11.1.0/02:00:00
Defines eastern standard time as "EST" with a GMT-5 offset. Daylight savings time is called "EDT", is one hour later and begins on the second Sunday of March at 2am and ends on the first Sunday of November at 2am.
CET-1CEST01:00:00,M3.5.0/02:00:00,M10.5.0/03:00:00
Defines central European time as GMT+1 with a one-hour daylight savings time ("CEST") that starts on the last Sunday in March at 2am and ends on the last Sunday in October at 3am.

5.3.12 /OpenHome/System/time/ntpServers

| | | | |
|---|---|---|---|
| URI | /OpenHome/System/time/ntpServers | Type | Command |
| Function | Access the NTP servers configured for the device. | | |
| Methods | Query String(s) | Inbound Data | Return Result |
| GET | | | <NTPServerList> |
| PUT | | <NTPServerList> | <ResponseStatus> |
| Notes | Performing a PUT transaction will replace the entire list of NTP servers. | | |

NTPServerList XML Block

```
<!-- NTPServerList -->
<xs:element name="NTPServerList" >
    <xs:complexType>
        <xs:sequence minOccurs="0" maxOccurs="unbounded">
            <xs:element ref="NTPServer" />
        </xs:sequence>
        <xs:attribute name="version" type="xs:string" use="required" />
        <xs:attributeGroup ref="Capabilities" />
    </xs:complexType>
</xs:element>
```

5.3.13 /OpenHome/System/time/ntpServers[UID]

| | | | |
|---|---|---|---|
| URI | /OpenHome/System/time/ntpServers/UID | Type | Command |
| Function | Access an NTP server configured for the device. | | |
| Methods | Query String(s) | Inbound Data | Return Result |
| GET | | | <NTPServer> |
| PUT | | <NTPServer> | <ResponseStatus> |
| DELETE | | | <ResponseStatus> |
| Notes | Depending on the value of <addressingFormatType>, either the <hostName> or the IP address fields will be used to locate the NTP server. Use of IPv4 or IPv6 addresses depends on the value of the <ipVersion> field in /OpenHome/System/Network/interfaces/[ID]/ipAddress. | | |

NTPServer XML Block

```
<!-- NTPServer -->
<xs:element name="NTPServer" >
    <xs:complexType>
        <xs:sequence>
            <xs:element name="id" type="IdCap" minOccurs="1" maxOccurs="1" />
            <xs:element name="addressingFormatType" type="AddressingFormatCap" minOccurs="1" maxOccurs="1" />
            <xs:element name="hostName" type="StringCap" minOccurs="0" maxOccurs="1" />
            <xs:element name="ipAddress" type="StringCap" minOccurs="0" maxOccurs="1" />
            <xs:element name="ipv6Address" type="StringCap" minOccurs="0" maxOccurs="1" />
            <xs:element name="portNo" type="IntegerCap" minOccurs="0" maxOccurs="1" />
            <xs:element name="Extensions" type="NTPServerExt" minOccurs="0" maxOccurs="1" />
        </xs:sequence>
        <xs:attribute name="version" type="xs:string" use="required" />
    </xs:complexType>
</xs:element>
```

5.3.14 /OpenHome/System/logging

| | | | |
|---|---|---|---|
| URI | /OpenHome/System/logging | Type | Command |
| Function | This function is used to set or read the logging parameters. | | |
| Methods | Query String(s) | Inbound Data | Return Result |
| GET | | | <LoggingConfig> |
| PUT | | <LoggingConfig> | <ResponseStatus> |
| Notes | The device maintains a rolling log of maxEntries that can be configured and queried. Remote logging may be enabled to send each new log entry to a HTTPS server using /OpenHome/System/logging/messages/event. | | |

LoggingConfig XML Block

```
<!-- Severity -->
<xs:simpleType name="Severity">
    <xs:restriction base="xs:string">
        <xs:enumeration value="Emergency" />
        <xs:enumeration value="Alert" />
        <xs:enumeration value="Critical" />
        <xs:enumeration value="Error" />
        <xs:enumeration value="Warning" />
        <xs:enumeration value="Notice" />
        <xs:enumeration value="Informational" />
        <xs:enumeration value="Debug" />
    </xs:restriction>
</xs:simpleType>
<!-- SeverityCap -->
<xs:complexType name="SeverityCap">
    <xs:simpleContent>
        <xs:extension base="Severity">
            <xs:attributeGroup ref="Capabilities" />
        </xs:extension>
    </xs:simpleContent>
</xs:complexType>
<!-- Logging -->
<xs:complexType name="LogTrigger">
    <xs:sequence>
        <xs:element name="severity" type="SeverityCap" minOccurs="1" maxOccurs="1" />
        <xs:any namespace="##any" processContents="lax" minOccurs="0" maxOccurs="unbounded"/>
    </xs:sequence>
</xs:complexType>
<xs:complexType name="LocalLog">
    <xs:sequence>
        <xs:element name="maxEntries" type="IntegerCap" minOccurs="1" maxOccurs="1" />
        <xs:any namespace="##any" processContents="lax" minOccurs="0" maxOccurs="unbounded"/>
    </xs:sequence>
</xs:complexType>
<xs:complexType name="remoteLogURL">
    <xs:sequence>
        <xs:element name="enabled" type="BooleanCap" minOccurs="1" maxOccurs="1" />
        <xs:element name="url" type="StringCap" minOccurs="1" maxOccurs="1" />
    </xs:sequence>
</xs:complexType>
<xs:complexType name="remoteLog">
    <xs:sequence>
        <xs:element name="xmpp" type="remoteLogURL" minOccurs="1" maxOccurs="1" />
        <xs:element name="https" type="remoteLogURL" minOccurs="1" maxOccurs="1" />
        <xs:element name="poll" type="remoteLogURL" minOccurs="1" maxOccurs="1">
        </xs:element>
        <xs:any namespace="##any" processContents="lax" minOccurs="0" maxOccurs="unbounded"/>
    </xs:sequence>
</xs:complexType>
<xs:element name="LoggingConfig" >
    <xs:complexType>
        <xs:sequence>
            <xs:element name="LogTrigger" type="LogTrigger" minOccurs="0" maxOccurs="1" />
            <xs:element name="LocalLog" type="LocalLog" minOccurs="0" maxOccurs="1" />
            <xs:element name="remoteLog" type="remoteLog" minOccurs="0" maxOccurs="1">
            </xs:element>
        </xs:sequence>
        <xs:attribute name="version" type="xs:string" use="required" />
    </xs:complexType>
</xs:element>
```

5.3.15 /OpenHome/System/logging/logData

| URI | /OpenHome/System/logging/logData | Type | Command |
|---|---|---|---|
| Function | This function is used to access the message log. | | |
| Methods | Query String(s) | Inbound Data | Return Result |
| GET | since | | <LogData> |
| Notes | Returns a list of messages with timestamp equals to or greater than <since>, where <since> is a UTC string for time in seconds since midnight, Jan. 1, 1970 UTC. If <since> is not specified, return all events contained in the local log file. <logData> is a text object containing 0 or more lines of logging text data. Each logging line should at least contain 1) Date/time of event, 2) severity of event, and 3) event text string. | | |

5.3.16 Notification: Logging Event

| URI | http or https://<ipAddress>:<portNo>/<loggingEventURL> or poll://<loggingEventURL> | Type | Notification |
|---|---|---|---|
| Function | This function is used by Camera to send logging events to Gateway. | | |
| Methods | Query String(s) | Inbound Data | Return Result |
| POST | | <LogEventList> | |
| Notes | This Notification is sent only if enabled in LoggingConfig. <loggingEventURL>, <ipAdress>, and <portNo> are derived from <remoteLog/https/url> or <remoteLog/poll/url>element and defines protocol used for Notification. <loggingEventURL> Examples: https://192.168.2.200:5000/Notification/logging/messages/event/006222000122 or poll://Notification/logging/messages/event/006222000122 dateTime is in ISO 8601 Date/Time string format, including fractions of a second to millisecond resolution. | | |

LogEventList XML Block

```
<!-- LogEventList -->
<xs:complexType name="LogEvent">
    <xs:sequence>
        <xs:element name="logNo" type="IntegerCap" minOccurs="1"
maxOccurs="1" />
        <xs:element name="dateTime" type="DateTimeCap"
minOccurs="1" maxOccurs="1" />
        <xs:element name="severity" type="SeverityCap" minOccurs="1"
maxOccurs="1" />
        <xs:element name="eventID" type="IdCap" minOccurs="0"
maxOccurs="1" />
        <xs:element name="message" type="StringCap" minOccurs="1"
maxOccurs="1" />
        <xs:any namespace="##any" processContents="lax"
minOccurs="0" maxOccurs="unbounded"/>
    </xs:sequence>
</xs:complexType>
<xs:element name="LogEventList" >
    <xs:complexType>
        <xs:sequence>
            <xs:element name="LogEvent" type="LogEvent"
minOccurs="0" maxOccurs="unbounded" />
        </xs:sequence>
        <xs:attribute name="version" type="xs:string" use="required" />
        <xs:attributeGroup ref="Capabilities" />
    </xs:complexType>
</xs:element>
```

5.3.17 5.3.17.1/OpenHome/System/Host/server

| URI | /OpenHome/System/Host/server | Type | Command |
|---|---|---|---|
| Function | Configure Camera's local host server listing ports. | | |
| Methods | Query String(s) | Inbound Data | Return Result |
| GET | | | <HostServer> |
| PUT | | <HostServer> | <ResponseStatus> |
| Notes | Configure the host servers on the camera. There are three types of servers supported on the camera: HTTP, HTTPS, and POLL. HTTP[S]: This is the standard HTTP[S] server running on port 80/443. POLL: The OpenHome specific internal notification queue mechanism. See /OpenHome/System/Poll/notifications. | | |

HTTPServer XML Block

```
<!-- HostServer -->
<xs:complexType name="HostServerHttp">
    <xs:sequence>
        <xs:element name="enabled" type="BooleanCap"
            minOccurs="1" maxOccurs="1" />
        <xs:element name="port" type="IntegerCap" minOccurs="0"
            maxOccurs="1" />
        <!--validateCerts is only valid for HTTPS connections. -->
        <!--Camera should through an Invalid XML Content error if
validateCerts is defined for HTTP -->
        <xs:element name="validateCerts" type="BooleanCap"
minOccurs="0" maxOccurs="1" />
    </xs:sequence>
</xs:complexType>
<xs:complexType name="HostServerPoll">
    <xs:sequence>
        <xs:element name="enabled" type="BooleanCap" minOccurs="1"
            maxOccurs="1" />
        <!-- Deafult Linger is in Seconds -->
        <xs:element name="defaultLinger" type="IntegerCap"
minOccurs="1" maxOccurs="1" />
    </xs:sequence>
</xs:complexType>
<xs:element name="HostServer" >
    <xs:complexType>
        <xs:sequence>
            <xs: element name="https" type="HostServerHttp"
                minOccurs="1" maxOccurs="1" />
            <xs:element name="http" type="HostServerHttp"
                minOccurs="1" maxOccurs="1" />
            <xs:element name="poll" type="HostServerPoll"
                minOccurs="1" maxOccurs="1" />
        </xs:sequence>
        <xs:attribute name="version" type="xs:string" use="required" />
    </xs:complexType>
</xs:element>
```

5.3.18 /OpenHome/System/history

| | | | |
|---|---|---|---|
| URI | /OpenHome/System/history | Type | Command |
| Function | Get history of Commands and response status | | |
| Methods | Query String(s) | Inbound Data | Return Result |
| GET | sinceCommand<br>sinceNotification | | <HistoryList> |
| Notes | sinceCommand and sinceNotification are <UTC in milliseconds>, where <UTC in milliseconds > is the time in milliseconds since midnight, January 1, 1970 UTC. If sinceCommand and/or sinceNotification query is used, device should return history entries for Commands or Notification since <UTC in milliseconds>, respectively.<br>If sinceCommand is 0 or missing, all Commands in the device history buffer should be returned.<br>If sinceNotification is 0 or missing, all Notifications in the device history buffer should be returned.<br><notifyTime> is time when Notification was sent by the device in ISO 8601 Date/Time string format, including fractions of a second.<br><receivedResponseTime> is time when a response was received by the device in ISO 8601 Date/Time string format, including fractions of a second.<br><responseCode> is the Gateway response code<br><xmlBody> is the XML body of the Notification | | |

HistoryList XML Block

```
<!-- HistoryList -->
<xs:element name="HistoryList" >
    <xs:complexType>
        <xs:sequence minOccurs="0" maxOccurs="unbounded">
            <xs:element ref="CommandHistory" />
            <xs:element ref="NotificationHistory" />
        </xs:sequence>
        <xs:attribute name="version" type="xs:string" use="required" />
        <xs:attributeGroup ref="Capabilities" />
    </xs:complexType>
</xs:element>
```

CommandHistory XML Block

```
<!-- CommandHistory -->
<xs:element name="CommandHistory" >
    <xs:complexType>
        <xs:sequence>
            <xs:element name="commandURI" type="StringCap"
minOccurs="1" maxOccurs="1" />
            <xs:element name="commandRxTime" type="DateTimeCap"
minOccurs="1" maxOccurs="1" />
            <xs:element name="commandExecTime" type="DateTimeCap"
minOccurs="0" maxOccurs="1" />
            <xs:element name="responseCode" type="IntegerCap"
minOccurs="1" maxOccurs="1" />
            <xs:element name="Extensions" type="CommandHistoryExt"
minOccurs="0" maxOccurs="1" />
        </xs:sequence>
    </xs:complexType>
</xs:element>
```

NotificationHistory XML Block

```
<!-- NotificationHistory -->
<xs:element name="NotificationHistory" >
    <xs:complexType>
        <xs:sequence>
            <xs:element name="notificationURI" type="StringCap"
minOccurs="1" maxOccurs="1" />
            <xs:element name="notifyTime" type="DateTimeCap"
minOccurs="1" maxOccurs="1" />
            <xs:element name="receivedResponseTime"
type="DateTimeCap" minOccurs="0" maxOccurs="1" />
            <xs:element name="responseCode" type="IntegerCap"
minOccurs="1" maxOccurs="1" />
            <xs:element name="xmlBody" type="StringCap"
minOccurs="1" maxOccurs="1" />
            <xs:element name="Extensions" type="NotificationHistoryExt"
minOccurs="0" maxOccurs="1" />
        </xs:sequence>
    </xs:complexType>
</xs:element>
```

5.3.19 /OpenHome/System/history/configuration

| | | | |
|---|---|---|---|
| URI | /OpenHome/System/history/configuration | Type | Command |
| Function | Configure history events queue size | | |
| Methods | Query String(s) | Inbound Data | Return Result |
| GET | | | <HistoryConfiguration> |
| PUT | | <HistoryConfiguration> | <ResponseStatus> |
| Notes | The default maximum buffer depth for command/notification history is dependent on the camera hardware. If a command is received by the camera that increases the buffer depth beyond the hardwares capabilities the camera should return an error. | | |

HistoryConfiguration XML Block

```
<!-- HistoryConfiguration -->
<xs:element name="HistoryConfiguration" >
    <xs:complexType>
        <xs:sequence>
            <xs:element name="commandHistorySize" type="IntegerCap" minOccurs="0" maxOccurs="1" />
            <xs:element name="notificationHistorySize" type="IntegerCap" minOccurs="0" maxOccurs="1" />
            <xs:element name="Extensions" type="HistoryConfigurationExt" minOccurs="0" maxOccurs="1" />
        </xs:sequence>
    </xs:complexType>
</xs:element>
```

5.3.20 /OpenHome/System/Poll/notifications

| | | | |
|---|---|---|---|
| URI | /OpenHome/System/Poll/notifications | Type | Command |
| Function | Poll for one or more pending Notifications | | |
| Methods | Query String(s) | Inbound Data | Return Result |
| GET | linger | | <NotificationWrapper> |
| Notes | linger is time to wait in seconds before responding to a request (if no notification is available). If a notification is available or becomes available during waiting, a response is sent as soon as possible without waiting for the linger expiration. This resource should be used to retrieve pending Notifications if the Notification event's URL is configured to use 'poll' as the prefix protocol (vs. http or https). Only Notifications configured for the poll channel should be returned in the response. For a list of all notifications (including polled notifications), use /OpenHome/System/history. | | |

NotificationWrapper XML Block

```
<!-- NotificationWrapper -->
<xs:element name="NotificationWrapper" >
    <xs:complexType>
        <xs:sequence>
            <xs:element name="notificationURI" type="StringCap" minOccurs="1" maxOccurs="1" />
            <xs:element name="notifyTime" type="DateTimeCap" minOccurs="1" maxOccurs="1" />
            <xs:element name="notifyBody" type="StringCap" minOccurs="1" maxOccurs="1" />
            <xs:element name="Extensions" type="NotificationWrapperExt" minOccurs="0" maxOccurs="1" />
        </xs:sequence>
    </xs:complexType>
</xs:element>
```

5.3.21 /OpenHome/System/Ping

| | | | |
|---|---|---|---|
| URI | /OpenHome/System/Ping | Type | Command |
| Function | Simple test to verify that a Camera is connected to the network and capable of receiving data. | | |
| Methods | Query String(s) | Inbound Data | Return Result |
| GET | | | <ResponseStatus> |
| Notes | Used by Gateway to verify connection with Camera. Camera responds with <ResponseStatus>" upon receiving GET to this resource. | | |

5.4 /OpenHome/System/Network Data Type Details
5.4.1 /OpenHome/System/Network/interfaces

| | | | |
|---|---|---|---|
| URI | /OpenHome/System/Network/interfaces | Type | Command |
| Function | Access the device network interfaces. | | |
| Methods | Query String(s) | Inbound Data | Return Result |
| GET | | | <NetworkInterfaceList> |
| Notes | As hardwired system resources, network interfaces cannot be created or destroyed. | | |

NetworkInterfaceList XML Block

```
<!-- NetworkInterfaceList -->
<xs:element name="NetworkInterfaceList" >
  <xs:complexType>
    <xs:sequence minOccurs="1" maxOccurs="unbounded">
      <xs:element ref="NetworkInterface" />
    </xs:sequence>
    <xs:attribute name="version" type="xs:string" use="required" />
    <xs:attributeGroup ref="Capabilities" />
  </xs:complexType>
</xs:element>
```

5.4.2 /OpenHome/System/Network/interfaces/[UID]

| | | | |
|---|---|---|---|
| URI | /OpenHome/System/Network/interfaces/[UID] | Type | Command |
| Function | Access a particular network interface. | | |
| Methods | Query String(s) | Inbound Data | Return Result |
| GET | | | <NetworkInterface> |
| PUT | | <NetworkInterface> | <ResponseStatus> |
| Notes | A <NetworkInterface> represents a virtual network interface, where each interface can be configured separately with IP address configuration (e.g., static for one interface and dynamic for the other). For example, if a camera supports only 1 physical interface but can be used in wireless or wireline mode, two interfaces should be listed to represent each virtual interface. | | |

NetworkInterface XML Block

```
<!-- NetworkInterface -->
<xs:element name="NetworkInterface" >
  <xs:complexType>
    <xs:sequence>
      <xs:element name="id" type="IdCap" minOccurs="1"
        maxOccurs="1" />
      <xs:element name="enabled" type="BooleanCap"
        minOccurs="1" maxOccurs="1" />
      <xs: element ref="IPAddress" minOccurs="1"
        maxOccurs="1" />
      <xs:element ref="Wireless" minOccurs="0" maxOccurs="1" />
      <xs:element ref="IEEE802_1x" minOccurs="0"
        maxOccurs="1" />
      <xs:element ref="Discovery" minOccurs="0"
        maxOccurs="1" />
      <xs:element name="Extensions" type="NetworkInterfaceExt"
        minOccurs="0" maxOccurs="1" />
    </xs:sequence>
    <xs:attribute name="version" type="xs:string" use="required" />
  </xs:complexType>
</xs:element>
```

5.4.3 /OpenHome/System/Network/interfaces/[UID]/ipAddress

| | | | |
|---|---|---|---|
| URI | /OpenHome/System/Network/interfaces/[UID]/ipAddress | Type | Command |
| Function | Access the device network interfaces. | | |
| Methods | Query String(s) | Inbound Data | Return Result |
| GET | | | <IPAddress> |
| PUT | | <IPAddress > | <ResponseStatus> |
| Notes | If <addressingType> is dynamic then a DHCP client is used by the device, and fields below it need not be provided. If <addressingType> is static the device IP address is configured manually and the gateway and DNS fields are optional. If <addressingType> refers to APIPA, the device IP address is automatically configured without DHCP. In this case the gateway and DNS fields are optional. Use of <ipAddress> or <ipv6Address> in fields is dictated by the <ipVersion> field. If <ipVersion> is "v4" the <ipAddress> fields are used; if <ipVersion> is "v6" the <ipv6Address> fields are used. If <ipVersion> is "dual", both <ipAddress> and <ipv6Address> fields may be used. <subnetMask> notation is "xxx.xxx.xxx.xxx". <IPV6Address> is "xxxx:xxxx:xxxx:xxxx:xxxx:xxxx:xxxx:xxxx" using CIDR notation. | | |

IPAddress XML Block

```
<!-- IPAddress -->
<xs:complexType name="ipVersion">
   <xs:simpleContent>
      <xs:restriction base="StringCap">
         <xs:enumeration value="v4" />
         <xs:enumeration value="v6" />
         <xs:enumeration value="dual" />
      </xs:restriction>
   </xs:simpleContent>
</xs:complexType>
<xs:complexType name="addressingType">
   <xs:simpleContent>
      <xs:restriction base="StringCap">
         <xs:enumeration value="static" />
         <xs:enumeration value="dynamic" />
         <xs:enumeration value="apipa" />
      </xs:restriction>
   </xs:simpleContent>
</xs:complexType>
<xs:complexType name="ipv4ipv6">
   <xs:sequence>
      <xs:element name="ipAddress" type="StringCap" minOccurs="0" maxOccurs="1" />
      <xs:element name="ipv6Address" type="StringCap" minOccurs="0" maxOccurs="1" />
   </xs:sequence>
</xs:complexType>
<xs:element name="IPAddress" >
   <xs:complexType>
      <xs:sequence>
         <xs:element name="ipVersion" type="ipVersion" minOccurs="1" maxOccurs="1" />
         <xs:element name="addressingType" type="addressingType" minOccurs="1" maxOccurs="1" />
         <xs:element name="ipAddress" type="StringCap" minOccurs="0" maxOccurs="1" />
         <xs:element name="subnetMask" type="StringCap" minOccurs="0" maxOccurs="1" />
         <xs:element name="ipv6Address" type="StringCap" minOccurs="0" maxOccurs="1" />
         <xs:element name="bitMask" type="StringCap" minOccurs="0" maxOccurs="1" />
         <xs:element name="DefaultGateway" type="ipv4ipv6" minOccurs="0" maxOccurs="1" />
         <xs:element name="PrimaryDNS" type="ipv4ipv6" minOccurs="0" maxOccurs="1" />
         <xs:element name="SecondaryDNS" type="ipv4ipv6" minOccurs="0" maxOccurs="1" />
         <xs:element name="Extensions" type="IPAddressExt" minOccurs="0" maxOccurs="1" />
      </xs:sequence>
      <xs:attribute name="version" type="xs:string" use="required" />
   </xs:complexType>
</xs:element>
```

5.4.4 /OpenHome/System/Network/interfaces/[UID]/wireless

| | | | |
|---|---|---|---|
| URI | /OpenHome/System/Network/interfaces/[UID]/wireless | Type | Command |
| Function | Access wireless network settings. | | |
| Methods | Query String(s) | Inbound Data | Return Result |
| GET | | | <Wireless> |
| PUT | | < Wireless> | <ResponseStatus> |
| Notes | If the <securityMode> field is "WEP", the <WEP> block must be provided. | | |
| | If the <securityMode> field is "WPA" or "WPA2-personal", the <WPA> block must be provided. | | |
| | If the "WPA" or "WPA2-enterprise" security mode is used, the <WPA> block must be used and settings related to 802.1x must be set using the /OpenHome/System/Network/interfaces/[UID]/ieee802.1x resource. | | |
| | <channel> corresponds to an 802.11g wireless channel number or "auto" for autoconfiguration. | | |
| | <wmmEnabled> enables 802.11e, QoS for IEEE 802.11 networks (Wi-Fi Multimedia) <defaultTransmitKeyIndex> indicates which encryption key is used for WEP security. <encryptionKey> is the WEP encryption key in hexadecimal format. | | |
| | <sharedKey> is the pre-shared key used in WPA | | |
| | <OptimalWiFiAPSelection> is used to enable/disable optimal Wifi selection mode | | |
| | <testConnectivity>, for PUT method and if enabled, Camera should verify Wifi connectivity with the configured AP (Camera must validate connectivity and not just association, e.g., Camera can obtain IP address via DHCP). Upon receiving a valid <testConnectivity> Command, Camera should respond with | | |

<ResponseStatus>, and then send a WifiConnectivityTestResult notification to the Gateway after connectivity test. For Camera that only supports one physical network interface, Camera may disconnect after responding with <ResponseStatus>, run Wifi connectivity test, reconnect to the original interface and send notification to Gateway.

Wireless XML Block

```
<!-- Wireless -->
<xs:complexType name="wirelessNetworkMode">
    <xs:simpleContent>
        <xs:restriction base="StringCap">
            <xs:enumeration value="infrastructure" />
            <xs:enumeration value="adhoc" />
        </xs:restriction>
    </xs:simpleContent>
</xs:complexType>
<xs:complexType name="WifiChannel">
    <xs:simpleContent>
        <xs:restriction base="StringCap">
            <xs:enumeration value="1" />
            <xs:enumeration value="2" />
            <xs:enumeration value="3" />
            <xs:enumeration value="4" />
            <xs:enumeration value="5" />
            <xs:enumeration value="6" />
            <xs:enumeration value="7" />
            <xs:enumeration value="8" />
            <xs:enumeration value="9" />
            <xs:enumeration value="10" />
            <xs:enumeration value="11" />
            <xs:enumeration value="12" />
            <xs:enumeration value="13" />
            <xs:enumeration value="14" />
            <xs:enumeration value="auto" />
        </xs:restriction>
    </xs:simpleContent>
</xs:complexType>
<xs:complexType name="WifiSecurityMode">
    <xs:simpleContent>
        <xs:restriction base="StringCap">
            <xs:enumeration value="disable" />
            <xs:enumeration value="WEP" />
            <xs:enumeration value="WPA-personal" />
            <xs:enumeration value="WPA2-personal" />
            <xs:enumeration value="WPA-RADIUS" />
            <xs:enumeration value="WPA-enterprise" />
            <xs:enumeration value="WPA2-enterprise" />
            <xs:enumeration value="WPA/WPA2-personal" />
        </xs:restriction>
    </xs:simpleContent>
</xs:complexType>
<xs:complexType name="WifiSecurityWEP">
    <xs:sequence>
        <xs:element name="authenticationType" minOccurs="1" maxOccurs="1">
            <xs:complexType>
                <xs:simpleContent>
                    <xs:restriction base="StringCap">
                        <xs:enumeration value="open" />
                        <xs:enumeration value="sharedkey" />
                        <xs:enumeration value="auto" />
                    </xs:restriction>
                </xs:simpleContent>
            </xs:complexType>
        </xs:element>
        <xs:element name="defaultTransmitKeyIndex" type="IntegerCap" minOccurs="1" maxOccurs="1" />
```

```
        <xs:element name="wepKeyLength" minOccurs="0" maxOccurs="1">
           <xs:complexType>
             <xs:simpleContent>
               <xs:restriction base="IntegerCap">
                 <xs:enumeration value="64" />
                 <xs:enumeration value="128" />
               </xs:restriction>
             </xs:simpleContent>
           </xs:complexType>
        </xs:element>
        <xs:element name="EncryptionKeyList" minOccurs="1" maxOccurs="1">
           <xs:complexType>
             <xs:sequence minOccurs="1" maxOccurs="unbounded">
               <xs:element name="encryptionKey" type="HexBinaryCap" />
             </xs:sequence>
             <xs:attributeGroup ref="Capabilities" />
           </xs:complexType>
        </xs:element>
        <xs:any namespace="##any" processContents="lax" minOccurs="0" maxOccurs="unbounded"/>
      </xs:sequence>
   </xs:complexType>
   <xs:complexType name="WifiSecurityWPAAlgo">
      <xs:simpleContent>
        <xs:restriction base="StringCap">
           <xs:enumeration value="TKIP" />
           <xs:enumeration value="AES" />
           <xs:enumeration value="TKIP/AES" />
        </xs:restriction>
      </xs:simpleContent>
   </xs:complexType>
   <xs:complexType name="WifiSecurityWPA">
      <xs:sequence>
        <xs:element name="algorithmType" type="WifiSecurityWPAAlgo" minOccurs="1" maxOccurs="1" />
        <xs:element name="sharedKey" type="StringCap" minOccurs="1" maxOccurs="1" />
        <xs:any namespace="##any" processContents="lax" minOccurs="0" maxOccurs="unbounded"/>
      </xs:sequence>
   </xs:complexType>
   <xs:complexType name="WifiSecurity">
      <xs:sequence>
        <xs:element name="securityMode" type="WifiSecurityMode" minOccurs="0" maxOccurs="1" />
        <xs:element name="WEP" type="WifiSecurityWEP" minOccurs="0" maxOccurs="1" />
        <xs:element name="WPA" type="WifiSecurityWPA" minOccurs="0" maxOccurs="1" />
        <xs:element name="Extensions" type="WirelessSecurityExt" minOccurs="0" maxOccurs="1" />
      </xs:sequence>
   </xs:complexType>
   <xs:complexType name="WirelessProfile">
      <xs:sequence>
        <xs:element name="channel" type="WifiChannel" minOccurs="0" maxOccurs="1" />
        <xs:element name="ssid" type="StringCap" minOccurs="0" maxOccurs="1" />
        <xs:element name="wmmEnabled" type="BooleanCap" minOccurs="0" maxOccurs="1" />
        <xs:element name="WirelessSecurity" type="WifiSecurity" minOccurs="0" maxOccurs="1" />
      </xs:sequence>
   </xs:complexType>
   <xs:element name="Wireless" >
      <xs:complexType>
        <xs:sequence>
           <xs:element name="enabled" type="BooleanCap" minOccurs="1" maxOccurs="1" />
           <xs:element name="wirelessNetworkMode" type="wirelessNetworkMode" minOccurs="0" maxOccurs="1" />
           <xs:element name="profile" type="WirelessProfile" minOccurs="0" maxOccurs="unbounded"/>
           <xs:element name="statusRefreshInterval" type="IntegerCap" minOccurs="1" maxOccurs="1" />
           <xs:element name="AggressiveRoaming" minOccurs="0" maxOccurs="1">
             <xs:complexType>
               <xs:sequence>
                 <xs:element name="enabled" type="BooleanCap" minOccurs="1" maxOccurs="1" />
               </xs:sequence>
             </xs:complexType>
           </xs:element>
           <xs:element name="testConnectivity" minOccurs="0" maxOccurs="1">
```

-continued

```
        <xs:complexType>
          <xs:sequence>
            <xs:element name="enabled" type="BooleanCap" minOccurs="1" maxOccurs="1" />
            <xs:element name="timeout" type="IntegerCap" minOccurs="0" maxOccurs="1" />
            <xs:element name="ResultNotifyURL" type="StringCap" minOccurs="0" maxOccurs="1" />
          </xs:sequence>
        </xs:complexType>
      </xs:element>
      <xs:element name="Extensions" type="WirelessExt" minOccurs="0" maxOccurs="1" />
    </xs:sequence>
    <xs:attribute name="version" type="xs:string" use="required" />
  </xs:complexType>
</xs:element>
```

5.4.4.1 Notification: WifiConnectivityTestResult

| | | |
|---|---|---|
| URI | http or https://<ipAddess>:<portNo>/<notificationURL>Type<br>or<br>poll:// <notificationURL > | Notification |
| Function | This function is used by the Camera to send Wifi connectivity test result to the Gateway. | |
| Methods | Query String(s) | Inbound Data | Return Result |
| POST | | <WifiConnectivityTestResult> | |
| Notes | <notificationURL > is derived from <Wireless> XML Block's <testConnectivity> parameters<br>dateTime is in ISO 8601 Date-Time format. | |

WifiConnectivityTestResult XML Block

```
<!-- WifiConnectivityTestResult      -->
<xs:element name="WifiConnectivityTestResult" >
  <xs:complexType>
    <xs:sequence>
      <xs:element name="id" type="StringCap" minOccurs="1" maxOccurs="1" />
      <xs:element name="associated" type="BooleanCap" minOccurs="1" maxOccurs="1" />
      <xs:element name="errorReason" type="StringCap" minOccurs="0" maxOccurs="1" />
      <xs:element name="dateTime" type="DateTimeCap" minOccurs="0" maxOccurs="1" />
      <xs:element name="channelNo" type="StringCap" minOccurs="0" maxOccurs="1" />
      <xs:element name="ssid" type="StringCap" minOccurs="0" maxOccurs="1" />
      <xs:element name="bssid" type="StringCap" minOccurs="0" maxOccurs="1" />
      <xs:element name="rssidB" type="IntegerCap" minOccurs="0" maxOccurs="1" />
    </xs:sequence>
    <xs:attribute name="version" type="xs:string" use="required" />
  </xs:complexType>
</xs:element>
```

5.4.5 /OpenHome/System/Network/interfaces[UID]/wireless/status

| | | |
|---|---|---|
| URI | /OpenHome/System/Network/interfaces/[UID]/wireless/statusType | Command |
| Function | Access interface status. | |
| Methods | Query String(s) | Inbound Data | Return Result |
| GET | forceRefresh | | <WirelessNetworkStatus> |
| Notes | If 'forceRefresh' query parameter is 'true', device should collect a new set of <WirelessNetworkStatus> data before returning result. If 'forceRefresh' parameter is false or missing, device should return <WirelessNetworkStatus> without collecting new data. Data underlying <WirelessNetworkStatus> must be periodically refreshed by the device at maximum interval of <statusRefreshInterval> seconds defined in the <Wireless> XML block. | |

WirelessNetworkStatus XML Block

```
<xs:complexType name="WifiChannel">
    <xs:simpleContent>
        <xs:restriction base="StringCap">
            <xs:enumeration value="1" />
            <xs:enumeration value="2" />
            <xs:enumeration value="3" />
            <xs:enumeration value="4" />
            <xs:enumeration value="5" />
            <xs:enumeration value="6" />
            <xs:enumeration value="7" />
            <xs:enumeration value="8" />
            <xs:enumeration value="9" />
            <xs:enumeration value="10" />
            <xs:enumeration value="11" />
            <xs:enumeration value="12" />
            <xs:enumeration value="13" />
            <xs:enumeration value="14" />
            <xs:enumeration value="auto" />
        </xs:restriction>
    </xs:simpleContent>
</xs:complexType>
<xs:complexType name="WifiSecurityMode">
    <xs:simpleContent>
        <xs:restriction base="StringCap">
            <xs:enumeration value="disable" />
            <xs:enumeration value="WEP" />
            <xs:enumeration value="WPA-personal" />
            <xs:enumeration value="WPA2-personal" />
            <xs:enumeration value="WPA-RADIUS" />
            <xs:enumeration value="WPA-enterprise" />
            <xs:enumeration value="WPA2-enterprise" />
        </xs:restriction>
    </xs:simpleContent>
</xs:complexType>
<xs:complexType name="WirelessAvailableAP">
    <xs:sequence>
        <xs:element name="ssid" type="StringCap" minOccurs="1" maxOccurs="1" />
        <xs:element name="bssid" type="StringCap" minOccurs="1" maxOccurs="1" />
        <xs:element name="rssidB" type="IntegerCap" minOccurs="1" maxOccurs="1" />
        <xs:element name="securityMode" type="WifiSecurityMode" minOccurs="0" maxOccurs="1" />
    </xs:sequence>
</xs:complexType>
<xs:complexType name="WirelessAvailableAPList">
    <xs:sequence>
        <xs:element name="AvailableAccessPoint" type="WirelessAvailableAP" minOccurs="0" maxOccurs="unbounded" />
        <xs:element name="Extensions" type="AvailableAccessPointExt" minOccurs="0" maxOccurs="1" />
    </xs:sequence>
    <xs:attribute name="version" type="xs:string" use="required" />
</xs:complexType>
<xs:element name="WirelessNetworkStatus" >
    <xs:complexType>
        <xs:sequence>
            <xs:element name="enabled" type="BooleanCap" minOccurs="1" maxOccurs="1" />
            <xs:element name="channelNo" type="WifiChannel" minOccurs="1" maxOccurs="1" />
            <xs:element name="ssid" type="StringCap" minOccurs="1" maxOccurs="1" />
            <xs:element name="bssid" type="StringCap" minOccurs="1" maxOccurs="1" />
            <xs:element name="rssidB" type="IntegerCap" minOccurs="1" maxOccurs="1" />
            <xs:element name="signalStrength" type="PercentageCap" minOccurs="1" maxOccurs="1" />
            <xs:element name="noiseIndB" type="IntegerCap" minOccurs="1" maxOccurs="1" />
            <xs:element name="numOfAPs" type="IntegerCap" minOccurs="1" maxOccurs="1" />
            <xs:element name="AvailableAPList" type="WirelessAvailableAPList" minOccurs="0" maxOccurs="1" />
            <xs:element name="Extensions" type="WirelessNetworkStatusExt" minOccurs="0" maxOccurs="1" />
        </xs:sequence>
        <xs:attribute name="version" type="xs:string" use="required" />
    </xs:complexType>
</xs:element>
```

5.4.6 /OpenHome/System/Network/interfaces/[UID]/ieee802.1x

| URI | /OpenHome/System/Network/interfaces/[UID]/ieee802.1x | Type | Command |
|---|---|---|---|
| Function | Access IEEE 802.1x settings. | | |
| Methods | Query String(s) | Inbound Data | Return Result |
| GET | | | <IEEE802_1x> |
| PUT | | < IEEE802_1x > | <ResponseStatus> |
| Notes | If the <authenticatonProtocolType> tag corresponds to "EAP-TTLS", then the <innerTTLSAuthenticationMethod> tag must be provided. If the <authenticationProtocolType> corresponds to "EAP-PEAP" or "EAP-FAST", then the <innerEAPProtocolType> tag must be provided. The <anonymousID> tag is optional. If the <authenticationProtocolType> corresponds to "EAP-FAST", then the <autoPACProvisioningEnabled> tag must be provided. <anonymousID> is the optional anonymous ID to be used in place of the <userName> . | | |

IEEE802_1x XML Block

```
<!-- IEEE802_1x -->
<xs:complexType name="ieee802_1x_authType">
   <xs:simpleContent>
      <xs:restriction base="StringCap">
         <xs:enumeration value="EAP-TLS" />
         <xs:enumeration value="EAP-TTLS" />
         <xs:enumeration value="EAP-PEAP" />
         <xs:enumeration value="EAP-LEAP" />
         <xs:enumeration value="EAP-FAST" />
      </xs:restriction>
   </xs:simpleContent>
</xs:complexType>
<xs:complexType name="ieee802_1x_TTLSAuth">
   <xs:simpleContent>
      <xs:restriction base="StringCap">
         <xs:enumeration value="MS-CHAP" />
         <xs:enumeration value="MS-CHAPv2" />
         <xs:enumeration value="PAP" />
         <xs:enumeration value="EAP-MD5" />
      </xs:restriction>
   </xs:simpleContent>
</xs:complexType>
<xs:complexType name="ieee802_1x_EAPProto">
   <xs:simpleContent>
      <xs:restriction base="StringCap">
         <xs:enumeration value="EAP-POTP" />
         <xs:enumeration value="MS-CHAPv2" />
      </xs:restriction>
   </xs:simpleContent>
</xs:complexType>
<xs:element name="IEEE802_1x" >
   <xs:complexType>
      <xs:sequence>
         <xs:element name="enabled" type="BooleanCap" minOccurs="1" maxOccurs="1" />
         <xs:element name="authenticationProtocolType" type="ieee802_1x_authType" minOccurs="1" maxOccurs="1" />
         <xs:element name="innerTTLSAuthenticationMethod" type="ieee802_1x_TTLSAuth" minOccurs="0" maxOccurs="1" />
         <xs:element name="innerEAPProtocolType" type="ieee802_1x_EAPProto" minOccurs="0" maxOccurs="1" />
         <xs:element name="validateServerEnabled" type="BooleanCap" minOccurs="0" maxOccurs="1" />
         <xs:element name="userName" type="StringCap" minOccurs="0" maxOccurs="1" />
         <xs:element name="password" type="StringCap" minOccurs="0" maxOccurs="1" />
         <xs:element name="anonymousID" type="StringCap" minOccurs="0" maxOccurs="1" />
         <xs:element name="autoPACProvisioningEnabled" type="BooleanCap" minOccurs="0" maxOccurs="1" />
         <xs:element name="Extensions" type="IEEE802_1xExt" minOccurs="0" maxOccurs="1" />
      </xs:sequence>
      <xs:attribute name="version" type="xs:string" use="required" />
   </xs:complexType>
</xs:element>
```

5.4.7 /OpenHome/System/Network/Interfaces/[UID]/discovery

| | | | |
|---|---|---|---|
| URI | /OpenHome/System/Network/interfaces/[UID]/discoveryType | | Command |
| Function | Device discovery settings. | | |
| Methods | Query String(s) | Inbound Data | Return Result |
| GET | | | < Discovery > |
| PUT | | < Discovery > | <ResponseStatus> |
| Notes | Use of IPv4 or IPv6 addresses depends on the value of the <ipVersion> field in /OpenHome/System/Network/interfaces/[UID]/ipAddress. <portNo> is the port number for the multicast discovery address. <ttl> is the time to live for multicast discovery packets. | | |

Discovery XML Block

```
<!-- Discovery -->
<xs:element name="Discovery" >
   <xs:complexType>
      <xs:sequence>
         <xs:element name="UPnP" minOccurs="0" maxOccurs="1">
            <xs:complexType>
               <xs:sequence>
                  <xs:element name="enabled" type="BooleanCap" minOccurs="1" maxOccurs="1" />
                  <xs:any namespace="##any" processContents="lax" minOccurs="0" maxOccurs="unbounded"/>
               </xs:sequence>
            </xs:complexType>
         </xs:element>
         <xs:element name="Zeroconf" minOccurs="0" maxOccurs="1">
            <xs:complexType>
               <xs:sequence>
                  <xs:element name="enabled" type="BooleanCap" minOccurs="1" maxOccurs="1" />
                  <xs:any namespace="##any" processContents="lax" minOccurs="0" maxOccurs="unbounded"/>
               </xs:sequence>
            </xs:complexType>
         </xs:element>
         <xs:element name="MulticastDiscovery" minOccurs="0" maxOccurs="1">
            <xs:complexType>
               <xs:sequence>
                  <xs:element name="enabled" type="BooleanCap" minOccurs="1" maxOccurs="1" />
                  <xs:element name="ipAddress" type="StringCap" minOccurs="0" maxOccurs="1" />
                  <xs:element name="ipv6Address" type="StringCap" minOccurs="0" maxOccurs="1" />
                  <xs:element name="portNo" type="IntegerCap" minOccurs="1" maxOccurs="1" />
                  <xs:element name="ttl" type="IntegerCap" minOccurs="1" maxOccurs="1" />
                  <xs:any namespace="##any" processContents="lax" minOccurs="0" maxOccurs="unbounded"/>
               </xs:sequence>
            </xs:complexType>
         </xs:element>
         <xs:element name="Extensions" type="DiscoveryExt" minOccurs="0" maxOccurs="1" />
      </xs:sequence>
      <xs:attribute name="version" type="xs:string" use="required" />
   </xs:complexType>
</xs:element>
```

5.5 /OpenHome/System/Audio Data Type Details
5.5.1 /OpenHome/System/Audio/channels

| | | | |
|---|---|---|---|
| URI | /OpenHome/System/Audio/channels | Type | Command |
| Function | Access the list of all hardware audio inputs. | | |
| Methods | Query String(s) | Inbound Data | Return Result |
| GET | | | <AudioChannelList> |
| Notes | Since inputs are resources that are defined by the hardware configuration of the device, audio inputs cannot be created or deleted. UID numbering or values should be considered arbitrary and device-dependent. | | |

AudioChannelList XML Block

```
<!-- AudioChannelList -->
<xs:element name="AudioChannelList" >
  <xs:complexType>
    <xs:sequence minOccurs="0" maxOccurs="unbounded">
      <xs:element ref="AudioChannel" />
    </xs:sequence>
    <xs:attribute name="version" type="xs:string" use="required" />
    <xs:attributeGroup ref="Capabilities" />
  </xs:complexType>
</xs:element>
```

5.5.2 /OpenHome/System/Audio/channels/[UID]

| | | | |
|---|---|---|---|
| URI | /OpenHome/System/Audio/channels/[UID] | Type | Command |
| Function | Access specific audio channel. | | |
| Methods | Query String(s) | Inbound Data | Return Result |
| GET | | | <AudioChannel> |
| PUT | | <AudioChannel> | <ResponseStatus> |
| Notes | <audioMode> is the duplex mode for audio transmission between the client and media device.<br><microphoneSource> indicates whether the device microphone is internal or external. <microphoneVolume> Volume control percentage for device microphone. 0 is mute. <speakerVolume> Volume control percentage for device speaker. 0 is mute. | | |

AudioChannel XML Block

```
<!-- AudioChannel -->
<xs:element name="AudioChannel" >
  <xs:complexType>
    <xs:sequence>
      <xs:element name="id" type="IdCap" minOccurs="1" maxOccurs="1" />
      <xs:element name="enabled" type="BooleanCap" minOccurs="1" maxOccurs="1" />
      <xs:element name="audioMode" minOccurs="1" maxOccurs="1">
        <xs:complexType>
          <xs:simpleContent>
            <xs:restriction base="StringCap">
              <xs:enumeration value="listenonly" />
              <xs:enumeration value="talkonly" />
              <xs:enumeration value="talkorlisten" />
              <xs:enumeration value="talkandlisten" />
            </xs:restriction>
          </xs:simpleContent>
        </xs:complexType>
      </xs:element>
      <xs:element name="microphoneEnabled" type="BooleanCap" minOccurs="0" maxOccurs="1" />
      <xs:element name="microphoneSource" minOccurs="0" maxOccurs="1">
        <xs:complexType>
          <xs:simpleContent>
            <xs:restriction base="StringCap">
              <xs:enumeration value="internal" />
              <xs:enumeration value="external" />
            </xs:restriction>
          </xs:simpleContent>
        </xs:complexType>
      </xs:element>
      <xs:element name="microphoneVolume" type="PercentageCap" minOccurs="0" maxOccurs="1" />
      <xs:element name="speakerEnabled" type="BooleanCap" minOccurs="0" maxOccurs="1" />
      <xs:element name="speakerVolume" type="PercentageCap" minOccurs="0" maxOccurs="1" />
      <xs:element name="Extensions" type="AudioChannelExt" minOccurs="0" maxOccurs="1" />
    </xs:sequence>
    <xs:attribute name="version" type="xs:string" use="required" />
  </xs:complexType>
</xs:element>
```

5.6 /OpenHome/System/Video Data Type Details
5.6.1 /OpenHome/System/Video/inputs

| | | | |
|---|---|---|---|
| URI | /OpenHome/System/Video/inputs | Type | Command |
| Function | Access the list of video inputs on an IP media device. | | |
| Methods | Query String(s) | Inbound Data | Return Result |
| GET | | | <VideoInput> |
| Notes | An IP media device may contain a set of video inputs. These inputs are hardwired by the device, meaning that the IDs can be discovered but not created or deleted. ID numbering or values should be considered arbitrary and device-dependent. | | |

VideoInput XML Block

```
<!-- VideoInput -->
<xs:element name="VideoInput" >
   <xs:complexType>
      <xs:sequence minOccurs="0" maxOccurs="unbounded">
         <xs:element ref="VideoInputChannelList" />
         <xs:element name="Extensions" type="VideoInputExt"
minOccurs="0" maxOccurs="1" />
      </xs:sequence>
      <xs:attribute name="version" type="xs:string" use="required" />
   </xs:complexType>
</xs:element>
```

5.6.2 /OpenHome/System/Video/inputs/channels

| | | | |
|---|---|---|---|
| URI | /OpenHome/System/Video/inputs/channels | Type | Command |
| Function | Access the list of video input channels on an IP media device. | | |
| Methods | Query String(s) | Inbound Data | Return Result |
| GET | | | <VideoInputChannelList> |
| Notes | Since video input channels are resources that are defined by the hardware configuration of the device, they cannot be created or deleted. | | |

VideoInputChannel XML Block

```
<!-- VideoInputChannelList -->
<xs:element name="VideoInputChannelList" >
   <xs:complexType>
      <xs:sequence minOccurs="0" maxOccurs="unbounded">
         <xs:element ref="VideoInputChannel" />
      </xs:sequence>
      <xs:attribute name="version" type="xs:string" use="required" />
      <xs:attributeGroup ref="Capabilities" />
   </xs:complexType>
</xs:element>
```

5.6.3 /OpenHome/System/Video/inputs/channels[UID]

| | | | |
|---|---|---|---|
| URI | /OpenHome/System/Video/inputs/channels/[UID] | Type | Command |
| Function | Access video input channel properties. | | |
| Methods | Query String(s) | Inbound Data | Return Result |
| GET | | | <VideoInputChannel> |
| PUT | | <VideoInputChannel> | <ResponseStatus> |
| Notes | <powerLineFrequencyMode> is used to adjust/correct video image based on different power frequencies. <br><whiteBalanceMode> indicates the white balance operational mode. <br><whiteBalanceLevel> indicates the white balance percentage value when whiteBalanceMode refers to manual . 0 is 'cool', 100 is 'hot'. <br><exposureMode> indicates the exposure operational mode. <br><exposureTarget> the target exposure for manual or auto-exposure. <br><exposureAutoMin> minimum exposure when <exposureMode> is set to auto. <br><exposureAutoMax> maximum exposure when <exposureMode> is set to auto. <br><GainWindow> defines the coordinates of the window used to determine the auto-gain statistics, if smaller than the entire window. <br><gainLevel> indicates the gain level percentage value when <exposureMode> refers to Manual. 0 is low gain, 100 is high gain. <br><irisMode> indicates the iris operational mode. Only applicable for auto-iris lens modules. Override will put lens module into manual mode until the scene changes, | | | at which point operation is switched to the auto mode.
<focusMode> indicates the focus operational mode. Only applicable for auto-focus lens modules. Override will put lens module into manual mode until the scene changes, at which point operation is switched to the auto mode.
In <DayNightFilter>, <beginTime> and <endTime> are only used if <switchScheduleEnabled> is true.

VideoInputChannel XML Block

```
<!-- VideoInput -->
<xs:element name="VideoInput" >
   <xs:complexType>
      <xs:sequence minOccurs="0" maxOccurs="unbounded">
         <xs:element ref="VideoInputChannelList" />
         <xs:element name="Extensions" type="VideoInputExt" minOccurs="0" maxOccurs="1" />
      </xs:sequence>
      <xs:attribute name="version" type="xs:string" use="required" />
   </xs:complexType>
</xs:element>
<!-- VideoInputChannel -->
<xs:complexType name="powerLineFrequencyMode">
   <xs:simpleContent>
      <xs:restriction base="StringCap">
         <xs:enumeration value="50hz" />
         <xs:enumeration value="60hz" />
      </xs:restriction>
   </xs:simpleContent>
</xs:complexType>
<xs:complexType name="whiteBalanceMode">
   <xs:simpleContent>
      <xs:restriction base="StringCap">
         <xs:enumeration value="manual" />
         <xs:enumeration value="auto" />
         <xs:enumeration value="indood/incandescent" />
         <xs:enumeration value="fluorescent/white" />
         <xs:enumeration value="fluorescent/yellow" />
         <xs:enumeration value="outdoor" />
         <xs:enumeration value="black&white" />
      </xs:restriction>
   </xs:simpleContent>
</xs:complexType>
<xs:complexType name="exposureMode">
   <xs:simpleContent>
      <xs:restriction base="StringCap">
         <xs:enumeration value="manual" />
         <xs:enumeration value="auto" />
      </xs:restriction>
   </xs:simpleContent>
</xs:complexType>
<xs:complexType name="VideoExposure">
   <xs:sequence>
      <xs:element name="exposureTarget" type="IntegerCap" minOccurs="1" maxOccurs="1" />
      <xs:element name="exposureAutoMin" type="IntegerCap" minOccurs="1" maxOccurs="1" />
      <xs:element name="exposureAutoMax" type="IntegerCap" minOccurs="1" maxOccurs="1" />
      <xs:any namespace="##any" processContents="lax" minOccurs="0" maxOccurs="unbounded"/>
   </xs:sequence>
</xs:complexType>
<xs:complexType name="VideoGainWindow">
   <xs:sequence>
      <xs:element ref="RegionCoordinatesList" minOccurs="0" maxOccurs="1" />
      <xs:element name="Extensions" type="GainWindowExt" minOccurs="0" maxOccurs="1" />
   </xs:sequence>
</xs:complexType>
<xs:complexType name="VideoLensList">
   <xs:sequence minOccurs="0" maxOccurs="unbounded">
      <xs:element name="Lens">
         <xs:complexType>
            <xs:sequence>
               <xs:element name="lensModuleName" type="StringCap" minOccurs="0" maxOccurs="1" />
```

```xml
            <xs:element name="irisMode" minOccurs="0" maxOccurs="1">
                <xs:complexType>
                    <xs:simpleContent>
                        <xs:restriction base="StringCap">
                            <xs:enumeration value="manual" />
                            <xs:enumeration value="auto" />
                            <xs:enumeration value="override" />
                        </xs:restriction>
                    </xs:simpleContent>
                </xs:complexType>
            </xs:element>
            <xs:element name="focusMode" minOccurs="0" maxOccurs="1">
                <xs:complexType>
                    <xs:simpleContent>
                        <xs:restriction base="StringCap">
                            <xs:enumeration value="manual" />
                            <xs:enumeration value="auto" />
                            <xs:enumeration value="autobackfocus" />
                            <xs:enumeration value="override" />
                        </xs:restriction>
                    </xs:simpleContent>
                </xs:complexType>
            </xs:element>
            <xs:element name="Extensions" type="LensExt" minOccurs="0" maxOccurs="1" />
          </xs:sequence>
        </xs:complexType>
      </xs:element>
    </xs:sequence>
    <xs:attributeGroup ref="Capabilities" />
  </xs:complexType>
  <xs:complexType name="VideoDayNightFilter">
    <xs:sequence>
      <xs:element name="dayNightFilterType" minOccurs="1" maxOccurs="1">
        <xs:complexType>
          <xs:simpleContent>
            <xs:restriction base="StringCap">
              <xs:enumeration value="day" />
              <xs:enumeration value="night" />
              <xs:enumeration value="auto" />
            </xs:restriction>
          </xs:simpleContent>
        </xs:complexType>
      </xs:element>
      <xs:element name="switchScheduleEnabled" type="BooleanCap" minOccurs="0" maxOccurs="1" />
      <xs:element name="beginTime" type="TimeCap" minOccurs="0" maxOccurs="1" />
      <xs:element name="endTime" type="TimeCap" minOccurs="0" maxOccurs="1" />
      <xs:element name="illuminationSwitchOver" minOccurs="0" maxOccurs="1">
        <xs:complexType>
          <xs:sequence>
            <xs:element name="enabled" type="BooleanCap" minOccurs="1" maxOccurs="1" />
            <xs:element name="threshold" type="IntegerCap" minOccurs="1" maxOccurs="1" />
          </xs:sequence>
        </xs:complexType>
      </xs:element>
      <xs:element name="Extensions" type="DayNightFilterExt" minOccurs="0" maxOccurs="1" />
    </xs:sequence>
  </xs:complexType>
  <xs:complexType name="VideoRotationDegree">
    <xs:simpleContent>
      <xs:restriction base="IntegerCap">
        <xs:minInclusive value="0"></xs:minInclusive>
        <xs:maxInclusive value="360"></xs:maxInclusive>
      </xs:restriction>
    </xs:simpleContent>
  </xs:complexType>
  <xs:element name="VideoInputChannel" >
    <xs:complexType>
      <xs:sequence>
        <xs:element name="id" type="IdCap" minOccurs="1" maxOccurs="1" />
        <xs:element name="inputPort" type="StringCap" minOccurs="0" maxOccurs="1" />
        <xs:element name="powerLineFrequencyMode" type="powerLineFrequencyMode" minOccurs="0" maxOccurs="1" />
        <xs:element name="whiteBalanceMode" type="whiteBalanceMode" minOccurs="0" maxOccurs="1" />
```

```
        <xs:element name="whiteBalanceLevel" type="PercentageCap" minOccurs="0" maxOccurs="1" />
        <xs:element name="exposureMode" type="exposureMode" minOccurs="0" maxOccurs="1" />
        <xs:element name="Exposure" type="VideoExposure" minOccurs="0" maxOccurs="1" />
        <xs:element name="GainWindow" type="VideoGainWindow" minOccurs="0" maxOccurs="1" />
        <xs:element name="gainLevel" type="PercentageCap" minOccurs="0" maxOccurs="1" />
        <xs:element name="brightnessLevel" type="PercentageCap" minOccurs="0" maxOccurs="1" />
        <xs:element name="contrastLevel" type="PercentageCap" minOccurs="0" maxOccurs="1" />
        <xs:element name="sharpnessLevel" type="PercentageCap" minOccurs="0" maxOccurs="1" />
        <xs:element name="saturationLevel" type="PercentageCap" minOccurs="0" maxOccurs="1" />
        <xs:element name="hueLevel" type="PercentageCap" minOccurs="0" maxOccurs="1" />
        <xs:element name="gammaCorrectionEnabled" type="BooleanCap" minOccurs="0" maxOccurs="1" />
        <xs:element name="gammaCorrectionLevel" type="PercentageCap" minOccurs="0" maxOccurs="1" />
        <xs:element name="WDREnabled" type="BooleanCap" minOccurs="0" maxOccurs="1" />
        <xs:element name="WDRLevel" type="PercentageCap" minOccurs="0" maxOccurs="1" />
        <xs:element name="LensList" type="VideoLensList" minOccurs="0" maxOccurs="1" />
        <xs:element name="DayNightFilter" type="VideoDayNightFilter" minOccurs="0" maxOccurs="1" />
        <xs:element name="shutterspeed" type="IntegerCap" minOccurs="0" maxOccurs="1" />
        <xs:element name="rotationDegree" type="VideoRotationDegree" minOccurs="0" maxOccurs="1" />
        <xs:element name="mirrorEnabled" type="BooleanCap" minOccurs="0" maxOccurs="1" />
        <xs:element name="Extensions" type="VideoInputChannelExt" minOccurs="0" maxOccurs="1" />
    </xs:sequence>
    <xs:attribute name="version" type="xs:string" use="required" />
  </xs:complexType>
</xs:element>
```

5.7 /OpenHome/Security Data Type Details

5.7.1 /OpenHome/Security/updateSSLCertificate/

Camera should support both client SSL certificates (used for validating Gateway identity) as well as server SSL certificates (used for Gateway to validate a camera's identity). One or more client SSL certificates are pre-configured in the Camera, but can be updated via the /OpenHome/Security/updateSSLCertificate/client Command. Server SSL certificate is used only if Interface Type 1—HTTP/HTTPS Command/Notification Channel is activated, and it is usually not pre-configured at the device. Procedures for updating Camera's client SSL certificate is as follows:

1. Gateway invokes/OpenHome/Security/updateSSLCertificate/server Command to start Certificate Signing Request (CSR) process, Command parameters includes the common name (CN) field to be used as part of the CSR request. CN utilizes the "<serial>-<siteid>-<timestamp>" format.
2. Camera generates its own public/private key pair (if it doesn't have one already)
3. Camera invokes/OpenHome/Security/certificateSigningRequest/server Notification to Gateway, submits this CSR to the server for signing. This is an HTTPS POST request using basic Authorization with the device serial number and key as username and password (see Section 4.1.2 Camera Originated Notifications).
4. Gateway authenticates the CSR request (verifies username and password), invokes a check command on the gateway (passing the CN) in order to obtain approval to process the CSR, and if approved, then signs and returns the result to the camera.

To guard against dictionary attacks, new SSL certificates can be refreshed via the bootstrap procedure. Additionally, network passwords have sufficiently high entropy to make dictionary attacks impractical over the life of the system.

Figure 29:
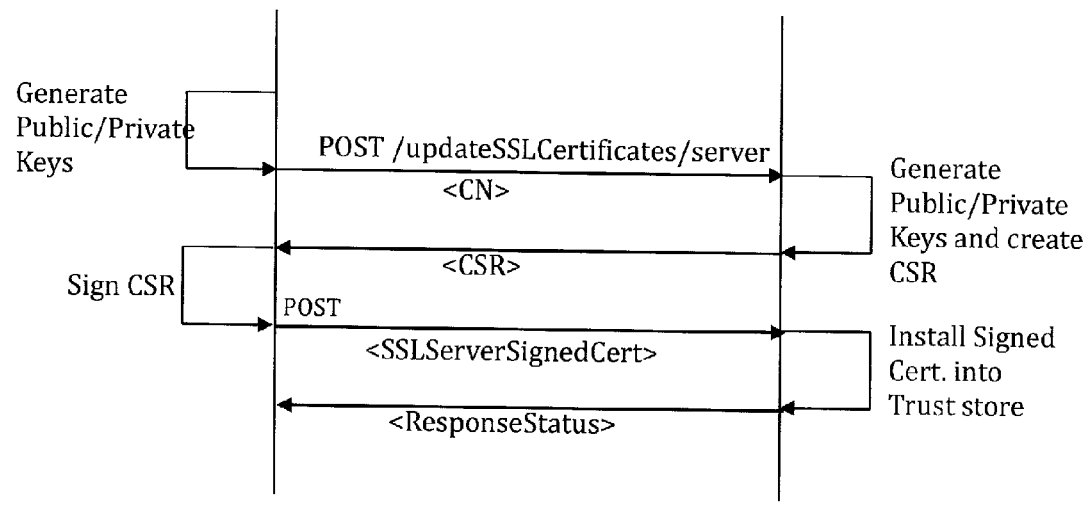
FIG. 29 is a flow diagram of the SSL server certificate update, under an embodiment.

See FIG. 29.

5.7.1.1 /OpenHome/Security/updateSSLCertificate/client

| URI | /OpenHome/Security/updateSSLCertificate/client | Type | | Command |
|---|---|---|---|---|
| Function | This function is used to trigger the device to retrieve an updated client SSL certificate | | | |
| Methods | Query String(s) | | Inbound Data | Return Result |
| POST | | | <UpdateSSLCertCommand> | <ResponseStatus> |
| GET | | | | Exisitng client certificates in PEM format |

| | |
|---|---|
| Notes | For client SSL certificate retrieval, the <clientCert> element is required.<br>Must use HTTPS to request this Command. Camera returns <ResponseStatus> with reboot-required parameter. Camera should verify certificate validity and ignore certificate if not validate.<br>This Command updates client certificates beyond the pre-configured client certificates on the device. It does NOT replace or remove the pre-configured client certificates. |

UpdateSSLCertCommand XML Block

```
<!-- UpdateSSLCertCommand -->
<xs:element name="UpdateSSLCertCommand" >
  <xs:complexType>
    <xs:sequence>
      <xs:element name="clientCert" minOccurs="0" maxOccurs="1" >
        <xs:complexType>
          <xs:sequence>
            <xs:element name="url" type="StringCap"
            minOccurs="1" maxOccurs="1" />
          </xs:sequence>
        </xs:complexType>
      </xs:element>
    </xs:sequence>
    <xs:attribute name="version" type="xs:string" use="required" />
    <xs:attributeGroup ref="Capabilities" />
  </xs:complexType>
</xs:element>
```

5.7.1.2 /OpenHome/Security/updateSSLCertificate/server

| | | | |
|---|---|---|---|
| URI | /OpenHome/Security/updateSSLCertificate/server | Type | Command |
| Function | This function is used to trigger the device to request a new SSL server certificate for the device (used for HTTPS transaction requests to the device) | | |
| Methods | Query String(s) | Inbound Data | Return Result |
| POST | | <UpdateSSLServerCert> | < UpdateSSLServerCert > |
| Notes | When an update to the server certificate is instantiated the caller must provide the CN. The server will then create a new public/private key pair and generate a new CSR. The CSR must be returned to the caller. | | |

UpdateSSLServerCert Command XML Block

```
<xs:element name="UpdateSSLServerCert" >
  <xs:complexType>
    <xs:sequence>
      <xs:element name="cn" type="StringCap" minOccurs="0"
      maxOccurs="1" />
      <xs:element name="csr" type="StringCap" minOccurs="0"
      maxOccurs="1" />
    </xs:sequence>
  </xs:complexType>
</xs:element>
```

5.7.1.3 /OpenHome/Security/updateSSLCertificate/server/signedCert

| | | | |
|---|---|---|---|
| URI | /OpenHome/Security/updateSSLCertificate/server/signedCert | Type | Command |
| Function | This function is used to upload the newly signed CSR to the device. | | |
| Methods | Query String(s) | Inbound Data | Return Result |
| POST | | <SSLServerSignedCert> | <Response Status> |
| Notes | | | |

SSLServerSignedCert Command XML Block

```
<xs:element name="SSLServerSignedCert" >
  <xs:complexType>
    <xs:sequence>
      <xs:element name="signedCert" type="StringCap" minOccurs="1"
        maxOccurs="1" />
      <xs:element name="publicKey" type="StringCap" minOccurs="1"
        maxOccurs="1" />
    </xs:sequence>
  </xs:complexType>
</xs:element>
```

5.7.1.4 Request for updateSSLCertificate

| | | | |
|---|---|---|---|
| URI | https://<hostName>:<portNo>/<updateSSLCertGatewayURL> | Type | HTTPS Request from Camera to Gateway |
| Function | This function is used to request signing of the device's server certificate from Camera to Gateway | | |
| Methods | Query String(s) | Inbound Data | Return Result |
| POST | | <CertificationRequestInfo> | <CertificationRequest> |
| Notes | <updateSSLCertGatewayURL>, <hostname>, are derived from the /OpenHome/Security/updateSSLCertificate/server's <ServerCert> element. Examples: https://192.168.2.200.5000/Notification/updateSSLCertRequest/006222000122 <CertificateSigningRequest> and <CertificationRequest> are defined in RFC 2986 (PKCS #10: Certification Request Syntax Specification). | | |

5.7.2 /OpenHome/Security/AAA/accounts

User and administration accounts on the Camera can be retrieved and configured via the following data types.

5.7.2.1 /OpenHome/Security/AAA/accounts

| | | | |
|---|---|---|---|
| URI | /OpenHome/Security/AAA/accounts | Type | Command |
| Function | Access the device's user list | | |
| Methods | Query String(s) | Inbound Data | Return Result |
| GET | | | <UserList> |
| PUT | | <UserList> | <ResponseStatus> |
| POST | | <Account> | <ResponseStatus> |
| DELETE | | | <ResponseStatus> |
| Notes | For server SSL certificate retrieval, the <serverCert> element is required. It is possible to add, remove and update users entries in the list. Passwords can only be uploaded - they are never revealed during GET operations. See /OpenHome/Security/AAA/accounts/[UID] for <Account> schema. | | |

UserListXML Block

```
<!-- UserList -->
<xs:element name="UserList" >
  <xs:complexType>
    <xs:sequence minOccurs="0" maxOccurs="unbounded">
      <xs:element ref="Account" />
    </xs:sequence>
    <xs:attribute name="version" type="xs:string" use="required" />
    <xs:attributeGroup ref="Capabilities" />
  </xs:complexType>
</xs:element>
```

5.7.2.2 /OpenHome/Security/AAA/accounts/[UID]

| | | | |
|---|---|---|---|
| URI | /OpenHome/Security/AAA/accounts/[UID] | Type | Command |
| Function | Authentication account settings | | |
| Methods | Query String(s) | Inbound Data | Return Result |
| GET | | | <Account> |
| PUT | | <Account> | <ResponseStatus> |
| DELETE | | | <ResponseStatus> |
| Notes | Each <protocolID> tag, if <ProtocolList> is provided, must match a corresponding [UID] tag in /OpenHome/Security/adminAccesses. Note: <password> is a write-only field. | | |

Account XML Block

```
<!-- Account -->
<xs:element name="Account" >
    <xs:complexType>
        <xs:sequence>
            <xs:element name="id" type="IdCap" minOccurs="1"
maxOccurs="1" />
            <xs:element name="userName" type="StringCap"
minOccurs="1" maxOccurs="1" />
            <xs:element name="password" type="StringCap"
minOccurs="0" maxOccurs="1" />
            <xs:element name="accessRights" type="AccessRightsType"
minOccurs="1" maxOccurs="1" />
            <xs:element name="Extensions" type="AccountExt"
minOccurs="0" maxOccurs="1" />
        </xs:sequence>
        <xs:attribute name="version" type="xs:string" use="required" />
    </xs:complexType>
</xs:element>
```

5.7.3 Authorization
5.7.3.1 /OpenHome/Security/Authorization/

| | | | |
|---|---|---|---|
| URI | /OpenHome/Security/Authorization | Type | Command |
| Function | This function is used to get authorization credential from Camera to Gateway | | |
| Methods | Query String(s) | Inbound Data | Return Result |
| GET | | | <AuthorizationInfo> |
| PUT | | <AuthorizationInfo> | <ResponseStatus> |
| Notes | /OpenHome/Security/Authorization is currently not used when a camera operates in OpenHome on-premise mode. | | |
| | siteID is an unique alphanumeric id assigned by the Gateway. | | |
| | SharedSecret is a unique alphanumeric string assigned by the Gateway | | |
| | credentialGWURL is an URL string assigned by the Gateway. | | |
| | pendingKey is an unique alphanumeric string assigned by the Gateway. | | |

AuthorizationInfo XML Block

```
<!-- AuthorizationInfo -->
<xs:element name="AuthorizationInfo" >
    <xs:complexType>
        <xs:sequence>
            <xs:element name="siteID" type="StringCap"
minOccurs="1" maxOccurs="1" />
            <xs:element name="sharedSecret" type="StringCap"
minOccurs="1" maxOccurs="1" />
            <xs:element name="pendingKey" type="StringCap"
minOccurs="1" maxOccurs="1" />
            <xs:element name="credentialGWURL" type="StringCap"
minOccurs="1" maxOccurs="1" />
            <xs:element name="Extensions" type="AuthorizationInfoExt"
minOccurs="0" maxOccurs="1" />
        </xs:sequence>
        <xs:attribute name="version" type="xs:string" use="required" />
    </xs:complexType>
</xs:element>
```

5.8 /OpenHome/Streaming Data Type Details
5.8.1 Configuring Audio/Video/Image Channels
5.8.1.1 /OpenHome/Streaming/channels

| | | | |
|---|---|---|---|
| URI | /OpenHome/Streaming/channels | Type | Command |
| Function | This function is used to configure or get streaming channels | | |
| Methods | Query String(s) | Inbound Data | Return Result |
| GET | | | <StreamingChannelList> |
| PUT | | <StreamingChannelList> | <ResponseStatus> |
| POST | | <StreamingChannel> | <ResponseStatus> |
| Notes | Streaming channels may be hardwired, or it may be possible to create multiple streaming channels per input if the device supports it. | | |

StreamingChannelList XML Block

```
<!-- StreamingChannelList -->
<xs:element name="StreamingChannelList" >
    <xs:complexType>
        <xs:sequence minOccurs="0" maxOccurs="unbounded">
            <xs:element ref="StreamingChannel" />
        </xs:sequence>
        <xs:attribute name="version" type="xs:string" use="required" />
        <xs:attributeGroup ref="Capabilities" />
    </xs:complexType>
</xs:element>
```

5.8.1.2 /OpenHome/Streaming/channels/[UID]

| | | | |
|---|---|---|---|
| URI | /OpenHome/Streaming/channels/[UID] | Type | Command |
| Function | This function is used to configure or get streaming channels | | |
| Methods | Query String(s) | Inbound Data | Return Result |
| GET | | | <StreamingChannel> |
| PUT | | <StreamingChannel> | <ResponseStatus> |
| DELETE | | | <ResponseStatus> |
| Notes | <ControlProtocolList> identifies the control protocols that are valid for this type of streaming.<br><Unicast> is for direct unicast streaming.<br><Multicast> is for direct multicast streaming.<br><videoSourcePortNo> and <audioSourcePortNo> are the source port numbers for the outbound video or audio streams.<br><videoInputChannelID> refers to /OpenHome/System/Video/inputs/channe/[UID].<br><audioInputChannelID> refers to /OpenHome/System/Audio/channels/[UID]. It must beconfigured as an input channel. Use of IPv4 or IPv6 addresses depends on the value of the <ipVersion> field in /OpenHome/System/Network/interfaces/[UID]/ipAddress.<br><Security> determines whether SRTP is used for stream encryption.<br><audioResolution> is the resolution for the outbound audio stream in bits.<br><constantBitRate> is in Kbps.<br><mediaCapture> is only required if the device requires pre-configuration of pre/post capture buffer duration.<br>"pre" and "post" video clip capture lengths are in milliseconds. | | |

StreamingChannel XML Block

```
<!-- StreamingChannel -->
<xs:complexType name="StreamControlProtoList">
    <xs:sequence minOccurs="1" maxOccurs="unbounded">
        <xs:element name="ControlProtocol">
            <xs:complexType>
                <xs:sequence>
                    <xs:element name="streamingTransport" minOccurs="1" maxOccurs="1">
                        <xs:complexType>
                            <xs:simpleContent>
                                <xs:restriction base="StringCap">
                                    <xs:enumeration value="HTTP" />
                                    <xs:enumeration value="RTSP" />
                                    <xs:enumeration value="HTTP,RTSP" />
                                </xs:restriction>
                            </xs:simpleContent>
                        </xs:complexType>
                    </xs:element>
                    <xs:any namespace="##any" processContents="lax" minOccurs="0" maxOccurs="unbounded"/>
                </xs:sequence>
            </xs:complexType>
        </xs:element>
    </xs:sequence>
    <xs:attributeGroup ref="Capabilities" />
</xs:complexType>
<xs:complexType name="StreamUnicast">
    <xs:sequence>
        <xs:element name="enabled" type="BooleanCap" minOccurs="1" maxOccurs="1" />
        <xs:element name="interfaceID" type="StringCap" minOccurs="0" maxOccurs="1" />
        <xs:element name="rtpTransportType" minOccurs="0" maxOccurs="1">
            <xs:complexType>
                <xs:simpleContent>
                    <xs:restriction base="StringCap">
                        <xs:enumeration value="RTP/UDP" />
```

-continued

```
              <xs:enumeration value="RTP/TCP" />
              <xs:enumeration value="RTP/UDP,RTP/TCP" />
            </xs:restriction>
          </xs:simpleContent>
        </xs:complexType>
      </xs:element>
      <xs:element name="Extensions" type="UnicastExt" minOccurs="0" maxOccurs="1" />
    </xs:sequence>
  </xs:complexType>
  <xs:complexType name="StreamMulticast">
    <xs:sequence>
      <xs:element name="enabled" type="BooleanCap" minOccurs="1" maxOccurs="1" />
      <xs:element name="userTriggerThreshold" type="IntegerCap" minOccurs="0" maxOccurs="1" />
      <xs:element name="destIPAddress" type="StringCap" minOccurs="0" maxOccurs="1" />
      <xs:element name="videoDestPortNo" type="IntegerCap" minOccurs="0" maxOccurs="1" />
      <xs:element name="audioDestPortNo" type="IntegerCap" minOccurs="0" maxOccurs="1" />
      <xs:element name="destIPv6Address" type="StringCap" minOccurs="0" maxOccurs="1" />
      <xs:element name="ttl" type="IntegerCap" minOccurs="0" maxOccurs="1" />
      <xs:element name="Extensions" type="MulticastExt" minOccurs="0" maxOccurs="1" />
    </xs:sequence>
  </xs:complexType>
  <xs:complexType name="StreamTransport">
    <xs:sequence>
      <xs:element name="rtspPortNo" type="IntegerCap" minOccurs="0" maxOccurs="1" />
      <xs:element name="maxPacketSize" type="IntegerCap" minOccurs="0" maxOccurs="1" />
      <xs:element name="audioPacketLength" type="IntegerCap" minOccurs="0" maxOccurs="1" />
      <xs:element name="audioInboundPacketLength" type="IntegerCap" minOccurs="0" maxOccurs="1" />
      <xs:element name="audioInboundPortNo" type="IntegerCap" minOccurs="0" maxOccurs="1" />
      <xs:element name="videoSourcePortNo" type="IntegerCap" minOccurs="0" maxOccurs="1" />
      <xs:element name="audioSourcePortNo" type="IntegerCap" minOccurs="0" maxOccurs="1" />
      <xs:element name="ControlProtocolList" type="StreamControlProtoList" minOccurs="1" maxOccurs="1" />
      <xs:element name="Unicast" type="StreamUnicast" minOccurs="0" maxOccurs="1" />
      <xs:element name="Multicast" type="StreamMulticast" minOccurs="0" maxOccurs="1" />
      <xs:element name="Security" minOccurs="0" maxOccurs="1">
        <xs:complexType>
          <xs:sequence>
            <xs:element name="enabled" type="BooleanCap" minOccurs="1" maxOccurs="1" />
            <xs:any namespace="##any" processContents="lax" minOccurs="0" maxOccurs="unbounded"/>
          </xs:sequence>
        </xs:complexType>
      </xs:element>
    </xs:sequence>
  </xs:complexType>
  <xs:complexType name="StreamVideoCodec">
    <xs:sequence>
      <xs:element name="h.264" minOccurs="0" maxOccurs="1">
        <xs:complexType>
          <xs:sequence>
            <xs:element name="profile" minOccurs="1" maxOccurs="1">
              <xs:complexType>
                <xs:simpleContent>
                  <xs:restriction base="StringCap">
                    <xs:enumeration value="baseline" />
                    <xs:enumeration value="main" />
                    <xs:enumeration value="high" />
                    <xs:enumeration value="extended" />
                  </xs:restriction>
                </xs:simpleContent>
              </xs:complexType>
            </xs:element>
            <xs:element name="level" minOccurs="1" maxOccurs="1">
              <xs:complexType>
                <xs:simpleContent>
                  <xs:restriction base="StringCap">
                    <xs:enumeration value="1" />
                    <xs:enumeration value="1b" />
                    <xs:enumeration value="1.1" />
```

```xml
            <xs:enumeration value="1.2" />
            <xs:enumeration value="1.3" />
            <xs:enumeration value="2" />
            <xs:enumeration value="2.1" />
            <xs:enumeration value="2.2" />
            <xs:enumeration value="3" />
            <xs:enumeration value="3.1" />
            <xs:enumeration value="3.2" />
            <xs:enumeration value="4" />
            <xs:enumeration value="4.1" />
            <xs:enumeration value="4.2" />
            <xs:enumeration value="5" />
            <xs:enumeration value="5.1" />
            <xs:enumeration value="5.2" />
          </xs:restriction>
        </xs:simpleContent>
      </xs:complexType>
    </xs:element>
  </xs:sequence>
</xs:complexType>
</xs:element>
<!-- We will only support Simple and Advanced profiles form MPEG4 (Part 2). -->
<!-- Neither of these profiles supports levels. -->
<xs:element name="mpeg4" minOccurs="0" maxOccurs="1">
  <xs:complexType>
    <xs:sequence>
      <xs:element name="profile" minOccurs="1" maxOccurs="1">
        <xs:complexType>
          <xs:simpleContent>
            <xs:restriction base="StringCap">
              <xs:enumeration value="simple" />
              <xs:enumeration value="advanced" />
            </xs:restriction>
          </xs:simpleContent>
        </xs:complexType>
      </xs:element>
    </xs:sequence>
  </xs:complexType>
</xs:element>
<xs:element name="mjpeg" minOccurs="0" maxOccurs="1" />
  </xs:sequence>
</xs:complexType>
<xs:complexType name="StreamVideo">
  <xs:sequence>
    <xs:element name="enabled" type="BooleanCap" minOccurs="1" maxOccurs="1" />
    <xs:element name="videoInputChannelID" type="IdCap" minOccurs="1" maxOccurs="1" />
    <xs:element name="videoCodecType" type="StreamVideoCodec" minOccurs="1" maxOccurs="1" />
    <xs:element name="videoScanType" minOccurs="0" maxOccurs="1">
      <xs:complexType>
        <xs:simpleContent>
          <xs:restriction base="StringCap">
            <xs:enumeration value="progressive" />
            <xs:enumeration value="interlaced" />
          </xs:restriction>
        </xs:simpleContent>
      </xs:complexType>
    </xs:element>
    <xs:element name="videoResolutionWidth" type="IntegerCap" minOccurs="1" maxOccurs="1" />
    <xs:element name="videoResolutionHeight" type="IntegerCap" minOccurs="1" maxOccurs="1" />
    <xs:element name="videoPositionX" type="IntegerCap" minOccurs="0" maxOccurs="1" />
    <xs:element name="videoPositionY" type="IntegerCap" minOccurs="0" maxOccurs="1" />
    <xs:element name="videoQualityControlType" minOccurs="0" maxOccurs="1">
      <xs:complexType>
        <xs:simpleContent>
          <xs:restriction base="StringCap">
            <xs:enumeration value="CBR" />
            <xs:enumeration value="VBR" />
          </xs:restriction>
        </xs:simpleContent>
      </xs:complexType>
    </xs:element>
    <xs:element name="constantBitRate" type="IntegerCap" minOccurs="0" maxOccurs="1" />
    <xs:element name="fixedQuality" type="PercentageCap" minOccurs="0" maxOccurs="1" />
```

-continued

```
        <xs:element name="vbrUpperCap" type="IntegerCap" minOccurs="0" maxOccurs="1" />
        <xs:element name="vbrLowerCap" type="IntegerCap" minOccurs="0" maxOccurs="1" />
        <xs:element name="maxFrameRate" type="IntegerCap" minOccurs="1" maxOccurs="1" />
        <xs:element name="keyFrameInterval" type="IntegerCap" minOccurs="0"
maxOccurs="1" />
        <xs:element name="rotationDegree" minOccurs="0" maxOccurs="1">
          <xs:complexType>
            <xs:simpleContent>
              <xs:restriction base="IntegerCap">
                <xs:minInclusive value="0"></xs:minInclusive>
                <xs:maxInclusive value="360"></xs:maxInclusive>
              </xs:restriction>
            </xs:simpleContent>
          </xs:complexType>
        </xs:element>
        <xs:element name="mirrorEnabled" type="BooleanCap" minOccurs="0"
maxOccurs="1" />
        <xs:element name="snapShotImageType" type="ImageTypeCap" minOccurs="0"
maxOccurs="1" />
        <xs:element name="Extensions" type="VideoExt" minOccurs="0" maxOccurs="1" />
      </xs:sequence>
    </xs:complexType>
    <xs:complexType name="StreamAudio">
      <xs:sequence>
        <xs:element name="enabled" type="BooleanCap" minOccurs="1" maxOccurs="1" />
        <xs:element name="audioInputChannelID" type="IdCap" minOccurs="1"
maxOccurs="1" />
        <xs:element name="audioCompressionType" type="AudioCodec" minOccurs="1"
maxOccurs="1" />
        <xs:element name="audioInboundCompressionType" type="AudioCodec"
minOccurs="0" maxOccurs="1" />
        <xs:element name="audioBitRate" type="IntegerCap" minOccurs="0" maxOccurs="1" />
        <xs:element name="audioSamplingRate" type="FloatCap" minOccurs="0"
maxOccurs="1" />
        <xs:element name="audioResolution" type="IntegerCap" minOccurs="0"
maxOccurs="1" />
        <xs:element name="Extensions" type="AudioExt" minOccurs="0" maxOccurs="1" />
      </xs:sequence>
    </xs:complexType>
    <xs:complexType name="StreamMediaCapture">
      <xs:sequence>
        <xs:element name="preCaptureLength" type="IntegerCap" minOccurs="1"
maxOccurs="1" />
        <xs:element name="postCaptureLength" type="IntegerCap" minOccurs="1"
maxOccurs="1" />
        <xs:element name="Extensions" type="MediaCaptureExt" minOccurs="0"
maxOccurs="1" />
      </xs:sequence>
    </xs:complexType>
    <xs:element name="StreamingChannel" >
      <xs:complexType>
        <xs:sequence>
          <xs:element name="id" type="IdCap" minOccurs="1" maxOccurs="1" />
          <xs: element name="channelName" type="StringCap" minOccurs="1" maxOccurs="1" />
          <xs:element name="enabled" type="BooleanCap" minOccurs="1" maxOccurs="1" />
          <xs:element name="Transport" type="StreamTransport" minOccurs="1"
maxOccurs="1" />
          <xs:element name="Video" type="StreamVideo" minOccurs="0" maxOccurs="1" />
          <xs:element name="Audio" type="StreamAudio" minOccurs="0" maxOccurs="1" />
          <xs:element name="MediaCapture" type="StreamMediaCapture" minOccurs="0"
maxOccurs="1" />
          <xs:element name="Extensions" type="StreamingChannelExt" minOccurs="0"
maxOccurs="1" />
        </xs:sequence>
        <xs:attribute name="version" type="xs:string" use="required" />
      </xs:complexType>
    </xs:element>
```

5.8.1.3 /OpenHome/Streaming/channels/[UID]/capabilities

| | | | |
|---|---|---|---|
| URI | /OpenHome/Streaming/channels/[ID]/capabilities | Type | Command |
| Function | This function is used to get capability of a specific channel and streaming protocol | | |
| Methods | Query String(s) | Inbound Data | Return Result |
| GET | | | <StreamingCapabilities> |
| Notes | | | |

StreamingCapabilities XML Block

```xml
<!-- StreamingCapabilities -->
<xs:complexType name="snapShotImageTypeEnum">
   <xs:simpleContent>
      <xs:restriction base="StringCap">
         <xs:enumeration value="JPEG" />
      </xs:restriction>
   </xs:simpleContent>
</xs:complexType>
<xs:complexType name="VideoCapabilites">
   <xs:sequence>
      <xs:element name="enabled" type="BooleanCap" minOccurs="1" maxOccurs="1" />
      <xs:element name="videoInputChannelID" type="IntegerCap" minOccurs="1" maxOccurs="1" />
      <xs:element name="videoCodecType" type="StreamVideoCodec" minOccurs="1" maxOccurs="1" />
      <xs:element name="videoResolutionWidth" type="IntegerCap" minOccurs="1" maxOccurs="1" />
      <xs:element name="videoResolutionHeight" type="IntegerCap" minOccurs="1" maxOccurs="1" />
      <xs:element name="videoQualityControlType" type="videoQualityControlTypeEnum" minOccurs="1" maxOccurs="1" />
      <xs:element name="constantBitRate" type="IntegerCap" minOccurs="1" maxOccurs="1" />
      <xs:element name="maxFrameRate" type="IntegerCap" minOccurs="1" maxOccurs="1" />
      <xs:element name="snapShotImageType" type="snapShotImageTypeEnum" minOccurs="1" maxOccurs="1" />
      <xs:any namespace="##any" processContents="lax" minOccurs="0" maxOccurs="unbounded"/>
   </xs:sequence>
</xs:complexType>
<xs:complexType name="AudioCapabilites">
   <xs:sequence>
      <xs:element name="enabled" type="BooleanCap" minOccurs="1" maxOccurs="1" />
      <xs:element name="audioInputChannelID" type="IntegerCap" minOccurs="1" maxOccurs="1" />
      <xs:element name="audioCompressionType" type="AudioCodecCap" minOccurs="1" maxOccurs="1" />
      <xs:element name="audioBitRate" type="IntegerCap" minOccurs="1" maxOccurs="1" />
      <xs:any namespace="##any" processContents="lax" minOccurs="0" maxOccurs="unbounded"/>
   </xs:sequence>
</xs:complexType>
<xs:complexType name="MediaCaptureCapabilities">
   <xs:sequence>
      <xs:element name="preCaptureLength" type="IntegerCap" minOccurs="1" maxOccurs="1" />
      <xs:element name="postCaptureLength" type="IntegerCap" minOccurs="1" maxOccurs="1" />
      <xs:any namespace="##any" processContents="lax" minOccurs="0" maxOccurs="unbounded"/>
   </xs:sequence>
</xs:complexType>
<xs:element name="StreamingCapabilities" >
   <xs:complexType>
      <xs:sequence>
         <xs:element name="id" type="IntergerCap" minOccurs="1" maxOccurs="1" />
         <xs:element name="channelName" type="StringCap" minOccurs="0" maxOccurs="1" />
         <xs:element name="enabled" type="BooleanCap" minOccurs="0" maxOccurs="1" />
         <xs:element name="ControlProtocolList" type="StreamControlProtoList" minOccurs="0" maxOccurs="1" />
         <xs:element name="Video" type="VideoCapabilites" minOccurs="0" maxOccurs="1" />
         <xs:element name="Audio" type="AudioCapabilities" minOccurs="0" maxOccurs="1" />
         <xs:element name="MediaCapture" type="MediaCaptureCapabilities" minOccurs="0" maxOccurs="1" />
         <xs:any namespace="##any" processContents="lax" minOccurs="0" maxOccurs="unbounded"/>
      </xs:sequence>
      <xs:attribute name="version" type="xs:string" use="required" />
   </xs:complexType>
</xs:element>
```

5.8.2 Video and Image Command and Status
5.8.2.1 /OpenHome/Streaming/status

| | | | |
|---|---|---|---|
| URI | /OpenHome/Streaming/status | Type | Command |
| Function | This function is used to get | | |
| Methods | Query String(s) | Inbound Data | Return Result |
| GET | | | <StreamingStatus> |
| Notes | This command accesses the status of all device-streaming sessions. | | |

StreamingStatus XML Block

```
<!-- StreamingStatus -->
<xs:element name="StreamingStatus" >
    <xs:complexType>
        <xs:sequence>
            <xs:element name="totalStreamingSessions" type="IntegerCap" minOccurs="1" maxOccurs="1" />
            <xs:element ref="StreamingSessionStatusList" minOccurs="0" maxOccurs="unbounded" />
            <xs:element name="Extensions" type="StreamingStatusExt" minOccurs="0" maxOccurs="1" />
        </xs:sequence>
        <xs:attribute name="version" type="xs:string" use="required" />
    </xs:complexType>
</xs:element>
```

5.8.2.2 /OpenHome/Streaming/channels/[UID]/status

| | | | |
|---|---|---|---|
| URI | /OpenHome/Streaming/channels/[UID]/status | Type | Command |
| Function | Get the list of streaming sessions associated with a particular channel. | | |
| Methods | Query String(s) | Inbound Data | Return Result |
| GET | | | <StreamingSessionStatusList> |
| Notes | Use of IPv4 or IPv6 addresses depends on the value of the <ipVersion> field in /OpenHome/System/Network/interfaces/[UID]/ipAddress.<br>dateTime is in ISO 8601 Date/Time string format. | | |

StreamingSessionStatus XML Block

```
<!-- StreamingSessionStatusList -->
<xs:element name="StreamingSessionStatusList" >
    <xs:complexType>
        <xs:sequence minOccurs="0" maxOccurs="unbounded">
            <xs:element ref="StreamingSessionStatus" />
        </xs:sequence>
        <xs:attribute name="version" type="xs:string" use="required" />
        <xs:attributeGroup ref="Capabilities" />
    </xs:complexType>
</xs:element>
<!-- StreamingSessionStatus -->
<xs:element name="StreamingSessionStatus" >
    <xs:complexType>
        <xs:sequence>
            <xs:element name="clientAddress" type="ipv4ipv6" minOccurs="1" maxOccurs="1" />
            <xs:element name="clientUserName" type="StringCap" minOccurs="0" maxOccurs="1" />
            <xs:element name="startDateTime" type="DateTimeCap" minOccurs="0" maxOccurs="1" />
            <xs:element name="elapsedTime" type="IntegerCap" minOccurs="0" maxOccurs="1" />
            <xs:element name="bandwidth" type="IntegerCap" minOccurs="0" maxOccurs="1" />
            <xs:element name="txPackets" type="IntegerCap" minOccurs="0" maxOccurs="1" />
            <xs:element name="rxPackets" type="IntegerCap" minOccurs="0" maxOccurs="1" />
            <xs:element name="Extensions" type="StreamingSessionStatusExt" minOccurs="0" maxOccurs="1" />
        </xs:sequence>
        <xs:attribute name="version" type="xs:string" use="required" />
    </xs:complexType>
</xs:element>
```

5.8.2.3 /OpenHome/Streaming/channels/[UID]/video/upload

| | | | |
|---|---|---|---|
| URI | /OpenHome/Streaming/channels/[UID]/video/upload | Type | Command |
| Function | This function is used to trigger a video clip capture and upload from Camera to Gateway | | |
| Methods | Query String(s) | Inbound Data | Return Result |
| POST | | <MediaUpload> | <ResponseStatus> |
| Notes | Camera uploads a video clip via procedures described in Section 4.3.1. If upload failed, Camera should send the MediaUploadFailure Notification. snapShotImageType should not be set for video upload. Some devices may not support dynamic request for <preCaptureLength> and <postCaptureLength>; for these devices, use <MediaCapture> configuration in /OpenHome/Streaming/channels/UID] instead. "pre" and "post" capture lengths are in milliseconds. | | |

MediaUpload XML Block

```
<!-- MediaUpload -->
<xs:complexType name="videoClipFormatType">
  <xs:simpleContent>
    <xs:restriction base="StringCap">
      <xs:enumeration value="MP4" />
      <xs:enumeration value="FLV" />
    </xs:restriction>
  </xs:simpleContent>
</xs:complexType>
<xs:element name="MediaUpload" >
  <xs:complexType>
    <xs:sequence>
      <xs:element name="id" type="IdCap" minOccurs="1" maxOccurs="1" />
      <xs:element name="snapShotImageType" type="ImageTypeCap" minOccurs="0" maxOccurs="1" />
      <xs:element name="videoClipFormatType" type="videoClipFormatType" minOccurs="0" maxOccurs="1" />
      <xs:element name="preCaptureLength" type="IntegerCap" minOccurs="0" maxOccurs="1" />
      <xs:element name="postCaptureLength" type="IntegerCap" minOccurs="0" maxOccurs="1" />
      <xs:element name="videoResolutionWidth" type="IntegerCap" minOccurs="0" maxOccurs="1" />
      <xs:element name="videoResolutionHeight" type="IntegerCap" minOccurs="0" maxOccurs="1" />
      <xs:element name="blockUploadComplete" type="BooleanCap" minOccurs="0" maxOccurs="1" />
      <xs:element name="gatewayUrl" type="StringCap" minOccurs="0" maxOccurs="1" />
      <xs:element name="eventUrl" type="StringCap" minOccurs="0" maxOccurs="1" />
      <xs:element name="Extensions" type="StreamingSessionStatusExt" minOccurs="0" maxOccurs="1" />
    </xs:sequence>
    <xs:attribute name="version" type="xs:string" use="required" />
  </xs:complexType>
</xs:element>
```

5.8.2.4 /OpenHome/Streaming/channels/[UID]/requestKeyFrame

| | | | |
|---|---|---|---|
| URI | /OpenHome/Streaming/channels/[UID]/requestKeyFrame | Type | Command |
| Function | Request that the device issue a key frame on a particular profile. | | |
| Methods | Query String(s) | Inbound Data | Return Result |
| POST | | | <ResponseStatus> |
| Notes | The key frame that is issued should include everything necessary to initialize a video decoder, i.e. parameter sets for H.264 or VOS for MPEG-4. | | |

5.8.2.5 /OpenHome/Streaming/channels/[UID]/picture/upload

| | | | |
|---|---|---|---|
| URI | /OpenHome/Streaming/channels/[UID]/picture/upload | Type | Command |
| Function | This function is used to trigger a picture capture and upload from Camera to Gateway | | |
| Methods | Query String(s) | Inbound Data | Return Result |
| POST | | <MediaUpload> | <ResponseStatus> |
| Notes | Camera uploads image via procedures describe in Section 4.3.2. If upload failed, Camera should send the MediaUploadFailure Notification. The videoClipFormatType element in <MediaUpload> should not be used for picture upload. | | |

5.8.2.6 Notification: MediaUploadEvent

The Upload Notification is sent when a media upload Command fails.

| | | | |
|---|---|---|---|
| URI | http or https://<failure_url> or poll:// <failure_url> | Type | Notification |
| Function | This function is used by the Camera to send event alerts to the Gateway. | | |
| Methods | Query String(s) | Inbound Data | Return Result |
| POST | | <MediaUploadFailure> | |
| Notes | <failure_url> is derived from <MediaUpload> XML Block. dateTime is in ISO 8601 Date-Time format. | | |

MediaUploadEvent XML Block

```
<!-- MediaUploadEvent -->
<xs:element name="MediaUploadEvent" >
  <xs:complexType>
    <xs:sequence>
      <xs:element name="id" type="StringCap" minOccurs="1" maxOccurs="1" />
      <xs:element name="dateTime" type="DateTimeCap" minOccurs="1" maxOccurs="1" />
      <xs:element name="uploadType" type="UploadType" minOccurs="1" maxOccurs="1" />
      <xs:element name="eventDescription" type="StringCap" minOccurs="1" maxOccurs="1" />
      <xs:element name="Extensions" type="MediaUploadFailureExt" minOccurs="0" maxOccurs="1" />
    </xs:sequence>
    <xs:attribute name="version" type="xs:string" use="required" />
  </xs:complexType>
</xs:element>
```

5.8.3 Video and Image Acquisition

All commands in this section may be accessed outside of the standard Command HTTP[S] connection.

5.8.3.1 /OpenHome/Streaming/channels/[UID]/rtsp

| | | | |
|---|---|---|---|
| URI | /OpenHome/Streaming/channels/[UID]/rtsp | Type | Command |
| Function | This function is used to request streaming of video from Camera via RTSP | | |
| Methods | Query String(s) | Inbound Data | Return Result |
| RTSP | | | Stream over RTSP |
| Notes | Each channel [UID] is pre-configured with encoding capabilities specific that channel; capabilities include codec type, bitrate, resolution, etc. A channel must be configured to enable RTSP for this Command to succeed. See /OpenHome/Streaming/channels/[UID]. An RTSP connection may be established over a standard HTTP[S] connection, or through the standard RTSP port (554). Device should support RTSP over UDP, TCP, HTTP, and HTTPS transports. | | |

5.8.3.2 /OpenHome/Streaming/channels/[UID]/mjpeg

| | | | |
|---|---|---|---|
| URI | /OpenHome/Streaming/channels/[UID]/mjpeg | Type | Command |
| Function | This function is used to request streaming of MJPEG video from Camera via HTTP[S] | | |
| Methods | Query String(s) | Inbound Data | Return Result |
| GET | | | Stream over HTTP[S] |

| | |
|---|---|
| Notes | This URI is intended for streaming MJPEG video. For RTSP and HLS video streaming, please refer to /OpenHome/Streaming/channels/[UID]/rtsp & /OpenHome/Streaming/channels/[UID]/hls/playlist.<br>Each channel [UID] is pre-configured with encoding capabilities specific that channel; capabilities include codec type, bitrate, resolution, etc. |

5.8.3.3 /OpenHome/Streaming/channels/[UID]/flv

| | | | |
|---|---|---|---|
| URI | /OpenHome/Streaming/channels/[UID]/flv | Type | Command |
| Function | This function is used to request streaming of FLV video from Camera via HTTPS | | |
| Methods | Query String(s) | Inbound Data | Return Result |
| GET | | | Stream over HTTPS |
| Notes | This URI is intended for streaming FLV video.<br>Each channel [UID] is pre-configured with encoding capabilities specific that channel; capabilities include codec type, bitrate, resolution, etc. A channel must be configured to enable FLV for this Command to succeed. See /OpenHome/Streaming/channels/[UID]. | | |

5.8.3.4 /OpenHome/Streaming/channels/[UID]/hls/playlist

| | | | |
|---|---|---|---|
| URI | /OpenHome/Streaming/channels/[UID]/hls/playlist | Type | Command |
| Function | Retrieve HTTP Live Streaming Playlist file | | |
| Methods | Query String(s) | Inbound Data | Return Result |
| GET | | | HTTP Live Streaming Playlist file |
| Notes | This function can be used to retrieve HTTP Live Streaming (HLS) Playlist file in accordance with HLS draft-pantos-http-live-streaming-07. The returned playlist file shall conform to the following requirements:<br>Playlist shall be refreshed periodically at a frequency for supporting real-time streaming<br>Each media segment shall be no longer than 10 sec in duration<br>It is recommended (but not required) that each media segment's URI (in the Playlist) follows the /OpenHome/Streaming/channels/[UID]/hls/<MediaSegmentID> naming convention<br>For Camera that supports multiple streaming channels from the same input source, the Playlist shall list all media segments from the same source. For example, if input source 1 is used by streaming channels 1 and 2 (where channel 1 encodes at VGA 1 Mbps and channel 2 encodes at QVGA 500 Kbps), both streaming channel 1 and 2's media segments should be presented to the player via the Playlist.<br>The use of "EXT-X-KEY" for media encryption is optional. However, off-premise access must be protected via SSL using the HLS Media Tunnel procedures described in section 4.2.3. For on-premise viewing, HTTP Basic Authorization is utilized to authenticate access. | | |

5.8.3.5 /OpenHome/Streaming/channels/[UID]/hls/<MediaSegment>

| | | | |
|---|---|---|---|
| URI | /OpenHome/Streaming/channels/[UID]/hls/playlist/MediaSegment | Type | Command |
| Function | Retrieve HTTP Live Streaming media segment | | |
| Methods | Query String(s) | Inbound Data | Return Result |
| GET | | | HTTP Live Streaming media segment |
| Notes | This is the recommended (but not mandatory) HTTP Live Streaming media segment URI format. The actual URI is specified in the HLS Playlist file (see /OpenHome/Streaming/channels/[UID]/hls/playlist). HTTP Basic Authentication is used to authenticate access. For on-premise viewing, HTTP or HTTPS can be used. For off-premise viewing, media must be protected via SSL using the HLS Media Tunnel procedures. | | |

5.8.3.6 /OpenHome/Streaming/channels/[UID]/picture

| | | | |
|---|---|---|---|
| URI | /OpenHome/Streaming/channels[UID]/picture | Type | Command |
| Function | This function is used to request a picture snapshot | | |
| Methods | Query String(s) | Inbound Data | Return Result |
| GET | resolutionWidth (optional)<br>resolutionHeight (optional)<br>fixedQuality (optional) | | Picture over HTTPS |
| Notes | resolutionWidth and resolutionHeight are capture image width and height respectively.<br>fixedQuality is the image compression quality, ranges from 1 to 100, with 100 as the highest quality.<br>To determine the format of the picture returned, either the parameters in <Video> or the query string values are used, or, if the Accept: header field is present in the request and the server supports it, the picture is returned in that format. | | |

5.8.4 Media Tunnel Creation and Teardown
5.8.4.1 /OpenHome/Streaming/MediaTunnel

| | | | |
|---|---|---|---|
| URI | /OpenHome/Streaming/MediaTunnel | Type | Command |
| Function | This function is used to get a list of active media tunnels | | |
| Methods | Query String(s) | Inbound Data | Return Result |
| GET | | | <MediaTunnelList> |
| Notes | | | |

MediaTunnel XML Block

```
<!-- MediaTunnelList -->
<xs:element name="MediaTunnelList" >
  <xs:complexType>
    <xs:sequence minOccurs="0" maxOccurs="unbounded">
      <xs:element ref="MediaTunnel" />
    </xs:sequence>
    <xs:attribute name="version" type="xs:string" use="required" />
    <xs:attributeGroup ref="Capabilities" />
  </xs:complexType>
</xs:element>
```

5.8.4.2 /OpenHome/Streaming/MediaTunnel/create

| | | | |
|---|---|---|---|
| URI | /OpenHome/Streaming/MediaTunnel/create | Type | Command |
| Function | This function is used to create a media tunnel from Camera to Gateway | | |
| Methods | Query String(s) | Inbound Data | Return Result |
| POST | | <CreateMediaTunnel> | <ResponseStatus> |
| Notes | transportSecurity must be set to TLS<br><sessionID> is returned as the media tunnel [UID] within <ResponseStatus> | | |

CreateMediaTunnel XML Block

```
<!-- CreateMediaTunnelExt -->
<xs:complexType name="CreateMediaTunnelExt">
  <xs:sequence>
    <xs:any namespace="##any" processContents="lax" minOccurs="0" maxOccurs="unbounded"/>
  </xs:sequence>
</xs:complexType>
<!-- CreateMediaTunnel -->
<xs:element name="CreateMediaTunnel" >
  <xs:complexType>
    <xs:sequence>
      <xs:element name="sessionID" type="StringCap" minOccurs="1" maxOccurs="1" />
      <xs:element name="gatewayURL" type="StringCap" minOccurs="1" maxOccurs="1" />
      <xs:element name="failureURL" type="StringCap" minOccurs="1" maxOccurs="1" />
      <xs:element name="Extensions" type="CreateMediaTunnelExt" minOccurs="0" maxOccurs="1" />
    </xs:sequence>
    <xs:attribute name="version" type="xs:string" use="required" />
    <xs:attributeGroup ref="Capabilities" />
  </xs:complexType>
</xs:element>
```

5.8.4.3 /OpenHome/Streaming/MediaTunnel/[UID]/status

| | | | |
|---|---|---|---|
| URI | /OpenHome/Streaming/MediaTunnel[UID]/status | Type | Command |
| Function | This function is used to get status of a specific media tunnel | | |
| Methods | Query String(s) | Inbound Data | Return Result |
| GET | | | <MediaTunnel> |
| Notes | State variables are defined in Sections 4.2.1.1 and 4.2.2.1 | | |

MediaTunnel XML Block

```
<!-- MediaTunnel -->
<xs:complexType name="MediaTunnelSecurity">
  <xs:simpleContent>
    <xs:restriction base="StringCap">
      <xs:enumeration value="TLS" />
      <xs:enumeration value="NONE" />
```

```
        </xs:restriction>
      </xs:simpleContent>
    </xs:complexType>
    <xs:complexType name="MediaTunnelState">
      <xs:simpleContent>
        <xs:restriction base="StringCap">
          <xs:enumeration value="IDLE" />
          <xs:enumeration value="START" />
          <xs:enumeration value="DISCONNECTING" />
          <xs:enumeration value="SOCKET_WAITING" />
          <xs:enumeration value="SOCKET_CONNECTED" />
          <xs:enumeration value="TUNNEL_READY" />
          <xs:enumeration value="RTSP_INIT" />
          <xs:enumeration value="RTSP_READY" />
          <xs:enumeration value="RTSP_PLAYING" />
          <xs:enumeration value="MJPEG_STREAMING" />
          <xs:enumeration value="PICTURE_SNAPSHOT" />
        </xs:restriction>
      </xs:simpleContent>
    </xs:complexType>
    <xs:element name="MediaTunnel" >
      <xs:complexType>
        <xs:sequence>
          <xs:element name="sessionID" type="StringCap" minOccurs="1" maxOccurs="1" />
          <xs:element name="transportSecurity" type="MediaTunnelSecurity" minOccurs="1" maxOccurs="1" />
          <xs:element name="startTime" type="DateTimeCap" minOccurs="0" maxOccurs="1" />
          <xs:element name="elapsedTime" type="IntegerCap" minOccurs="1" maxOccurs="1" />
          <xs:element name="state" type="MediaTunnelState" minOccurs="0" maxOccurs="1" />
          <xs:element name="Extensions" type="MediaTunnelExt" minOccurs="0" maxOccurs="1" />
        </xs:sequence>
        <xs:attribute name="version" type="xs:string" use="required" />
        <xs:attributeGroup ref="Capabilities" />
      </xs:complexType>
    </xs:element>
```

5.8.4.4 /OpenHome/Streaming/MediaTunnel/[UID]/destroy

| | | | |
|---|---|---|---|
| URI | /OpenHome/Streaming/MediaTunnel-[UID]/destroy | Type | Command |
| Function | This function is used to destroy a media tunnel from Camera to Gateway | | |
| Methods | Query String(s) | Inbound Data | Return Result |
| POST | | | <ResponseStatus> |
| Notes | | | |

5.8.4.5 Notification: CreateMediaTunnelFailure

The CreateMediaTunnelFailure Notification is sent when a media tunnel creation Command fails.

| | | | |
|---|---|---|---|
| URI | http or https://<failure_url> or poll://<failure_url> | Type | Notification |
| Function | This function is used by the Camera to send event alerts to the Gateway. | | |
| Methods | Query String(s) | Inbound Data | Return Result |
| POST | | CreateMediaTunnelFailure | |
| Notes | <failure_url> is derived from <MediaUpload> XML Block. dateTime is in ISO 8601 Date-Time format. | | |

CreateMediaTunnelFailure XML Block

```
<!-- CreateMediaTunnelFailure -->
<xs:element name="CreateMediaTunnelFailure" >
  <xs:complexType>
    <xs:sequence>
      <xs:element name="id" type="StringCap" minOccurs="1" maxOccurs="1" />
```

```
        <xs:element name="dateTime" type="DateTimeCap" minOccurs="1" maxOccurs="1" />
        <xs:element name="eventDescription" type="StringCap" minOccurs="0" maxOccurs="1" />
        <xs:element name="Extensions" type="CreateMediaTunnelFailureExt" minOccurs="0" maxOccurs="1" />
      </xs:sequence>
      <xs:attribute name="version" type="xs:string" use="required" />
    </xs:complexType>
  </xs:element>
```

5.9 /OpenHome/PTZ Data Type Details
5.9.1 /OpenHome/PTZ/channels

| URI | /OpenHome/PTZ/channels | Type | Command |
|---|---|---|---|
| Function | Access the list of PTZ channels | | |
| Methods | Query String(s) | Inbound Data | Return Result |
| GET | | | <PTZChannelList> |
| PUT | | <PTZChannelList> | <ResponseStatus> |
| POST | | <PTZChannel> | <ResponseStatus> |
| Notes | PTZ channels are static mechanical control channels contained within the camera and thus may not be added or removed. See Section 5.9.2 for the definition of the <PTZChannel> object. | | |

PTZChannelList XML Block

```
<!-- PTZChannelList -->
<xs:element name="PTZChannelList" >
  <xs:complexType>
    <xs:sequence minOccurs="0" maxOccurs="unbounded">
      <xs:element ref="PTZChannel" />
    </xs:sequence>
    <xs:attribute name="version" type="xs:string" use="required" />
    <xs:attributeGroup ref="Capabilities" />
  </xs:complexType>
</xs:element>
```

5.9.2 /OpenHome/PTZ/channels/[UID]

| URI | /OpenHome/PTZ/channels/[UID] | Type | Command |
|---|---|---|---|
| Function | Access or control a PTZ channel | | |
| Methods | Query String(s) | Inbound Data | Return Result |
| GET | | | <PTZChannel> |
| PUT | | <PTZChannel> | <ResponseStatus> |
| Notes | <videoInputID> links the PTZ channel to a video channel. <panMaxSpeed> defines or limits the maximum pan speed. <tiltMaxSpeed> defines or limits the maximum tilt speed. <autoPatrolSpeed> defines or limits the maximum patrol speed. <controlProtocol> indicates the control protocol to be used for PTZ. Supported protocols are device-dependent. <defaultPreset> identifies the default preset ID to be used with some interfaces. | | |

PTZChannel XML Block

```
<!-- PTZChannel -->
<xs:element name="PTZChannel" >
  <xs:complexType>
    <xs:sequence>
      <xs:element name="id" type="IdCap" minOccurs="1" maxOccurs="1" />
      <xs:element name="enabled" type="BooleanCap" minOccurs="1" maxOccurs="1" />
      <xs:element name="videoInputID" type="StringCap" minOccurs="1" maxOccurs="1" />
      <xs:element name="panMaxSpeed" type="IntegerCap" minOccurs="0" maxOccurs="1" />
      <xs:element name="tiltMaxSpeed" type="IntegerCap" minOccurs="0" maxOccurs="1" />
      <xs:element name="autoPatrolSpeed" type="PercentageCap" minOccurs="0" maxOccurs="1" />
      <xs:element name="controlProtocol" type="StringCap" minOccurs="0" maxOccurs="1" />
      <xs:element name="defaultPresetID" type="IdCap" minOccurs="0" maxOccurs="1" />
      <xs:element name="Extensions" type="PTZChannelExt" minOccurs="0" maxOccurs="1" />
    </xs:sequence>
    <xs:attribute name="version" type="xs:string" use="required" />
  </xs:complexType>
</xs:element>
```

5.9.3 /OpenHome/PTZ/channels/[UID]/homePosition

| URI | /OpenHome/PTZ/channels/[UID] | Type | Command |
|---|---|---|---|
| Function | Set the home position of the PTZ camera to the current position | | |
| Methods | Query String(s) | Inbound Data | Return Result |
| PUT | | | <ResponseStatus> |
| Notes | This function is used to set the current position as the absolute home position for a PTZ enabled device. After calling this API, the current position will act as the reference point for all absolute PTZ commands sent to the device. | | |

5.9.4 /OpenHome/PTZ/channels/[UID]/relative

| URI | /OpenHome/PTZ/channels/[UID]/relative | Type | Command |
|---|---|---|---|
| Function | Pans, tilts, and/or zooms the device relative to the current position. | | |
| Methods | Query String(s) | Inbound Data | Return Result |
| PUT | positionX positionY relativeZoom | <PTZData> | <ResponseStatus> |
| Notes | The device shall not respond with a <ResponseStatus> until the PTZ command has been issued. Either the inbound data or query string values are used. The <positionX> and <positionY> tags must be provided in relation to the currently set video resolution. The device will center on the provided coordinates. The <relativeZoom> tag roughly indicates what percentage to zoom in respect to the current image. The auto patrol feature is stopped if it is running. | | |

Relative PTZ Data XML Block

```
<!-- PTZData -->
<xs:element name="PTZData" >
  <xs:complexType>
    <xs:sequence>
```

```
            <xs:element name="Relative" minOccurs="0" maxOccurs="1">
                <xs:complexType>
                    <xs:sequence>
                        <xs:element name="positionX" type="IntegerCap" minOccurs="0" maxOccurs="1" />
                        <xs:element name="positionY" type="IntegerCap" minOccurs="0" maxOccurs="1" />
                        <xs:element name="relativeZoom" type="VectorCap" minOccurs="0" maxOccurs="1" />
                    </xs:sequence>
                </xs:complexType>
            </xs:element>
            <xs:element name="Extensions" type="PTZDataExt" minOccurs="0" maxOccurs="1" />
        </xs:sequence>
        <xs:attribute name="version" type="xs:string" use="required" />
    </xs:complexType>
</xs:element>
```

5.9.5 /OpenHome/PTZ/channels/[UID]/absolute

| | | | |
|---|---|---|---|
| URI | /OpenHome/PTZ/channels/[UID]/absolute | Type | Command |
| Function | Pans, tilts, and/or zooms the device relative to the absolute home position. | | |
| Methods | Query String(s) | Inbound Data | Return Result |
| PUT | | <PTZData> | <ResponseStatus> |
| Notes | The device shall not respond with a <ResponseStatus> until the PTZ command has been issued. All parameters in the <Absolute> block must be provided. The device will pan/tilt to the provided elevation and azimuth degrees in respect to the devices "home" position. The device will also zoom to the position specified by <absoluteZoom>. The "homePosition" URI should be called first to configure the device's "home" or "zero" position. The auto patrol feature is stopped if it is running. | | |

Absolute PTZ Data XML Block

```
<!-- PTZData -->
<xs:complexType name="PTZElevation">
    <xs:simpleContent>
        <xs:restriction base="IntegerCap">
            <xs:minInclusive value="-90" />
            <xs:maxInclusive value="90" />
        </xs:restriction>
    </xs:simpleContent>
</xs:complexType>
<xs:complexType name="PTZAzimuth">
    <xs:simpleContent>
        <xs:restriction base="IntegerCap">
            <xs:minInclusive value="0" />
            <xs:maxInclusive value="360" />
        </xs:restriction>
    </xs:simpleContent>
</xs:complexType>
<xs:element name="PTZData" >
    <xs:complexType>
        <xs:sequence>
            <xs:element name="Absolute" minOccurs="0" maxOccurs="1">
                <xs:complexType>
                    <xs:sequence>
                        <xs:element name="elevation" type="PTZElevation" minOccurs="0" maxOccurs="1" />
                        <xs:element name="azimuth" type="PTZAzimuth" minOccurs="0" maxOccurs="1" />
                        <xs:element name="absoluteZoom" type="PercentageCap" minOccurs="0" maxOccurs="1" />
                    </xs:sequence>
                </xs:complexType>
            </xs:element>
            <xs:element name="Extensions" type="PTZDataExt" minOccurs="0" maxOccurs="1" />
        </xs:sequence>
        <xs:attribute name="version" type="xs:string" use="required" />
    </xs:complexType>
</xs:element>
```

5.9.6 /OpenHome/PTZ/channels/[UID]/status

| | | | |
|---|---|---|---|
| URI | /OpenHome/PTZ/channels[UID]/status | Type | Command |
| Function | Get current PTZ camera position information. | | |
| Methods | Query String(s) | Inbound Data | Return Result |
| GET | | | <PTZStatus> |
| Notes | Currently only querying the absolute coordinates, elevation, azimuth and zoom, is supported. | | |

PTZStatus XML Block

```
<!-- PTZStatus -->
<xs:element name="PTZStatus" >
    <xs:complexType>
        <xs:sequence>
            <xs:element name="Absolute">
                <xs:complexType>
                    <xs:sequence>
                        <xs:element name="elevation" type="PTZElevation" minOccurs="0" maxOccurs="1" />
                        <xs:element name="azimuth" type="PTZAzimuth" minOccurs="0" maxOccurs="1" />
                        <xs:element name="absoluteZoom" type="PercentageCap" minOccurs="0" maxOccurs="1" />
                    </xs:sequence>
                </xs:complexType>
            </xs:element>
            <xs:any namespace="##any" processContents="lax" minOccurs="0" maxOccurs="unbounded"/>
        </xs:sequence>
        <xs:attribute name="version" type="xs:string" use="required" />
    </xs:complexType>
</xs:element>
```

5.10 /OpenHome/Event Data Type Details

5.10.1 Event Configuration Commands

5.10.1.1 /OpenHome/Event

| | | | |
|---|---|---|---|
| URI | /OpenHome/Event | Type | Command |
| Function | Access and configure the device event behavior and notifications. | | |
| Methods | Query String(s) | Inbound Data | Return Result |
| GET | | | <EventNotification> |
| PUT | | <EventNotification> | <ResponseStatus> |
| Notes | The event trigger list defines the set of device behaviors that trigger events. The event schedule defines when event notifications are active. The event notification methods define what types of notification (HTTP, FTP, e-mail) are supported. | | |

EventNotifiction XML Block

```
<!-- EventNotification -->
<xs:element name="EventNotification" >
    <xs:complexType>
        <xs:sequence>
            <xs:element ref="EventTriggerList" minOccurs="1" maxOccurs="1" />
            <xs:element ref="EventNotificationMethods" minOccurs="1" maxOccurs="1" />
            <xs:any namespace="##any" processContents="lax" minOccurs="0" maxOccurs="unbounded"/>
```

```
        </xs:sequence>
        <xs:attribute name="version" type="xs:string" use="required" />
    </xs:complexType>
</xs:element>
```

5.10.1.2 /OpenHome/Event/triggers

| | | | |
|---|---|---|---|
| URI | /OpenHome/Event/triggers | Type | Command |
| Function | Access and configure the device event behavior and notifications. | | |
| Methods | Query String(s) | Inbound Data | Return Result |
| GET | | <EventTriggerList> | <EventTriggerList> |
| PUT | | <EventTrigger> | <ResponseStatus> |
| POST | | | <ResponseStatus> |
| Notes | Event triggering defines how the device reacts to particular events, such as video loss or motion detection. | | |

EventTriggerList XML Block

```
<!-- EventTriggerList -->
<xs:element name="EventTriggerList" >
    <xs:complexType>
        <xs:sequence minOccurs="0" maxOccurs="unbounded">
            <xs:element ref="EventTrigger" />
        </xs:sequence>
        <xs:attribute name="version" type="xs:string" use="required" />
        <xs:attributeGroup ref="Capabilities" />
    </xs:complexType>
</xs:element>
```

5.10.1.3 /OpenHome/Event/triggers/[UID]/

| | | | |
|---|---|---|---|
| URI | /OpenHome/Event/triggers/[UID] | Type | Command |
| Function | Access a particular event trigger. | | |
| Methods | Query String(s) | Inbound Data | Return Result |
| GET | | | <EventTrigger> |
| PUT | | <EventTrigger> | <ResponseStatus> |
| DELETE | | | <ResponseStatus> |
| Notes | An event trigger determines how the device reacts when a particular event is detected. The following types are supported: PirMD: trigger on PIR motion detection VMD: trigger on video motion detection. SndD: trigger on sound detection TempD: trigger on temperature detection eventTypeInputID: ID of eventTypeInput. For example, if VMD supports multiple input channels, this Id is used to differentiate between them. For intervalBetweenEvents: minimum interval in seconds between 2 detection triggers | | |

EventTrigger XML Block

```
<!-- EventType -->
<xs:simpleType name="EventType">
    <xs:restriction base="xs:string">
        <xs:enumeration value="PirMD" />
        <xs:enumeration value="VMD" />
        <xs:enumeration value="SndD" />
        <xs:enumeration value="TempD" />
    </xs:restriction>
</xs:simpleType>
<!-- EventTrigger -->
<xs:element name="EventTrigger" >
    <xs:complexType>
        <xs:sequence>
            <xs:element name="id" type="IdCap" minOccurs="1" maxOccurs="1" />
            <xs:element name="eventType" type="EventType" minOccurs="1" maxOccurs="1" />
            <xs:element name="eventTypeInputID" type="IdCap" minOccurs="0" maxOccurs="1" />
            <xs:element name="eventDescription" type="StringCap" minOccurs="0" maxOccurs="1" />
            <xs:element name="inputIOPortID" type="IdCap" minOccurs="0" maxOccurs="1" />
            <xs:element name="intervalBetweenEvents" type="IntegerCap" minOccurs="1" maxOccurs="1" />
            <xs:element ref="EventTriggerNotificationList" minOccurs="0" maxOccurs="1" />
            <xs:element name="Extensions" type="EventTriggerExt" minOccurs="0" maxOccurs="1" />
        </xs:sequence>
        <xs:attribute name="version" type="xs:string" use="required" />
    </xs:complexType>
</xs:element>
```

5.10.1.4 /OpenHome/Event/triggers/[UID]/notifications

| | | | |
|---|---|---|---|
| URI | /OpenHome/Event/triggers/[UID]/notifications | Type | Command |
| Function | List of notification methods and behaviors. | | |
| Methods | Query String(s) | Inbound Data | Return Result |
| GET | | | <EventTriggerNotificationList> |
| PUT | | <EventTriggerNotificationList> | <ResponseStatus> |
| POST | | <EventTriggerNotification> | <ResponseStatus> |
| Notes | This section determines the kinds of notifications that are supported for a particular event trigger and their recurrences and behaviors. | | |

EventTriggerNotificationList XML Block

```
<!-- EventTriggerNotificationList -->
<xs:element name="EventTriggerNotificationList" >
    <xs:complexType>
        <xs:sequence minOccurs="0" maxOccurs="unbounded">
            <xs:element ref="EventTriggerNotification" />
        </xs:sequence>
        <xs:attribute name="version" type="xs:string" use="required" />
        <xs:attributeGroup ref="Capabilities" />
    </xs:complexType>
</xs:element>
```

5.10.1.5 /OpenHome/Event/triggers/[UID]/notifications/[NOTIFYID]

| | | | |
|---|---|---|---|
| URI | /OpenHome/Event/triggers/[UID]/notifications/[NOTIFYID] | Type | Command |
| Function | Access and configure a particular notification trigger. | | |
| Methods | Query String(s)    Inbound Data | Return Result | |
| GET | | <EventTriggerNotification> | |
| PUT | <EventTriggerNotification> | <ResponseStatus> | |
| DELETE | | <ResponseStatus> | |
| Notes | notificationRecurrence: | | |
| | beginning    send EventAlert at beginning of trigger event | | |
| | beginningandend    send EventAlert at beginning of event detection and at the end | | |
| | recurring    send EventAlert at beginning, continue sending >notificationInterval> while trigger is active until end of detection (e.g. motion stopped). At end of detection, send EventAlert. | | |
| | notificationInterval: interval between EventAlert message is sent while detected event is active | | |

EventTriggerNotification XML Block

```
<!-- EventTriggerNotification -->
<xs:complexType name="EventNotificationMethod">
    <xs:simpleContent>
        <xs:restriction base="StringCap">
            <xs:enumeration value="HTTP" />
            <xs:enumeration value="XMPP" />
            <xs:enumeration value="POLL" />
        </xs:restriction>
    </xs:simpleContent>
</xs:complexType>
<xs:complexType name="EventNotificationRecurrence">
    <xs:simpleContent>
        <xs:restriction base="StringCap">
            <xs:enumeration value="beginning" />
            <xs:enumeration value="beginningandend" />
            <xs:enumeration value="recurring" />
        </xs:restriction>
    </xs:simpleContent>
</xs:complexType>
```

-continued

```
<xs:element name="EventTriggerNotification" >
    <xs:complexType>
        <xs:sequence>
            <xs:element name="notificationID" type="IdCap"
                minOccurs="1" maxOccurs="1" />
            <xs:element name="notificationMethod"
                type="EventNotificationMethod" minOccurs="1" maxOccurs="1" />
            <xs:element name="notificationRecurrence"
                type="EventNotificationRecurrence" minOccurs="1" maxOccurs="1" />
            <xs:element name="notificationInterval" type="IntegerCap"
                minOccurs="0" maxOccurs="1" />
            <xs:element name="Extensions"
                type="EventTriggerNotificationExt" minOccurs="0" maxOccurs="1" />
        </xs:sequence>
        <xs:attribute name="version" type="xs:string" use="required" />
    </xs:complexType>
</xs:element>
```

5.10.1.6 /OpenHome/Event/notification/methods

| | | | |
|---|---|---|---|
| URI | /OpenHome/Event/notification/methods | Type | Command |
| Function | Configure notifications. This data type defines how notification should be sent to the Gateway when an event is triggered. | | |
| Methods | Query String(s)    Inbound Data | Return Result | |
| GET | | <EventNotificationMethods> | |
| PUT | <EventNotificationMethods> | <ResponseStatus> | |
| Notes | The following notification types are supported: | | |
| | HTTP(S): the device connects to a given address and port and issues an HTTP(S) POST with the given parameters. | | |
| | <MediaFormat> determines the type of snapshot, video clip and the video clip pre and post recording times. | | |
| | <NonMediaEvent> instructs Camera to post <EventAlert> upon trigger without media upload. | | |
| | For most applications, either <NonMediaEvent> or <MediaFormat> is used, but not both at the same time. | | |
| | If an entry in <HostNotificationList> contains a POLL URI and a <MediaFormat> is given then the camera should raise an error. | | |

EventNotificationMethods XML Block

```xml
<!-- EventNotificationMethods -->
<xs:complexType name="EventMediaFormat">
   <xs:sequence>
      <xs:element name="snapShotImageType" type="ImageTypeCap" minOccurs="0" maxOccurs="1" />
      <xs:element name="videoClipFormatType" type="videoClipFormatType" minOccurs="0" maxOccurs="1" />
      <xs:element name="preCaptureLength" type="IntegerCap" minOccurs="0" maxOccurs="1" />
      <xs:element name="postCaptureLength" type="IntegerCap" minOccurs="0" maxOccurs="1" />
      <xs:element name="Extensions" type="MediaFormatExt" minOccurs="0" maxOccurs="1" />
   </xs:sequence>
</xs:complexType>
<xs:complexType name="EventNonMediaFormat">
   <xs:sequence>
      <xs:element name="enabled" type="BooleanCap" minOccurs="0" maxOccurs="1" />
      <xs:element name="Extensions" type="NonMediaEventExt" minOccurs="0" maxOccurs="1" />
   </xs:sequence>
</xs:complexType>
<xs:element name="EventNotificationMethods" >
   <xs:complexType>
      <xs:sequence>
         <xs:element ref="HostNotificationList" minOccurs="0" maxOccurs="1" />
         <xs:element name="MediaFormat" type="EventMediaFormat" minOccurs="0" maxOccurs="1" />
         <xs:element name="NonMediaEvent" type="EventNonMediaFormat" minOccurs="0" maxOccurs="1" />
      </xs:sequence>
      <xs:attribute name="version" type="xs:string" use="required" />
   </xs:complexType>
</xs:element>
```

5.10.1.7 /OpenHome/Event/notification/host

| URI | /OpenHome/Event/notification/host | Type | Command |
|---|---|---|---|
| Function | Access the list of notification hosts. | | |
| Methods | Query String(s) | Inbound Data | Return Result |
| GET | | | <HostNotificationList> |
| PUT | | <HostNotificationList> | <ResponseStatus> |
| Notes | Host notification involves the device connecting to a particular URL and delivering a message whenever the event triggers. If the notification has been configured as POLL, and a "poll://<URL>" is given then an event will be placed into the internal notificaiton event queue. | | |

HostNotificationList XML Block

```xml
<!-- HostNotificationList -->
<xs:element name="HostNotificationList" >
  <xs:complexType>
     <xs:sequence minOccurs="0" maxOccurs="unbounded">
        <xs:element ref="HostNotification" />
     </xs:sequence>
     <xs:attribute name="version" type="xs:string" use="required" />
     <xs:attributeGroup ref="Capabilities" />
  </xs:complexType>
</xs:element>
```

5.10.1.8 /OpenHome/Event/notification/host/[UID]

| URI | /OpenHome/Event/notification/host/[UID] | Type | Command |
|---|---|---|---|
| Function | Access a particular notification host. | | |
| Methods | Query String(s) | Inbound Data | Return Result |
| GET | | | <HostNotification> |
| PUT | | <HostNotification> | <ResponseStatus> |
| DELETE | | | <ResponseStatus> |

| Notes | Procedures for how to upload media to Gateway are defined in Section 4.2.5. If HTTP is chosen and <MediaFormat> is selected then a media clip will be uploaded to the specified URL. If <NonMediaFormat> is selected then the event will be uploaded to the URL. If POLL is selected then only <NonMediaFormat> will be available, and the specified event shall be placed into the notification event queue. |
|---|---|

HostNotification XML Blockusa

```xml
<!-- HostNotification -->
<xs:element name="HostNotification" >
   <xs:complexType>
      <xs:sequence>
         <xs:element name="id" type="IdCap" minOccurs="1" maxOccurs="1" />
         <xs:element name="url" type="StringCap" minOccurs="1" maxOccurs="1" />
         <xs:element name="httpAuthenticationMethod" type="HTTPAuthenticationMethod" minOccurs="0" maxOccurs="1" />
         <xs:any namespace="##any" processContents="lax" minOccurs="0" maxOccurs="unbounded"/>
      </xs:sequence>
      <xs:attribute name="version" type="xs:string" use="required" />
   </xs:complexType>
</xs:element>
```

5.10.2 Event Detection Configuration Commands

5.10.2.1 Motion Detection

/OpenHome/Custom/MotionDetection can be used for both Video Motion detection and Passive Infrared Motion detection methods.

5.10.2.1.1 /OpenHome/Event/MotionDetection/PIR or /OpenHome/Event/MotionDetection/video

| URI | /OpenHome/Event/MotionDetection/ PIR or /OpenHome/Event/ MotionDetection/video | Type | Command |
|---|---|---|---|
| Function | Motion detection configuration for all video input channels. | | |
| Methods | Query String(s) | Inbound Data | Return Result |
| GET | | | <MotionDetectionList> |
| Notes | Either PIR or video analytics based motion detection methods are supported via this data model. If the device supports video motion detection, a motion detection ID will be allocated for each video input channel ID. The motion detection ID must correspond to the video input channel ID. If the device supports PIR motion detection, one or more PIR detection channels can be supported. If no motion detection capability is supported for a requested path (e.g., /video or /PIR), device returns a MotionDetectionList with no element. | | |

MotionDetectionList XML Block

```xml
<!-- MotionDetectionList -->
<xs:element name="MotionDetectionList" >
   <xs:complexType>
      <xs:sequence minOccurs="0" maxOccurs="unbounded">
         <xs:element ref="MotionDetection" />
      </xs:sequence>
      <xs:attribute name="version" type="xs:string" use="required" />
      <xs:attributeGroup ref="Capabilities" />
   </xs:complexType>
</xs:element>
```

5.10.2.1.2 /OpenHome/Event/MotionDetection/PIR/[UID] or /OpenHome/Event/MotionDetection/video[UID]

| | | | |
|---|---|---|---|
| URI | /OpenHome/Event/MotionDetection/PIR/[UID] or /OpenHome/Event/MotionDetection/video/[UID] | Type | Command |
| Function | Motion detection configuration for all video input channels. | | |
| Methods | Query String(s) | Inbound Data | Return Result |
| GET | | | <MotionDetection> |
| PUT | | <MotionDetection> | <ResponseStatus> |
| Notes | Grid-based motion detect divides the image into a set of fixed "bins" that delimit the motion detection area boundaries. ROI-based motion detection allows motion areas or regions of interest to be defined based on pixel coordinates. If a <pirSettings> element is present then both Grid/ROI and PIR must activate in order to signal motion has occurred. For PIR-based detection, the MotionDetectionRegionList element must not be included, rather the pirSettings element must be present. | | |

MotionDetection XML Block

```
<!-- MotionDetection -->
<xs:complexType name="MotionDirection">
    <xs:simpleContent>
        <xs:restriction base="StringCap">
            <xs:enumeration value="left-right" />
            <xs:enumeration value="right-left" />
            <xs:enumeration value="up-down" />
            <xs:enumeration value="down-up" />
            <xs:enumeration value="any" />
        </xs:restriction>
    </xs:simpleContent>
</xs:complexType>
<xs:complexType name="MotionRegionType">
    <xs:simpleContent>
        <xs:restriction base="StringCap">
            <xs:enumeration value="grid" />
            <xs:enumeration value="roi" />
        </xs:restriction>
    </xs:simpleContent>
</xs:complexType>
<xs:complexType name="MotionPIR">
    <xs:sequence>
        <!-- All times are based in milliseconds. -->
        <xs:element name="PirValidTime" type="IntegerCap" minOccurs="0" maxOccurs="1" />
        <xs:element name="PirMotionTime" type="IntegerCap" minOccurs="0" maxOccurs="1" />
        <xs:any namespace="##any" processContents="lax" minOccurs="0" maxOccurs="unbounded"/>
    </xs:sequence>
</xs:complexType>
<xs:complexType name="MotionGrid">
    <xs:sequence>
        <xs:element name="rowGranularity" type="IntegerCap" minOccurs="1" maxOccurs="1" />
        <xs:element name="columnGranularity" type="IntegerCap" minOccurs="1" maxOccurs="1" />
        <xs:any namespace="##any" processContents="lax" minOccurs="0" maxOccurs="unbounded"/>
    </xs:sequence>
</xs:complexType>
<xs:complexType name="MotionROI">
    <xs:sequence>
        <xs:element name="minHorizontalResolution" type="IntegerCap" minOccurs="1" maxOccurs="1" />
        <xs:element name="minVerticalResolution" type="IntegerCap" minOccurs="1" maxOccurs="1" />
        <xs:any namespace="##any" processContents="lax" minOccurs="0" maxOccurs="unbounded"/>
    </xs:sequence>
</xs:complexType>
<xs:element name="MotionDetection" >
    <xs:complexType>
        <xs:sequence>
            <xs:element name="id" type="IdCap" minOccurs="1" maxOccurs="1" />
            <xs:element name="enabled" type="BooleanCap" minOccurs="1" maxOccurs="1" />
            <xs:element name="inputID" type="StringCap" minOccurs="1" maxOccurs="1" />
            <xs:element name="samplingInterval" type="IntegerCap" minOccurs="0" maxOccurs="1" />
            <xs:element name="startTriggerTime" type="IntegerCap" minOccurs="0" maxOccurs="1" />
            <xs:element name="endTriggerTime" type="IntegerCap" minOccurs="0" maxOccurs="1" />
```

```xml
<!-- If more than one direction is specified then these directions
    shall be logical OR'ed together. This provides support
    for diagonal movement detection. A selection of "any" will override
    all other choices.
-->
    <xs:element name="directionSensitivity" type="MotionDirection" minOccurs="0" maxOccurs="4" />
    <xs:element name="regionType" type="MotionRegionType" minOccurs="0" maxOccurs="1" />
    <xs:element name="minObjectSize" type="IntegerCap" minOccurs="0" maxOccurs="1" />
    <xs:element name="maxObjectSize" type="IntegerCap" minOccurs="0" maxOccurs="1" />
    <xs:element name="Grid" type="MotionGrid" minOccurs="0" maxOccurs="1" />
    <xs:element name="ROI" type="MotionROI" minOccurs="0" maxOccurs="1" />
    <xs:element name="PIR" type="MotionPIR" minOccurs="0" maxOccurs="1" />
    <xs:element ref="MotionDetectionRegionList" minOccurs="1" maxOccurs="1" />
    <xs:any namespace="##any" processContents="lax" minOccurs="0" maxOccurs="unbounded"/>
  </xs:sequence>
  <xs:attribute name="version" type="xs:string" use="required" />
 </xs:complexType>
</xs:element>
```

5.10.2.1.3 /OpenHome/Event/MotionDetection/video/[UID]/regions

| | | | |
|---|---|---|---|
| URI | /OpenHome/Event/MotionDetection/video/[UID]/regions | Type | Command |
| Function | Motion detection configuration for all video input channels. | | |
| Methods | Query String(s) | Inbound Data | Return Result |
| GET | | | <MotionDetectionRegionList> |
| PUT | | <MotionDetectionRegionList> | <ResponseStatus> |
| POST | | <MotionDetectionRegion> | <ResponseStatus> |
| Notes | Each motion detection region has its own detection threshold and sensitivity level. It is possible to define mask regions that are subtracted from other regions, allowing non-rectangular motion areas to be configured. | | |

MotionDetectionRegionList XML Block

```xml
<!-- MotionDetectionRegionList -->
<xs:element name="MotionDetectionRegionList">
  <xs:complexType>
    <xs:sequence minOccurs="0" maxOccurs="unbounded">
      <xs:element ref="MotionDetectionRegion" />
    </xs:sequence>
    <xs:attribute name="version" type="xs:string" use="required" />
    <xs:attributeGroup ref="Capabilities" />
  </xs:complexType>
</xs:element>
```

5.10.2.1.4 /OpenHome/Event/MotionDetection/video/[UID]/regions/[REGIONID]

| | | | |
|---|---|---|---|
| URI | /OpenHome/Event/MotionDetection/video/[UID]/regions/[REGIONID] | Type | Command |
| Function | Motion detection configuration for all video input channels. | | |
| Methods | Query String(s) | Inbound Data | Return Result |
| GET | | | <MotionDetectionRegionList > |
| PUT | | <MotionDetectionRegion > | <ResponseStatus > |
| DELETE | | | <ResponseStatus > |

Notes

The Camera must support a rectangular region that consists of two coordinates: the lower-left and upper-right. All two-coordinate RegionCoordinatesList elements must be treated as such. In addition, the Camera must support a rectangular region that can be "drawn" from four coordinates with four points in a clockwise direction, beginning point with the low-left point. If the coordinates do not form a supported region, the Camera must return an error.

MotionDetectionRegionList XML Block

```xml
<!-- RegionCoordinates -->
<xs:element name="RegionCoordinates">
  <xs:complexType>
    <xs:sequence>
      <xs:element name="positionX" type="IntegerCap" minOccurs="1" maxOccurs="1" />
      <xs:element name="positionY" type="IntegerCap" minOccurs="1" maxOccurs="1" />
      <xs:any namespace="##any" processContents="lax" minOccurs="0" maxOccurs="unbounded"/>
    </xs:sequence>
  </xs:complexType>
</xs:element>
<!-- RegionCoordinatesList -->
<xs:element name="RegionCoordinatesList">
  <xs:complexType>
    <xs:sequence minOccurs="0" maxOccurs="unbounded">
      <xs:element ref="RegionCoordinates" />
    </xs:sequence>
    <xs:attributeGroup ref="Capabilities" />
  </xs:complexType>
</xs:element>
<!-- MotionDetectionRegion -->
<xs:element name="MotionDetectionRegion">
  <xs:complexType>
    <xs:sequence>
      <xs:element name="id" type="IdCap" minOccurs="1" maxOccurs="1" />
      <xs:element name="enabled" type="BooleanCap" minOccurs="1" maxOccurs="1" />
      <xs:element name="maskEnabled" type="BooleanCap" minOccurs="0" maxOccurs="1" />
      <xs:element name="sensitivityLevel" type="PercentageCap" minOccurs="1" maxOccurs="1" />
      <xs:element name="detectionThreshold" type="PercentageCap" minOccurs="1" maxOccurs="1" />
      <xs:element ref="RegionCoordinatesList" minOccurs="1" maxOccurs="1" />
      <xs:any namespace="##any" processContents="lax" minOccurs="0" maxOccurs="unbounded"/>
    </xs:sequence>
    <xs:attribute name="version" type="xs:string" use="required" />
  </xs:complexType>
</xs:element>
```

5.10.2.1.5  /OpenHome/Event/MotionDetection/video/[UID]/capabilities

| | | | |
|---|---|---|---|
| URI | /OpenHome/Event/MotionDetection/video/[UID]/capabilities | Type | Command |
| Function | Motion detection configuration for all video input channels. | | |
| Methods | Query String(s) | Inbound Data | Return Result |
| GET | | | <MotionDetectionCapabilities> |
| Notes | samplingInterval is the number of frames skipped between motion detection samples. | | |

MotionDetectionCapabilities XML Block

```xml
<!-- MotionDetectionCapabilities -->
<xs:complexType name="MotionTypeEnum">
  <xs:simpleContent>
    <xs:restriction base="StringCap">
      <xs:enumeration value="roi" />
      <xs:enumeration value="grid" />
      <xs:enumeration value="pir" />
    </xs:restriction>
  </xs:simpleContent>
</xs:complexType>
<xs:complexType name="GridCapabilites">
  <xs:sequence>
    <xs:element name="rowGranularity" type="IntegerCap" minOccurs="1" maxOccurs="1" />
    <xs:element name="columnGranularity" type="IntegerCap" minOccurs="1" maxOccurs="1" />
```

```
        <xs:any namespace="##any" processContents="lax" minOccurs="0"
maxOccurs="unbounded"/>
    </xs:sequence>
</xs:complexType>
<xs:complexType name="ROICapabilities">
    <xs:sequence>
        <xs:element name="maxRegions" type="IntegerCap" minOccurs="1"
maxOccurs="1" />
        <xs:element name="minHorizontalResolution" type="IntegerCap" minOccurs="1"
maxOccurs="1" />
        <xs:element name="maxHorizontalResolution" type="IntegerCap" minOccurs="1"
maxOccurs="1" />
        <xs:any namespace="##any" processContents="lax" minOccurs="0"
maxOccurs="unbounded"/>
    </xs:sequence>
</xs:complexType>
<xs:element name="MotionDetectionCapabilities">
    <xs:complexType>
        <xs:sequence>
            <xs:element name="samplingInterval" type="IntergerCap" minOccurs="0"
maxOccurs="1" />
            <xs:element name="motionTypes" type="MotionTypeEnum" minOccurs="0"
maxOccurs="1" />
            <xs:element name="minObjectSize" type="IntegerCap" minOccurs="0"
maxOccurs="1" />
            <xs:element name="maxObjectSize" type="IntegerCap" minOccurs="0"
maxOccurs="1" />
            <xs:element name="Grid" type="GridCapabilites" minOccurs="0"
maxOccurs="1" />
            <xs:element name="ROI" type="ROICapabilities" minOccurs="0"
maxOccurs="1" />
            <xs:any namespace="##any" processContents="lax" minOccurs="0"
maxOccurs="unbounded"/>
        </xs:sequence>
        <xs:attribute name="version" type="xs:string" use="required" />
    </xs:complexType>
</xs:element>
```

5.10.2.2 Sound Detection
5.10.2.2.1 /OpenHome/Event/SoundDetection

| | | | |
|---|---|---|---|
| URI | /OpenHome/Event/SoundDetection | Type | Command |
| Function | Detection configuration for sound detection channels | | |
| Methods | Query String(s) | Inbound Data | Return Result |
| GET | | | <SoundDetectionList> |
| Notes | If the device supports sound detection, a sound detection ID will be allocated for each audio input channel ID. The sound detection ID must correspond to the audio input channel ID. | | |

SoundDetectionList XML Block

```
<!-- SoundDetectionList -->
<xs:element name="SoundDetectionList" >
    <xs:complexType>
        <xs:sequence minOccurs="0" maxOccurs="unbounded">
            <xs:element ref="SoundDetection" />
        </xs:sequence>
        <xs:attribute name="version" type="xs:string" use="required" />
        <xs:attributeGroup ref="Capabilities" />
    </xs:complexType>
</xs:element>
```

5.10.2.2.2 /OpenHome/Event/SoundDetection/[UID]

| | | | |
|---|---|---|---|
| URI | /OpenHome/Eyent/SouondDetection/[UID] | Type | Command |
| Function | Sound detection configuration for all audio input channels. | | |
| Methods | Query String(s) | Inbound Data | Return Result |
| GET | | | <SoundDetection> |
| PUT | | <SoundDetection> | <ResponseStatus> |
| Notes | Note that the ID used here MUST correspond to the audio input channel ID.<br><triggeringType> indicates the signal conditions to trigger the input port.<br>Rising/Fallin refer to a rising/falling edge of a signal.<br>High/Low will continuously trigger for the duration of the high/low input signal. | | |

SoundDetection XML Block

```
<!-- SoundDetection -->
<xs:complexType name="TriggerType">
    <xs:simpleContent>
        <xs:restriction base="StringCap">
            <xs:enumeration value="high" />
            <xs:enumeration value="low" />
            <xs:enumeration value="rising" />
            <xs:enumeration value="falling" />
        </xs:restriction>
    </xs:simpleContent>
</xs:complexType>
```

```xml
<xs:element name="SoundDetection" >
  <xs:complexType>
    <xs:sequence>
      <xs:element name="id" type="IdCap" minOccurs="1" maxOccurs="1" />
      <xs:element name="enabled" type="BooleanCap" minOccurs="1" maxOccurs="1" />
      <xs:element name="triggeringType" type="TriggerType" minOccurs="1" maxOccurs="1" />
      <xs:element name="detectionThreshold" type="PercentageCap" minOccurs="1" maxOccurs="1" />
    </xs:sequence>
    <xs:attribute name="version" type="xs:string" use="required" />
  </xs:complexType>
</xs:element>
```

5.10.2.3 Temperature Detection
5.10.2.3.1 /OpenHome/Event/TemperatureDetection

| URI | /OpenHome/Event/TemperatureDetection | Type | Command |
|---|---|---|---|
| Function | Detection configuration for temperature change detection channels | | |
| Methods | Query String(s) | Inbound Data | Return Result |
| GET | | | <TemperatureDetectionList> |
| Notes | If the device supports PIR detection, a temperature detection ID will be allocated for each temperature input channel ID. The temperature detection ID must correspond to the temperature input channel ID. | | |

TemperatureDetectionList XML Block

```xml
<!-- TemperatureDetectionList -->
<xs:element name="TemperatureDetectionList" >
  <xs:complexType>
    <xs:sequence minOccurs="0" maxOccurs="unbounded">
      <xs:element ref="SoundDetection" />
    </xs:sequence>
    <xs:attribute name="version" type="xs:string" use="required" />
    <xs:attributeGroup ref="Capabilities" />
  </xs:complexType>
</xs:element>
```

5.10.2.3.2 /OpenHome/Event/TemperatureDetection/[UID]

| URI | /OpenHome/Event/TemperatureDetection/[UID] | Type | Command |
|---|---|---|---|
| Function | Temperature detection configuration for temperature input channels. | | |
| Methods | Query String(s) | Inbound Data | Return Result |
| GET | | | <TemperatureDetection> |
| PUT | | <TemperatureDetection> | <ResponseStatus> |
| Notes | Note that the ID used here MUST correspond to the temperature input channel ID.<br><triggeringType> indicates the signal conditions to trigger the input port.<br>Rising/Falling refer to a rising/falling edge of a signal. High/Low will continuously trigger for the duration of the high/low input signal. | | |

TemperatureDetection XML Block

```xml
<!-- TemperatureDetection -->
<xs:complexType name="TriggerType">
  <xs:simpleContent>
    <xs:restriction base="StringCap">
      <xs:enumeration value="high" />
      <xs:enumeration value="low" />
      <xs:enumeration value="rising" />
      <xs:enumeration value="falling" />
    </xs:restriction>
  </xs:simpleContent>
</xs:complexType>
<xs:element name="TemperatureDetection" >
  <xs:complexType>
    <xs:sequence>
      <xs:element name="id" type="IdCap" minOccurs="1" maxOccurs="1" />
      <xs:element name="enabled" type="BooleanCap" minOccurs="1" maxOccurs="1" />
      <xs:element name="triggeringType" type="TriggerType" minOccurs="1" maxOccurs="1" />
      <xs:element name="detectionThreshold" type="PercentageCap" minOccurs="1" maxOccurs="1" />
    </xs:sequence>
    <xs:attribute name="version" type="xs:string" use="required" />
  </xs:complexType>
</xs:element>
```

5.10.2.3.3 /OpenHome/Event/TemperatureDetection/[UID]/ Current

| URI | /OpenHome/Event/TemperatureDetectioni[UID]/Current | Type | Command |
|---|---|---|---|
| Function | Get Current Temperature | | |
| Methods | Query String(s) | Inbound Data | Return Result |
| GET | | | <CurrentTemperature> |
| Notes | Note that the ID used here MUST correspond to the temperature input ID. Read-only | | |

CurrentTemperature XML Block

```
<!-- CurrentTemperature -->
<xs:element name="CurrentTemperature" >
  <xs:complexType>
    <xs:sequence>
      <xs:element name="dateTime" type="DateTimeCap" minOccurs="1" maxOccurs="1" />
      <xs: element name="scale" minOccurs="1" maxOccurs="1">
        <xs:complexType>
          <xs:simpleContent>
            <xs:restriction base="StringCap">
              <xs:enumeration value="C" />
              <xs:enumeration value="F" />
            </xs:restriction>
          </xs:simpleContent>
        </xs:complexType>
      </xs:element>
      <xs:element name="degree" type="IntegerCap" minOccurs="1" maxOccurs="1" />
    </xs:sequence>
    <xs:attribute name="version" type="xs:string" use="required" />
  </xs:complexType>
</xs:element>
```

5.10.3 Notification: EventAlert

The EventAlert Notification is sent when an Event trigger occurs and the Event is configured to send EventAlert (see Section 5.10.1.6). This data type supports non-media upload alerts, for media upload format, see Section 4.2.5 Image Media Channel

| URI | http or https://<ipAddress>:<portNo>/<eventAlertURL> or poll://<eventAlertURL> | Type | Notification |
|---|---|---|---|
| Function | This function is used by the Camera to send event alerts to the Gateway. | | |
| Methods | Query String(s) | Inbound Data | Return Result |
| POST | | EventAlert | |
| Notes | <eventAlertURL> is derived from <HostNotification> element of /OpenHome/Event/notification. Response to POST consists of standard HTTP responses (e.g., 200, 404, etc.) | | |

EventAlert XML Block

```
<!-- EventAlert -->
<xs:complexType name="AlertEventState">
  <xs:simpleContent>
    <xs:restriction base="StringCap">
      <xs:enumeration value="active" />
      <xs:enumeration value="inactive" />
    </xs:restriction>
  </xs:simpleContent>
</xs:complexType>
<xs:complexType name="AlertDetectionRegionList">
  <xs:sequence minOccurs="1" maxOccurs="unbounded">
    <xs:element name="DetectionRegionEntry">
      <xs:complexType>
        <xs:sequence>
          <xs:element name="regionID" type="IdCap" minOccurs="1" maxOccurs="1" />
          <xs:element name="sensitivityLevel" type="PercentageCap" minOccurs="1" maxOccurs="1" />
          <xs:element name="detectionThreshold" type="PercentageCap" minOccurs="1" maxOccurs="1" />
          <xs:any namespace="##any" processContents="lax" minOccurs="0" maxOccurs="unbounded"/>
        </xs:sequence>
      </xs:complexType>
    </xs:element>
  </xs:sequence>
  <xs:attributeGroup ref="Capabilities" />
</xs:complexType>
<xs:element name="EventAlert" >
  <xs:complexType>
    <xs:sequence>
```

```
        <xs:element name="id" type="IdCap" minOccurs="1"
maxOccurs="1" />
        <xs:element name="dateTime" type="DateTimeCap" minOccurs="1"
maxOccurs="1" />
        <xs:element name="activePostCount" type="IntegerCap" minOccurs="1"
maxOccurs="1" />
        <xs:element name="eventType" type="EventType" minOccurs="1"
maxOccurs="1" />
        <xs:element name="eventState" type="AlertEventState" minOccurs="1"
maxOccurs="1" />
        <xs:element name="eventDescription" type="StringCap" minOccurs="0"
maxOccurs="1" />
        <xs:element name="DetectionRegionList" type="AlertDetectionRegionList"
minOccurs="0" maxOccurs="1" />
        <xs:element name="Extensions" type="EventAlertExt" minOccurs="0"
maxOccurs="1" />
    </xs:sequence>
    <xs:attribute name="version" type="xs:string" use="required" />
  </xs:complexType>
</xs:element>
```

6 ACRONYMS

AAA Authentication, Authorization, and Accounting
AP Access Point
BSSID Basic Service Set Identifier
CA Certificate Authority
DNS Domain Name System
DVR Digital Video Recording
GUUID Globally Universally Unique Identifier
HLS HTTP Live Streaming (Internet draft-pantos-http-live-streaming-07)
HTTP/HTTPS Hypertext Transfer Protocol (Secured)
PIR Passive Infra Red
PSIA Physical Security Interoperability Alliance (www.psialliance.org)
PTZ Pan, Tilt, Zoom
RaCM PSIA Recording and Content Management (Specification)
RFC Request for Comments
RSSI Received Signal Strength Indication
RTP Real Time Transport Protocol
RTSP Real Time Streaming Protocol
SSDP Simple Service Discovery Protocol (used by UPnP)
SSID Service Set Identifier
SSL Secure Sockets Layer (predecessor to TLS)
TCP Transmission Control Protocol
TLS Transport Layer Security
URI/URL Universal Resource Identifier/Universal Resource Locator
UPnP Universal Plug and Play
USN Unique Service Number (UPnP device specific ID)
UTC Coordinated Universal Time
XML Extensible Markup Language

7 Frequently Asked Questions (FAQ)

Semi-persistent connections: All connections are semi-persistent and are dropped after lack of activity.

8 APPENDIX A: EXAMPLES

8.1.1 HTTP[S] Command Channel Example

Gateway Originated Command

The example below illustrates a Command from Gateway to retrieve wireless configurations for the Camera's network interface 1. See Section 5.4.4 for URI and XML definitions.

```
Gateway->Camera
GET /System/Network/interfaces/1/wireless HTTP/1.1
Host: 192.168.2.52
Date: Sat, 11 Jun 2011 18:23:51 GMT
Camera->Gateway
HTTP/1.1 401 Unauthorized
Host: 192.168.1.50
Date: Sat, 11 Jun 2011 18:23:60 GMT
WWW-Authenticate: Digest realm="Administrator@192.168.1.50",
    qop="auth,auth-int",          nonce="dcd98b7102dd2f0e8b11d0f600bfb0c093",
    opaque="5ccc069c403ebaf9f0171e9517f40e41"
Gateway->Camera
GET /System/Network/interfaces/1/wireless HTTP/1.1
Host: 192.168.2.52
Date: Sat, 11 Jun 2011 18:23:51 GMT
Authorization: Digest username="<SerialNumber>",
    realm=" mediagw@ server.icontrol.com",nonce="dcd98b7102dd2f0e8b11d0f600bfb0c093",
    uri="/vidupload/icamera/1308677301445/43/f/889229dcd864691ffcd4bff342153a00/",
    qop=auth,
    nc=00000001,
    cnonce="0a4f113b",          response="6629fae49393a05397450978507c4ef1",
    opaque="5ccc069c403ebaf9f0171e9517f40e41"
Camera->Gateway
HTTP/1.1 200 OK
Content-Type: application/xml; charset="UTF-8"
Connection: Keep-Alive
Content-Length: <size of the xml body below in bytes>
```

```
<Wireless version="1.0">
  <enabled>true</enabled>
  <wirelessNetworkMode>infrastructure</wirelessNetworkMode>
  <profile>
     <ssid>iHub_00622011211</ssid>
     <WirelessSecurity>
        <securityMode>WPA2-personal</securityMode>
           <WPA>
              <algorithmType>AES</algorithmType>
              <sharedKey>mySecretKey</sharedKey>
           </WPA>
     </WirelessSecurity>
  </profile>
</Wireless>
```

Camera Originated Outbound Notification

The following example illustrates a Notification from Camera indicating a motion event.

```
Camera->Gateway
POST
/gateway.icontrol.com/GWServices/EventAlert/1308677301445/43/f/889229dcd864691ffcd4bff342153a00/
HTTP/1.1
Host: gateway.icontrol.com
Date: Sat, 11 Jun 2011 18:23:51 GMT
...
Gateway ->Camera
HTTP/1.1 401 Unauthorized
Host: server.icontrol.com
Date: Sat, 11 Jun 2011 18:23:60 GMT
WWW-Authenticate: Digest realm="mediagw@gateway.icontrol.com",
    qop="auth,auth-int",           nonce="dcd98b7102dd2f0e8b11d0f600bfb0c093",
    opaque="5ccc069c403ebaf9f0171e9517f40e41"
Camera->Gateway
POST
/gateway.icontrol.com/GWServices/EventAlert/1308677301445/43/f/889229dcd864691ffcd4bff342153a00/
HTTP/1.1
Host: gateway.icontrol.com
Date: Sat, 11 Jun 2011 18:23:51 GMT
Content-Type: application/xml; charset="UTF-8"
Authorization: Digest username="<SerialNumber>",
    realm=" mediagw@ server.icontrol.com",nonce="dcd98b7102dd2f0e8b11d0f600bfb0c093",
    uri="/gateway.icontrol.com/GWServices/EventAlert/1308677301445/43/f/889229dcd864691ffcd4bff342153a00/",
    qop=auth,
    nc=00000001,
    cnonce="0a4f113b",          response="6629fae49393a05397450978507c4ef1",
    opaque="5ccc069c403ebaf9f0171e9517f40e41"
Content-Length: <size of the xml body below in bytes>
<EventAlert version="1.0">
  <id>23XZ0933</id>
  <dateTime>2009-03-11T15.5:27Z</dateTime >
  <activePostCount>301</activePostCount>
  <eventType>PirMD</eventType>
  <eventState>active</eventState>
  <eventDescription>PIR motion detected</eventDescription>
</EventAlert>
Gateway->Camera
HTTP/1.1 200 OK
Connection: Keep-Alive
```

Camera Notification via Inbound Polling

The following example illustrates a motion event Notification from Camera that is delivered to the Gateway via inbound polling.

```
Gateway->Camera
GET /OpenHome/System/poll/notifications/poll?linger=120 HTTP/1.1
Host: 192.168.2.52
Camera->Gateway
HTTP/1.1 401 Unauthorized
Host: server.icontrol.com
Date: Sat, 11 Jun 2011 18:23:60 GMT
```

```
WWW-Authenticate: Digest realm="mediagw@gateway.icontrol.com",
  qop="auth,auth-int",           nonce="dcd98b7102dd2f0e8b11d0f600bfb0c093",
  opaque="5ccc069c403ebaf9f0171e9517f40e41"
Gateway->Camera
GET /OpenHome/System/poll/notifications/poll?linger=120 HTTP/1.1
Host: 192.168.2.52
Authorization: Digest username="<SerialNumber>",
  realm=" mediagw@ server.icontrol.com",nonce="dcd98b7102dd2f0e8b11d0f600bfb0c093",
  uri/OpenHome/System/poll/notifications/poll",
  qop=auth,
  nc=00000001,
  cnonce="0a4f113b",           response="6629fae49393a05397450978507c4ef1",
  opaque="5ccc069c403ebaf9f0171e9517f40e41"
After 120 seconds without Notification
Camera->Gateway
HTTP/1.1 200 OK
Content-Type: application/xml; charset="UTF-8"
Connection: Keep-Alive
Content-Length: 0
As soon as Gateway received and processed the 200 OK message
Gateway->Camera
GET /OpenHome/System/poll/notifications/poll?linger=120 HTTP/1.1
Host: 192.168.2.52
Camera->Gateway
HTTP/1.1 401 Unauthorized
Host: server.icontrol.com
Date: Sat, 11 Jun 2011 18:24:60 GMT
WWW-Authenticate: Digest <digest challenge>
Gateway->Camera
GET /OpenHome/System/poll/notifications/poll?linger=120 HTTP/1.1
Host: 192.168.2.52
Authorization: Digest <challenge response>
Camera->Gateway
HTTP/1.1 200 OK
Content-Type: application/xml; charset="UTF-8"
Connection: Keep-Alive
Content-Length: <size of the xml body below in bytes>
<NotificationWrapper>
  <notificationURI>/gateway.icontrol.com/GWServices/EventAlert/1308677301445/43/f/889229dcd864691ffcd4bff342153a00
  </notificationURI>
  <notifyTime>2009-03-11T15:27.5Z</notifyTime>
  <notifyBody>
    <EventAlert version="1.0">
      <id>23XZ0933</id>
      <dateTime>2009-03-11T15:27.4Z</dateTime >
      <activePostCount>301</activePostCount>
      <eventType>PirMD</eventType>
      <eventState>active</eventState>
      <eventDescription>PIR motion detected</eventDescription>
    </EventAlert>
  </notifyBody>
</NotificationWrapper>
```

8.1.2 RTSP Media Tunnel Example
Precondition: successful TLS negotiation
Camera→Gateway
POST
/1607349153877243391/icamera/sslrelay/1308677301445/
889229dcd864691ffcd4bff342153ad7/HTTP/1.1
Gateway→Camera
DESCRIBE   rtsp://192.168.2.52:4302/OpenHome/Streaming/channels/2/rtsp RTSP/1.0
CSeq: 1
Accept: application/sdp
Accept-Language: en
User-Agent: iControl Applet 1.0
Authorization: Basic aWN4OGdla0Y6bG5IMXdQQ2g=
Content-Length: 0
Camera→Gateway
RTSP/1.0 200 OK
Cseq: 1
Content-Base:       rtsp://192.168.2.52:4302/OpenHome/
Streaming/channels/2/rtsp
Content-Type: application/sdp
Content-Length: 405
v=0
o=-15034 15034 IN IP4 192.168.107.226
s=RTSP Server(MPEG4)—iCamera7FF4BF
c=IN IP4 0.0.0.0
t=0 0
a=charset: Shift_JIS
a=range:npt=0—
a=control:*
a=etag:1234567890
m=video 0 RTP/AVP 96
b=AS:512
a=rtpmap:96 MP4V-ES/30000
a=control:trackID=1
a=fmtp:96 profile-level-id=1;
config=000001B001000001B509000001000000001200084-
5D4C28A021E0A21F;decode_buf=76800
a=x-framerate:15
a=framerate:15.0
Gateway→Camera
SETUP    rtsp://192.168.2.52:4302/Streaming/channels/2/
rtsp/trackID=1 RTSP/1.0

CSeq: 2
Transport: RTP/AVP/TCP;unicastinterleaved=0-1
User-Agent: iControl Applet 1.0
Content-Length: 0
Camera→Gateway
RTSP/1.0 200 OK
Cseq: 2
Session: 26;timeout=60
Transport: RTP/AVP/TCP;unicastinterleaved=0-1; ssrc=65d471b5;mode="PLAY"
Gateway→Camera
PLAY rtsp://192.168.2.52:4302/OpenHome/Streaming/channels/2/rtsp RTSP/1.0
Accept-Language: en
CSeq: 3
User-Agent: iControl Applet 1.0
Session: 26
Range: npt=0.000000—
Content-Length: 0
Camera→Gateway
RTSP/1.0 200 OK
Cseq: 3
Session: 26;timeout=60
RTP-Info: url=trackID=1;seq=0;rtptime=0
Range: npt=0—
RTCP-Interval: 6000

8.1.3 MJPEG Media Tunnel Example
Precondition: successful TLS negotiation
Camera→Gateway
POST /1607349153877243391/icamera/sslrelay/1308677301445/889229dcd864691ffcd4bff342153ad7/HTTP/1.0
Gateway→Camera
GET /OpenHome/Streaming/channel/1/http HTTP/1.1
Authorization: Basic tdNnOGdla0Y6bG5IMXdQQ2g=
Camera→Gateway
HTTP/1.0 200 OK
Content-Type: multipart/x-mixed-replace; boundary=MyRandomStr
MyRandomStr
Content-Type: image/jpeg
Content-Length: 22444
<jpeg binary data>
8.1.4 Encoder Channel Query Capability and Set Configuration Example
The following example illustrates a Gateway querying Camera's encoder channel 1's capabilities and base on capability received, set channel 1 with desired configurations. Note, Authorization flow examples not shown.
Gateway→Camera (get capability for encoder channel 1)
GET /OpenHome/Streaming/channels/1/capabilities HTTP/1.1
Host: 192.168.2.52
Pragma: no-cache
Cache-Control: no-cache
Date: Sat, 11 Jun. 2011 18:23:51 GMT Camera->Gateway (response)
HTTP/1.1 200 OK
Content-Type: application/xml; charset="UTF-8"
Connection: Keep-Alive
Content-Length: <size of the xml body below in bytes>
<StreamingCapabilities version="1.0">
  <id opt="1,2">1</id>
  <channelName min="0" max="64"></channelName>
  <ControlProtocolList>
    <ControlProtocol>
      <streamingTransport opt="RTSP/RTP">RTSP/RTP</streamingTransport>
    </ControlProtocol>
  </controlProtocolList>
  <Video>
    <enabled opt="true,false">true</enabled>
    <VideoInputChannelID opt="0,1">1</VideoInputChannelID>
    <videoCodecType opt="MPEG4,H264,3GPP">MPEG4</videoCodecType>
    <videoResolutionWidth min="0" max="640">0</videoResolutionWidth>
    <videoResolutionHeight min="0" max="480">0</videoResolutionHeight>
    <videoQualityControlType opt="CBR,VBR">CBR</videoQualityControlType>
    <constantBitRate min="0" max="2000" dynamic="true">500</constantBitRate>
    <maxFrameRate min="0" max="30" dynamic="true">15</maxFrameRate>
    <snap ShotImageTpe opt="JPEG">JPEG</snapShotImageTpe>
  </Video>
  <Audio>
    <enabled opt="true,false">true</enabled>
    <audioInputChannelID opt="1">1</audioInputChannelID>
    <aduioCompressionType opt=G.726,G.711ulaw,G.711alaw,AMR,AAC">G.726
    </aduioCompressionType>
    <audioBitRate opt="32">32</audioBitRate>
  </Audio>
</StreamingCapabilities>
Gateway->Camera (set encoder channel 1's configuration)
PUT /OpenHome/Streaming/channels/1 HTTP/1.1
Host: 192.168.2.52
Pragma: no-cache
Cache-Control: no-cache
Date: Sat, 11 Jun 2011 18:23:51 GMT
Content-Type: application/xml; charset="UTF-8"
Content-Length: <size of the xml body below in bytes>
<StreamingChannel version="1.0">
  <id>1</id>
  <channelName>rtsp channel 1</channelName>
  <enabled>true</enabled>

```
<Transport>
   <ControlProtocol>
      <streamingTransport>RTSP/RTP</streamingTransport>
   </ControlProtocol>
</Transport>
<Video>
   <enabled>true</enabled>
   <VideoInputChannelID>0</VideoInputChannelID>
   <videoCodecType>H264</videoCodecType>
   <videoResolutionWidth>640</videoResolutionWidth>
   <videoResolutionHeight>480</videoResolutionHeight>
   <videoQualityControlType>CBR</videoQualityControlType>
   <constantBitRate>750</constantBitRate>
   <fixedQuality>70</fixedQuality>
   <maxFrameRate>30</maxFrameRate>
   <snapShotImageTpe>JPEG</snapShotImageTpe>
</Video>
<Audio>
   <enabled>false</enabled>
</Audio>
</StreamingChannel>
Camera->Gateway (response)
HTTP/1.1 200 OK
Content-Type: application/xml; charset="UTF-8"
Connection: Keep-Alive
Content-Length: <size of the xml body below in bytes>
<ResponseStatus version="1.0">
   <statusCode>1</statusCode>
   <statusString>OK</statusString>
</ResponseStatus>
```

8.1.5 Media Streaming Examples
MJPEG Streaming
The following example illustrates how to start a MJPEG video stream from channel 1. Gateway→Camera (start streaming on channel 1)
GET /OpenHome/Streaming/channels/1/http HTTP/1.1
Host: 192.168.2.52
Camera→Gateway
HTTP/1.1 401 Unauthorized
Host: 192.168.2.52
Date: Sat, 11 Jun. 2011 18:23:40 GMT
WWW-Authenticate: Digest <digest challenge>
Gateway→Camera (start streaming on channel 1)
GET /OpenHome/Streaming/channels/1/http HTTP/1.1
Host: 192.168.2.52
Pragma: no-cache
Authorization: Digest <challenge response>
Cache-Control: no-cache
Date: Sat, 11 Jun. 2011 18:23:51 GMT
Camera→Gateway
HTTP/1.1 200 OK
Content-Type: multipart/x-mixed-replace;boundary= MyRandomStr
   MyRandomStr
Content-Type: image/jpeg
Content-Length: 22444
<jpeg binary data>
Picture Snapshot
   The following example illustrates how to capture a JPEG snapshot from channel 1 using a different image resolution than the pre-configured channel image size.
Gateway→Camera (capture picture)
GET /OpenHome/Streaming/channels/1/picture?videoResolutionWidth=320&videoResolutionHeight=240 HTTP/1.1
Host: 192.168.2.52
Camera→Gateway
HTTP/1.1 401 Unauthorized
Host: 192.168.2.52
Date: Sat, 11 Jun. 2011 18:23:40 GMT
WWW-Authenticate: Digest <digest challenge>
Gateway→Camera (capture picture)
GET /OpenHome/Streaming/channels/1/picture?videoResolutionWidth=320&videoResolutionHeight=24 0 HTTP/1.1
Host: 192.168.2.52
Pragma: no-cache
Authorization: Digest <challenge response>
Cache-Control: no-cache
Date: Sat, 11 Jun. 2011 18:23:51 GMT
Camera→Gateway
HTTP/1.1 200 OK
Content-Type: image/jpeg
Content-Length: 5002
<jpeg binary data>
Trigger a Video Clip Upload
   The following example illustrates how to trigger a video clip upload.
Gateway→Camera (trigger video capture and upload)
POST /OpenHome/Streaming/channels/1/video/upload HTTP/1.1
Host: 192.168.2.52
Camera→Gateway (response)
HTTP/1.1 401 Unauthorized
Host: 192.168.2.52
Date: Sat, 11 Jun. 2011 18:23:40 GMT
WWW-Authenticate: Digest <digest challenge>
Gateway->Camera
POST /OpenHome/Streaming/channels/1/video/upload HTTP/1.1
Host: 192.168.2.52
Pragma: no-cache

```
Authorization: Digest <challenge response>
Cache-Control: no-cache
Date: Sat, 11 Jun 2011 18:23:51 GMT
Content-Type: application/xml; charset="UTF-8"
Content-Length: <size of the xml body below in bytes>
<MediaUpload version="1.0">
  <id>998d2002</id>
  <videoClipFormatType>MP4</videoClipFormatType>
  <preCaptureLength>10000</preCaptureLength>
  <postCaptureLength>20000</postCaptureLength>
  <target_url>
    https://gw.icontrol.com/vidupload/43/f/889229dcd864691ffcd4bff342153a00/
  </target_url>
  <failure_url>
    https:// gw.icontrol.com/vidulfailed/43/f/889229dcd864691ffcd4bff342153a00/
  </failure_url>
</MediaUpload>
Camera->Gateway (response)
HTTP/1.1 200 OK
Content-Type: application/xml; charset="UTF-8"
Connection: Keep-Alive
Content-Length: <size of the xml body below in bytes>
<ResponseStatus version="1.0">
  <statusCode>1</statusCode>
  <status String>OK</statusString>
</ResponseStatus>
```

Camera Starts Media Upload
Camera→Gateway (upload video clip)
POST /vidupload/43/f/889229dcd864691ffcd4bff342153a00/HTTP/1.1
Host: gw.icontrol.com
Gateway→Camera (response)
HTTP/1.1 401 Unauthorized
Host: gw.icontrol.com
Date: Sat, 11 Jun. 2011 18:23:60 GMT
WWW-Authenticate: Digest <digest challenge>
Camera→Gateway (upload video clip)
POST /vidupload/43/f/889229dcd864691ffcd4bff342153a00/HTTP/1.1
Host: gw.icontrol.com
Content-Type: video/mp4
Date: Sat, 11 Jun. 2011 18:23:51 GMT
X-Capture-Time: 1308677301225
Authorization: Digest <challenge response>
Content-Length: 144555
<mp4 binary content>
Gateway→Camera (response)
HTTP/1.1 200 OK 8.1.6 Video Upload Example
Camera→Gateway
POST /vidupload/icamera/1308677301445/43/f/889229dcd864691ffcd4bff342153a00/HTTP/1.1
Host: server.icontrol.com
Content-Type: video/mp4
Date: Sat, 11 Jun. 2011 18:23:51 GMT
X-Capture-Time: 1308677301225
Gateway→Camera
HTTP/1.1 401 Unauthorized
Host: server.icontrol.com
Date: Sat, 11 Jun. 2011 18:23:60 GMT
WWW-Authenticate: Digest realm="mediagw@server.icontrol.com", qop="auth,auth-int", nonce="dcd98b7102dd2f0e8b11d0f600bfb0c093", opaque="5ccc069c403ebaf9f0171e9517f40e41"
Camera→Gateway
POST /vidupload/icamera/1308677301445/43/f/889229dcd864691ffcd4bff342153a00/HTTP/1.1
Host: server.icontrol.com
Content-Type: video/mp4
Date: Sat, 11 Jun. 2011 18:23:51 GMT
X-Capture-Time: 1308677301225
Authorization: Digest username="<SerialNumber>", realm="mediagw@ server.icontrol.com", nonce="dcd98b7102dd2f0e8b11d0f600bfb0c093", uri="/vidupload/icamera/1308677301445/43/f/889229dcd864691ffcd4bff342153a00/", qop=auth,
  nc=00000001,
  cnonce="0a4f113b",
    response="6629fae49393a05397450978507c4ef1",
    opaque="5ccc069c403ebaf9f0171e9517f40e41"
Content-Length: 144555
<mp4 binary content>
Gateway→Camera
HTTP/1.1 200 OK
8.1.7 Event Notification Examples
Configuration for Motion Detection Alert
  The example below illustrates a Command from Gateway to configure the camera to send PIR motion event Notifications to Gateway Gateway->Camera
PUT /Event HTTP/1.1
Host: 192.168.2.52
Date: Sat, 11 Jun 2011 18:23:51 GMT
Camera->Gateway
HTTP/1.1 401 Unauthorized
Host: 192.168.1.50
Date: Sat, 11 Jun 2011 18:23:60 GMT
WWW-Authenticate: <challenge>

```
Gateway->Camera
PUT /Event HTTP/1.1
Host: 192.168.2.52
Pragma: no-cache
Authorization: Digest <challenge response>
Cache-Control: no-cache
Date: Sat, 11 Jun 2011 18:23:51 GMT
Content-Type: application/xml; charset="UTF-8"
Content-Length: <size of the xml body below in bytes>
<EventNotification>
    <EventTriggerList>
      <EventTrigger>
        <id>0</id>
        <eventType>PirMD</eventType>
        <eventTypeInputID>0</eventTypeInputID>
        <intervalBetweenEvents>300</intervalBetweenEvents>
        <EventTriggerNotificationList>
          <EventTriggerNotification>
            <notificationID>0</notificationID>
            <notificationMethod>HTTP</notificationMethod>
            <notificationRecurrence>beginningandend</notificationRecurrence>
          </EventTriggerNotification>
        </EventTriggerNotificationList>
      </EventTrigger>
    </EventTriggerList>
    <EventNotificationMethods>
      <HostNotificationList>
        <HostNotification>
          <id>0</id>
          <url>https://192.168.2.89/service/eventalert/</url>
          <httpAuthenticationMethod>MD5digest</httpAuthenticationMethod>
        </HostNotification>
      </HostNotificationList>
      <NonMediaEvent>
        <enabled>true</enabled>
      </NonMediaEvent>
    </EventNotificationMethods>
</EventNotification>
```

Motion EventAlert Example

The example below illustrates a Notification from Camera to Gateway when a motion event is detected.

```
Camera→Gateway
POST /service/eventalert HTTP/1.1
Host: 192.168.2.52
Date: Sat, 11 Jun. 2011 18:23:51 GMT
Gateway→Camera
HTTP/1.1 401 Unauthorized
Host: 192.168.1.50
Date: Sat, 11 Jun. 2011 18:23:60 GMT
WWW-Authenticate: <challenge>
Camera→Gateway
POST /service/eventalert HTTP/1.1
Host: 192.168.2.52
Pragma: no-cache
Authorization: Digest <challenge response>
Cache-Control: no-cache
Date: Sat, 11 Jun. 2011 18:23:51 GMT
Content-Type: application/xml; charset="UTF-8"
Content-Length: <size of the xml body below in bytes>
<EventAlert>
<id>100</id>
<dateTime>2012-01-09T09:01:29.970-08:00</dateTime>
<activePostCount>0</activePostCount>
<eventType>PirMD</eventType>
<eventState>active</eventState>
</EventAlert>
Gateway→Camera (response)
HTTP/1.1 200 OK
```

8.1.8 SSL Server Certificate Update Flow
See FIG. 29.

The invention claimed is:

1. A method comprising:
communicating, by a premises management system located at a premises, via a first wireless access point of a plurality of wireless access points;
determining first signal information associated with the first wireless access point and second signal information associated with a second wireless access point of the plurality of wireless access points;
determining, based on the first signal information and the second signal information, satisfaction of a connection switch threshold; and
communicating, based on the satisfaction of the connection switch threshold, via the second wireless access point.

2. The method of claim 1, wherein the connection switch threshold comprises a difference in respective signal information of at least two wireless access points of the plurality of wireless access points.

3. The method of claim 1, wherein the communicating via the second wireless access point comprises communicating, via the second wireless access point, with at least one computing device located at the premises.

4. The method of claim 1, wherein the first signal information and the second signal information each comprise at least one of signal strength, error rate, or interference.

5. The method of claim 1, wherein the communicating via the second wireless access point comprises at least one of sending data via the second wireless access point or receiving data via the second wireless access point.

6. The method of claim 1, wherein the communicating via the second wireless access point is further based on satisfaction of a minimum switch time.

7. The method of claim 1, wherein the determining the satisfaction of a connection switch threshold is based on comparing the first signal information and the second signal information.

8. A system comprising:
a first wireless access point;
a second wireless access point; and
a premises management system located at a premises, wherein the premises management system is configured to:
communicate via the first wireless access point;
determine first signal information associated with the first wireless access point and second signal information associated with the second wireless access point;
determine, based on the first signal information and the second signal information, satisfaction of a connection switch threshold; and
communicate, based on the satisfaction of the connection switch threshold, via the second wireless access point.

9. The system of claim 8, wherein the premises management system comprises a camera.

10. The system of claim 8, further comprising a gateway device configured to:
determine the connection switch threshold; and
send, to the premises management system, an indication of the connection switch threshold.

11. The system of claim 10, wherein the gateway device is configured to determine the connection switch threshold based on signal strength, error rates, or interference associated with at least one of the first wireless access point or the second wireless access point.

12. The system of claim 10, wherein the gateway device is further configured to:
determine a minimum switch time; and
send the premises management system an indication of the minimum switch time; and
wherein the premises management system is configured to communicate via the second wireless access point further based on satisfaction of a minimum switch time.

13. The system of claim 10, the premises management system is configured to communicate via the second wireless access point by streaming, to the gateway device, video.

14. The system of claim 10, wherein the gateway device comprises a display.

15. The system of claim 8, wherein the connection switch threshold comprises a difference between the first signal information and the second signal information.

16. A premises management system comprising:
one or more processors; and
memory storing instructions that, when executed by the one or more processors, cause the premises management system to:
communicate via a first wireless access point of a plurality of wireless access points;
determine first signal information associated with the first wireless access point and second signal information associated with a second wireless access point of the plurality of wireless access points;
determine, based on the first signal information and the second signal information, satisfaction of a connection switch threshold; and
communicate, based on the satisfaction of the connection switch threshold, via the second wireless access point.

17. The premises management system of claim 16, wherein the connection switch threshold comprises a difference in respective signal information of at least two wireless access points of the plurality of wireless access points.

18. The premises management system of claim 16, wherein the instructions that, when executed, cause the premises management system to communicate via the second wireless access point cause the premises management system to communicate, via the second wireless access point, with at least one computing device located at a premises.

19. The premises management system of claim 16, wherein the first signal information and the second signal information each comprise at least one of signal strength, error rate, or interference.

20. The premises management system of claim 16, wherein the instructions that, when executed, cause the premises management system to communicate via the second wireless access point cause the premises management system to at least one of send data via the second wireless access point or receive data via the second wireless access point.

21. The premises management system of claim 16, wherein the instructions that, when executed, cause the premises management system to communicate via the second wireless access point cause the premises management system to communicate via the second wireless access point further based on satisfaction of a minimum switch time.

22. The premises management system of claim 21, wherein the minimum switch time comprises time elapsed from an initial time of communication via at least one of the plurality of wireless access points.

23. A non-transitory computer-readable medium storing instructions that, when executed, cause:
communicating, by a premises management system located at a premises, via a first wireless access point of a plurality of wireless access points;
determining first signal information associated with the first wireless access point and second signal information associated with a second wireless access point of the plurality of wireless access points;
determining, based on the first signal information and the second signal information, satisfaction of a connection switch threshold; and
communicating, based on the satisfaction of the connection switch threshold, via the second wireless access point.

24. The non-transitory computer-readable medium of claim 23, wherein the connection switch threshold comprises a difference in respective signal information of at least two wireless access points of the plurality of wireless access points.

25. The non-transitory computer-readable medium of claim 23, wherein the communicating via the second wireless access point comprises communicating, via the second wireless access point, with at least one computing device located at the premises.

26. The non-transitory computer-readable medium of claim 23, wherein the first signal information and the second signal information each comprise at least one of signal strength, error rate, or interference.

27. The non-transitory computer-readable medium of claim 23, wherein the communicating via the second wireless access point comprises at least one of sending data via the second wireless access point or receiving data via the second wireless access point.

28. The non-transitory computer-readable medium of claim 23, wherein the communicating via the second wireless access point is further based on satisfaction of a minimum switch time.

29. The non-transitory computer-readable medium of claim 23, wherein the communicating via the second wireless access point is further based on a determination that data has been sent via the first wireless access point.

30. The non-transitory computer-readable medium of claim 23, wherein the communicating via the second wireless access point is further based on termination of a communication session via the first wireless access point.

* * * * *